(12) United States Patent
Chakraborty et al.

(10) Patent No.: US 11,552,290 B2
(45) Date of Patent: Jan. 10, 2023

(54) NEGATIVE ELECTRODES FOR ELECTROCHEMICAL CELLS

(71) Applicant: FORM ENERGY INC., Somerville, MA (US)

(72) Inventors: Rupak Chakraborty, Brookline, MA (US); Jarrod David Milshtein, Arlington, MA (US); Eric Weber, Pittsburgh, PA (US); William Henry Woodford, Cambridge, MA (US); Yet-Ming Chiang, Weston, MA (US); Ian Salmon McKay, Seattle, WA (US); Liang Su, Medfield, MA (US); Jay Whitacre, Pittsburgh, PA (US); Theodore Alan Wiley, Somervile, MA (US); Kristen Carlisle, Medford, MA (US); Mitchell Terrance Westwood, Boston, MA (US); Rachel Elizabeth Mumma, Somerville, MA (US); Max Rae Chu, Brookline, MA (US); Amelie Nina Kharey, Cambridge, MA (US); Benjamin Thomas Hultman, Somerville, MA (US); Marco Ferrara, Boston, MA (US); Mateo Cristian Jaramillo, San Francisco, CA (US); Isabella Caruso, Boston, MA (US); Jocelyn Newhouse, Somerville, MA (US)

(73) Assignee: FORM ENERGY, INC., Somerville, MA (US)

( * ) Notice: Subject to any disclaimer, the term of this patent is extended or adjusted under 35 U.S.C. 154(b) by 212 days.

(21) Appl. No.: 16/523,722

(22) Filed: Jul. 26, 2019

(65) Prior Publication Data

US 2020/0036002 A1 Jan. 30, 2020
US 2022/0344647 A9 Oct. 27, 2022

Related U.S. Application Data

(60) Provisional application No. 62/868,511, filed on Jun. 28, 2019, provisional application No. 62/790,668,
(Continued)

(51) Int. Cl.
*H01M 4/38* (2006.01)
*H01M 10/48* (2006.01)
(Continued)

(52) U.S. Cl.
CPC ............ *H01M 4/38* (2013.01); *H01M 10/48* (2013.01); *H01M 4/364* (2013.01); *H01M 12/08* (2013.01);
(Continued)

(58) Field of Classification Search
CPC ............... H01M 10/48; H01M 12/08; H01M 2004/021; H01M 2004/025; H01M 4/364; H01M 4/38; Y02E 60/10
See application file for complete search history.

(56) References Cited

U.S. PATENT DOCUMENTS 678,722 A 7/1901 Edison
692,507 A 2/1902 Edison
(Continued)

FOREIGN PATENT DOCUMENTS

CN 101651208 A 2/2010
CN 202797189 U 3/2013
(Continued)

OTHER PUBLICATIONS

Tekin, B. et al., "A New Sodium-Based Aqueous Rechargeable Battery System: The Special Case of Na0.44MnO2/Dissolved Sodium Polysulfide," View online DOI: 10.1002/ente.201700245, Energy Technol. vol. 5, pp. 2182-2188, (2017).
(Continued)

*Primary Examiner* — Lingwen R Zeng
(74) *Attorney, Agent, or Firm* — The Marbury Law Group PLLC

(57) ABSTRACT

Various embodiments provide a battery, a bulk energy storage system including the battery, and/or a method of operating the bulk energy storage system including the battery. In various embodiment, the battery may include a first electrode, an electrolyte, and a second electrode, wherein one or both of the first electrode and the second electrode comprises direct reduced iron ("DRI"). In various embodiments, the DRI may be in the form of pellets. In various embodiments, the pellets may comprise at least
(Continued)

about 60 wt % iron by elemental mass, based on the total mass of the pellets. In various embodiments, one or both of the first electrode and the second electrode comprises from about 60% to about 90% iron and from about 1% to about 40% of a component comprising one or more of the materials selected from the group of $SiO_2$, $Al_2O_3$, MgO, CaO, and $TiO_2$.

56 Claims, 36 Drawing Sheets

Related U.S. Application Data filed on Jan. 10, 2019, provisional application No. 62/711,253, filed on Jul. 27, 2018.

(51) Int. Cl.
- *H01M 4/02* (2006.01)
- *H01M 12/08* (2006.01)
- *H01M 4/36* (2006.01)

(52) U.S. Cl.
CPC .............. *H01M 2004/021* (2013.01); *H01M 2004/025* (2013.01); *Y02E 60/10* (2013.01)

(56) References Cited

U.S. PATENT DOCUMENTS

| | | |
|---|---|---|
| 983,430 A | 2/1911 | Estelle |
| 1,940,385 A | 12/1933 | Karl et al. |
| 1,988,861 A | 1/1935 | Ernst et al. |
| 2,104,973 A | 1/1938 | Adolf et al. |
| 2,131,592 A | 9/1938 | Erich et al. |
| 2,571,927 A | 10/1951 | Georg et al. |
| 2,643,276 A | 6/1953 | Salauze |
| 2,646,454 A | 7/1953 | Victor et al. |
| 2,661,387 A | 12/1953 | Karl et al. |
| 2,683,182 A | 7/1954 | Salauze |
| 2,798,110 A | 7/1957 | Freimut et al. |
| 2,862,989 A | 12/1958 | Strauss |
| 2,871,281 A | 1/1959 | Moulton et al. |
| 2,905,739 A | 9/1959 | Strauss |
| 2,915,576 A | 12/1959 | Strauss |
| 2,920,127 A | 1/1960 | Hans et al. |
| 2,930,829 A | 3/1960 | Jacquier et al. |
| 2,980,747 A | 4/1961 | Daley et al. |
| 2,980,748 A | 4/1961 | Jean et al. |
| 2,988,584 A | 6/1961 | Freimut et al. |
| 2,988,585 A | 6/1961 | Freimut et al. |
| 2,994,728 A | 8/1961 | Andre et al. |
| 2,997,516 A | 8/1961 | Friiz et al. |
| 3,003,014 A | 10/1961 | Fritz et al. |
| 3,055,963 A | 9/1962 | Willi et al. |
| 3,059,041 A | 10/1962 | Hans et al. |
| 3,066,178 A | 11/1962 | Winkler |
| 3,080,440 A | 3/1963 | Paul et al. |
| 3,096,215 A | 7/1963 | Ernst et al. |
| 3,117,033 A | 1/1964 | Fritz et al. |
| 3,174,879 A | 3/1965 | Douchan et al. |
| 3,226,260 A | 12/1965 | Drengler |
| 3,262,815 A | 7/1966 | Alois et al. |
| 3,266,936 A | 8/1966 | Willi et al. |
| 3,323,951 A | 6/1967 | Kreiselmaier |
| 3,326,676 A | 6/1967 | Werner et al. |
| 3,342,639 A | 9/1967 | Rodolphe et al. |
| 3,345,212 A | 10/1967 | Schweitzer |
| 3,378,406 A | 4/1968 | Rosansky |
| 3,393,094 A | 7/1968 | Douchan et al. |
| 3,424,618 A | 1/1969 | Weilnbock et al. |
| 3,438,812 A | 4/1969 | Cherney et al. |
| 3,462,303 A | 8/1969 | Reber et al. |
| 3,484,291 A | 12/1969 | MacKenzie et al. |
| 3,507,696 A | 4/1970 | Jackovitz et al. |
| 3,525,640 A | 8/1970 | McCormick et al. |
| 3,526,822 A | 9/1970 | Dickfeldt et al. |
| 3,527,613 A | 9/1970 | Hardman et al. |
| 3,598,653 A | 8/1971 | Fukuda et al. |
| 3,622,398 A | 11/1971 | Sekido et al. |
| 3,630,778 A | 12/1971 | Kreidl et al. |
| 3,647,544 A | 3/1972 | Schneider |
| 3,650,835 A | 3/1972 | Jackovitz et al. |
| 3,679,482 A | 7/1972 | Hardman et al. |
| 3,701,691 A | 10/1972 | Sassmannshausen et al. |
| 3,713,889 A | 1/1973 | Lecouffe |
| 3,785,867 A | 1/1974 | Edwards et al. |
| 3,802,878 A | 4/1974 | Lindstrom |
| 3,819,413 A | 6/1974 | Nippe et al. |
| 3,836,397 A | 9/1974 | Hardman |
| 3,847,603 A | 11/1974 | Fukuda et al. |
| 3,847,668 A | 11/1974 | Kramer et al. |
| 3,849,198 A | 11/1974 | Seidel |
| 3,853,624 A | 12/1974 | Brown et al. |
| 3,871,921 A | 3/1975 | Beatty et al. |
| 3,895,961 A | 7/1975 | Gutridge |
| 3,898,098 A | 8/1975 | Giles |
| 3,898,099 A | 8/1975 | Baker et al. |
| 3,918,989 A | 11/1975 | Gillman et al. |
| 3,947,292 A | 3/1976 | Jackovitz et al. |
| 3,976,502 A | 8/1976 | Sekido et al. |
| 3,977,906 A | 8/1976 | Beatty et al. |
| 3,980,501 A | 9/1976 | Feder et al. |
| 3,982,966 A | 9/1976 | Beatty et al. |
| 3,987,266 A | 10/1976 | Betz |
| 3,993,504 A | 11/1976 | Kramer et al. |
| 4,000,004 A | 12/1976 | Takahashi et al. |
| 4,011,365 A | 3/1977 | Lindstrom |
| 4,021,911 A | 5/1977 | Kononenko et al. |
| 4,032,693 A | 6/1977 | Lindstrom |
| 4,037,033 A | 7/1977 | Takamura et al. |
| 4,049,878 A | 9/1977 | Lindstrom |
| 4,064,331 A | 12/1977 | Patton et al. |
| 4,078,120 A | 3/1978 | Lindstrom |
| 4,091,178 A | 5/1978 | Kordesch |
| 4,109,060 A | 8/1978 | Andersson et al. |
| 4,123,568 A | 10/1978 | Kononenko et al. |
| 4,132,547 A | 1/1979 | Buzzelli et al. |
| 4,143,212 A | 3/1979 | Ueno et al. |
| 4,166,886 A | 9/1979 | Bonnaterre |
| 4,168,349 A | 9/1979 | Buzzelli |
| 4,207,383 A | 6/1980 | Oliapuram |
| 4,236,927 A | 12/1980 | Buhl et al. |
| 4,246,324 A | 1/1981 | de Nora et al. |
| 4,250,236 A | 2/1981 | Haschka et al. |
| 4,320,184 A | 3/1982 | Bernstein et al. |
| 4,332,869 A | 6/1982 | Margalit et al. |
| 4,335,192 A | 6/1982 | Oliapuram |
| 4,356,101 A | 10/1982 | Jackovitz et al. |
| 4,383,015 A | 5/1983 | Buzzelli |
| 4,384,928 A | 5/1983 | Hall |
| 4,434,214 A | 2/1984 | Suzuki |
| 4,436,795 A | 3/1984 | Cooper et al. |
| 4,447,509 A | 5/1984 | Maskalick |
| 4,448,858 A | 5/1984 | Graf et al. |
| 4,448,860 A | 5/1984 | Von et al. |
| 4,450,211 A | 5/1984 | Vignaud |
| 4,485,154 A | 11/1984 | Remick et al. |
| 4,519,425 A | 5/1985 | Seidel |
| 4,552,630 A | 11/1985 | Wheeler et al. |
| 4,643,959 A | 2/1987 | Glotzl et al. |
| 4,680,100 A | 7/1987 | Morin |
| 4,689,880 A | 9/1987 | Brezillon et al. |
| 4,735,874 A | 4/1988 | Glotzel et al. |
| 4,826,744 A | 5/1989 | Itou et al. |
| 4,828,942 A | 5/1989 | Licht |
| 4,842,963 A | 6/1989 | Ross, Jr. |
| 4,863,484 A | 9/1989 | Beauchamp et al. |
| 4,897,324 A | 1/1990 | Glaser |
| 4,900,642 A | 2/1990 | Tomantschger et al. |
| 4,925,747 A | 5/1990 | Kordesch et al. |
| 4,950,561 A | 8/1990 | Niksa et al. |
| 4,957,827 A | 9/1990 | Kordesch et al. |
| 4,977,044 A | 12/1990 | Ludwig |

(56) References Cited

U.S. PATENT DOCUMENTS

| | | |
|---|---|---|
| 5,011,747 A | 4/1991 | Strong et al. |
| 5,043,234 A | 8/1991 | Tomantschger et al. |
| 5,077,151 A | 12/1991 | Yasuda et al. |
| 5,122,426 A | 6/1992 | Simon et al. |
| 5,143,799 A | 9/1992 | Tsenter |
| 5,145,752 A | 9/1992 | Goldstein et al. |
| 5,162,169 A | 11/1992 | Tomantschger et al. |
| 5,190,833 A | 3/1993 | Goldstein et al. |
| 5,254,414 A | 10/1993 | Tsenter |
| 5,281,495 A | 1/1994 | Hirakawa et al. |
| 5,290,640 A | 3/1994 | Tsenter et al. |
| 5,300,371 A | 4/1994 | Tomantschger et al. |
| 5,397,532 A | 3/1995 | Blaimschein |
| 5,405,719 A | 4/1995 | Sonoda et al. |
| 5,411,815 A | 5/1995 | Goldstein |
| 5,415,949 A | 5/1995 | Stone et al. |
| 5,429,885 A | 7/1995 | Stockburger et al. |
| 5,432,022 A | 7/1995 | Cheiky |
| 5,441,820 A | 8/1995 | Siu et al. |
| 5,447,805 A | 9/1995 | Harats et al. |
| 5,447,806 A | 9/1995 | Hoge et al. |
| 5,451,475 A | 9/1995 | Ohta et al. |
| 5,549,991 A | 8/1996 | Licht et al. |
| 5,569,551 A | 10/1996 | Pedicini et al. |
| 5,569,554 A | 10/1996 | Tsenter |
| 5,576,116 A | 11/1996 | Sanchez et al. |
| 5,595,949 A | 1/1997 | Goldstein et al. |
| 5,665,481 A | 9/1997 | Schuster et al. |
| 5,700,596 A | 12/1997 | Ikoma et al. |
| 5,733,384 A | 3/1998 | Cao et al. |
| 5,753,384 A | 5/1998 | Kimberg |
| 5,773,163 A | 6/1998 | Suzuki et al. |
| 5,788,943 A | 8/1998 | Aladjov |
| 5,789,097 A | 8/1998 | Kistrup et al. |
| 6,183,899 B1 | 2/2001 | Sanchez et al. |
| 6,194,098 B1 | 2/2001 | Ying et al. |
| 6,210,832 B1 | 4/2001 | Visco et al. |
| 6,228,535 B1 | 5/2001 | Fierro et al. |
| 6,249,940 B1 | 6/2001 | Asano et al. |
| 6,268,085 B1 | 7/2001 | Manthiram et al. |
| 6,333,123 B1 | 12/2001 | Davis et al. |
| 6,358,643 B1 | 3/2002 | Katz et al. |
| 6,392,389 B1 | 5/2002 | Kohler |
| 6,410,160 B1 | 6/2002 | Landin et al. |
| 6,416,649 B1 | 7/2002 | Ray et al. |
| 6,458,480 B1 | 10/2002 | Morris et al. |
| 6,475,658 B1 | 11/2002 | Pedicini et al. |
| 6,489,056 B1 | 12/2002 | Davis et al. |
| 6,537,701 B1 | 3/2003 | Nimon et al. |
| 6,620,548 B1 | 9/2003 | Satoguchi et al. |
| 6,673,483 B2 | 1/2004 | Jordy et al. |
| 6,680,140 B1 | 1/2004 | Berlureau et al. |
| 6,777,129 B2 | 8/2004 | Komori et al. |
| 6,849,172 B2 | 2/2005 | Rigby et al. |
| 6,849,356 B2 | 2/2005 | Dow et al. |
| 7,060,388 B2 | 6/2006 | Naruoka |
| 7,070,632 B1 | 7/2006 | Msco et al. |
| 7,112,383 B2 | 9/2006 | Konabe |
| 7,261,970 B2 | 8/2007 | Young et al. |
| 7,527,890 B2 | 5/2009 | Kodama et al. |
| 8,168,337 B2 | 5/2012 | Friesen et al. |
| 8,309,259 B2 | 11/2012 | Friesen et al. |
| 8,329,346 B2 | 12/2012 | Janse Van Rensburg et al. |
| 8,397,508 B2 | 3/2013 | Weimer et al. |
| 8,486,563 B2 | 7/2013 | Chou et al. |
| 8,491,763 B2 | 7/2013 | Friesen |
| 8,492,052 B2 | 7/2013 | Friesen et al. |
| 8,563,150 B2 | 10/2013 | Bugnet et al. |
| 8,659,268 B2 | 2/2014 | Krishnan et al. |
| 8,741,491 B2 | 6/2014 | Wolfe et al. |
| 8,758,948 B2 | 6/2014 | Narayan et al. |
| 8,859,145 B2 | 10/2014 | Stevanovic et al. |
| 8,877,391 B2 | 11/2014 | Friesen et al. |
| 8,895,197 B2 | 11/2014 | Friesen et al. |
| 8,904,626 B2 | 12/2014 | Liu et al. |
| 8,906,563 B2 | 12/2014 | Friesen et al. |
| 8,911,910 B2 | 12/2014 | Krishnan et al. |
| 8,920,969 B2 | 12/2014 | Issaev et al. |
| 9,065,120 B2 | 6/2015 | Carlson |
| 9,105,910 B2 | 8/2015 | Friesen et al. |
| 9,105,946 B2 | 8/2015 | Friesen et al. |
| 9,136,563 B2 | 9/2015 | Hucker et al. |
| 9,147,919 B2 | 9/2015 | Friesen et al. |
| 9,172,123 B2 | 10/2015 | Albertus et al. |
| 9,178,207 B2 | 11/2015 | Friesen et al. |
| 9,214,830 B2 | 12/2015 | Friesen et al. |
| 9,263,779 B2 | 2/2016 | Lee et al. |
| 9,269,995 B2 | 2/2016 | Friesen et al. |
| 9,269,996 B2 | 2/2016 | Friesen et al. |
| 9,287,592 B2 | 3/2016 | Gifford et al. |
| 9,368,486 B2 | 6/2016 | Licht |
| 9,368,788 B2 | 6/2016 | Ogg et al. |
| 9,419,273 B2 | 8/2016 | Kakeya et al. |
| 9,450,233 B2 | 9/2016 | Ogg |
| 9,478,793 B2 | 10/2016 | Ogg et al. |
| 9,478,806 B2 | 10/2016 | Ogg et al. |
| 9,537,144 B2 | 1/2017 | Huang et al. |
| 9,559,385 B2 | 1/2017 | Ogg et al. |
| 9,577,298 B2 | 2/2017 | Narayan et al. |
| 9,583,779 B2 | 2/2017 | Chiang et al. |
| 9,660,265 B2 | 5/2017 | Visco et al. |
| 9,680,151 B2 | 6/2017 | Mullins |
| 9,680,154 B2 | 6/2017 | Chen et al. |
| 9,728,774 B2 | 8/2017 | Schuh et al. |
| 9,732,409 B2 | 8/2017 | Ogg et al. |
| 9,755,231 B2 | 9/2017 | Lee et al. |
| 9,780,379 B2 | 10/2017 | Zhamu et al. |
| 9,816,170 B2 | 11/2017 | Ogg et al. |
| 9,843,064 B2 | 12/2017 | Brandon et al. |
| 9,893,397 B2 | 2/2018 | Yoshida et al. |
| 9,911,985 B2 | 3/2018 | Dong et al. |
| 9,941,548 B2 | 4/2018 | Vu et al. |
| 9,947,481 B2 | 4/2018 | Solomon et al. |
| 9,972,874 B2 | 5/2018 | Toussaint et al. |
| 10,008,754 B2 | 6/2018 | Englert |
| 10,014,530 B2 | 7/2018 | Lang et al. |
| 10,033,036 B2 | 7/2018 | Christensen et al. |
| 10,044,082 B2 | 8/2018 | Suyama et al. |
| 10,147,988 B2 | 12/2018 | Park et al. |
| 10,177,426 B2 | 1/2019 | Nitta |
| 2002/0010261 A1 | 1/2002 | Callahan et al. |
| 2002/0061427 A1 | 5/2002 | Vu et al. |
| 2002/0142202 A1 | 10/2002 | Li et al. |
| 2002/0142203 A1 | 10/2002 | Ma et al. |
| 2002/0146600 A1 | 10/2002 | Vartak et al. |
| 2002/0155351 A1 | 10/2002 | Licht |
| 2002/0160247 A1 | 10/2002 | Tzeng et al. |
| 2002/0177036 A1 | 11/2002 | Faris |
| 2003/0049520 A1 | 3/2003 | Davis et al. |
| 2004/0031143 A1 | 2/2004 | Morris et al. |
| 2004/0221426 A1 | 11/2004 | Igawa et al. |
| 2004/0265684 A1 | 12/2004 | Faris et al. |
| 2005/0042503 A1 | 2/2005 | Kim et al. |
| 2005/0048351 A1 | 3/2005 | Hood et al. |
| 2005/0123815 A1 | 6/2005 | Tsai et al. |
| 2006/0040174 A1 | 2/2006 | Peabody |
| 2006/0194107 A1 | 8/2006 | Licht |
| 2007/0077491 A1 | 4/2007 | Burchardt |
| 2008/0131762 A1 | 6/2008 | Joo et al. |
| 2008/0145721 A1 | 6/2008 | Shapiro et al. |
| 2008/0261094 A1 | 10/2008 | Licht et al. |
| 2009/0130539 A1 | 5/2009 | Van Burdine |
| 2009/0284229 A1 | 11/2009 | Friesen et al. |
| 2010/0003570 A1 | 1/2010 | Finsterwalder et al. |
| 2010/0062313 A1 | 3/2010 | Browning et al. |
| 2010/0119895 A1 | 5/2010 | Friesen |
| 2010/0119919 A1 | 5/2010 | Iarochenko et al. |
| 2010/0143824 A1 | 6/2010 | Tucker et al. |
| 2010/0285375 A1 | 11/2010 | Friesen et al. |
| 2010/0310905 A1 | 12/2010 | Oriet et al. |
| 2010/0316935 A1 | 12/2010 | Friesen et al. |
| 2011/0020534 A1 | 1/2011 | Chou et al. |
| 2011/0027648 A1 | 2/2011 | Rolison et al. |
| 2011/0070506 A1 | 3/2011 | Friesen et al. |

(56) References Cited

U.S. PATENT DOCUMENTS

| | | |
|---|---|---|
| 2011/0086278 A1 | 4/2011 | Friesen et al. |
| 2011/0200893 A1 | 8/2011 | Friesen et al. |
| 2011/0250512 A1 | 10/2011 | Friesen et al. |
| 2011/0300429 A1 | 12/2011 | Mswhorter |
| 2011/0316485 A1 | 12/2011 | Krishnan et al. |
| 2012/0015264 A1 | 1/2012 | Friesen et al. |
| 2012/0021303 A1 | 1/2012 | Amendola et al. |
| 2012/0034498 A1 | 2/2012 | Hsu et al. |
| 2012/0052404 A1 | 3/2012 | Friesen et al. |
| 2012/0068667 A1 | 3/2012 | Friesen et al. |
| 2012/0070746 A1 | 3/2012 | Mikhaylik et al. |
| 2012/0098499 A1 | 4/2012 | Friesen et al. |
| 2012/0139496 A1 | 6/2012 | Krishnan et al. |
| 2012/0187918 A1 | 7/2012 | Narayan et al. |
| 2012/0202127 A1 | 8/2012 | Friesen et al. |
| 2012/0295172 A1 | 11/2012 | Peled et al. |
| 2012/0321969 A1 | 12/2012 | Friesen et al. |
| 2013/0022881 A1 | 1/2013 | Friesen et al. |
| 2013/0095393 A1 | 4/2013 | Friesen et al. |
| 2013/0115523 A1 | 5/2013 | Friesen et al. |
| 2013/0115525 A1 | 5/2013 | Friesen et al. |
| 2013/0115526 A1 | 5/2013 | Friesen et al. |
| 2013/0115531 A1 | 5/2013 | Amendola et al. |
| 2013/0115533 A1 | 5/2013 | Friesen et al. |
| 2013/0149615 A1 | 6/2013 | Narayan et al. |
| 2013/0183591 A1 | 7/2013 | Dickson |
| 2013/0189592 A1 | 7/2013 | Roumi et al. |
| 2013/0285597 A1 | 10/2013 | Goldstein |
| 2013/0295471 A1 | 11/2013 | Visco et al. |
| 2014/0075745 A1 | 3/2014 | Lu et al. |
| 2014/0091631 A1 | 4/2014 | Naden et al. |
| 2014/0162129 A1 | 6/2014 | Kim et al. |
| 2014/0217985 A1 | 8/2014 | Gifford et al. |
| 2014/0220256 A1 | 8/2014 | Ogg |
| 2014/0220432 A1 | 8/2014 | Ogg et al. |
| 2014/0220434 A1 | 8/2014 | Ogg |
| 2014/0220435 A1 | 8/2014 | Ogg et al. |
| 2014/0220440 A1 | 8/2014 | Ogg |
| 2014/0220460 A1 | 8/2014 | Ogg et al. |
| 2014/0227615 A1 | 8/2014 | Friesen et al. |
| 2014/0234730 A1 | 8/2014 | Albertus et al. |
| 2014/0262760 A1 | 9/2014 | Hayes et al. |
| 2014/0266055 A1 | 9/2014 | Trimble et al. |
| 2014/0266056 A1 | 9/2014 | Trimble et al. |
| 2014/0322598 A1 | 10/2014 | Ogg |
| 2014/0342214 A1 | 11/2014 | Wegner et al. |
| 2014/0377626 A1 | 12/2014 | Vu et al. |
| 2015/0010812 A1 | 1/2015 | Ohyama et al. |
| 2015/0044572 A1 | 2/2015 | Hucker et al. |
| 2015/0056505 A1 | 2/2015 | Ogg |
| 2015/0064512 A1 | 3/2015 | Turney et al. |
| 2015/0064561 A1 | 3/2015 | Ogg et al. |
| 2015/0064562 A1 | 3/2015 | Ogg et al. |
| 2015/0086884 A1 | 3/2015 | Narayan et al. |
| 2015/0104679 A1 | 4/2015 | Trimble et al. |
| 2015/0162601 A1 | 6/2015 | Ogg et al. |
| 2015/0171455 A1 | 6/2015 | Mills |
| 2015/0221999 A1 | 8/2015 | Friesen et al. |
| 2015/0228991 A1 | 8/2015 | Friesen et al. |
| 2015/0280216 A1 | 10/2015 | Sumiyama et al. |
| 2015/0372357 A1 | 12/2015 | Kruglak et al. |
| 2016/0006090 A1 | 1/2016 | Licht |
| 2016/0020493 A1 | 1/2016 | Van Dijk et al. |
| 2016/0036094 A1 | 2/2016 | Ogg |
| 2016/0036095 A1 | 2/2016 | Ogg |
| 2016/0049689 A1 | 2/2016 | Zinck et al. |
| 2016/0056518 A1 | 2/2016 | Benkert et al. |
| 2016/0064789 A1 | 3/2016 | Friesen et al. |
| 2016/0087320 A1 | 3/2016 | Suyama |
| 2016/0111730 A1 | 4/2016 | Kim et al. |
| 2016/0118636 A1 | 4/2016 | Jin et al. |
| 2016/0190563 A1 | 6/2016 | Yan et al. |
| 2016/0197351 A1 | 7/2016 | Tani et al. |
| 2016/0248136 A1 | 8/2016 | Bugga et al. |
| 2016/0268622 A1 | 9/2016 | Lu et al. |
| 2016/0308220 A1 | 10/2016 | Qi et al. |
| 2016/0351907 A1 | 12/2016 | Tsutsumi |
| 2017/0040597 A1 | 2/2017 | Ogg et al. |
| 2017/0092990 A1 | 3/2017 | Tarrant |
| 2017/0141434 A1 | 5/2017 | Narayan et al. |
| 2017/0162857 A1 | 6/2017 | Ogg et al. |
| 2017/0194795 A1 | 7/2017 | Ensling et al. |
| 2017/0207432 A1 | 7/2017 | Vu et al. |
| 2017/0207464 A1 | 7/2017 | Gyenge et al. |
| 2017/0237063 A1 | 8/2017 | Ogg |
| 2018/0010228 A1 | 1/2018 | Ogg et al. |
| 2018/0123116 A1 | 5/2018 | Lee et al. |
| 2018/0219220 A1* | 8/2018 | Hayashi .......... H01M 4/02 |
| 2018/0241107 A1 | 8/2018 | Su et al. |
| 2018/0287237 A1 | 10/2018 | Manthiram et al. |
| 2020/0006745 A1 | 1/2020 | Westwood et al. |
| 2020/0006796 A1 | 1/2020 | Su et al. |
| 2020/0006828 A1 | 1/2020 | Milshtein et al. |
| 2020/0006896 A1 | 1/2020 | Mahadik et al. |
| 2020/0136153 A1 | 4/2020 | Jaramillo et al. |
| 2020/0353660 A1 | 11/2020 | Lee |
| 2020/0411879 A1 | 12/2020 | Hartman et al. |
| 2020/0411932 A1 | 12/2020 | Weber et al. |
| 2021/0028452 A1 | 1/2021 | Su et al. |
| 2021/0028457 A1 | 1/2021 | Newhouse et al. |

FOREIGN PATENT DOCUMENTS

| | | |
|---|---|---|
| CN | 103098299 A | 5/2013 |
| CN | 102623710 B | 7/2014 |
| CN | 102623757 B | 7/2014 |
| CN | 102623758 B | 7/2014 |
| CN | 206340592 U | 7/2017 |
| CN | 109478653 A | 3/2019 |
| DE | 1671929 A1 | 10/1971 |
| DE | 69306598 T2 | 6/1997 |
| EP | 0030954 A1 | 7/1981 |
| EP | 0146946 A1 | 7/1985 |
| EP | 0677883 A1 | 10/1995 |
| EP | 0624283 B1 | 12/1995 |
| EP | 0637291 B1 | 10/1997 |
| EP | 0664932 B1 | 1/1998 |
| EP | 0823135 B1 | 11/1998 |
| EP | 0835334 B1 | 9/2002 |
| EP | 1027747 B1 | 9/2002 |
| EP | 1413001 B1 | 4/2005 |
| EP | 1266413 B1 | 5/2005 |
| EP | 1977475 B1 | 2/2012 |
| EP | 2486622 B1 | 7/2014 |
| EP | 2424016 B1 | 10/2014 |
| EP | 2823528 B1 | 3/2016 |
| EP | 2586092 B1 | 1/2017 |
| EP | 2619835 B1 | 6/2017 |
| EP | 2792004 B1 | 11/2017 |
| EP | 2721688 B1 | 2/2018 |
| EP | 2774205 B1 | 3/2018 |
| EP | 2954583 B1 | 4/2018 |
| EP | 2559097 B1 | 5/2018 |
| EP | 2596545 B1 | 6/2018 |
| EP | 2659536 B1 | 8/2018 |
| EP | 2973803 B1 | 7/2021 |
| FR | 2770342 A1 | 4/1999 |
| FR | 2998719 A1 | 5/2014 |
| GB | 1179777 A | 1/1970 |
| GB | 1242832 A | 8/1971 |
| GB | 1359746 A | 7/1974 |
| GB | 1564438 A | 4/1980 |
| IN | 201917002254 A | 4/2019 |
| JP | S4888439 A | 11/1973 |
| JP | S50154746 A | 12/1975 |
| JP | S5288738 A | 7/1977 |
| JP | H0714575 A | 1/1995 |
| JP | 2001313093 A | 11/2001 |
| JP | 2002194411 A | 7/2002 |
| JP | 3387724 B2 | 1/2003 |
| JP | 2008293678 A | 12/2008 |
| JP | 2009129646 A | 6/2009 |
| JP | 2010140736 A | 6/2010 |
| JP | 2010-192313 A | 9/2010 |

(56) References Cited

FOREIGN PATENT DOCUMENTS

| | | |
|---|---|---|
| JP | 2010-262876 A | 11/2010 |
| JP | 2013134838 A | 7/2013 |
| JP | 2014127289 A | 7/2014 |
| JP | 2014150056 A | 8/2014 |
| JP | 2015076379 A | 4/2015 |
| JP | 5952540 B2 | 6/2016 |
| JP | 6032018 B2 | 11/2016 |
| JP | 6234917 B2 | 11/2017 |
| JP | 2017216126 A | 12/2017 |
| JP | 2018006057 A | 1/2018 |
| JP | 2018067399 A | 4/2018 |
| JP | 6352884 B2 | 6/2018 |
| JP | 6363244 B2 | 7/2018 |
| JP | 2018529207 A | 10/2018 |
| JP | 2019220340 A | 12/2019 |
| JP | 6682102 B2 | 3/2020 |
| KR | 20140068850 A | 6/2014 |
| KR | 20160115912 A | 10/2016 |
| KR | 10-2018-0063144 A | 6/2018 |
| TW | 552731 B | 9/2003 |
| TW | 200421657 A | 10/2004 |
| WO | 8304381 A1 | 12/1983 |
| WO | 8402232 A1 | 6/1984 |
| WO | WO8402429 A1 | 6/1984 |
| WO | 8904067 A1 | 5/1989 |
| WO | 8904070 A1 | 5/1989 |
| WO | 8905528 A1 | 6/1989 |
| WO | 9117581 A1 | 11/1991 |
| WO | 9120102 A1 | 12/1991 |
| WO | 9312553 A1 | 6/1993 |
| WO | 9401896 A1 | 1/1994 |
| WO | 02069422 A2 | 9/2002 |
| WO | 03012908 A2 | 2/2003 |
| WO | 2005004260 A1 | 1/2005 |
| WO | 2008058165 A2 | 5/2008 |
| WO | 2010060333 A1 | 6/2010 |
| WO | 2010065890 A1 | 6/2010 |
| WO | 2010069209 A1 | 6/2010 |
| WO | 2012012558 A2 | 1/2012 |
| WO | 2012012731 A2 | 1/2012 |
| WO | 2012174433 A2 | 12/2012 |
| WO | WO2012174433 A3 | 12/2012 |
| WO | 2013005050 A1 | 1/2013 |
| WO | 2014067982 A1 | 5/2014 |
| WO | WO2014142666 | 9/2014 |
| WO | WO2015042573 A1 | 3/2015 |
| WO | WO2015145690 A1 | 10/2015 |
| WO | WO2015150784 A1 | 10/2015 |
| WO | 2016110862 A1 | 7/2016 |
| WO | WO2017-006666 A1 | 1/2017 |
| WO | WO2017-049414 A1 | 3/2017 |
| WO | WO2017075577 A1 | 5/2017 |
| WO | WO2017117373 A1 | 7/2017 |
| WO | WO2017-223219 A1 | 12/2017 |
| WO | WO2018009930 A2 | 1/2018 |
| WO | WO2018018036 A1 | 1/2018 |
| WO | 2018052376 A1 | 3/2018 |
| WO | WO2018187561 A1 | 10/2018 |
| WO | WO2019-133702 A1 | 7/2019 |
| WO | WO2020006419 A1 | 1/2020 |
| WO | WO2020023912 A1 | 1/2020 |
| WO | WO2021021685 A1 | 2/2021 |

OTHER PUBLICATIONS

Tian, B. et al., "The effect of Na2S additive in alkaline electrolyte on improved performances of Fe-based air batteries," Electrochimica Acta, vol. 259, pp. 196-203, (2018).
Trocino, S. et al., "High performance solid-state iron-air rechargeable ceramic battery operating at intermediate temperatures (500-650 ° C.)," Applied Energy, pp. 233-234 & pp. 386-394, (2019).
Vijayamohanan, K. et al., "Rechargeable Alkaline Iron Electrodes," Journal of Power Sources, vol. 34, pp. 269-285, (1991).
Wei, X. et al., "An Aqueous Redox Flow Battery Based on Neutral Alkali Metal Ferri/ferrocyanide and Polysulfide Electrolytes," Journal of The Electrochemical Society, vol. 163, No. 1, pp. A5150-A5153, (2016).
Weinrich, H. et al., "Understanding the Nanoscale Redox-Behavior of Iron-Anodes for Rechargeable Iron-Air Batteries," View Online https://doi.org/10.1016/j.nanoen.2017.10.023, Nano Energy, Institute of Energy and Climate Research-Fundamental Electrochemistry (IEK-9) Center for Nanophase Materials Sciences, Oak Ridge National Laboratory, Oak Ridge, Tennessee 378, US, 46 pages, (2017).
Wilke, S. K. et al., "Structural evolution of directionally freeze-cast iron foams during oxidation/reduction cycles," Acta Materialia, vol. 162, pp. 90-102, (2019).
Yang, B. et al., "Organo-Sulfur Molecules enable iron-based battery electrodes to meet the challenges of large-scale electrical energy storage," Energy Environ. Sci., vol. 7, pp. 2753-2763, (2014).
Yang, C. et al., "Unique aqueous Li-ion/sulfur chemistry with high energy density and reversibility," View online, www.pnas.org/cgi/doi/10.1073/pnas.1703937114, PNAS, vol. 114, No. 24, pp. 6197-6202, (2017).
You, S. et al., "A microbial fuel cell using permanganate as the cathodic electron acceptor," Journal of Power Sources, vol. 162, pp. 1409-1415, (2006).
Yu, X. et al., "A Voltage-Enhanced, Low-Cost Aqueous Iron-Air Battery Enabled with a Mediator-Ion Solid Electrolyte," View Online DOI: 10.1021/acsenergylett.7b00168, ACS Energy Lett., vol. 2, pp. 1050-1055, (2017).
Yun, S. et al., "Materials and Device Constructions for Aqueous Lithium-Sulfur Batteries," View online DOI: 10.1002/adfm.201707593, Adv. Funct. Mater., vol. 28, pp. 1-17 (1707593), (2018).
Sayilgan, E. et al., "A review of technologies for the recovery of metals from spent alkaline and zinc-carbon batteries", Hydrometallurgy, 2009, vol. 97, Issues 3-4, pp. 158-166.
AI, W. et al., "A Novel Graphene-Polysulfide Anode Material for High-Performance Lithium-Ion Batteries," Scientific Reports, vol. 3, No. 234, pp. 1-5, DOI: 10.1038/srep0234, (2013).
Al-Hoshan, M. S. et al., "Synthesis, Physicochemical and Electrochemical Properties of Nicekl Ferrite Spinels Obtained by Hydrothermal Method for the Oxygen Evolution Reaction (OER)," Int. J. Electrochem. Sci., vol. 7, pp. 4959-4973, (2012).
Arunchander, A. et al., "Synthesis of flower-like molybdenum sulfide/graphene hybrid as an efficient oxygen reduction electrocatalyst for anion exchange membrane fuel cells," Journal of Power Sources, vol. 353, pp. 104-114, (2017).
Bandal, H. et al., "Iron-based heterogeneous catalysts for oxygen evolution reaction; change in perspective from activity promoter to active catalyst," Journal of Power Sources, vol. 395, pp. 106-127, (2018).
Blurton, K. F. et al., "Metal/Air Batteries: Their Status and Potential—A Review," Journal of Power Sources, vol. 4, pp. 263-279, (1979).
Burke, M. S. et al., "Cobalt-Iron (Oxy)Hudroxide Oxygen Evlolution Electrocatalysts: The Role of Structur5e and Composition on Activity, Stability, and Mechanism," J. Am. Chem. Soc., vol. 137, pp. 3638-3648, DOI: 10.1021/jacs.5b00281, (2015).
Burke, M. S. et al., "Oxygen Evolution Reaction Electrocatalysis on Transition Metal Oxides and (Oxy)hydroxides: Activity Trends and Design Principles," Department of Chemistry and Biochemistry, University of Oregon, Eugene, Oregon 97403, United States, Chemistry of Materials, 10 pages, (2015).
Chen, Y. et al., "Harvesting polysulldes by sealing the sulfur electrode in a composite ion-selective net," Journal of Power Sources, vol. 368, pp. 38-45, (2017).
Chiang, Y.M. et al., High Capacity, Temperature-Stable Lithium Aluminum Manganese Oxide Cahtodes for Rechargeable Batteries, Electrochemical and Solid-State Letters, vol. 2, No. 3, pp. 107-110, (1990).
Colli, A. N. et al., "High energy density MnO4-/MnO42 redox couple for alkaline redox flow batteries," Chem. Commun., vol. 52, pp. 14039-14042, (2016).

(56) References Cited

OTHER PUBLICATIONS

Cui, B. et al., "Improved Cycle Iron Molten Air Battery Performance Using a Robust Fin Air Electrode," Journal of The Electrochemical Society, vol. 164, No. 2, pp. A88-A92, (2017).
Demir-Cakan, R. et al., "An aqueous electrolyte rechargeable Li-ion/polysul!de battery," Journal of Materials Chemistry A, View Article Online DOI: 10.1039/c4ta01308e, 5 pages, (2014).
Demir-Cakan, R. et al., "Use of ion-selective polymer membranes for an aqueous electrolyte rechargeable Li-ion-polysulphide battery," View Online DOI: 10.1039/c4ta05756b, J. Mater. Chem. A, vol. 3, pp. 2869-2875, (2015).
Egashira, M. et al., "Iron-Air (Secondary and Primpary)," Yamaguchi University, Yamaguchi, Japan & 2009 Elsevier B.V. All rights reserved, pp. 372-375, (2009).
Figueredo-Rodriguez, H. A. et al., "A Rechargeable, Aqueous Iron Air Battery with Nanostructured Electrodes Capable of High Energy Density Operation," Journal of The Electrochemical Society, vol. 164, No. 6, pp. A1148-A1157, (2017).
Gross, M. M. et al., "Aqueous Polysulfide—Air Battery with a Mediator-Ion Solid Electrolyte and a Copper Sul!de Catalyst for Polysulfide Redox," View Online DOI: 10.1021/acsaem.8b01679, ACS Applied Energy Materials, vol. 1, No. 12, pp. 7230-7236, (2018).
Hall, D. E., "Ni(OH)2_Impregnated Anodes for alkaline Water Electrolysis," J. Electrochem. So., vol. 130, No. 2, pp. 317-321, (1983).
Hall, D. E., "Electrolysis: Corrosion Resistance," J. Electrochem. Soc., vol. 129, No. 2, pp. 310-315, (1982).
Hang, B. T. et al., "Effect of metal-sulfide additives on electrochemical properties of nano-sized Fe2O3-loaded carbon for Fe/air battery anodes," Journal of Power Sources, vol. 168, pp. 522-532, (2007).
Hang, B. T. et al., "Effect of additives on the electrochemical properties of Fe2O3/C nanocomposite for Fe/air battery anode," Journal of Electroanalytical Chemistry, vol. 762, pp. 59-65, (2016).
Notification Concerning Transmittal of International Preliminary Report on Patentability and Written Opinion of the International Search Authority for International Patent Application No. PCT/US2018/026243, dated Oct. 17, 2019 9 pages.
International Search Report and Written Opinion of the International Searching Authority for International Patent Application No. PCT/US2018/026243, dated Jul. 27, 2018, 12 pages.
International Search Report and Written Opinion of the International Searching Authority for International Patent Application No. PCT/US2019/039844, dated Oct. 23, 2019, 15 pages.
International Search Report and Written Opinion of the International Searching Authority for International Patent Application No. PCT/US2019/039867, dated Nov. 15, 2019, 19 pages.
International Search Report and Written Opinion of the International Searching Authority for International Patent Application No. PCT/US2019/039973, dated Jan. 13, 2020, 26 pages.
International Search Report and Written Opinion of the International Searching Authority for International Patent Application No. PCT/US2019/043745, dated Nov. 13, 2019, 17 pages.
Ji, X. et al., "Stabilizing lithium-sulphur cathodes using polysulphide reservoirs," View Online DOI: 10.1038/ncomms1293, Nature Communications, vol. 2, No. 325, 8 pages, (2011).
Jin, X. et al., "A high-!delity multiphysics model for the new solid oxide iron-air redox battery part I: Bridging mass transport and charge transfer with redox cycle kinetics," Journal of Power Sources, vol. 280, pp. 195-204, (2015).
Kadyk, T. et al., "How to Enhance Gas Removal from Porous Electrodes?" View Online DOI: 10.1038/SREP38780, Scientific Reports, vol. 6, No. 38780, pp. 1-14, (2016).
Klaus, S. et al., "Elects of Fe Electrolyte Impurities on Ni(OH)2/NiOOH Structure and Oxygen Evolution Activity," View Online DOI:10.1021/acs.jpcc.5b00105, Journal of Physical Chemistry C, vol. 119, No. 13, pp. 7243-7254, (2015).
Licht, S., "A Novel Aqueous Aluminum permanganate fuel cell," Electrochemistry Communications, vol. 1, pp. 33-36, (1999).
Li, Z. et al., "Air-Breathing Aqueous Sulfur Flow Battery for Ultralow-Cost Long-Duration Electrical Storage," Joule vol. 1, pp. 306-327, Oct. 11, 2017, 2017 Published by Elsevier Inc., (2017).
Li, Z. et al., "A high-energy and low-cost polysullde/iodide redox ow battery," Nano Energy, vol. 30, pp. 283-292, (2016).
Mainar, A. R. et al., "Alkaline aqueous electrolytes for secondary zinc-air batteries: an overview," Int. J. Energy Res. 2016; vol. 40, pp. 1032-1049, (2016).
Malkhandi, S. et al., "Organo-Sulfur Additives for Suppressing Hydrogen Evolution in Iron-air Battery," Abstract #688, 220th ECS Meeting, 2011 The Electrochemical Society.
Matsuda, A. et al., "Preparation of hydroxide ion conductive KOH—ZrO2 electrolyte for all-solid state iron/air secondary battery," Solid State Ionics, vol. 262, pp. 188-191, (2014).
Maurya, S. et al., "A review on recent developments of anion exchange membranes for fuel cells and redox flow batteries," View online DOI: 10.1039/c5ra04741b, RSC Adv., vol. 5, pp. 37206-37230, (2015).
McKerracher, R. D. et al., "A Review of the Iron-Air Secondary Battery for Energy Storage," View online DOI: 10.1002/cplu. 201402238, ChemPlusChem 2015, vol. 80, pp. 323-335, (2015).
Merle, G. et al., "Anion exchange membranes for alkaline fuel cells: A review," Journal of Membrane Science, vol. 377, pp. 1-35, (2011).
Mitra, D. et al., "An Efficient and Robust Surface-Modified Iron Electrode for Oxygen Evolution in AlkalineWater Electrolysis,"Journal of The Electrochemical Society, vol. 165, No. 5, pp. F392-F400, (2018).
Mitra, D. et al., "A Stable and Electrocatalytic Iron Electrode for Oxygen Evolution in Alkaline Water Electrolysis," View Online https://doi.org/10.1007/s11244-018-0971-9, Springer Science+Business Media, LLC, part of Springer Nature 2018.
Narayan, S. R. et al., "Bi-Functional Oxygen Electrodes—Challenges and Prospects," The Electrochemical Society Interface, Summer 2015, pp. 65-69, (2015).
Neburchilov, V. et al., "Metal-Air And Metal-Sulfur Batteries: Fundamentals and Applications," CRC Press Taylor & Francis Group, 6000 Broken Sound Parkway NW, Suite 300, Boca Raton, FL 33487-2742, © 2017 by Taylor & Francis Group, LLC, CRC Press is an imprint of Taylor & Francis Group, an Informa business.
Ojefors, L. et al., "An-iron-Air Vehicle Battery," Journal of Power Sources, vol. 2, pp. 287-296, (1977).
Pan, J. et al., "Constructing Ionic Highway in Alkaline Polymer Electrolytes," Energy Environ. Sci. 2014, vol. 7, pp. 354-360, (2014).
Roe, S. et al., "A High Energy Density Vanadium Redox Flow Battery with 3 M Vanadium Electrolyte," Journal of The Electrochemical Society, vol. 163, No. 1, pp. A5023-A5028, (2016).
Sen, R. K. et al., "Metal-Air Battery Assessment," Prepared for Office of Energy Storage and Distribution Conservation and Renewable Energy, The U.S. Department of Energy under Contract DE-AC06-76RLO 1830, Pacific Northwest Laboratory, Operated for the U.S. Department of Energy, 96 pages, (1988).
Sevinc, S. et al., "In-situ tracking of NaFePO4 formation in aqueous electrolytes and its electrochemical performances in Na-ion/polysul!de batteries," Journal of Power Sources, vol. 412, pp. 55-62, (2019).
Smith, R. D. L. et al., "Water Oxidation Catalysis: Electrocatalytic Response to Metal Stoichiometry in Amorphous Metal Oxide Films Containing Iron, Cobalt, and Nickel," J. Am. Chem. Soc., vol. 135, No. 31, pp. 11580-11115, (2013).
EPO Office Communication, Extended European Search Report for European Patent Application No. 19839894.3 (PCT/US2019/043745), dated May 10, 2022, 7 pages.
Abd El Haleem S.M., et al., "Electrochemical Behaviour of Iron in Alkaline Sulphide Solutions," The International Journal of Corrosion Processes and Corrosion Control, Engineering, Science and Technology, 2008, vol. 43, No. 2, pp. 173-178, DOI: 10.1179/174327807X234769.
Anh T.T., et al., "The Influence Of Carbon Additive On The Electrochemical Behaviors Of Fe2O3/C Electrodes In Alkaline Solution," Vietnam Journal of Science and Technology, 2018, vol. 56, No. 1, pp. 24-30, DOI: 10.15625/2525-2518/56/1/9271.

(56) References Cited

OTHER PUBLICATIONS

Argonne National Laboratory: "Design and Cost Study of a Nickel-Iron Oxide Battery for Electric Vehicles," Public Report, vol. II, Final Report Contract No. 31-109-38-3723, Aug. 23, 1977, 76 Pages.
Argonne National Laboratory: "Development of Near-Term Batteries for Electric Vehicles," Summery Report, Oct. 1977-Sep. 1979, 19 Pages.
Baratin F., "Investigation of the Cu—Fe—S—H20 System at 200 degree C," 1980, 6 Pages.
Bisoi S., et al., "Gas Separation Properties of Troeger's Base-Bridged Polyamides," e-Polymers, 2017, vol. 17, No. 4, pp. 283-293, DOI: https://doi.org/10.1515/epoly-2016-0291.
Carta M., et al., "The Synthesis of Microporous Polymers Using Tröger's Base Formation," Polymer Chemistry, 2014 vol. 5, No. 18, pp. 5267-5272, DOI:10.1039/C4PY00609G, ISSN 1759-9954, XP055770813.
Cerny J., et al., "Voltammetric Study of an Iron Electrode in Alkaline Electrolytes," Journal of Power Sources, 1989, vol. 25, pp. 111-122.
Chamoun M., et al., "Stannate Increases Hydrogen Evolution Overpotential on Rechargeable Alkaline Iron Electrodes," Journal of The Electrochemical Society, 2017, vol. 164, No. 6, pp. A1251-A1257.
Chladil L., et al., "Influence of Zinc Ions on Properties of Non-Sintered Ni(OH)2 Electrodes," Meet, Abstract #338, 224th ECS Meeting, 2013-338, The Electrochemical Society, 2013, 1 Page.
Clever H.L., et al., "The Solubility of Some Sparingly Soluble Salts of Zinc and Cadmium In Water and in Aqueous Electrolyte Solutions," Journal of Physical and Chemical Reference Data, 1992, vol. 21, No. 5, pp. 941-1004, httos://doi.ora/10.1063/1.555909.
Corrigan D.A., "The Catalysis of the Oxygen Evolution Reaction by Iron Impurities in Thin Film Nickel Oxide Electrodes," Journal of Electrochemical Society, 1987, vol. 134, No. 2, pp. 377-384.
Daskalakis K.D., et al.," The solubility of Sphalerite (ZnS) in Sulfidic Solutions at 25C and 1 atm Pressure," Geochimica et Cosmochimica Acta, vol. 57. No. 20, Oct. 1993, pp. 4923-4931.
Edison: "Manual of Storage Battery Practice," The Committee on Electric Storage Batteries of the Association of Edison Illuminating Companies, 1914, 11 Pages.
Extended European Search Report for European Application No. 12845396.6, dated Jun. 8, 2016, 8 Pages.
Extended European Search Report for European Application No. 18176436.6, dated Sep. 28, 2018, 16 Pages.
Extended European Search Report for European Application No. 18189034.4, dated Oct. 12, 2018, 8 Pages.
Extended European Search Report for European Application No. 20196772.6, dated Jan. 22, 2021, 6 Pages.
Ferreira S.R., et al., "Selected Test Results from the Encell Technology Nickel Iron Battery," Test Results from Encell Ni—Fe Battery, Sandia Report, SAND2014-17462, Unlimited Release Printed Sep. 2014, 36 Pages.
Gayer K.H., et al., "The Solubility of Ferrous Hydroxide and Ferric Hydroxide in Acidic and Basic Media at 25C," The Journal of Physical Chemistry, 1956, vol. 60, No. 11, pp. 1569-1571, DOI: https://doi.ora/10.1021/i150545a021.
Han J., et al., "Mechanism Study on the Sulfidation of ZnO with Sulfur and Iron Oxide at High Temperature," Scientific Reports, Feb. 10, 2017, vol. 7, No. 42536, 12 Pages, DOI: 10.1038/srep42536.
Hang B.T., et al., "Fe2PO3-Filled Carbon Nanotubes as a Negative Electrode for an Fe-air Battery," Journal of Power Sources, 2008, vol. 178, pp. 393-401.
Hariprakash B., et al., "A Sealed, Starved-electrolyte Nickel Iron Battery," Journal of Applied Electrochemistry, 2005, vol. 35, pp. 27-32, DOI: 10.1007/s10800-004-2052-y.
Hariprakash B., et al., "Ceria-Supported Platinum as Hydrogen-oxygen Recombinant Catalyst for Sealed Lead-acid Batteries," Electrochemical and Solid-State Letters, 2001, vol. 4, No. 3, pp. A23-A26.
Hayashi K., et al., "Development Iron-Based Rechargeable Batteries with Sintered Porous Iron Electrodes," ECS Transactions, The Electrochemical Society, 2017, vol. 75, No. 18, pp. 111-116, DOI: 10 1149/07518.0111ecst.
Hayashi K., et al., "Electrochemical Performance of Sintered Porous Negative Electrodes Fabricated with Atomized Powders for Iron-Based Alkaline Rechargeable Batteries," Journal of The Electrochemical Society, 2017, vol. 164, No. 9, pp. A2049-A2055, DOI: 10.1149/2.1311709jes.
Hayashi K., et al., "Performance of Rechargeable Iron Alkaline Batteries with Sulfur-Containing Atomized Powders as Negative Electrodes," ECS Meeting Abstracts, vol. MA2017-02, A01-Battery and Energy Technology Joint General Session, abstract 2017, 2 pages.
Indian First Examination Report for Application No. 201617013657, dated Aug. 27, 2019, 6 Pages.
International Preliminary Report on Patentability for International Application No. PCT/US2010/049361, dated Mar. 29, 2012, 06 Pages.
International Preliminary Report on Patentability for International Application No. PCT/US2012/062502, dated May 14, 2015, 13 Pages.
International Preliminary Report on Patentability for International Application No. PCT/US2016/014936, dated Aug. 10, 2017, 07 Pages.
International Preliminary Report on Patentability for International Application No. PCT/US2016/023439, dated May 31, 2017, 21 Pages.
International Preliminary Report on Patentability for International Application No. PCT/US2019/043745, dated Feb. 11, 2021, 14 Pages.
International Preliminary Report on Patentability for International Application No. PCT/US2020/031182, dated Nov. 18, 2021, 6 Pages.
International Preliminary Report on Patentability for International Application No. PCT/US2020/039976, dated Jan. 6, 2022, 08 Pages.
International Preliminary Report on Patentability for International Application No. PCT/US2020/043630, dated Feb. 10, 2022, 7 Pages.
International Preliminary Report on Patentability for International Application No. PCT/US2020/043639, dated Feb. 10, 2022, 8 Pages.
International Preliminary Report on Patentability for International Application No. PCT/US2020/058859, dated May 19, 2022, 8 Pages.
International Search Report and Written Opinion for International Application No. PCT/US2009/040658, dated Aug. 24, 2009, 6 Pages.
International Search Report and Written Opinion for International Application No. PCT/US2010/049361, dated Dec. 29, 2010, 08 Pages.
International Search Report and Written Opinion for International Application No. PCT/US2012/062502, dated Jan. 24, 2013, 13 Pages.
International Search Report and Written Opinion for International Application No. PCT/US2016/014936, dated May 12, 2016, 08 Pages.
International Search Report and Written Opinion for International Application No. PCT/US2021/028477, dated Aug. 4, 2021, 13 Pages.
International Search Report and Written Opinion for International Application No. PCT/US2021/031182, dated Dec. 31, 2021, 11 Pages.
International Search Report and Written Opinion for International Application No. PCT/US2021/058859, dated Mar. 8, 2022, 10 Pages.
International Search Report and Written Opinion of International Application No. PCT/US2020/043630, dated Nov. 11, 2020, 9 Pages.
International Search Report and Written Opinion of the International Application No. PCT/US2020/043639, dated Nov. 13, 2020, 11 Pages.

(56) References Cited

OTHER PUBLICATIONS

International Search Report for International Application No. PCT/US2016/023439, dated Aug. 31, 2016, 06 Pages.
Jackovitz J.F., et al., "Chapter 25: Iron Electrode Batteries," Linden Handbook of Batteries, 2004, 26 Pages.
Jayalakshmi M., et al., "Passivation of Iron in Alkaline Carbonate Solutions," Journal of Power Sources, 1991, vol. 35, pp. 131-142.
Jozwiak W.K., et al., "Reduction Behavior of Iron Oxides in Hydrogen And Carbon Monoxide Atmospheres," Applied Catalysis A: General, 2007, vol. 326, pp. 17-27.
Kalaignan G.P., et al., "Iron-Copper Electrodes for Alkaline Batteries," Bulletin of Electrochemistry, Mar.-Apr. 1996, vol. 12, No. 3-4, pp. 213-217.
Kao C-Y., et al., "Iron/Carbon-black Composite Nanoparticles as an Iron Electrode Material in a Paste Type Rechargeable Alkaline Battery," Journal of Power Sources, 2010, vol. 195, pp. 2399-2404.
Kao C.Y., et al., "Synthesis and Characterization of the Iron/Copper Composite as an Electrode Material for the Rechargeable Alkaline Battery," Journal of Power Sources, 2011, vol. 196, pp. 5746-5750.
Kitamura H., et al., "Effect of Charge Current Density on Electrochemical Performance of Fe/c Electrodes in Alkaline Solutions," Journal of the Electrochemical Society, 2012, vol. 159, No. 6, pp. A720-A724.
Kumar H., et al., "Fabrication Fe/Fe3/O4/Graphene Nanocomposite Electrode Material for Rechargeable Ni/Fe Batteries in Hybrid Electric Vehicles," International Letters of Chemistry, Physics and Astronomy, 2013, vol. 14, pp. 15-25.
Lee T.S., "Hydrogen Overpotential in Pure Metals in Alkaline Solution," Journal of Electrochemical Society, Aug. 1971, vol. 118, No. 8, pp. 1278-1282.
Li Z., et al., "Air-Breathing Aqueous Sulfur Flow Battery for Ultralow-Cost Long-Duration Electrical Storage," Joule, Oct. 11, 2017, vol. 1, No. 2, pp. 306-327, XP055667017.
Licht S., "Aqueous Solubilities, Solubility Products and Standard Oxidation-Reduction Potentials of the Metal Sulfides," Journal of the Electrochemical Society, Dec. 1988, vol. 135, No. 12, pp. 2971-2975.
Liu J., et al., "A Flexible Alkaline Rechargeable Ni/Fe Battery Based on Graphene Foam/Carbon Nanotubes Hybrid Film," Nano Letters, 2014, vol. 14, No. 12, pp. 7180-7187, Retrieved from the Internet: URL: https://doi.org/10.1021/nl503852m.
Liu W., et al., "Sulfidation Mechanism of ZnO Roasted With Pyrite," Scientific Reports, Jun. 2018, vol. 8, No. 1, 12 pages, DOI:10 1038/s41598-018-27968-z.
Mabbett I., et al., "Rapid Processing and Scanning Electrochemical Techniques Applied to Sintered Nickel Electrodes of Varying Thickness and Rate Capability," Rapid Processing & Scanning EC Techniques Applied to Sintered Ni Electrodes, ECS Transactions, 2015, 64 (18), pp. 1-12.
Malkhandi S., et al., "Self-Assembled Monolayers of n-Alkanethiols Suppress Hydrogen Evolution and Increase the Efficiency of Rechargeable Iron Battery Electrodes," Journal of American Chemical Society, 2013, vol. 135, pp. 347-353, dx.doi.org/10.1021/ja3095119.
Manohar A. K., et al., "Mechanism of Formation of Carbonyl Iron Electrodes in Alkaline Batteries," Abstract #371, Honolulu PRiME 2012, The Electrochemical Society, 2012, 1 page.
Manohar A.K., et al., "A High-Performance Rechargeable Iron Electrode for Large-Scale Battery-based Energy Storage," Journal of The Electrochemical Society, 2012, vol. 159, No. 8, pp. A1209-A1214.
Manohar A.K., et al., "Enhancing the Performance of the Rechargeable Iron Electrode in Alkaline Batteries with with Bismuth Oxide and Iron Sulfide Additives," Journal of The Electrochemical Society, 2013, vol. 160, No. 11, pp. A2078-A2084.
Manohar A.K., et al., "The Role of Sulfide Additives in Achieving Long Cycle Life Rechargeable Iron Electrodes in Alkaline Batteries," Journal of the Electrochemical Society, 2015, vol. 162, No. 9, pp. A1864-A1872.
Mitra D., et al., "Highly-Active, Durable and Inexpensive Iron-Based Electrocatalyst for Oxygen Evolution," 2016 ECS—The Electrochemical Society ECS Meeting Abstracts, vol. MA2016-02, A01—Batteries and Energy Technology Joint General Session, 2016, 2 pages.
Murcia D.C.F., et al., "Determination of Zinc Sulfide Solubility to High Temperatures," Journal of Solution Chemistry, 2017, vol. 46, No. 9-10, pp. 1805-1817, Retrieved from the Internet: URL: https://doi.org/10.1007/s10953-017-0648-1.
Notice of Rejection of Japanese Office Action dated May 12, 2015 for Application No. 2013-520885, 8 Pages.
Notification of Transmittal of the International Search Report and Written Opinion of the International Search Authority or International Patent Application No. PCT/US2020/039889, dated Oct. 15, 2020,11 pages.
Notification of Transmittal of the International Search Report and Written Opinion of the International Search Authority or International Patent Application No. PCT/US2020/039942, dated Oct. 22, 2020, 17 pages.
Notification of Transmittal of the International Search Report and Written Opinion of the International Search Authority or International Patent Application No. PCT/US2020/039976, dated Oct. 23, 2020, 11 pages.
Paulraj A.R., et al., "Core/Shell Structure Nano-lron/lron Carbide Electrodes for Rechargeable Alkaline Iron Batteries," Journal of The Electrochemical Society, 2017, vol. 164, No. 7, pp. A1665-A1672.
Paulraj A.R., et al., "Electrochemical Performance and in Operando Charge Efficiency Measurements of Cu/Sn-Doped Nano Iron Electrodes," Batteries, 2019, vol. 5, No. 1, pp. 1-15, DOI: 10.3390/batteries5010001.
Paulraj A.R., et al., "Electrochemical Study of Nano-lron/lron Carbide as Rechargeable Electrodes," 2016 ECS—The Electrochemical Society, ECS Meeting Abstracts, vol. MA2016-02, A01-Batteries and Energy Technology Joint General Session, 2016, 2 pages.
Periasamy P., et al., "Cyclic Voltammetric Studies of Porous Iron Electrodes in Alkaline Solutions used for Alkaline Batteries," Journal of Power Sources, 1996, vol. 58, pp. 35-40.
Perkins N.R., et al., "Hydrogen Oxidation Electrodes and Electrochemical Cells Including the Same," U.S. Appl. No. 16/951,396, filed Nov. 18, 2020, 88 Pages.
Posada J.O.G., et al., "Post-hoc Comparisons Among Iron Electrode Formulations based on Bismuth, Bismuth Sulphide, Iron Sulphide, and Potassium Sulphide under Strong Alkaline Conditions," Journal of Power Sources, 2014, vol. 268, Article 810e815, 7 Pages.
Rajan A.S., et al., "An In situ Carbon-grafted Alkaline Iron Electrode for Iron-based Accumulators," Energy & Environmental Science, 2014, vol. 7, pp. 1110-1116.
Rajan A.S., et al., "Carbonyl-Iron Electrodes for Rechargeable-Iron Batteries," Electrochemical Energy Technology, 2014, vol. 1, pp. 2-9.
Ravikumar M.K., et al., "In Situ Crystallographic Probing on Ameliorating Effect of Sulfide Additives and Carbon Grafting in Iron Electrodes," Journal of The Electrochemical Society, 2015, vol. 162, No. 12, 12 Pages.
Reardon E.J., "Zerovalent Irons—Styles of Corrosion and Inorganic Control on Hydrogen Pressure Buildup," Environmental Science & Technology, 2005, vol. 39, No. 18, pp. 7311-7317.
Reinders L.A., "Selective Separation of Heavy Metals in Aqueous Systems by Sulfide Precipitation: A Theoretical Equilibrium Model public Deposited," 1992, 86 pages, https://doi.org/10.17615/t2bhsa90.
Rickard D., et al., "Chemistry of Iron Sulfides," Chemical Reviews, 2007, vol. 107, pp. 514-562.
Rosenblum P., "Solubility in the Potassium Stannate—Potassium Hydroxide—Water System at 0 to 95.0 degree C," Canadian Journal of Chemistry, 1968, vol. 46, pp. 2715-2719.
Serebrennikova I., et al., "Steel Corrosion in Alkaline Batteries," Electrochimica Acta, 2009, vol. 54, pp. 5216-5222.
Shanmugam N., et al., "Effect of Annealing on the ZnS Nanocrystals Prepared by Chemical Precipitation Method," Journal of Nanomaterials, 2013, vol. 2013, Article ID 351798, 7 Pages.
Shukla A.K., et al., "Nickel-based Rechargeable Batteries," Journal of Power Sources, 2001, vol. 100, pp. 125-148.

(56) References Cited

OTHER PUBLICATIONS

Veselov S.V., et al., "The Capability of Multilayer Cermet Coating Fabrication on Steel with Electrophoretic Deposition," ECS Transactions, 2018, vol. 82, No. 1, pp. 67-71.

Vijayamohanan K., et al., "Formation Mechanism of Porous Alkaline Iron Electrodes," Journal of Power Sources, 1990, vol. 32, pp. 329-339.

Wang M., et al., "Surface Stoichiometry of Zinc Sulfide and Its Effect on the Adsorption Behaviors of Xanthate," Chemistry Central Journal, 2011, vol. 5, 73, Retrieve from URL: http://journal.chemistrycentral.eom/content/5/1/73.

Written Opinion for International Application No. PCT/US2016/023439, dated Aug. 31, 2016, 14 Pages.

Kang C., et al., "A High-Performance Sintered Iron Electrode for Rechargeable Alkaline Batteries to Enable Large-Scale Energy Storage," Journal of the Electrochemical Society, 2017, vol. 164, No. 2, pp. A418-A429.

Yang C., et al., "Performance of Rechargeable Sintered Iron Electrodes for Large-Scale Energy Storage," abstract 2015, The Electrochemical Society, Meeting Abstracts, MA2015-01 673, 2015, 2 pages.

Zielinski J., et al., "Reduction of Fe2O3 With Hydrogen," Applied Catalysis A General, 2010, pp. 1-18, DOI: 10.1016/I.apcata.2010.04.003.

\* cited by examiner

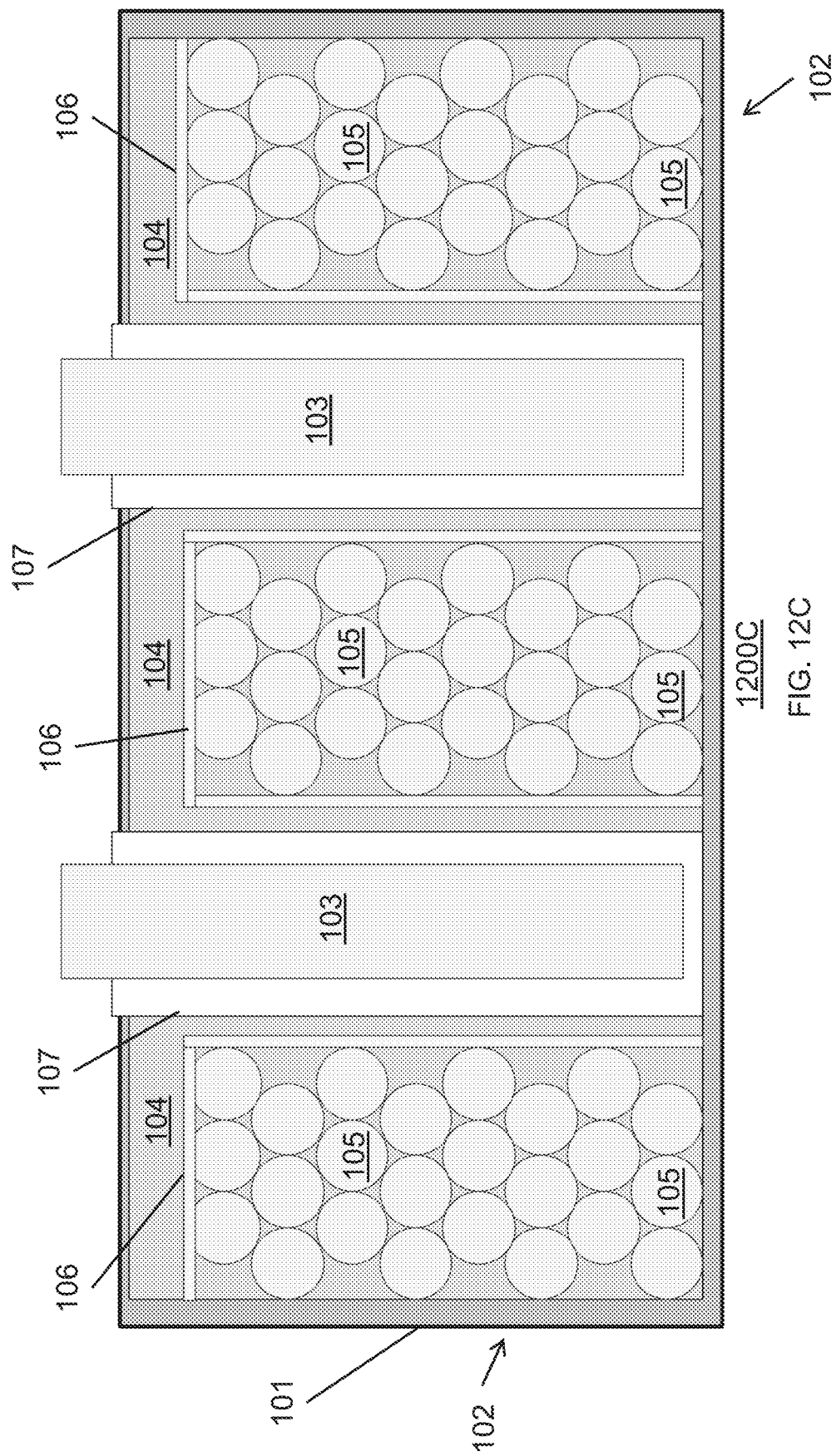

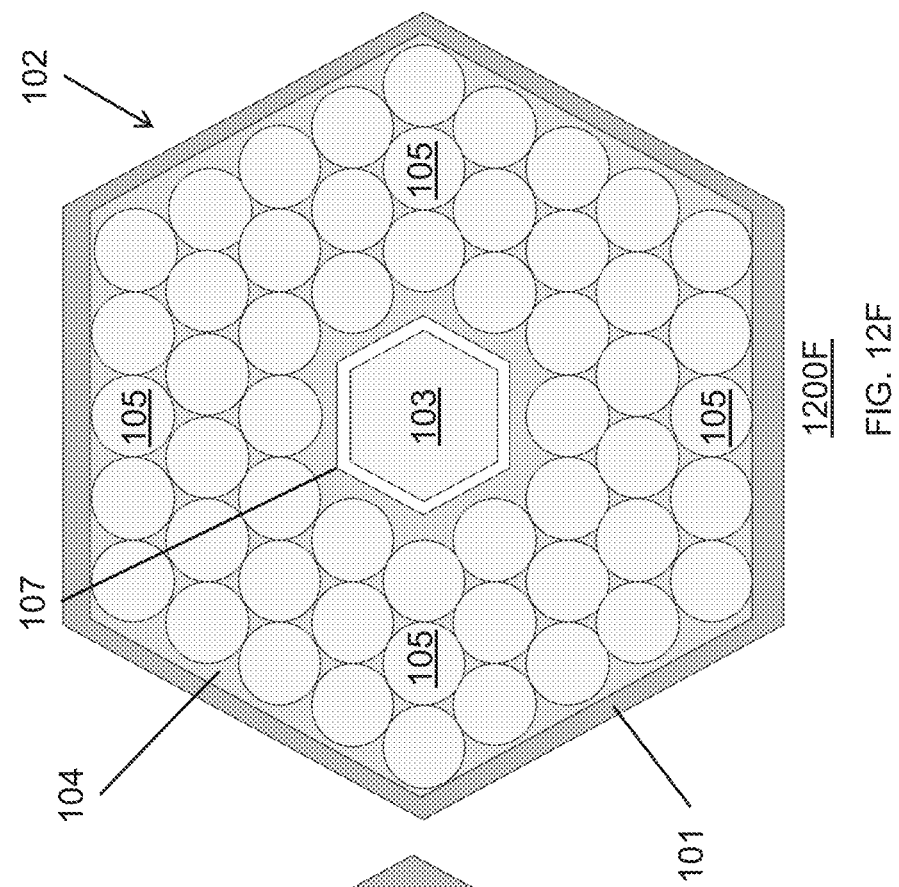
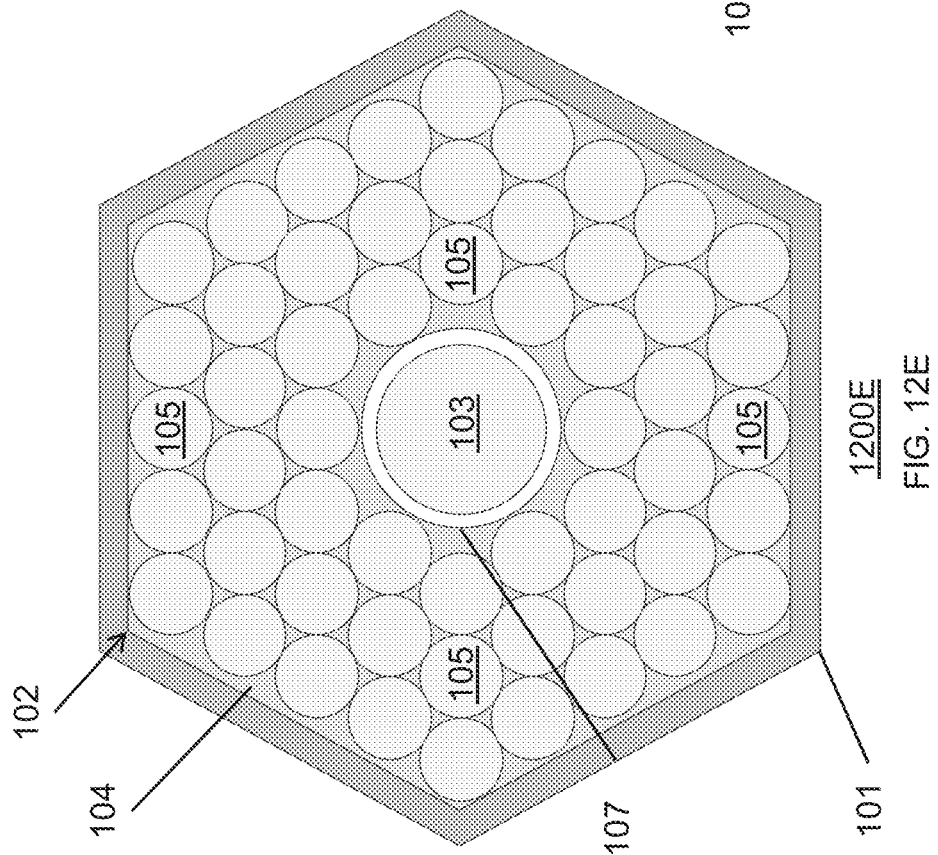

NEGATIVE ELECTRODES FOR ELECTROCHEMICAL CELLS

RELATED APPLICATIONS

This application claims the benefit of priority to U.S. Provisional Patent Application No. 62/711,253 entitled "Negative Electrodes for Metal-Air Batteries" filed Jul. 27, 2018, U.S. Provisional Application No. 62/790,668 entitled "Negative Electrodes for Metal-Air Batteries" filed Jan. 10, 2019, and U.S. Provisional Patent Application No. 62/868,511 entitled "Negative Electrodes for Metal-Air Batteries" filed Jun. 28, 2019. The entire contents of all three applications are hereby incorporated by reference for all purposes.

BACKGROUND

Energy storage technologies are playing an increasingly important role in electric power grids; at a most basic level, these energy storage assets provide smoothing to better match generation and demand on a grid. The services performed by energy storage devices are beneficial to electric power grids across multiple time scales, from milliseconds to years. Today, energy storage technologies exist that can support timescales from milliseconds to hours, but there is a need for long and ultra-long duration (collectively, ≥8 h) energy storage systems.

This Background section is intended to introduce various aspects of the art, which may be associated with embodiments of the present inventions. Thus, the foregoing discussion in this section provides a framework for better understanding the present inventions, and is not to be viewed as an admission of prior art.

SUMMARY

Materials, designs, and methods of fabrication for metal electrodes for electrochemical cells are disclosed. In various embodiments, the negative electrode comprises metallic pellets arranged in one or more, configurations, including multiple layers.

In various embodiments, pellets may comprise one or more forms of iron, ranging from highly reduced (more metallic) iron to highly oxidized (more ionic) iron. In various embodiments, the pellets may include various iron compounds, such as iron oxides, hydroxides, sulfides, or combinations thereof. In various embodiments, the pellets may include one or more secondary phases, such as silica ($SiO_2$) or silicates, calcium oxide (CaO), magnesium oxide (MgO), etc.

In various embodiments, pellets may be sintered iron agglomerates with various different shapes. In various embodiments, sintered iron agglomerate pellets may be formed in a furnace, such as a continuous feed calcining furnace, batch feed calcining furnace, shaft furnace, rotary calciner, rotary hearth, etc. In various embodiments, pellets may comprise forms of reduced and/or sintered iron-bearing precursors known to those skilled in the art as direct reduced iron (DRI), and/or its byproduct materials. Various embodiments may include processing pellets, including DRI pellets, using mechanical, chemical, and/or thermal processes before introducing the pellets into the electrochemical cell.

In various embodiments, the negative electrode may be a composite metal electrode comprised of a mixture of spherical or substantially spherical metallic pellets and powdered metal feedstock. In various embodiments, the powdered metal feedstock may be wetted by electrolyte. In various embodiments, the negative electrode may be comprised of a mixture of iron ore (e.g., taconite, etc.) pellets and conductive DRI fines, sponge iron, and/or atomized iron. "DRI fines" are understood to mean particulates smaller in size than the DRI pellets but which are produced concurrently with the DRI pellets, or particulates produced from DRI pellets by comminution, handling, or thermal or chemical means.

In various embodiments, the negative electrode may include the pellets, which may be grouped in an ordered array. In various embodiments, the pellets may be arranged packed in a bed such that macro-pores are created between two or more pellets in contact with one another. In various embodiments, the pellets may each include micro-pores. In various embodiments, electrolyte may fill the micro-pores or macro-pores, or be flowed through the pore space surrounding the pellets comprising the electrode.

In various embodiments, a layer of powdered iron may form an interface between the pellets of the negative electrode and a current collector wherein the negative electrode further comprises a layer of powdered iron configured to form an interface between the pellets and a current collector of the electrochemical cell.

Various embodiments may include systems and methods for monitoring the state-of-charge of the negative electrode comprising metallic pellets arranged in one or more layers.

In various embodiments, the pellets may be synthesized in a first stage of a dual use energy storage plant and used in the negative electrode in a second stage of the dual use energy storage plant.

Various embodiments may provide a battery, including a first electrode; an electrolyte; and a second electrode, wherein one or both of the first electrode and the second electrode comprises direct reduced iron ("DRI"). In various embodiments, the DRI is in the form of pellets. In various embodiments, the pellets comprise at least about 60 wt % iron by elemental mass, based on the total mass of the pellets. In various embodiments, the pellets comprise at least about 60 wt % metallic iron based on the total mass of the pellets, the pellets have an average particle size of 4 mm to 20 mm, and the pellets comprise at least 60 percent of the total mass of at least one of the first electrode and the second electrode. In various embodiments, the pellets comprise at least about 80 wt % metallic iron based on the total mass of the pellets. In various embodiments, the pellets comprise between about 90 wt % and about 98 wt % metallic iron, based on the total mass of the pellets. In various embodiments, the pellets are spherical, rod-shaped, disk-shaped, plate shaped, briquette-shaped, or a combination thereof. In various embodiments, the pellets are briquette-shaped and comprise hot briquetted iron. In various embodiments, the hot briquetted iron is formed from powdered iron fines or iron pellets. In various embodiments, the pellets have an average length ranging from about 10 mm to about 500 mm, an average width ranging from about 5 mm to about 250 mm, and an average height ranging from about 5 mm to about 200 mm. In various embodiments, the DRI comprises iron ore, direct reduced grade iron ore, reduced taconite, wustite, magnetite, hematite, cementite, iron oxide, or any combination thereof. In various embodiments, the DRI comprises DRI fines or powder. In various embodiments, the pellets have an average internal porosity ranging from about 10% to about 90% by volume. In various embodiments, the pellets have an average specific surface area ranging from about 0.19 $m^2/g$ to about 18 $m^2/g$. In various embodiments, the pellets have a volume weighted mean pore size ranging from 1 to 10 microns. In various embodiments, at least one of the first electrode and the second electrode has a thickness of greater than 0.1 cm. In various embodiments, the pellets are spherical and have an average diameter ranging from about 0.5 mm to about 10 cm. In various embodiments, the pellets comprise greater than 0.5 wt % percent silica containing compounds, based on the total weight of the pellets. In various embodiments, the pellets comprise from about 1 wt % to about 5 wt % silica containing compounds by elemental mass, based on the total mass of the pellets. In various embodiments, the pellets comprise from about 1 wt % to about 25 wt % silica containing compounds by elemental mass, based on the total mass of the pellets. In various embodiments, a packing fraction of the pellets in at least one of the first electrode and the second electrode is between 30% and 74%. In various embodiments, the pellets comprise: a primary phase comprising iron; and a secondary phase comprising silicon or another metal. In various embodiments, the pellets comprise: a primary phase comprising iron; and a secondary phase comprising cementite. In various embodiments, the secondary phase comprises silica or a silicate. In various embodiments, the secondary phase comprises titanium, vanadium, manganese, magnesium, calcium, phosphorus, carbon, aluminum, zirconium, or any combinations thereof. In various embodiments, at least one of the first electrode and the second electrode comprises a single layer of the pellets or multiple layers of the pellets. In various embodiments, the electrolyte is infiltrated between the pellets. In various embodiments, the battery may further include a current collector electrically connected to the pellets. In various embodiments, the current collector contacts a lower surface of at least one of the first electrode and the second electrode, side surfaces of at least one of the first electrode and the second electrode, extends through at least one of the first electrode and the second electrode, or any combination thereof. In various embodiments, the pellets are sintered iron agglomerate pellets. In various embodiments, the sintered iron agglomerate pellets are fabricated using a continuous feed calcining furnace, a batch calcining furnace, a shaft furnace, or any other type of furnace. In various embodiments, the second electrode may comprise a slurry or a gel. In various embodiments, at least one of the first electrode and the second electrode is a composite metal electrode comprising a mixture of the pellets and a smaller metal particle composition. In various embodiments, the smaller metal particle composition is a powdered metal feedstock. In various embodiments, the powdered metal feedstock is wetted by the electrolyte. In various embodiments, the smaller metal particle composition comprises DRI fines, sponge iron, atomized iron, or any combination thereof. In various embodiments, the pellets comprise DR taconite. In various embodiments, the pellets are synthesized in a first stage of operation in a dual use energy storage plant comprising the battery and loaded into at least one of the first electrode and the second electrode in a second stage of operation of the dual use energy storage plant. In various embodiments, the pellets are packed in a bed such that macro-pores are created between two or more pellets in contact with one another; and the pellets each include micro-pores in at least their respective outer surfaces. In various embodiments, the pellets are fused together. In various embodiments, the pellets are pre-processed chemically, mechanically, thermally, electrically, and/or electrochemically to fuse at least a portion of the pellets into a packed in a bed. In various embodiments, the battery may further include a pump configured to flow the liquid electrolyte over the pellets in the packed bed. In various embodiments, the pellets each include micro-pores in their respective outer surfaces. In various embodiments, the pellets comprise pores created by soaking the pellets in an etching bath before installation in at least one of the first electrode and the second electrode. In various embodiments, the etching bath is an acid bath. In various embodiments, at least one of the first electrode and the second electrode further comprises additive pellets comprising $Bi_2O_3$ or a metal sulfide. In various embodiments, the additive pellets comprise FeS, $FeS^2$, $Na_2S$, or a combination thereof. In various embodiments, the pellets are sintered iron pellets comprised of crushed direct reduced iron ("DRI") precursors and/or DRI fines. In various embodiments, the pellets are mechanically, chemically, electrically, electrochemically, and/or thermally pre-processed before installation in at least one of the first electrode and the second electrode. In various embodiments, the pre-processing includes pre-charging the pellets. In various embodiments, the pellets are initially comprised of at least a portion of cementite ($Fe_3C$) before operation of the battery. In various embodiments, at least one of the first electrode and the second electrode further comprises a layer of powdered iron configured to form an interface between the pellets and a current collector of the battery. In various embodiments, the battery may further include a monitoring system configured to monitor the state-of-charge (SOC) and/or state-of-health of at least one of the first electrode and the second electrode. In various embodiments, the monitoring system comprises one or more sensor connected to a controller. In various embodiments, the one or more sensors is selected from the group consisting of a strain gauge, a Mossbauer spectrometer, a CCD detector, an ultrasonic transducer, an ion sensing electrode, a thermocouple, and a gas sensor. In various embodiments, at least one of the first electrode and the second electrode is a composite metal electrode comprising a mixture of the pellets and a conductive material dispersed between individual pellets. In various embodiments, the conductive material comprises one or more conductive fibers, one or more wires, one or more meshes, and/or one or more sheets. In various embodiments, the first electrode is a negative electrode and comprises the DRI. In various embodiments, the battery may further include an additive delivery system configured to add one or more additives to the electrolyte. In various embodiments, the additive delivery system delivers liquid additives or solid additives. In various embodiments, the one or more additives include a salt. In various embodiments, the salt is a carbonate salt or polysulfide salt. In various embodiments, the one or more additives include a sulfur-based additive. In various embodiments, the one or more additives include a surfactant additive. In various embodiments, the one or more additives are configured to mitigate self-discharge and/or suppress the hydrogen evolution reaction (HER). In various embodiments, at least one of the first electrode and the second electrode is under compressive force. In various embodiments, at least one of the first electrode and the second electrode comprises additional conductive material. In various embodiments, the additional conductive material surrounds the iron-containing pellets. In various embodiments, the additional conductive material is a foil, sheet, screen, or wire.

Various embodiments may provide a method for operating an energy storage plant, including operating the energy storage plant to produce active materials; and using the active materials in the energy storage plant for long-duration energy storage. In various embodiments, the production of the active materials uses renewable energy.

Various embodiments may provide a bulk energy storage system, including one or more batteries, wherein at least one of the one or more batteries includes a first electrode, an electrolyte, and a second electrode, wherein one or both of the first electrode and the second electrode comprises direct reduced iron ("DRI"). In various embodiments, at least one of the first electrode and the second electrode comprising DRI is a negative electrode comprising direct reduced iron ("DRI") pellets. In various embodiments, at least one of the first electrode and the second electrode further comprises additive pellets. In various embodiments, the additive pellets are comprised of FeS, $FeS_2$, $Bi_2O_3$, or a metal sulfide. In various embodiments, the DRI comprises sintered iron pellets comprised of crushed direct reduced iron ("DRI") precursors and/or DRI fines. In various embodiments, the DRI is comprised of direct reduced iron ("DRI") pellets that are mechanically, chemically, and/or thermally pre-processed before installation in at least one of the first electrode and the second electrode. In various embodiments, the DRI comprises at least about 60 wt % metallic iron based on the total mass of the pellets, the DRI comprises direct reduced iron pellets having an average size of 4 mm to 20 mm and the direct reduced iron pellets comprise at least 60 percent of the total mass of at least one of the first electrode and the second electrode. In various embodiments, the bulk energy storage system is a long duration energy storage (LODES) system.

Various embodiments may provide a long duration energy storage system configured to hold an electrical charge for at least 24 hours, the system including a housing; a first electrode, the electrode comprising: from about 60% to about 90% iron; and, from about 1% to about 40% of a component comprising one or more of the materials selected from the group consisting of $SiO_2$, $Al_2O_3$, MgO, CaO, and $TiO_2$; a second electrode; and, an electrolyte. In various embodiments, the component may comprise about 1.5% to about 7.5% $SiO_2$. In various embodiments, the component may comprise about 0.3% to about 3% $Al_2O_3$. In various embodiments, the component may comprise about 0.25% to about 2% MgO. In various embodiments, the component may comprise about 0.75% to about 2.5% CaO. In various embodiments, the component may comprise about 0.25% to about 1.5% $TiO_2$. In various embodiments, the component may comprise 1% to 10% $SiO_2$. In various embodiments, the component may comprise 0.2% to 5% $Al_2O_3$. In various embodiments, the component may comprise 0.1% to 10% MgO. In various embodiments, the component may comprise 0.9% to 10% CaO. In various embodiments, the component may comprise 0.05% to 5% $TiO_2$. In various embodiments, at least 50% of the iron is $Fe^0$. In various embodiments, at least 50% of the iron is metallic iron. In various embodiments, at the iron comprises $Fe^0$, $Fe^{2+}$ and $Fe^{3+}$. In various embodiments, the storage system has a power rating of at least about 100 MW, a rated duration of at least about 100 hours, and an energy rating of at least about 2,000 MWh. In various embodiments, the storage is system has a power rating from about 50 MW to about 500 MW, a rated duration from about 25 hours to about 500 hours, and an energy rating of about 3,000 MWh to about 90,000 MWh.

DESCRIPTION OF THE DRAWINGS

FIGS. 12A-12F are schematic views of electrochemical cells, according to various embodiments of the present disclosure.

DETAILED DESCRIPTION

Figure 1:
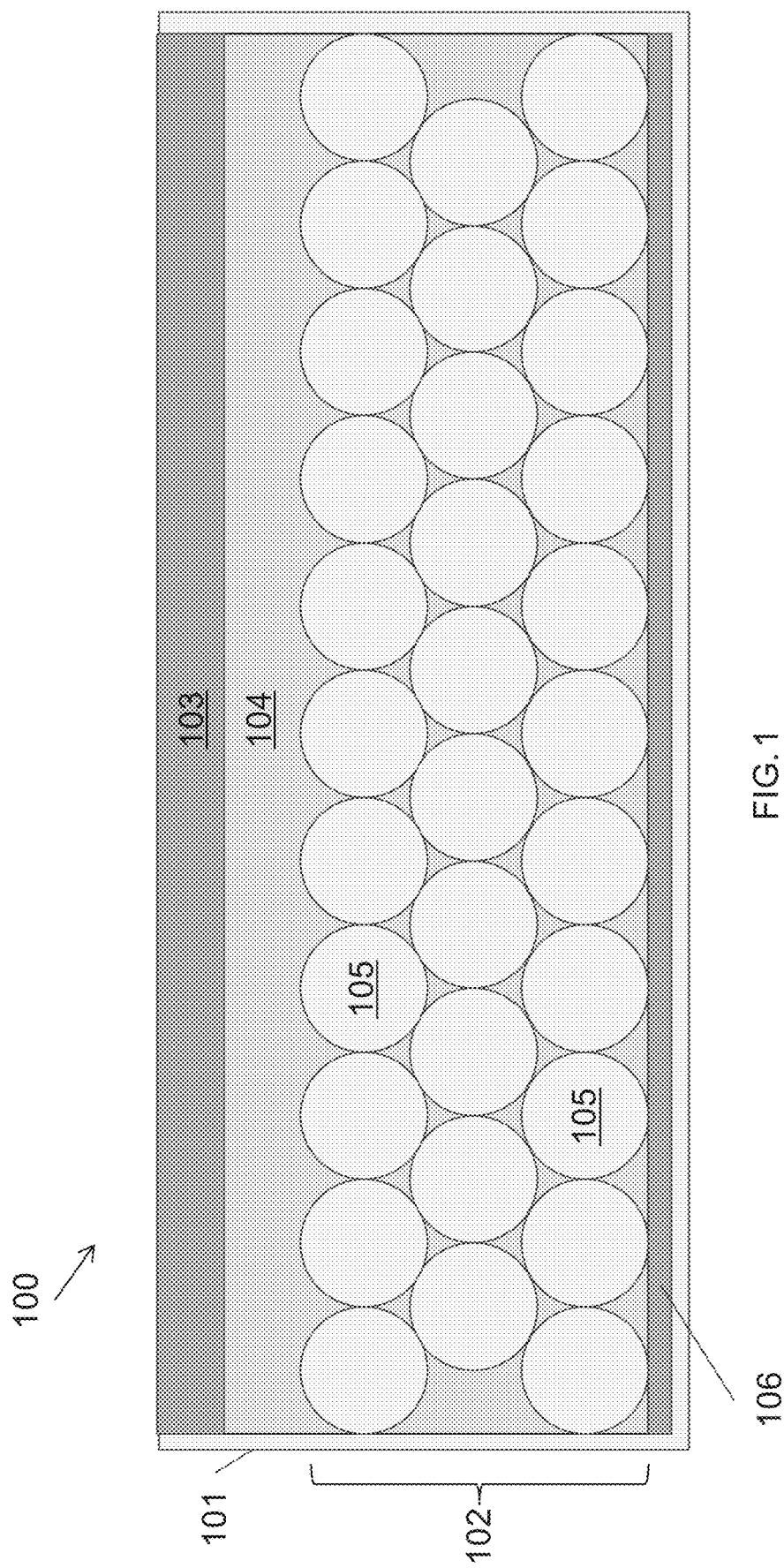
FIG. 1 is a schematic of an electrochemical cell, according to various embodiments of the present disclosure.

The various embodiments will be described in detail with reference to the accompanying drawings. Wherever possible, the same reference numbers will be used throughout the drawings to refer to the same or like parts. References made to particular examples and implementations are for illustrative purposes and are not intended to limit the scope of the claims. The following description of the embodiments of the invention is not intended to limit the invention to these embodiments but rather to enable a person skilled in the art to make and use this invention. Unless otherwise noted, the accompanying drawings are not drawn to scale.

As used herein, unless stated otherwise, room temperature is 25° C. And, standard temperature and pressure is 25° C. and 1 atmosphere. Unless expressly stated otherwise all tests, test results, physical properties, and values that are temperature dependent, pressure dependent, or both, are provided at standard ambient temperature and pressure.

Generally, the term "about" and the symbol "~" as used herein unless specified otherwise is meant to encompass a variance or range of ±10%, the experimental or instrument error associated with obtaining the stated value, and preferably the larger of these.

As used herein unless specified otherwise, the recitation of ranges of values herein is merely intended to serve as a shorthand method of referring individually to each separate value falling within the range. Unless otherwise indicated herein, each individual value within a range is incorporated into the specification as if it were individually recited herein.

As used herein, unless specified otherwise the terms %, weight % and mass % are used interchangeably and refer to the weight of a first component as a percentage of the weight of the total, e.g., formulation, mixture, particle, pellet, material, structure or product. As used herein, unless specified otherwise "volume %" and "% volume" and similar such terms refer to the volume of a first component as a percentage of the volume of the total, e.g., formulation, mixture, particle, pellet, material, structure or product.

The following examples are provided to illustrate various embodiments of the present systems and methods of the present inventions. These examples are for illustrative purposes, may be prophetic, and should not be viewed as limiting, and do not otherwise limit the scope of the present inventions.

It is noted that there is no requirement to provide or address the theory underlying the novel and groundbreaking processes, materials, performance or other beneficial features and properties that are the subject of, or associated with, embodiments of the present inventions. Nevertheless, various theories are provided in this specification to further advance the art in this area. The theories put forth in this specification, and unless expressly stated otherwise, in no way limit, restrict or narrow the scope of protection to be afforded the claimed inventions. These theories many not be required or practiced to utilize the present inventions. It is further understood that the present inventions may lead to new, and heretofore unknown theories to explain the function-features of embodiments of the methods, articles, materials, devices and system of the present inventions; and such later developed theories shall not limit the scope of protection afforded the present inventions.

The various embodiments of systems, equipment, techniques, methods, activities and operations set forth in this specification may be used for various other activities and in other fields in addition to those set forth herein. Additionally, these embodiments, for example, may be used with: other equipment or activities that may be developed in the future; and, with existing equipment or activities which may be modified, in-part, based on the teachings of this specification. Further, the various embodiments and examples set forth in this specification may be used with each other, in whole or in part, and in different and various combinations. Thus, the configurations provided in the various embodiments of this specification may be used with each other. For example, the components of an embodiment having A, A' and B and the components of an embodiment having A", C and D can be used with each other in various combination, e.g., A, C, D, and A. A" C and D, etc., in accordance with the teaching of this Specification. Thus, the scope of protection afforded the present inventions should not be limited to a particular embodiment, configuration or arrangement that is set forth in a particular embodiment, example, or in an embodiment in a particular figure.

As used herein, unless specified otherwise, the terms specific gravity, which is also called apparent density, should be given their broadest possible meanings, and generally mean weight per unit volume of a structure, e.g., volumetric shape of material. This property would include internal porosity of a particle as part of its volume. It can be measured with a low viscosity fluid that wets the particle surface, among other techniques.

As used herein, unless specified otherwise, the terms actual density, which may also be called true density, should be given their broadest possible meanings, and general mean weight per unit volume of a material, when there are no voids present in that material. This measurement and property essentially eliminates any internal porosity from the material, e.g., it does not include any voids in the material.

Thus, a collection of porous foam balls (e.g., Nerf® balls) can be used to illustrate the relationship between the three density properties. The weight of the balls filling a container would be the bulk density for the balls:

$$\text{Bulk Density} = \frac{\text{weight of balls}}{\text{volume of container filled}}$$

The weight of a single ball per the ball's spherical volume would be its apparent density:

$$\text{Apparent Density} = \frac{\text{weight of one ball}}{\text{volume of that ball}}$$

The weight of the material making up the skeleton of the ball, i.e., the ball with all void volume removed, per the remaining volume of that material would be the actual density:

$$\text{Actual Density} = \frac{\text{weight of material}}{\text{volume of void free material}}$$

Embodiments of the present invention include apparatus, systems, and methods for long-duration, and ultra-long-duration, low-cost, energy storage. Herein, "long duration" and "ultra-long duration" and similar such terms, unless expressly stated otherwise, should be given their broadest possible meaning and include periods of energy storage of 8 hours or longer, such as periods of energy storage of 8 hours, periods of energy storage ranging from 8 hours to 20 hours, periods of energy storage of 20 hours, periods of energy storage ranging from 20 hours to 24 hours, periods of energy storage of 24 hours, periods of energy storage ranging from 24 hours to a week, periods of energy storage ranging from a week to a year (e.g., such as from several days to several weeks to several months), etc. and would include LODES systems. Further, the terms "long duration" and "ultra-long duration", "energy storage cells" including "electrochemical cells", and similar such terms, unless expressly stated otherwise, should be given their broadest possible interpretation; and include electrochemical cells that may be configured to store energy over time spans of days, weeks, or seasons.

In general, in an embodiment, the long duration energy storage cell can be a long duration electrochemical cell. In general, this long duration electrochemical cell can store electricity generated from an electrical generation system, when: (i) the power source or fuel for that generation is available, abundant, inexpensive, and combinations and variations of these; (ii) when the power requirements or electrical needs of the electrical grid, customer or other user, are less than the amount of electricity generated by the electrical generation system, the price paid for providing such power to the grid, customer or other user, is below an economically efficient point for the generation of such power (e.g., cost of generation exceeds market price for the electricity), and combinations and variations of these; and (iii) combinations and variations of (i) and (ii) as well as other reasons. This electricity stored in the long duration electrochemical cell can then be distributed to the grid, customer or other user, at times when it is economical or otherwise needed. For example, the electrochemical cells may be configured to store energy generated by solar cells during the summer months, when sunshine is plentiful and solar power generation exceeds power grid requirements, and discharge the stored energy during the winter months, when sunshine may be insufficient to satisfy power grid requirements.

Various embodiments are discussed in relation to the use of direct reduced iron (DRI) as a material a battery (or cell), as a component of a battery (or cell) and combinations and variations of these. In various embodiments, the DRI may be produced from, or may be, material which is obtained from the reduction of natural or processed iron ores, such reduction being conducted without reaching the melting temperature of iron. In various embodiments the iron ore may be taconite or magnetite or hematite or goethite, etc. In various embodiments, the DRI may be in the form of pellets, which may be spherical or substantially spherical. In various embodiments the DRI may be porous, containing open and/or closed internal porosity. In various embodiments the DRI may comprise materials that have been further processed by hot or cold briquetting. In various embodiments, the DRI may be produced by reducing iron ore pellets to form a more metallic (more reduced, less highly oxidized) material, such as iron metal ($Fe^0$), wustite (FeO), or a composite pellet comprising iron metal and residual oxide phases. In various non-limiting embodiments, the DRI may be reduced iron ore taconite, direct reduced ("DR") taconite, reduced "Blast Furnace (BF) Grade" pellets, reduced "Electric Arc Furnace (EAF)-Grade" pellets, "Cold Direct Reduced Iron (CDRI)" pellets, direct reduced iron ("DRI") pellets, Hot Briquetted Iron (HBI), or any combination thereof. In the iron and steelmaking industry, DRI is sometimes referred to as "sponge iron;" this usage is particularly common in India. Embodiments of iron materials, including for example embodiments of DRI materials, for use in various embodiments described herein, including as electrode materials, may have, one, more than one, or all of the material properties as described in Table 1 below. As used in the Specification, including Table 1, the following terms, have the following meaning, unless expressly stated otherwise: "Specific surface area" means, the total surface area of a material per unit of mass, which includes the surface area of the pores in a porous structure; "Carbon content" or "Carbon (wt %)" means the mass of total carbon as percent of total mass of DRI; "Cementite content" or "Cementite (wt %)" means the mass of $Fe_3C$ as percent of total mass of DRI; "Total Fe (wt %)" means the mass of total iron as percent of total mass of DRI; "Metallic Fe (wt %)" means the mass of iron in the $Fe^0$ state as percent of total mass of DRI; and "Metallization" means the mass of iron in the $Fe^0$ state as percent of total iron mass. Weight and volume percentages and apparent densities as used herein are understood to exclude any electrolyte that has infiltrated porosity or fugitive additives within porosity unless otherwise stated.

TABLE 1

| Material Property | Embodiment Range |
| --- | --- |
| Specific surface area* | 0.01-25 $m^2/g$ |
| Actual density** | 4.6-7.1 g/cc |
| Apparent density*** | 2.3-6.5 g/cc |
| Minimum $d_{pore,\ 90\%\ volume}$**** | 10 nm-50 μm |
| Minimum $d_{pore,\ 50\%\ surface\ area}$***** | 1 nm-15 μm |
| Total Fe (wt %)# | 65-95% |
| Metallic Fe (wt %)## | 46-90% |
| Metallization (%)### | 59-96% |
| Carbon (wt %)#### | 0-5% |
| $Fe^{2+}$ (wt %)##### | 1-9% |
| $Fe^{3+}$ (wt %)$ | 0.9-25% |
| $SiO_2$ (wt %)$$ | 1-15% |
| Ferrite (wt %, XRD)$$$ | 22-97% |
| Wustite (FeO, wt %, XRD)$$$$ | 0-13% |
| Goethite (FeOOH, wt %, XRD)$$$$$ | 0-23% |
| Cementite ($Fe_3C$, wt %, XRD)+ | <<80% |

*Specific surface area preferably determined by the Brunauer-Emmett-Teller adsorption method ("BET"), and more preferably as the BET is set forth in ISO 9277 (the entire disclosure of which is incorporated herein by reference); recognizing that other tests, such as methylene blue (MB) staining, ethylene glycol monoethyl ether (EGME) adsorption, electrokinetic analysis of complex-ion adsorption and a Protein Retention (PR) method may be employed to provide results that can be correlated with BET results.

**Actual density preferably determined by helium (He) pycnometry, and more preferably as is set forth in ISO 12154 (the entire disclosure of which is incorporated herein by reference); recognizing that other tests may be employed to provide results that can be correlated with He pycnometry results. Actual density may also be referred to as "true density" or "skeletal density" in the art.

***Apparent density preferably determined by immersion in water, and more preferably as is set forth in ISO 15968 (the entire disclosure of which is incorporated herein by reference); recognizing that other tests may be employed to provide results that can be correlated with He pycnometry results. Porosity may be defined as the ratio of apparent density to actual density:

$$\text{Porosity} = \frac{\text{apparent density}}{\text{actual density}}$$

****$d_{pore,\ 90\%\ volume}$ preferably determined by mercury (Hg) intrusion porosimetry, and more preferably as is set forth in ISO 15901-1 (the entire disclosure of which is incorporated herein by reference); recognizing that other tests, such as gas adsorption, may be employed to provide results that can be correlated with Hg intrusion results. $d_{pore,\ 90\%\ volume}$ is the pore diameter above which 90% of the total pore volume exists.

*****$d_{pore,\ 50\%\ surface\ area}$ preferably determined by mercury (Hg) intrusion porosimetry, and more preferably as is set forth in ISO 15901-1 (the entire disclosure of which is incorporated herein by reference); recognizing that other tests, such as gas adsorption, may be employed to provide results that can be correlated with Hg intrusion results. $d_{pore,\ 50\%\ surface\ area}$ is the pore diameter above which 50% of free surface area exists.

Total Fe (wt %) preferably determined by dichromate titrimetry, and more preferably as is set forth in ASTM E246-10 (the entire disclosure of which is incorporated herein by reference); recognizing that other tests, such as titrimetry after tin(II) chloride reduction, titrimetry after titanium(III) chloride reduction, inductively coupled plasma (ICP) spectrometry, may be employed to provide results that can be correlated with dichromate titrimetry.

Metallic Fe (wt %) preferably determined by iron(III) chloride titrimetry, and more preferably as is set forth in ISO 16878 (the entire disclosure of which is incorporated herein by reference); recognizing that other tests, such as bromine-methanol titimetry, may be employed to provide results that can be correlated with iron(III) chloride titrimetry.

Metallization (%) preferably determined by the ratio of metallic Fe to total Fe, each as preferably determined by the methods previously described.

Carbon (wt %) preferably determined by infrared absorption after combustion in an induction furnace, and more preferably as is set forth in ISO 9556 (the entire disclosure of which is incorporated herein by reference); recognizing that other tests, such as various combustion and inert gas fusion techniques, such as are described in ASTM E1019-18 may be employed to provide results that can be correlated with infrared absorption after combustion in an induction furnace.

$Fe^{2+}$ (wt %) preferably determined by titrimetry, and more preferably as is set forth in ASTM D3872-05 (the entire disclosure of which is incorporated herein by reference); recognizing that other tests, such as Mossbauer spectroscopy, X-ray absorption spectroscopy, etc., may be employed to provide results that can be correlated with titrimetry.

$ $Fe^{3+}$ (wt %) preferably determined by the mass balance relation between and among Total Fe (wt %), Metallic Fe (wt %), $Fe^{2+}$ (wt %) and $Fe^{3+}$ (wt %). Specifically the equality Total Fe (wt %)=Metallic Fe (wt %)+$Fe^{2+}$ (wt %)+$Fe^{3+}$ (wt %) must be true by conservation of mass, so $Fe^{3+}$ (wt %) may be calculated as $Fe^{3+}$ (wt %)=Total Fe (wt %)−Metallic Fe (wt %)−$Fe^{2+}$ (wt %).

$$ $SiO_2$ (wt %) preferably determined by gravimetric methods, and more preferably as is set forth in ISO 2598-1 (the entire disclosure of which is incorporated herein by reference); recognizing that other tests, such as reduced molybdosilicate spectrophotometric methods, x-ray diffraction (XRD), may be employed to provide results that can be correlated with gravimetric methods. In certain methods, the $SiO_2$ wt % is not determined directly, but rather the Si concentration (inclusive of neutral and ionic species) is measured, and the $SiO_2$ wt % is calculated assuming the stoichiometry of $SiO_2$; that is, a 1:2 molar ratio of Si:O is assumed.

$$$ Ferrite (wt %, XRD) preferably determined by x-ray diffraction (XRD).

$$$$ Wustite (FeO, wt %, XRD) preferably determined by x-ray diffraction (XRD).

$$$$$ Goethite (FeOOH, wt %, XRD) preferably determined by x-ray diffraction (XRD).

+ Cementite ($Fe_3C$, wt %, XRD) preferably determined by x-ray diffraction (XRD).

Additionally, embodiments of iron materials, including for example embodiments of DRI materials, for use in various embodiments described herein, including as electrode materials, may have one or more of the following properties, features or characteristics, (noting that values from one row or one column may be present with values in different rows or columns) as set forth in Table 1A.

TABLE 1A

| | | | | |
|---|---|---|---|---|
| Fe total (wt %)[1] | >60% | >70% | >80% | ~83-94% |
| $SiO_2$ (wt %)[!!] | <12% | <7.5% | 1-10% | 1.5-7.5% |
| $Al_2O_3$ (wt %)[!!!] | <10% | <5% | 0.2-5% | 0.3-3% |
| MgO (wt %)[!!!!] | <10% | <5% | 0.1-10% | 0.25-2% |
| CaO (wt %)[!!!!!] | <10% | <5% | 0.9-10% | 0.75-2.5% |
| $TiO_2$ (wt %)[&] | <10% | <2.5% | 0.05-5% | 0.25-1.5% |
| Size (largest cross-sectional distance, e.g. for a sphere the diameter) | <200 mm | ~50 to ~150 mm | ~2 to ~30 mm | ~4 to ~20 mm |
| Actual Density ($g/cm^3$)[&&] | ~5 | ~5.8 to ~6.2 | ~4.0 to ~6.5 | <7.8 |
| Apparent Density ($g/cm^3$)[&&&] | <7.8 | >5 | >4 | 3.4-3.6 |
| Bulk Density ($kg/m^3$)[&&&&] | <7 | >1.5 | ~2.4 to ~3.4 | ~1.5 to ~2.0 |
| Porosity (%)[&&&&&] | >15% | >50% | ~20% to ~90% | ~50% to ~70% |

! Total Fe (wt %) preferably determined by dichromate titrimetry, and more preferably as is set forth in ASTM E246-10 (the entire disclosure of which is incorporated herein by reference); recognizing that other tests, such as titrimetry after tin(II) chloride reduction, titrimetry after titanium(III) chloride reduction, inductively coupled plasma (ICP) spectrometry, may be employed to provide results that can be correlated with dichromate titrimetry.

!! $SiO_2$ (wt %) preferably determined by gravimetric methods, and more preferably as is set forth in ISO 2598-1 (the entire disclosure of which is incorporated herein by reference); recognizing that other tests, such as reduced molybdosilicate spectrophotometric methods, x-ray diffraction (XRD), may be employed to provide results that can be correlated with gravimetric methods. In certain methods, the $SiO_2$ wt % is not determined directly, but rather the Si concentration (inclusive of neutral and ionic species) is measured, and the $SiO_2$ wt % is calculated assuming the stoichiometry of $SiO_2$; that is, a 1:2 molar ratio of Si:O is assumed.

!!! $Al_2O_3$ (wt %) preferably determined by flame atomic absorption spectrometric method, and more preferably as is set forth in ISO 4688-1 (the entire disclosure of which is incorporated herein by reference); recognizing that other tests, such as x-ray diffraction (XRD), may be employed to provide results that can be correlated with flame atomic absorption spectrometric method. In certain methods, the $Al_2O_3$ wt % is not determined directly, but rather the Al concentration (inclusive of neutral and ionic species) is measured, and the $Al_2O_3$ wt % is calculated assuming the stoichiometry of $Al_2O_3$; that is, a 2:3 molar ratio of Al:O is assumed.

!!!! MgO (wt %) preferably determined by flame atomic absorption spectrometric method, and more preferably as is set forth in ISO 10204 (the entire disclosure of which is incorporated herein by reference); recognizing that other tests, such as x-ray diffraction (XRD), may be employed to provide results that can be correlated with flame atomic absorption spectrometric method. In certain methods, the MgO wt % is not determined directly, but rather the Mg concentration (inclusive of neutral and ionic species) is measured, and the MgO wt % is calculated assuming the stoichiometry of MgO; that is, a 1:1 molar ratio of Mg:O is assumed.

!!!!! CaO (wt %) preferably determined by flame atomic absorption spectrometric method, and more preferably as is set forth in ISO 10203 (the entire disclosure of which is incorporated herein by reference); recognizing that other tests, such as x-ray diffraction (XRD), may be employed to provide results that can be correlated with flame atomic absorption spectrometric method. In certain methods, the CaO wt % is not determined directly, but rather the Ca concentration (inclusive of neutral and ionic species) is measured, and the CaO wt % is calculated assuming the stoichiometry of CaO; that is, a 1:1 molar ratio of Ca:O is assumed.

& $TiO_2$ (wt %) preferably determined by a diantipyrylmethane spectrophotometric method, and more preferably as is set forth in ISO 4691 (the entire disclosure of which is incorporated herein by reference); recognizing that other tests, such as x-ray diffraction (XRD), may be employed to provide results that can be correlated with the diantipyrylmethane spectrophotometric method. In certain methods, the $TiO_2$ wt % is not determined directly, but rather the Ti concentration (inclusive of neutral and ionic species) is measured, and the $TiO_2$ wt % is calculated assuming the stoichiometry of $TiO_2$; that is, a 1:2 molar ratio of Ti:O is assumed.

&& Actual density preferably determined by helium (He) pycnometry, and more preferably as is set forth in ISO 12154 (the entire disclosure of which is incorporated herein by reference); recognizing that other tests may be employed to provide results that can be correlated with He pycnometry results. Actual density may also be referred to as "true density" or "skeletal density" in the art.

&&& Apparent density preferably determined by immersion in water, and more preferably as is set forth in ISO 15968 (the entire disclosure of which is incorporated herein by reference); recognizing that other tests may be employed to provide results that can be correlated with He pycnometry results.

&&&& Bulk Density ($kg/m^3$) preferably determined by measuring the mass of a test portion introduced into a container of known volume until its surface is level, and more preferably as is set forth in Method 2 of ISO 3852 (the entire disclosure of which is incorporated herein by reference); recognizing that other tests may be employed to provide results that can be correlated with the massing method.

&&&&& Porosity determined preferably by the ratio of the apparent density to the actual density:

$$\text{Porosity} = \frac{\text{apparent density}}{\text{actual density}}$$

The properties set forth in Table 1, may also be present in embodiments with, in addition to, or instead of the properties in Table 1A. Greater and lesser values for these properties may also be present in various embodiments.

In embodiments the specific surface area for the pellets can be from about 0.05 $m^2/g$ to about 35 $m^2/g$, from about 0.1 $m^2/g$ to about 5 $m^2/g$, from about 0.5 $m^2/g$ to about 10 $m^2/g$, from about 0.2 $m^2/g$ to about 5 $m^2/g$, from about 1 $m^2/g$ to about 5 $m^2/g$, from about 1 $m^2/g$ to about 20 $m^2/g$, greater than about 1 $m^2/g$, greater than about 2 $m^2/g$, less than about 5 $m^2/g$, less than about 15 $m^2/g$, less than about 20 $m^2/g$, and combinations and variations of these, as well as greater and smaller values.

In general, iron ore pellets are produced by crushing, grinding or milling of iron ore to a fine powdery form, which is then concentrated by removing impurity phases (so called "gangue") which are liberated by the grinding operation. In general, as the ore is ground to finer (smaller) particle sizes, the purity of the resulting concentrate is increased. The concentrate is then formed into a pellet by a pelletizing or balling process (using, for example, a drum or disk pelletizer). In general, greater energy input is required to produce higher purity ore pellets. Iron ore pellets are commonly marketed or sold under two principal categories: Blast Furnace (BF) grade pellets and Direct Reduction (DR Grade) (also sometimes referred to as Electric Arc Furnace (EAF) Grade) with the principal distinction being the content of $SiO_2$ and other impurity phases being higher in the BF grade pellets relative to DR Grade pellets. Typical key specifications for a DR Grade pellet or feedstock are a total Fe content by mass percentage in the range of 63-69 wt % such as 67 wt % and a $SiO_2$ content by mass percentage of less than 3 wt % such as 1 wt %. Typical key specifications for a BF grade pellet or feedstock are a total Fe content by mass percentage in the range of 60-67 wt % such as 63 wt % and a $SiO_2$ content by mass percentage in the range of 2-8 wt % such as 4 wt %.

In certain embodiments the DRI may be produced by the reduction of a "Blast Furnace" pellet, in which case the resulting DRI may have material properties as described in Table 2 below. The use of reduced BF grade DRI may be advantageous due to the lesser input energy required to produce the pellet, which translates to a lower cost of the finished material.

TABLE 2

| Material Property | Embodiment Range |
|---|---|
| Specific surface area* | 0.21-25 $m^2/g$ |
| Actual density** | 5.5-6.7 g/cc |
| Apparent density*** | 3.1-4.8 g/cc |
| Minimum $d_{pore,\ 90\%\ volume}$**** | 50 nm-50 μm |
| Minimum $d_{pore,\ 50\%\ surface\ area}$***** | 1 nm-10 μm |
| Total Fe (wt %)# | 81.8-89.2% |

TABLE 2-continued

| Material Property | Embodiment Range |
| --- | --- |
| Metallic Fe (wt %)## | 68.7-83.2% |
| Metallization (%)### | 84-95% |
| Carbon (wt %)#### | 0.03-0.35% |
| Fe$^{2+}$ (wt %)##### | 2-8.7% |
| Fe$^{3+}$ (wt %)$ | 0.9-5.2% |
| SiO$_2$ (wt %)$$ | 3-7% |
| Ferrite (wt %, XRD)$$$ | 80-96% |
| Wustite (FeO, wt %, XRD)$$$$ | 2-13% |
| Goethite (FeOOH, wt %, XRD)$$$$$ | 0-11% |
| Cementite (Fe$_3$C, wt %, XRD)+ | 0-80% |

*Specific surface area preferably determined by the Brunauer-Emmett-Teller adsorption method ("BET"), and more preferably as the BET is set forth in ISO 9277 (the entire disclosure of which is incorporated herein by reference); recognizing that other tests, such as methylene blue (MB) staining, ethylene glycol monoethyl ether (EGME) adsorption, electrokinetic analysis of complex-ion adsorption and a Protein Retention (PR) method may be employed to provide results that can be correlated with BET results.

**Actual density preferably determined by helium (He) pycnometry, and more preferably as is set forth in ISO 12154 (the entire disclosure of which is incorporated herein by reference); recognizing that other tests may be employed to provide results that can be correlated with He pycnometry results. Actual density may also be referred to as "true density" or "skeletal density" in the art.

***Apparent density preferably determined by immersion in water, and more preferably as is set forth in ISO 15968 (the entire disclosure of which is incorporated herein by reference); recognizing that other tests may be employed to provide results that can be correlated with He pycnometry results. Porosity may be defined as the ratio of apparent density to actual density:

$$\text{Porosity} = \frac{\text{apparent density}}{\text{actual density}}$$

****$d_{pore,\ 90\%\ volume}$ preferably determined by mercury (Hg) intrusion porosimetry, and more preferably as is set forth in ISO 15901-1 (the entire disclosure of which is incorporated herein by reference); recognizing that other tests, such as gas adsorption, may be employed to provide results that can be correlated with Hg intrusion results. $d_{pore,\ 90\%\ volume}$ is the pore diameter above which 90% of the total pore volume exists.

*****$d_{pore,\ 50\%\ surface\ area}$ preferably determined by mercury (Hg) intrusion porosimetry, and more preferably as is set forth in ISO 15901-1 (the entire disclosure of which is incorporated herein by reference); recognizing that other tests, such as gas adsorption, fray be employed to provide results that can be correlated with Hg intrusion results. $d_{pore,\ 50\%\ surface\ area}$ is the pore diameter above which 50% of free surface area exists.

Total Fe (wt %) preferably determined by dichromate titrimetry, and more preferably as is set forth in ASTM E246-10 (the entire disclosure of which is incorporated herein by reference); recognizing that other tests, such as titrimetry after tin(II) chloride reduction, titrimetry after titanium(III) chloride reduction, inductively coupled plasma (ICP) spectrometry, may be employed to provide results that can be correlated with dichromate titrimetry.

Metallic Fe (wt %) preferably determined by iron(III) chloride titrimetry, and more preferably as is set forth in ISO 16878 (the entire disclosure of which is incorporated herein by reference); recognizing that other tests, such as bromine-methanol titrimetry, may be employed to provide results that can be correlated with iron(III) chloride titrimetry.

Metallization (%) preferably determined by the ratio of metallic Fe to total Fe, each as preferably determined by the methods previously described.

Carbon (wt %) preferably determined by infrared absorption after combustion in an induction furnace, and more preferably as is set forth in ISO 9556 (the entire disclosure of which is incorporated herein by reference); recognizing that other tests, such as various combustion and inert gas fusion techniques, such as are described in ASTM E1019-18 may be employed to provide results that can be correlated with infrared absorption after combustion in an induction furnace.

Fe$^{2+}$ (wt %) preferably determined by titrimetry, and more preferably as is set forth in ASTM D3872-05 (the entire disclosure of which is incorporated herein by reference); recognizing that other tests, such as Mossbauer spectroscopy, X-ray absorption spectroscopy, etc., may be employed to provide results that can be correlated with titrimetry.

Fe$^{3+}$ (wt %) preferably determined by the mass balance relation between and among Total Fe (wt %), Metallic Fe (wt %), Fe$^{2+}$ (wt %) and Fe$^{3+}$ (wt %). Specifically the equality Total Fe (wt %)=Metallic Fe (wt %)+Fe$^{2+}$ (wt %)+Fe$^{3+}$ (wt %) must be true by conservation of mass, so Fe$^{3+}$ (wt %) may be calculated as Fe$^{3+}$ (wt %)=Total Fe (wt %)−Metallic Fe (wt %)−Fe$^{2+}$ (wt %).

$$ SiO$_2$ (wt %) preferably determined by gravimetric methods, and more preferably as is set forth in ISO 2598-1 (the entire disclosure of which is incorporated herein by reference); recognizing that other tests, such as reduced molybdosilicate spectrophotometric methods, x-ray diffraction (XRD), may be employed to provide results that can be correlated with gravimetric methods. In certain methods, the SiO$_2$ wt % is not determined directly, but rather the Si concentration (inclusive of neutral and ionic species) is measured, and the SiO$_2$ wt % is calculated assuming the stoichiometry of SiO$_2$; that is, a 1:2 molar ratio of Si:O is assumed.

$$$ Ferrite (wt %, XRD) preferably determined by x-ray diffraction (XRD).

$$$$ Wustite (FeO, wt %, XRD) preferably determined by x-ray diffraction (XRD).

$$$$$ Goethite (FeOOH, wt %, XRD) preferably determined by x-ray diffraction (XRD).

+ Cementite (Fe$_3$C, wt %, XRD) preferably determined by x-ray diffraction (XRD).

The properties set forth in Table 2, may also be present in embodiments with, in addition to, or instead of the properties in Tables 1 and/or 1A. Greater and lesser values for these properties may also be present in various embodiments.

In certain embodiments the DRI may be produced by the reduction of a DR Grade pellet, in which case the resulting DRI may have material properties as described in Table 3 below. The use of reduced DR grade DRI may be advantageous due to the higher Fe content in the pellet which increases the energy density of the battery.

TABLE 3

| Material Property | Embodiment Range |
| --- | --- |
| Specific surface area* | 0.1-0.7 m²/g as received or 0.19-25 m²/g after performing a pre-charge formation step |
| Actual density** | 4.6-7.1 g/cc |
| Apparent density*** | 2.3-5.7 g/cc |
| Minimum $d_{pore,\ 90\%\ volume}$**** | 50 nm-50 μm |
| Minimum $d_{pore,\ 50\%\ surface\ area}$***** | 1 nm-10 μm |
| Total Fe (wt %)# | 80-94% |
| Metallic Fe (wt %)## | 64-94% |
| Metallization (%)### | 80-100% |
| Carbon (wt %)#### | 0-5% |
| $Fe^{2+}$ (wt %)##### | 0-8% |
| $Fe^{3+}$ (wt %)$ | 0-10% |
| $SiO_2$ (wt %)$$ | 1-4% |
| Ferrite (wt %, XRD)$$$ | 22-80% |
| Wustite (FeO, wt %, XRD)$$$$ | 0-13% |
| Goethite (FeOOH, wt %, XRD)$$$$$ | 0-23% |
| Cementite ($Fe_3C$, wt %, XRD)+ | «80% |

*Specific surface area preferably determined by the Brunauer-Emmett-Teller adsorption method ("BET"), and more preferably as the BET is set forth in ISO 9277 (the entire disclosure of which is incorporated herein by reference); recognizing that other tests, such as methylene blue (MB) staining, ethylene glycol monoethyl ether (EGME) adsorption, electrokinetic analysis of complex-ion adsorption' and a Protein Retention (PR) method may be employed to provide results that can be correlated with BET results.
**Actual density preferably determined by helium (He) pycnometry, and more preferably as is set forth in ISO 12154 (the entire disclosure of which is incorporated herein by reference); recognizing that other tests may be employed to provide results that can be correlated with He pycnometry results. Actual density may also be referred to as "true density" or "skeletal density" in the art.
***Apparent density preferably determined by immersion in water, and more preferably as is set forth in ISO 15968 (the entire disclosure of which is incorporated herein by reference); recognizing that other tests may be employed to provide results that can be correlated with He pycnometry results. Porosity may be defined as the ratio of apparent density to actual density:

$$Porosity = \frac{apparent\ density}{actual\ density}$$

****$d_{pore,\ 90\%\ volume}$ preferably determined by mercury (Hg) intrusion porosimetry, and more preferably as is set forth in ISO 15901-1 (the entire disclosure of which is incorporated herein by reference); recognizing that other tests, such as gas adsorption, may be employed to provide results that can be correlated with Hg intrusion results. $d_{pore,\ 90\%\ volume}$ is the pore diameter above which 90% of the total pore volume exists.
***** $d_{pore,\ 50\%\ surface\ area}$ preferably determined by mercury (Hg) intrusion porosimetry, and more preferably as is set forth in ISO 15901-1 (the entire disclosure of which is incorporated herein by reference); recognizing that other tests, such as gas adsorption, may be employed to provide results that can be correlated with Hg intrusion results. $d_{pore,\ 50\%\ surface\ area}$ is the pore diameter above which 50% of free surface area exists.
Total Fe (wt %) preferably determined by dichromate titrimetry, and more preferably as is set forth in ASTM E246-10 (the entire disclosure of which is incorporated herein by reference); recognizing that other tests, such as titrimetry after tin(II) chloride reduction, titrimetry after titanium(III) chloride reduction, inductively coupled plasma (ICP) spectrometry, may be employed to provide results that can be correlated with dichromate titrimetry.
Metallic Fe (wt %) preferably determined by iron(III) chloride titrimetry, and more preferably as is set forth in ISO 16878 (the entire disclosure of which is incorporated herein by reference); recognizing that other tests, such as bromine-methanol titrimetry, may be employed to provide results that can be correlated with iron(III) chloride titrimetry.
Metallization (%) preferably determined by the ratio of metallic Fe to total Fe, each as preferably determined by the methods previously described.
Carbon (wt %) preferably determined by infrared absorption after combustion in an induction furnace, and more preferably as is set forth in ISO 9556 (the entire disclosure of which is incorporated herein by reference); recognizing that other tests, such as various combustion and inert gas fusion techniques, such as are described in ASTM E1019-18 may be employed to provide results that can be correlated with infrared absorption after combustion in an induction furnace.
$Fe^{2+}$ (wt %) preferably determined by titrimetry, and more preferably as is set forth in ASTM D3872-05 (the entire disclosure of which is incorporated herein by reference); recognizing that other tests, such as Mossbauer spectroscopy, X-ray absorption spectroscopy, etc., may be employed to provide results that can be correlated with titrimetry.
$$Fe^{3+}$ (wt %) preferably determined by the mass balance relation between and among Total Fe (wt %), Metallic Fe (wt %), $Fe^{2+}$ (wt %) and $Fe^{3+}$ (wt %). Specifically the equality Total Fe (wt %) = Metallic Fe (wt %) + $Fe^{2+}$ (wt %) + $Fe^{3+}$ (wt %) must be true by conservation of mass, so $Fe^{3+}$ (wt %) may be calculated as $Fe^{3+}$ (wt %) = Total Fe (wt %) − Metallic Fe (wt %) − $Fe^{2+}$ (wt %).
$$$SiO_2$ (wt %) preferably determined by gravimetric methods, and more preferably as is set forth in ISO 2598-1 (the entire disclosure of which is incorporated herein by reference); recognizing that other tests, such as reduced molybdosilicate spectrophotometric methods, x-ray diffraction (XRD), may be employed to provide results that can be correlated with gravimetric methods. In certain methods, the $SiO_2$ wt % is not determined directly, but rather the Si concentration (inclusive of neutral and ionic species) is measured, and the $SiO_2$ wt % is calculated assuming the stoichiometry of $SiO_2$; that is, a 1:2 molar ratio of $Si:O$ is assumed.
$$$Ferrite (wt %, XRD) preferably determined by x-ray diffraction (XRD).
$$$$Wustite (FeO, wt %, XRD) preferably determined by x-ray diffraction (XRD).
$$$$$Goethite (FeOOH, wt %, XRD) preferably determined by x-ray diffraction (XRD).
+Cementite ($Fe_3C$, wt %, XRD) preferably determined by x-ray diffraction (XRD).

The properties set forth in Table 3, may also be present in embodiments with, in addition to, or instead of the properties in Tables 1, 1A, and/or 2. Greater and lesser values for these properties may also be present in various embodiments.

In various embodiments, a bed of conductive pellets comprise (e.g., function to provide, are a component of, constitute, etc.) an electrode in an energy storage system. In embodiments of this electrode the pellets comprise, an iron containing material, a reduced iron material, iron in a non-oxidized state, iron in a highly oxidized state, iron having a valence state between 0 and 3+ and combinations and variations of these. In embodiments of this electrode the pellets comprise iron having one or more of the features set forth in Tables 1, 1A, 2, and 3. In embodiments the pellets have porosity, for example open pore structures, that can have pore sizes, for example, ranging from a few nanometers to several microns. For example, embodiments may have pore sizes from about 5 nm (nanometers) to about 100 μm (microns), about 50 nm to about 10 μm, about 100 nm to about 1 μm, greater than 100 nm, greater than 500 nm, less than 1 μm, less than 10 μm, less than 100 μm and combinations and variations of these pore sizes as well as larger and smaller pores. In some embodiments, the pellets comprise pellets of direct reduced iron (DRI). Embodiments of these electrodes in the energy storage system, and in particular in long duration energy storage systems, may have one or more of these foregoing features.

The packing of pellets creates macro-pores, e.g., openings, spaces, channels, or voids, in between individual pellets. The macro-pores facilitate ion transport through electrodes that in some embodiments have a smallest dimension that is still very thick compared to some other types of battery electrodes, being multi-centimeter in dimension. The micro-pores within the pellets allow the high surface area active material of the pellet to be in contact with electrolyte to enable high utilization of the active material. This electrode structure lends itself specifically to improving the rate capability of extremely thick electrodes for stationary long duration energy storage, where thick electrodes may be required to achieve extremely high areal capacities.

The pellets for these embodiments, and in particular for use in embodiments of electrodes for long duration energy storage systems, can be any volumetric shape, e.g., spheres, discs, pucks, beads, tablets, pills, rings, lenses, disks, panels, cones, frustoconical shapes, square blocks, rectangular blocks, trusses, angles, channels, hollow sealed chambers, hollow spheres, blocks, sheets, films, particulates, beams, rods, angles, slabs, columns, fibers, staple fibers, tubes, cups, pipes, and combinations and various of these and other more complex shapes. The pellets in an electrode can be the same or different shapes. The pellets in an electrode that is one of several electrodes in a long duration energy storage system, can be the same as, or different from, the pellets in the other electrodes in that storage system.

The size of the pellets, unless expressly used otherwise, refers to the largest cross-sectional distance of the pellet, e.g., the diameter of sphere. The pellets can be the same or different sizes. It being recognized that the shape, size and both of the pellets, as well as, typically to a lesser degree the shape and size of the container or housing holding the pellets, determines the nature and size of the macro-pores in the electrode. The pellets can have sizes from about 0.1 mm to about 10 cm, about 5 mm to about 100 mm, 10 mm to about 50 mm, about 20 mm, about 25 mm, about 30 mm, greater than 0.1 mm, greater than 1 mm, greater than 5 mm, greater than 10 mm and greater than 25 mm, and combinations and variations of these.

In embodiments, the pellets as configured in an electrode can provide an electrode having a bulk density of from about 3 g/cm³ to about 6.5 g/cm³, about 0.1 g/cm³ to about 5.5 g/cm³, about 2.3 g/cm³ to about 3.5 g/cm³, 3.2 g/cm³ to about 4.9 g/cm$^3$, greater than about 0.5 g/cm$^3$, greater than about 1 g/cm$^3$, greater than about 2 g/cm$^3$, greater than about 3 g/cm$^3$, and combinations and various of these as well as greater and lesser values.

In certain embodiments a mixture of reduced DR grade and reduced BF grade pellets may be used together. In certain other embodiments, reduced material (DRI) and raw ore materials (DR grade or BF grade) may be used in combination.

In various embodiments, DRI may be produced by the use of an "artificial ore" such as waste or by-product forms of iron oxide. As one non-limiting example, mill scale is a mixed iron oxide formed on the surface of hot rolled steel, which in various embodiments is collected and ground to form an iron oxide powder which is then agglomerated to form a pellet and is subsequently reduced to form DRI. Other waste streams may be similarly utilized to form DRI. As another non-limiting example, pickle liquor is an acidic solution which can be rich in dissolved Fe ions. In various embodiments, Fe-bearing pickle liquor may be neutralized with a base (such as caustic potash or sodium hydroxide) to precipitate iron oxide powder which is then agglomerated to form a pellet and is subsequently reduced to form DRI.

In various embodiments the precursor iron oxides are first reduced and then subsequently formed into a pellet or other agglomerate. In certain non-limiting embodiments iron oxide powder from a natural or artificial ore is reduced to iron metal powder by heat treatment at 900° C. under a reducing gas environment such as a linear hearth furnace with a hydrogen atmosphere, ranging from 1% to 100% H$_2$. In embodiments that use hydrogen as a reducing gas, the cementite (Fe$_3$C) content of the DRI can be as low as 0 wt %.

In various embodiments, DRI pellets or agglomerates are formed in a single process from iron oxide powders by use of a rotary calciner. The rotary motion of the furnace promotes agglomeration of the powder into a pellet or agglomerate, while the high temperature reducing gas environment provides for concurrent reduction of the iron oxide. In various other embodiments a multi-stage rotary calciner may be used in which the agglomerating and reducing steps may be tuned and optimized independently.

In various embodiments, the DRI has a shape that is not spherical. In certain embodiments the DRI may have a shape that is substantially rectilinear or brick-like. In certain embodiments the DRI may have a shape that is substantially cylindrical or rod-like, or disc-like. In certain embodiments the DRI may have a shape that is substantially planar or sheet-like. In certain embodiments the iron oxide powder is dry formed by die compaction into a cylindrical shape or any other shape that is amenable to die pressing. In certain embodiments the iron oxide powder is dry formed into a sheet-like form by roll pressing through a calendar roll. In certain embodiments the iron oxide powder is blended with a binder such as a clay or polymer and is dry processed into a rod-like shape by extrusion. In certain embodiments the iron oxide powder is blended with a binder such as a clay or polymer and is dry processed into a sheet-like form by roll pressing through a calendar roll. Binders may be comprised of a clay, such as bentonite, or a polymer, such as corn starch, polyacrylamide, or polyacrylate. Binders may include bentonite, sodium carbonate, calcium chloride, calcium hydroxide, sodium silicate, carboxymethylcellulose (CMC), Alcotac, Peridur, corn starch, Funa, wheat flour, sodium lignosulfate, molasses, or polyacrylate, etc. Binders may be comprised of a combination of one or more clays and one or more polymers. In certain embodiments the iron oxide powder is dispersed into a liquid to form a slurry that is then used to wet form into various shapes. In certain embodiments an iron oxide slurry is slip cast into a mold of near-arbitrary shape. In certain embodiments an iron oxide slurry is coated onto a sheet by doctor blading or other similar coating processes.

In various embodiments, a bed of conductive microporous pellets comprise an electrode in an energy storage system. In some embodiments, said pellets comprise pellets of direct reduced iron (DRI). The packing of pellets creates macro-pores in between individual pellets. The macro-pores facilitate ion transport through electrodes that in some embodiments have a smallest dimension that is still very thick as compared to some other types of battery electrodes, being of multiple centimeters in dimension. The macropores may form a pore space of low tortuosity compared to the micro-pores within the pellets. The micro-pores within the pellets allow the high surface area active material of the pellet to be in contact with electrolyte to enable high utilization of the active material. This electrode structure lends itself specifically to improving the rate capability of extremely thick electrodes for stationary long duration energy storage, where thick electrodes may be required to achieve extremely high areal capacities.

In various embodiments, a fugitive pore former is incorporated during the production of DRI to increase the porosity of the resulting DRI. In one embodiment, the porosity of the DRI pellet is modified by incorporating a sacrificial pore former such as ice (solid H$_2$O) in the pelletization process, which subsequently melts or sublimes away under thermal treatment. In certain other embodiments the fugitive pore former comprises napthalene, which subsequently sublimes to leave porosity. In other embodiments the fugitive pore former comprises NH$_4$CO$_3$ (ammonium carbonate) may be the fugitive pore former, and it may be introduced as a solid at various points in the production of DRI and will decompose under heat and leave entirely as gaseous or liquid species (NH$_3$+CO$_2$+H$_2$O). In various other embodiments, the fugitive additive may serve an additional function in the cell (e.g. be an electrolyte component). In certain embodiments the fugitive additive may be an alkaline salt such as KOH or NaOH or LiOH. In certain embodiments the fugitive additive may be a soluble electrolyte additive which is solid in form under ambient, dry conditions, such as lead sulfate, lead acetate, antimony sulfate, antimony acetate, sodium molybdenum oxide, potassium molybdenum oxide, thiourea, sodium stannate, ammonium thiosulfate. In various other embodiments the fugitive additive may be a binder used in the agglomeration of iron ore powder to form a pellet or other shape, such as sodium alginate or carboxymethylcellulose binder.

In various embodiments, sacrificial pore formers, convertible pore formers, fugitive pore formers, removable pore formers, or techniques may be utilized. In these embodiments, the intermediate material with the pore former still present may have Fe total wt % in the range of 20 wt % to 90 wt %. The pore formers may be removed in part prior to utilization as an electrode, in whole prior to utilization as an electrode, or during utilization as an electrode, and combinations and variations of these. In an embodiment, an intermediate can have from 25 wt % to 50 wt % Fe total, and upon removal of the pore former, provide an electrode with 60 wt % to 90 wt % Fe total.

In certain embodiments, the reducing gas used to form DRI is hydrogen (H$_2$). In certain embodiments, the hydrogen used as reducing gas is a byproduct of an industrial, chemical, or manufacturing process. In certain embodiments, the hydrogen is generated by electrolysis of water from renewable power generation sources such as wind energy or solar energy. In certain embodiments the electrolyzer is coupled to an energy storage system. In certain embodiments the electrolyzer is a Proton Exchange Membrane (PEM) electrolyzer. In certain embodiments the electrolyzer is an alkaline electrolyzer. In certain embodiments, the hydrogen is a byproduct of a chloro-alkali process or plant. In embodiments that use hydrogen as a reducing gas, the cementite ($Fe_3C$) content of the DRI can be as low as 0 wt %.

In certain embodiments, natural gas (methane, $CH_4$) is used as a reducing agent to produce DRI. In some embodiments, the natural gas used is obtained from naturally-occurring underground deposits or from agriculture. In certain embodiments, the methane used as reducing gas is a byproduct of an industrial, chemical, or manufacturing process. In certain embodiments, the methane is steam reformed (via reaction with water, $H_2O$) to produce a mixture of carbon monoxide (CO) and hydrogen ($H_2$) through the reaction $CH_4+H_2O \rightarrow CO+3H_2$. In certain embodiments, this reforming reaction occurs through an ancillary reformer, separate from the reactor in which the iron reduction occurs. In certain embodiments, the reforming occurs in situ in the reduction reactor. In certain embodiments the reforming occurs both in an ancillary reformer and in the reduction reactor. In certain embodiments, coal is used as a reducing agent to produce DRI. In certain embodiments coke is used as a reducing agent to produce DRI. In embodiments that use a carbon-containing reducing gas, the cementite ($Fe_3C$) content of the DRI can be higher, up to 80 wt %.

In certain embodiments, a mixture of DRI produced using various reducing gases can be used to achieve a beneficial combination of composition and properties. In one non-limiting embodiment a 50/50 mix by mass of DRI produced from BF grade pellets reduced in natural gas and DRI produced from DR grade pellets reduced in hydrogen is used as the negative electrode of a battery. Other combinations of mass ratios, feedstock type (DR, BF, other artificial ores, etc.) and reducing media (hydrogen, natural gas, coal, etc.) may be combined in other embodiments.

In various embodiments, DRI pellets may be crushed and the crushed pellets may comprise the bed (with or without the addition of a powder).

In various embodiments, additives beneficial to electrochemical cycling, for instance, hydrogen evolution reaction (HER) suppressants may be added to the bed in solid form, for instance, as a powder, or as solid pellets.

In some embodiments, metal electrodes may have a low initial specific surface area (e.g., less than about 5 $m^2/g$ and preferably less than about 1 $m^2/g$). Such electrodes tend to have low self-discharge rates in low-rate, long duration energy storage systems. One example of a low specific surface area metal electrode is a bed of DRI pellets. In many typical, modern electrochemical cells, such as lithium ion batteries or nickel-metal-hydride batteries, a high specific surface area is desirable to promote high rate capability (i.e., high power). In long duration systems, the rate capability requirement is significantly reduced, so low specific surface area electrodes can meet target rate-capability requirements while minimizing the rate of self-discharge.

In some embodiments, DRI pellets are processed by mechanical, chemical, electrical, electrochemical, and/or thermal methods before the DRI pellets are used in an electrochemical cell. Such pre-treatments may allow superior chemical and physical properties to be achieved, and, for example, may increase the accessible capacity during the discharge reaction. The physical and chemical properties of as-purchased (also sometimes referred to as "as received") DRI may not be optimal for use as the negative electrode of an electrochemical cell. Improved chemical and physical properties may include introduction of a higher content of desirable impurities, such as HER suppressants, achieving a lower content of undesirable impurities (such as HER catalysts), achieving a higher specific surface area, achieving a higher total porosity, achieving a different pore size distribution from the starting DRI (such as a multimodal pore size distribution to reduce mass transport resistance), achieving a desired distribution of pellet sizes (such as a multimodal size distribution to allow packing of pellets to a desired density), altering or selecting pellets of a desired aspect ratio (in order to achieve a desired bed packing density). Mechanical processing may include tumbling, milling, crushing, pulverizing, and powderizing. Chemical processing may include acid etching. Chemical processing may include soaking a bed of pellets in an alkaline solution to create necking between pellets, coarsen the micropores within the pellets, or dissolve impurity or secondary phases to increase the pore volume percentage or alter the pore size distribution. Thermal processing may include processing DRI at elevated temperature in inert, reducing, oxidizing, and/or carburizing atmosphere. In various embodiments, mechanical, chemical, electrical, electrochemical, and/or thermal methods of pre-processing the materials forming an electrode, such as DRI pellets, etc., may fuse the material forming the electrode into a bed, such as bed of fused together DRI pellets, etc.

In embodiments, as set forth herein, the iron material can be processed, chemically modified, mechanically modified, or otherwise configured, to have one or more of its features changed. These methodologies are generally described herein as being performed on DRI material. It is understood that these methodologies can be used on other iron containing materials, such as, a reduced iron material, iron in a non-oxidized state, iron in a highly oxidized state, iron having a valence state between 0 and 3+ and combinations and variations of these. In this manner there are provided iron containing pellets for utilization in an electrode configuration for a long duration electrical storage cell that have predetermined features, for example, the features as set forth in this specification.

In certain embodiments, the DRI is subjected to mechanical operations to grind, abrade, or polish the surface, and/or remove fines. In one embodiment, DRI pellets are rolled in a trommel screen to abrade the surface and remove fine powder/dust from the surface. This operation may have the beneficial effect of reducing the reactivity of the pellet DRI, making it easier and safer to ship, without resorting to a briquetting or other compaction operation. In another embodiment, DRI blocks or sheets are passed under a rotary brush to remove fine powders from the surface, having a similar beneficial effect.

In one embodiment, porosity is increased by pre-treating the DRI by soaking in an acid bath (for example, concentrated HCl), which etches the iron and creates larger pores, increasing the total porosity. The etching time can be optimized to increase the total capacity of a DRI pellet without losing too much active material to the acid etching solution.

In another embodiment, desirable impurities or additives are incorporated into DRI. When these impurities are solids, they may be incorporated by ball-milling (for example, with a planetary ball mill or similar equipment) the powder additive with DRI pellets, the pellets serving as their own milling media. In this way the powder additive is mechanically introduced into the pores or surface of the DRI pellet.

DRI may also be coated in beneficial additives, for example, by rolling or dipping in a slurry containing the additives. These desirable impurities may include alkali sulfides. Alkali sulfide salts have been demonstrated to vastly improve active material utilization in Fe anodes. Just as soluble alkali sulfides may be added to the electrolyte, insoluble alkali sulfides may be added to DRI, for example, by the above method.

In various embodiments, the specific surface area of DRI is increased by a factor of 3 or more, preferably a factor of 5 or more, as measured by a technique, such as the Brunauer-Emmett-Teller gas adsorption method. In some embodiments this surface area increase is accomplished by using DRI as an electrode in an electrochemical cell, and electrochemically reducing it with an applied current.

In some embodiments, the surface area of cementite or iron carbide containing materials, such as DRI pellets containing cementite or iron carbide, is increased by using the material as the anode of an electrochemical cell and discharging it. In certain embodiments, the specific current densities may be 0.1-25 mA/g. This high surface area iron oxide may also be used for various applications other than in electrochemical cells.

In various embodiments, to increase electrical conductivity, pellets may be mixed with a more electrically conductive, but potentially more expensive, powder, to produce a higher conductivity composite bed. This powder may increase the areal capacity of the cell by filling voids in between the pellets. This may decrease the ratio of electrolyte volume to DRI pellets in a way that can be systematically varied and optimized. In one embodiment, this powder is used at the site of current collection to increase the contact surface area, reducing interfacial resistivity between the current collector and the small contact area of the spherical pellets, as described in more detail in a previous section. This ensures the ability to vary and control the effective current density at the pellet. Varying particle size in the composite bed may produce controllable cost and conductivity. In another example, the use of additional powder, wire, mesh, gauze, or wool conductive material enables the use of low-conductivity pellets such as DR taconite pellets or direct reduced pellets that are undermetallized (sometimes called "remet" in the trade) in the composite bed by increasing overall conductivity. In one embodiment, this conductive component may comprise DRI fines or other waste materials from the DRI process.

The ratio of electrolyte to iron material, for example DRI material in a cell may be from about $0.5\ \text{mL}_{electrolyte}\!:\!1\ g_{iron\text{-}material}$ to about $5\ \text{mL}_{electrolyte}\!:\!1\ g_{non\text{-}material}$, from about $0.6\ \text{mL}_{electrolyte}\!:\!1\ g_{iron\text{-}material}$ to about $3\ \text{mL}_{electrolyte}\!:\!1\ g_{iron\text{-}material}$, about $0.6\ \text{mL}_{electrolyte}\!:\!1\ g_{iron\text{-}material}$, about $0.7\ \text{mL}_{electrolyte}\!:\!1\ g_{iron\text{-}material}$, about $0.8\ \text{mL}_{electrolyte}\!:\!1\ g_{iron\text{-}material}$, about $1\ \text{mL}_{electrolyte}\!:\!1\ g_{iron\text{-}material}$, and combinations and variations of these as well as larger and smaller ratios.

In one embodiment, porous sintered iron electrodes may be formed from DRI, which may have its particle size reduced or be made into a powder, for instance, by crushing or grinding. DRI fines or other waste materials may also be used to form a sintered iron electrode. The sintered electrode may be formed with a binder under heat and/or pressure, then the binder may be burned out and the green-form is sintered at high temperature. DRI pellets may also be directly fused together by sintering, without a binder, optionally with pressure applied, in a non-oxidizing atmosphere, in order to create electrical and physical connectivity between pellets.

In various embodiments, porous negative electrodes may be formed by crushing, shredding, or grinding of hot briquetted iron (HBI). In various embodiments, HBI may be preferable for shipment and transportation due to its lower surface area and reactivity, but the porosity of HBI may be too low for practical application in a thick electrode, due to ionic transport limitations. To achieve the optimal combination of transportation and performance, the DRI may be transported in a briquetted form to the cell assembly or manufacturing site whereat it is crushed, ground, and/or shredded to increase the porosity of the resulting electrode.

A packed bed of DRI pellets may be a desirable configuration of an iron-based electrode as it provides for an electronically conductive percolation path through the packed bed while leaving porosity available to be occupied by an electrolyte that facilitates ion transport. In certain embodiments, the ratio of electrolyte volume to DRI mass may be in the range of 0.5 mL/g to 5 mL/g, such as 0.6 mL/g or 1.0 mL/g. The DRI pellets are generally in contact with surrounding pellets through a small contact area compared to the surface area of the pellet, and in some instances the contact can be considered a "point contact." Contacts of small cross-sectional area may be constrictions for the flow of electrical current that may result in a relatively low electrical conductivity for the pellet bed as a whole, which may in turn lead to high electrode overpotentials and low voltaic efficiency of the battery.

In various embodiments, the electrical conductivity of a DRI pellet bed may be increased in a number of ways. In some embodiments, the electrical conductivity of a DRI pellet bed may be increased by the use of an additional conductive material that may surround individual pellets, be embedded within individual pellets, surround the entire pellet bed, or penetrate through a pellet bed. The conductive material may be one or more of a metal, a metal oxide, a metal carbide, a metal nitride a semiconductor, carbon, a conductive polymer, or a composite comprising at least one of such electronically conducting materials. The electronically conductive material may be in the form of a powder, wire, mesh, or sheet. In certain embodiments, the conductive material may itself participate in an electrochemical reaction in the battery, including but not limited to providing storage capacity. In certain other embodiments the electronically conductive material is not substantially electrochemically active. In one embodiment, the conductive material is a powder, and the powder fills or partially fills the space between pellets or in between pellets and current collectors to improve inter-pellet or pellet-to-current collector electrical conduction. For example, the conductive powder may consist of DRI "fines", which is a powderized waste product of the direct reduction process that is similar in composition to DRI. The fines may serve to both increase the electrical conductivity of the bed and to increase the storage capacity of the anode in this case. In another embodiment, the conductive material is a powder, and the powder is applied to the surfaces of the pellets to make a coating. Such a coating provides for a larger area for electrical contact between pellets.

In various embodiments, conductive coatings are applied to low-conductivity pellets to enable their usage in an electrode. In certain embodiments low-conductivity pellets such as taconite pellets or direct reduced pellets that are undermetallized (sometimes called "remet" in the trade) may be coated. The coating may be conductive to decrease electrical resistance from the current collector to the taconite pellet during the initial reduction step. The coating may or may not be removed during or after the reduction step. In one embodiment, the coating is a thin conformal metallic layer such as stainless steel that wraps circumferentially around each pellet. In another embodiment, the coating is a thin layer of lead that coats the outside of each pellet using a directional deposition technique such as sputtering, evaporation, or other physical vapor deposition techniques. In certain embodiments, the coating is applied by rolling DRI and the coating material together in a rotating vessel. In certain embodiments the DRI in the rotating vessel is substantially spherical in shape.

In another embodiment, some or all of the individual pellets in the pellet bed are wrapped with an electrically conductive wire, foil or sheet. In some embodiments a tightening mechanism, such as a screen, is used to apply tension to the wire, foil or sheet. Optionally, such current collectors surrounding individual pellets can be attached to wires that are gathered or connect to a larger current collector. In another example, a conductive mesh, gauze, or wool is interspersed in the space between the DRI pellets to increase electrical connectivity. In various embodiments the conductive material is a mesh with an opening (clear size) that is selected to be smaller than the pellets such that pellets do not pass through the mesh. The conductive material in this case may be stainless steel, nickel, or other metals and metal alloys. In another example, DRI pellets are directly connected to each other by conductive wire through or around the individual pellets. For example, a wire may be threaded through holes in the DRI pellets, similar to forming a string of beads, leading to electrical contact not only between pellets but to the interior of pellets. Optionally, a string of pellets may be held in contact using an electrical terminal or "stopper" at which tension is optionally applied to the wire. The electrical terminals may optionally be electrically connected to a larger current collecting fixture such as a plate.

In another embodiment, the electrical conductivity of a bed of pellets is improved by the application of a compressive load to the DRI pellet bed anode to increase inter-pellet force and/or pellet-to-pellet or pellet-to-current collector contact area, thus reducing contact resistance and enhancing electrochemical performance. Typical DRI pellets are approximately spherical in shape, have internal porosity, and can be elastically deformed to >5% linear strain before yielding. Applying a load that compresses the DRI bed can increase the effective contact area between pellets and at the interface between pellets and the current collector. It is advantageous to use pellets with yield strains that permit deformation to achieve desired increases in conductivity without undergoing fracture. In one embodiment, pellets with compressive strengths between 700 and 2500 psi are used in a pellet bed electrode to which a compressive load is applied. In addition, the mechanical assembly that provides the compressive load on the pellet bed may also serve as current collectors. The electrical resistance of such a bed of pellets, measured in the dry state before any filling with liquid electrolyte, may be reduced by a factor of two to a factor of 100 or more by applying a compressive load. In certain embodiments, the applied load can be in the range of 0.1 psi to 1000 psi, such as 50 psi or 100 psi. In certain embodiments, the applied load can be in the range of 0.1 psi to 10 psi, such as 1 psi or 5 psi. In one example, metal plates on opposing faces of a bed of pellets serve to provide both current collection and a compressive load on the pellet bed. Optionally, one or more of the plates may be replaced by a macro-porous current collector (e.g., metal mesh) to facilitate ionic transport throughout the electrode. The opposing current collectors are preferably joined so they are at the same electrical potential, advantageously making electrochemical reaction rates more uniform throughout the electrode. In another example, a container containing the pellet bed serves both as a current collector and as a method of applying compressive load. In another embodiment, an array of conductive posts (or rods) that connect to a common, bottom-facing current collector is implemented. Therefore, many areas of current collection can be placed throughout the pellet bed. This approach can also reduce the effective transport lengths within the electrode from the total pellet bed thickness to the inter-post spacing. Additionally, these posts can be used to affix a mechanical clamping mechanism, such as a plate or perforated plate at the top of the pellet bed, to incorporate down-force onto the pellet bed, while serving as a current collection element.

In some embodiments, a compressive load may be provided in part or in whole by a magnetic force. For example, force can be applied using a permanent magnet positioned on one or more sides of the bed, causing the pellets in the bed to be attracted to the magnet. For a DRI pellet bed that is predominantly metallic iron, the pellet bed is expected to be predominantly ferromagnetic, and the pellet bed would be attracted to the magnet. The magnet can also be embedded in other fixtures surrounding the pellet bed. The magnets and fixtures serve to hold the bed of pellets in place, and provide a compressive stress that results in improved electrical contact between pellets and between pellets and current collectors as described above.

In some embodiments, inter-pellet contact resistance in the pellet bed may be reduced through the use of a pre-treatment applied to the pellet bed before battery assembly and/or operation. Several such pre-treatment processes are described in the following paragraphs.

In some embodiments, whole DRI pellets are packed into a bed and sintered in an inert or reducing (i.e., non-oxidizing) atmosphere, optionally with the application of mechanical pressure during sintering, for example, using a material that is stable at the sintering temperature and atmosphere. The sintering temperature may range from 600-1100° C. The non-oxidizing atmosphere may consist partially or wholly of inert gases such as nitrogen or argon. The non-oxidizing atmosphere may also include mixtures of gases that tend to reduce iron, such as CO and $CO_2$, and $H_2$ and $H_2O$. The exact composition of the mixture may be optimized according to an Ellingham diagram to ensure that oxidation of the iron is thermodynamically unfavorable. In one embodiment, forming gas (5% $H_2$, 95% $N_2$) is used at a sintering temperature of about 600° C. to about 1100° C., such as 600° C. to about 850° C., 850° C., about 850° C. to about 1100° C., etc., to provide a non-oxidizing condition. The combination of high temperature and a non-oxidizing atmosphere may promote atom diffusion and particle coarsening at pellet contacts, causing the pellets to bond to each other. The result is a bed of DRI pellets that are fused together with low inter-pellet contact resistance. The pellets may also be fused to the current collector through the same process.

In another embodiment, the pellets are joined using a thermal treatment in which a flux or sintering aid is used to substantially reduce the heat treatment temperature required to form sinter necks between the pellets. Examples of fluxes or sintering aids include one or more metals of lower melting point than iron, such as zinc, tin, copper, aluminum, bismuth, and lead, or metals which form alloys with iron that have lower melting temperatures than iron, such as those which exhibit a lower-melting eutectic liquid. Other examples of sintering aids include one or more glass-forming compositions including but not limited to silicates, borates and phosphates.

In another embodiment, the pellets can be fused together electrically by a process such as welding. In some such embodiments, welding is accomplished by passing electrical current through the bed of pellets. In some such embodiments, such current is delivered by discharging a capacitor.

In various embodiments the anode electrode is an ordered array of pellets. In certain embodiments the pellets are arranged into cylinders. In certain embodiments the pellets are arranged into plates. In certain embodiments the pellets are arranged into discs. In certain embodiments the pellets are arranged into rectangular prisms. In certain embodiments the pellets are arranged into hexagonal prisms. In certain embodiments the pellets are arranged into arbitrary volumes.

In various embodiments, an electrolyte management system may be provided, in which different electrolyte additives or formulations are added to the battery when switching between states of operation. The optimal electrolyte formulation for operation during the charge, discharge, and idle states of a battery may be very different. The electrolyte management system of various embodiments may improve capacity utilization of the iron electrode, self-discharge of the cell, and suppress the hydrogen evolution reaction (HER). One or more such benefits may be realized simultaneously. In one embodiment of such an electrolyte management system, an arbitrary number of distinct electrolyte formulation reservoirs are provided, each connected to the electrochemical cell with separate flow controllers. During different stages of operation, different relative amounts of each electrolyte formulation are flowed into the cell based on the optimal concentrations of constituent species for the instantaneous mode of operation (charge, discharge, idle). The electrolyte management system may be configured to adjust the electrolyte composition based on the instantaneous state of charge of the battery.

Various embodiments may provide a method and apparatus for maintaining the liquid electrolyte level in a battery. A vessel containing water when exposed to air will experience evaporation until the partial pressure of water vapor in the air is equal to the vapor pressure of water at the system's temperature. Specifically, an electrochemical system where aqueous electrolyte is exposed to the environment will experience this same evaporation. Dehydration of the electrolyte can lead to issues stemming from reduced electrolyte volume, and changes in electrolyte concentration can alter electrochemical performance. To mitigate this issue, in various embodiments the electrolyte level may be maintained via constant or intermittent flow of electrolyte into the cell volume. Specifically, electrolyte liquid level can be maintained by introduction of electrolyte into the vessel until it pours over an overflow point. Since the liquid level cannot rise above this spill point, the level can be maintained in a relatively controlled manner. Specifically, several volumes can be arranged in a cascade such that overflow from one chamber can flow into the next, establishing "liquid communication" between cells. Linking these cells in series allows one source to supply liquid electrolyte to several cells simultaneously. Overflow from the final vessel can be re-circulated to the first. In a system that utilizes shared electrolyte, flowing in a cascading fashion between cells, attributes of the electrolyte can be monitored and treated at a central location for many cells. Electrolyte mediation such as performing compositional adjustments or adding components, in order to mitigate issues related to electrolyte carbonation, electrolyte dehydration, and the like, is beneficially conducted at such a collection source for the circulating electrolyte.

Various embodiments may provide compositions and methods for adding beneficial additives to the electrolyte of an aqueous electrochemical cell are provided. During charging of an aqueous secondary battery, electrolytic production of hydrogen can cause coulombic inefficiency, gas buildup in the cell housing, safety concerns, and consumption of electrolyte. Furthermore, metal electrode self-discharge can occur by spontaneous reaction of the metal with the electrolyte to form metal hydroxide, in which reaction hydrogen is produced as a product. Certain solid-phase hydrogen evolution inhibitors (e.g., Bi, Sb, As) can reduce these deleterious effects, but incorporating a solid-phase inhibitor into the porous metal electrode of a battery can be costly and present manufacturing challenges. Accordingly, various embodiments, a soluble salt of a desired hydrogen evolution inhibitor, which dissolves to provide in solution ions of the desired additive (e.g., $Bi^{3+}$, $Sb^{3+}$, $As^{3+}$), is added to a liquid electrolyte. The additive is selected such that the redox potential of the inhibitor's ion-to-metal plating reaction (e.g., $Bi^{3+} \rightarrow Bi^0$) occurs at a higher half-cell potential (as measured vs. RHE (but at a lower cell potential)) than the potential of the charging reaction of the anode active material. Thus, during charging of the battery (reduction of the metal electrode), the ionic form of the HER inhibitor is electrodeposited onto the surfaces of the metal electrode, providing an inexpensive and simple strategy for introducing an HER inhibitor to the battery electrolyte chemistry. The electrodeposited inhibitor suppresses the hydrogen evolution reaction at the surface of the electrode, which may be an electrode with open porosity. During the discharge mode, the deposit may dissolve back into the electrolyte. The salt additive is preferably selected so that it does not degrade the operation of the cathode during charge or discharge operations.

In another embodiment, the electrochemical cell includes an electrode at which the hydrogen oxidation reaction (HOR) is performed to recapture the hydrogen produced in the HER side reaction, mitigating the evolution of potentially dangerous hydrogen gas. Hydrogen gas bubbles generated during HER may be captured and exposed to the HOR electrode, which may be a working electrode of the battery cell or an additional electrode added to the system. In one embodiment, the hydrogen gas is captured by arranging the electrodes of the cell such that buoyancy forces carry the hydrogen gas bubbles to the HOR electrode. For example, the system may be tilted, or include a funnel designed to promote this flow.

In various embodiments, a liquid electrolyte is flowed through a collection or bed of DRI pellets. For a thick (up to multi-centimeter) battery electrode comprised of active material pellets, it can be challenging to achieve sufficient transport of reactants, reactant products, and additives through the thick bed on a time scale commensurate with the operating (charge and discharge) time scale of the battery. Inadequate transport rates in the electrolyte can have several detrimental impacts including but not limited to increasing overpotential losses in the pellet-based electrode and decreasing utilization of the active materials. In a metal-electrode battery with an alkaline electrolyte, bubble formation and pH gradient formation during both charge and discharge conditions may result in undesired performance decay or corrosion of one or both of the electrodes. In various embodiments, liquid electrolyte is flowed through the bed of DRI pellets in order to reduce the detrimental effects of limited transport. Flow of the electrolyte produces convective transport of electrolyte individual pellets. Amongst other benefits, electrochemical reaction rates and uniformity of reaction are improved by decreasing electrolyte concentration boundary layers that may arise through the thickness of the entire pellet bed or within macro-pores in the pellet bed. The electrolyte flow will generally decrease overpotential losses by homogenizing the electrolyte composition throughout the macro- and micro-structure of the electrode. In some embodiments, electrolyte flow is accomplished using active methods, such as mechanical pumping. The flow rate of the electrolyte may be low, as low as 1 mL/min/cm$^2$ or less. In other embodiments, electrolyte flow is accomplished by passive means, such as buoyancy-driven flow due to thermal or compositional gradients. In a specific example, a component of the battery at which resistive dissipation of heat occurs is located at or near the bottom of the electrode bed, causing electrolyte to be heated and to rise through the bed of pellets. In another specific example, an electrode at which an electrochemical reaction changes the density of the electrolyte, for example via an exothermic or endothermic reaction or a change in the composition of the electrolyte in contact with the electrode, is located within the battery so as to produce buoyancy-driven flow. In this example, an electrode reaction that produces a lower density electrolyte may be located at or near the bottom of a bed of DRI pellets, and a reaction that increases the density of the electrolyte may be located at the top of the bed of pellets.

In some embodiments, an additive that suppresses a side-reaction, such as a corrosion inhibitor that suppresses the HER reaction or suppresses self-discharge, is combined with an additive that improves capacity utilization. Additives to the electrolyte of a battery comprising a metal electrode, including iron electrodes, may beneficially perform several functions including increasing the capacity utilization of the iron, suppressing undesirable side reactions, or both. Different additives have different advantages, and these advantages can be combined by combining additives in the proper concentration. An example of a utilization enhancing additive is sulfur or a sulfide. In some embodiments, more than one corrosion inhibitor may be used with one or more sulfides. For example, sulfur aids in depassivation of iron electrodes, but may be consumed during electrochemical cycling of the battery. Sulfur consumption may therefore contribute to a fade in capacity over many cycles. In one embodiment, a delivery system is used to replenish sulfur in order to maintain battery performance One example of such a system is a pump that delivers sulfur-bearing liquid to the battery cell. Another example is a dry hopper that delivers polysulfide salts to a closed or open battery cell.

In one embodiment, iron sulfide (FeS) may added to a metal-air battery that uses an alkaline electrolyte as a sparingly soluble additive, thereby improving the electrochemical stability of the OER electrode and increasing the electrode lifetime. This embodiment aids in mitigating catalyst performance decay at an oxygen evolution reaction (OER) electrode under alkaline conditions, which may limit the operational lifetime of the electrode.

In certain embodiments sulfur may be added to DRI by an additional process operation. In certain embodiments DRI may be dipped in a molten sulfur bath, taking advantage of the low melting temperature of sulfur. In certain other embodiments, hydrogen sulfide gas may be flowed over hot or cold DRI to deposit a layer of sulfur and/or iron sulfide on the surface of the DRI. In certain other embodiments sulfur may be sublimed and vapor deposited on the surface of the DRI; the DRI may be hot or cold. In certain embodiments sulfur is melt diffused into the pores of DRI by melting sulfur and then wicking it into the pores of DRI.

In some embodiments, sulfur may be added to the DRI by a wet deposition process involving a process solvent. In certain embodiments, colloidal mixtures may be used to deposit sulfur or sulfide (e.g., FeS) species on/within the DRI. For example, a dispersion of sulfur in water may be prepared via sonication to which DRI is subsequently added. The water may be allowed to evaporate, depositing the sulfur or sulfide species on the surface and within the DRI pellets. In certain other embodiments, sulfur may be dissolved in an organic solvent (e.g., ethanol or acetone). Addition of DRI to the solution, and subsequent evaporation of the solvent, allows for a coating of sulfur.

In some embodiments, additives comprising a molybdate ion are used in an alkaline battery comprising an iron anode. Without being bound by any particular scientific interpretation, such additives may aid in suppressing the hydrogen evolution reaction (HER) at the iron electrode and improving the cycling efficiency of the battery. The concentration of the additive is selected to be able to suppress HER while still enabling the desired iron charge/discharge process. As an example, a molybdate ion may be added via a molybdate compound such as $KMoO_4$. In one specific example, the electrolyte contains an additive concentration of 10 mM (mM means millimolar, $10^{-3}$ mol/L concentration) molybdate anion. In other embodiments, the electrolyte contains additive concentrations ranging from 1-100 mM of the molybdate anion.

In some embodiments, a surfactant is used to control wetting and bubbling during operation of a metal air battery. During charging, at least two gas evolution reactions may occur that result in bubble formation. One is hydrogen evolution at the metal anode, which is a parasitic reaction that may contribute to poor coulombic efficiency during cycling of the battery. Another is the oxygen evolution reaction, which is necessary for the functioning of the metal-air battery. A surfactant additive can mitigate undesirable effects associated with both reactions. In the case of HER, a hydrophobic surfactant additive may suppress the hydrogen evolution reaction at the metal anode by physically blocking water (a HER reactant) from the metal anode during charging. In the case of ORR, a surfactant additive may reduce electrolyte surface tension and viscosity at the oxygen evolution electrode to generate smaller, uniformly sized, controllable bubbles during charging. In one non-limiting example, 1-Octanethiol is added to the alkaline electrolyte at a concentration of 10 mM to mitigate both of these challenges.

In some embodiments, a carbonate salt is added to the electrolyte of a metal-air battery utilizing an alkaline electrolyte in order to lower the rate of uptake of carbon dioxide from the air. In air, potassium or sodium hydroxide based electrolytes will lose potassium or sodium cations from solution through a reaction with the carbon dioxide ($CO_2$) present in air, forming potassium or sodium carbonate. This especially poses a problem for batteries with an air electrode, since ambient air supplies the lowest-cost form of the desired reactant, oxygen, to the oxygen reduction reaction (ORR) electrode. Electrolyte carbonation can lead to several detrimental effects on battery performance relating to undesired side reactions and decreased electrolyte conductivity, all of which contribute to lower operating efficiency of the battery. The rate of carbonate formation, however, slows dramatically with increased carbonate concentration in the electrolyte. In one embodiment, a carbonate salt is intentionally added to the electrolyte before operation to decrease the rate of the carbonation reaction with air while the battery is in operation. The intentional carbonate addition mitigates the deleterious effects of carbonation and maintains acceptable carbonate levels in the electrolyte over a long operational lifetime.

In an embodiment, the health of the electrolyte in a metal air battery is periodically or continuously monitored. Electrolyte age and quality are found to dramatically impact the electrochemical performance of an iron-air battery. In some instances, the degradation of performance is associated with the negative electrode, for instance, an iron electrode. Generally, as the electrolyte ages, the discharge capacity of the negative electrode decreases. This may be due to changing concentrations of electrolyte constituents over time due to spontaneous reactions that form undesired products, especially those due to exposure to air. In some embodiments, electrolyte health is monitored while the battery is in operation in order to determine the appropriate time to replenish, replace, or treat the electrolyte. The feedback mechanism may be manual or automated. In an automated system, the electrolyte quality measurement may be one input to a proportional-integral-derivative (PID) loop that adjusts electrolyte constituent concentrations on a continuous basis. The electrolyte quality measurement is done ex-situ on a small aliquot of the electrolyte, or is done operando on the active electrolyte while the cell is in operation. One non-limiting method for assessing electrolyte health is to measure the electrical conductivity of the electrolyte. One mechanism of degradation is carbonation of the electrolyte over time, due to $CO_2$ dissolution in the electrolyte from air. In a specific example, experiments are performed to show that electrolyte conductivity varies in linear proportion to the carbonate concentration in the electrolyte. A conductivity probe is used to evaluate the concentration of carbonate in the electrolyte. The conductivity probe is used to monitor the state of health of the electrolyte.

In some embodiments, corrosion inhibitors used in the field of ferrous metallurgy to inhibit aqueous corrosion are used as components in a battery with an iron negative electrode to improve performance. In some embodiments, directed reduced iron (DRI) is used as the negative electrode, and favorable performance characteristics may be achieved by using one or more corrosion inhibitors in a suitable range of concentrations. In these embodiments, the principles of corrosion science are used to prevent undesirable side reactions (e.g. hydrogen evolution) in the charge condition, mitigate the rate of spontaneous self-discharge during an electrochemical hold, and maximize the utilization of iron active material upon discharge. Generally, there are two classes of corrosion inhibitors: interface inhibitors which react with the metal surface at the metal-environment interface to prevent corrosion, and environmental scavengers that remove corrosive elements from the environment surrounding the metal surface to inhibit corrosion. Under the broad umbrella of corrosion inhibitors, appropriate concentrations of inhibitors may be added to the electrochemical cell to achieve favorable performance characteristics with respect to the efficiency and capacity of an electrochemical cell. For the iron electrode of a metal air battery, one applicable general class of inhibitors are liquid and interphase interface inhibitors. This class encompasses three major types of interface inhibitors: anodic, cathodic, and mixed inhibitors. Anodic inhibitors create a passivation layer that inhibits an anodic metal dissolution reaction. Cathodic inhibitors may decrease the rate of a reduction reaction (HER in the case of an iron electrode), or precipitate at cathodic active sites to block the same reduction reaction. Mixed inhibitors may inhibit corrosion via one or both pathways, and include but are not limited to molecules that adsorb on the metal surface physically or chemically to form a film that may block active sites for a reduction reaction. The inhibitors can be added to a base electrolyte at any concentration.

In various embodiments, an inhibitor that forms a passivation layer on the metal surface is paired with an additive that de-passivates the iron surface. In the correct concentrations, an optimal balance of corrosion inhibition and active material utilization may be achieved. In one specific embodiment, when using direct reduced iron as the negative electrode, 10 mM molybdate anion is used as the passivator, while 10 mM sulfide anion is used as the de-passivator in an alkaline electrolyte comprised of 5.5M potassium or sodium hydroxide. Specific examples of electrolyte compositions include: 5.5 M KOH+0.5 M LiOH+10 mM $Na_2S$+10 mM 1-octanethiol; 5.95 M NaOH+50 mM LiOH+50 mM $Na_2S$+10 mM 1-octanethiol; 5.95 M NaOH+50 mM LiOH+50 mM $Na_2S$+10 mM 1-octanethiol+10 mM $K_2MoO_4$; and 5.95 M NaOH+50 mM LiOH+50 mM $Na_2S$+10 mM $K_2MoO_4$. However, the present disclosure is not limited to any particular concentration of the above additives in the electrolyte. For example, one or more of the above additives may be included in the electrolyte at concentrations ranging from about 2 mM to about 200 mM, such as from about 5 mM to about 50 mM, or about 5 mM to about 25 mM.

In certain embodiments, other electrolyte additives are incorporated in the electrolyte. Electrolyte additives may be selected from the non-limiting set of sodium thiosulfate, sodium thiocyanate, polyethylene glycol (PEG) 1000, trimethylsulfoxonium iodide, zincate (by dissolving ZnO in NaOH), hexanethiol, decanethiol, sodium chloride, sodium permanganate, lead (IV) oxide, lead (II) oxide, magnesium oxide, sodium chlorate, sodium nitrate, sodium acetate, iron phosphate, phosphoric acid, sodium phosphate, ammonium sulfate, ammonium thiosulfate, lithopone, magnesium sulfate, iron(III) acetylacetonate, hydroquinone monomethyl ether, sodium metavanadate, sodium chromate, glutaric acid, dimethyl phthalate, methyl methacrylate, methyl pentynol, adipic acid, allyl urea, citric acid, thiomalic acid, N-(2-aminoethyl)-3-aminopropyl trimethoxysilane, propylene glycol, trimethoxysilyl propyl diethylene, aminopropyl trimethoxysilane, dimethyl acetylenedicarboxylate (DMAD), 1,3-diethylthiourea, N,N'-diethylthiourea, aminomethyl propanol, methyl butynol, amino modified organosilane, succinic acid, isopropanolamine, phenoxyethanol, dipropylene glycol, benzoic acid, N-(2-aminoethyl)-3-aminopropyl, behenamide, 2-phosphonobutane tricarboxylic, mipa borate, 3-methacryloxypropyltrimethoxysilane, 2-ethylhexoic acid, isobutyl alcohol, t-butylaminoethyl methacrylate, diisopropanolamine, propylene glycol n-propyl ether, sodium benzotriazolate, pentasodium aminotrimethylene phosphonate, sodium cocoyl sarcosinate, laurylpyridinium chloride, steartrimonium chloride, stearalkonium chloride, calcium montanate, quaternium-18 chloride, sodium hexametaphosphate, dicyclohexylamine nitrite, lead stearate, calcium dinonylnaphthalene sulfonate, iron(II) sulfide, sodium bisulfide, pyrite, sodium nitrite, complex alkyl phosphate ester (e.g. RHODAFAC® RA 600 Emulsifier), 4-mercaptobenzoic acid, ethylenediaminetetraacetic acid, ethylenediaminetetraacetate (EDTA), 1,3-propylenediaminetetraacetate (PDTA), nitrilotriacetate (NTA), ethylenediaminedisuccinate (EDDS), diethylenetriaminepentaacetate (DTPA), and other aminopolycarboxylates (APCs), diethylenetriaminepentaacetic acid, 2-methylbenzenethiol, 1-octanethiol, bismuth sulfide, bismuth oxide, antimony(III) sulfide, antimony (III) oxide, antimony(V) oxide, bismuth selenide, antimony selenide, selenium sulfide, selenium(IV) oxide, propargyl alcohol, 5-hexyn-1-ol, 1-hexyn-3-ol, N-allylthiourea, thiourea, 4-methylcatechol, trans-cinnamaldehyde, Iron(III) sulfide, calcium nitrate, hydroxylamines, benzotriazole, furfurylamine, quinoline, tin(II) chloride, ascorbic acid, tetraethylammonium Hydroxide, calcium carbonate, magnesium carbonate, antimony dialkylphosphorodithioate, potassium stannate, sodium stannate, tannic acid, gelatin, saponin, agar, 8-hydroxyquinoline, bismuth stannate, potassium gluconate, lithium molybdenum oxide, potassium molybdenum oxide, hydrotreated light petroleum oil, heavy naphthenic petroleum oil (e.g. sold as Rustlick® 631), antimony sulfate, antimony acetate, bismuth acetate, hydrogen-treated heavy naphtha (e.g. sold as WD-40®), tetramethylammonium hydroxide, NaSb tartrate, urea, D-glucose, $C_6Na_2O_6$, antimony potassium tartrate, hydrazinsulphate, silica gel, triethylamine, potassium antimonate trihydrate, sodium hydroxide, 1,3-di-o-tolyl-2-thiourea, 1,2-diethyl-2-thiourea, 1,2-diisopropyl-2-thiourea, N-phenylthiourea, N,N'-diphenylthiourea, sodium antimonyl L-tartrate, rhodizonic acid disodium salt, sodium selenide, and combinations thereof.

In certain embodiments the electrolyte is gelled. In certain embodiments, silica ($SiO_2$) or other network forming oxides such as boron oxide ($B_2O_3$) or alumina ($Al_2O_3$) are dissolved in an alkaline liquid to form a gel. In certain embodiments, a network-forming organic molecule is dispersed in a liquid electrolyte to form a gel electrolyte. In certain embodiments, the organic molecule comprises a polymer. In certain embodiments a liquid electrolyte is added to a solid polymer such as polyethylene oxide (PEO), polyvinyl alcohol (PVA), polyacrylamide (PAM), or polyacrylic acid (PAA) to form a gel electrolyte. Bio-derived polymers, such as cassava or gelatin, may also be used as the polymer additive. In certain embodiments the gel electrolyte is formed in situ by dissolution of silica (or other oxides) from DRI. In certain other embodiments, additional gel-former is intentionally added to a liquid electrolyte for purposes of creating a gel. In certain embodiments a gel electrolyte is formed in situ due to the evaporation of solvent (e.g. water) from the electrolyte, concentrating the dissolved salts and converting the electrolyte from a liquid to a gel or supersaturated solution.

In certain embodiments the electrolyte is a semi-solid or slurry electrolyte. In certain embodiments the liquid is supersaturated with salt and the electrolyte is a two-phase mixture of solid salt and saturated solution. In certain embodiments, the electrolyte may be a saturated solution of NaOH in water with additional dispersed solid phase NaOH, which together forms a slurry electrolyte. Such an electrolyte may have mechanical properties similar to those of a gel.

In certain embodiments, electrolyte additives are delivered to the electrode as mixtures of solids. Electrolyte additives may have a range of solubilities, and some may have the most beneficial effect when they are intimately mixed with the solid electrode. In one embodiment, the solid pellets are primarily composed of additives, and these additive pellets are added to or mixed with a metal electrode, which in one embodiment comprises multiple DRI pellets. In another embodiment, the electrolyte additives are mixed with a metal, which may be the metal comprising the redox-active electrode, and this mixture, which may be pelletized, is mixed with a metal electrode, which in one embodiment comprises multiple DRI pellets. Non-limiting examples of additives include sodium sulfide ($Na_2S$), potassium sulfide ($K_2S$), lithium sulfide ($Li_2S$), iron sulfides ($FeS_x$, where x=1-2), bismuth sulfide ($Bi_2S_3$), lead sulfide (PbS), zinc sulfide (ZnS), antimony sulfide ($Sb_2S_3$), selenium sulfide ($SeS_2$), tin sulfides (SnS, $SnS_2$, $Sn_2S_3$), nickel sulfide (NiS), molybdenum sulfide ($MoS_2$), and mercury sulfide (HgS), FeS, bismuth oxide ($Bi_2O_3$), combinations thereof, or the like. In some embodiments, pellets are prepared with varying proportions of redox-active metal to additive, and pellets differing in composition are mixed to create a blended electrode.

In some embodiments, an electrochemical formation cycling protocol is used to change the properties of starting DRI pellets and improve subsequent operational electrochemical performance of the DRI as an anode. As-made DRI pellets may not be in a form optimized for electrochemical cycling in a battery. For example, a native oxide may exist on the free surface of the DRI that blocks electrochemical access to active material; the specific surface area may be too low to reach desired specific capacity; and/or the pore structure may limit ionic transport and limit specific capacity. In one specific embodiment, initial cycling, referred to as "formation," consists of one or more repetitions of one or more of the following steps. One step may be a brief charging step ("pre-charge"), during which any native oxide layer that detrimentally passivates the as-received DRI may be chemically reduced, or the specific surface area of the DRI pellet may be increased, in some cases by more than a factor of 10. These changes may increase the accessible capacity of the DRI in subsequent discharges. Another step may be a discharge step that oxidizes the metallic iron until one or more of the reactions from Fe to $Fe^{2+}$, or $Fe^{2+}$ to $Fe^{3+}$, are fully or partially completed. The charge and discharge capacities may be different between repetitions of the formation cycle. In some embodiments, formation may comprise repeated pre-charge and discharge cycles of systematically increasing capacity. In one specific embodiment, the formation cycling consists of the following: Pre-charge to a capacity of 250 mAh/g, then cycle n times the following loop: discharge to 25+n*25 mAh/g, then charge to (25+n*25)*1.1 mAh/g, where n is the cycle number. The pre-charge step increases the specific surface area of the DRI from about 0.5 $m^2$/g up to 12 $m^2$/g or greater, which may enhance accessible capacity for subsequent discharges. The rest of the formation cycling is conducted over n cycles, in growing capacity increments of 25 mAh/g (assuming a 90% coulombic efficiency), gradually approaching charge and discharge capacities corresponding to deep cycling.

In some embodiments, the electrical potential at which the negative electrode is charged is controlled using particular operational strategies. During charging of an iron-air battery, iron reduction and the parasitic hydrogen evolution reaction are expected to occur concurrently over a large potential range, but the relative rates of each reaction are potential-dependent. Over some potential regimes, the hydrogen evolution reaction will be thermodynamically and/or kinetically favored, whereas in others, the iron reduction reaction will be favored. Strategies that involve tuning of the operating potential of the negative electrode during charge include, but are not limited to, the following strategies. For example in one strategy the negative electrode is charged at a higher current rate than the rate at which it is discharged. This may be affected during constant current, constant power, or other more complex cycling conditions. By charging at a greater rate than that during discharging, the electrode may be driven to a potential that thermodynamically and/or kinetically favors the reduction of iron rather than parasitic reactions like hydrogen evolution. The result is a higher coulombic efficiency and higher electrode utilization over multiple cycles. As another example, in another strategy the negative electrode is charged at constant potential instead of constant current or power. The charging potential is selected to optimize electrochemical performance. For example, the potential on charge may be optimized to maximize coulombic efficiency and higher electrode utilization. As another example, in another strategy the effective resistance of other cell components (i.e., not the solid Fe electrode or negative current collector) in increased. By doing so, a larger overall cell polarization is achieved, which causes the negative electrode to have larger polarization. If the extra negative electrode polarization is sufficiently large, the absolute potential of the Fe electrode may become sufficiently low to favor iron reduction over the hydrogen evolution reaction. This effect can be achieved by increasing the effective resistance of the electrolyte, cathode, or cathode current collector.

In some embodiments, self-discharge of the negative electrode is limited by using a passivating chemical layer on the metal anode, optionally used with one or more electrical pulses during charging. Metal anodes (e.g., Fe, Al, Zn) in alkaline batteries typically self-discharge through a corrosion reaction, that forms hydrogen gas and metal hydroxide as a product of the self-discharge corrosion reaction. Typically, passivating electrolyte additives are considered undesirable for slowing self-discharge because the passivation layer also makes the metal anode non-reactive in desired discharge reactions. According to the present embodiment, an electrolyte additive (e.g., $Na_2MoO_4$) is used that forms a thin, passivating film. Self-discharge of the anode is therefore limited to only a small layer on the surface of the anode. However, to recover reactivity of the metal anode, a short and aggressive charging pulse is used to reduce the surface film. Once the surface film is reduced, the discharge reaction can proceed.

In this embodiment, an ex-situ measurement of the composition of the metal electrode is used to determine its state of charge and state of health. In an electrochemical cell that comprises an iron electrode, the state of charge and state of health of the electrode are correlated with the fraction of metallic iron. Therefore, measurement of the fraction of metallic iron can be used to identify the battery's state of charge or state of health. In one specific embodiment, magnetic susceptibility measurements are performed on one or more portions of an iron electrode to determine state of charge or state of health. In order to conduct such measurements, the sample may be shaped it into a disc or cylinder, with a thickness in the range of several millimeters and a diameter of 0.25 cm to 4 cm. The measured magnetic susceptibility is analyzed to extract the relative amounts of metallic iron, ferrous iron, and ferric iron.

In various embodiments, DRI is used as a redox-active electrode material in a battery of primary or secondary type. In one embodiment DRI is used as an anode active material in a primary battery. In one embodiment DRI is used as an anode active material in a primary refuelable (or mechanically rechargeable) primary battery in which the anode is mechanically replaceable by fresh DRI. In one embodiment, DRI is used as an anode active material in a secondary battery. In another embodiment, DRI is used as an electrode material with alkaline electrolyte (pH>9). In one particular embodiment, the alkaline secondary battery may employ a nickel cathode. In this embodiment, DRI serves as the starting material for the anode of a Ni—Fe alkaline secondary battery, and may be used in its as-received state or may be processed before use according to other embodiments described herein. Other electrochemical couples (combinations of a cathode and an anode) for alkaline batteries employing a DRI anode include iron/nickel (Fe/Ni cell) or iron/silver (Fe/Ag cell). In various embodiments, DRI may serve as an anode active material in primary or secondary batteries where the pH of the electrode spans the acidic (pH<5.5) or neutral (5.5<pH<9) regimes. As an example, DRI may be used as the anode active material in a battery employing an electrolyte containing hydrochloric acid (HCl) in the concentration range of 1-5 M. At the anode, the DRI may engage in the following half-cell reaction upon discharge: $Fe+2Cl^- \rightarrow FeCl_2+2e^-$.

DRI may specifically be used as the anode material in an all-Fe battery, where Fe is the reactive species at both the anode and cathode. In such an embodiment, the DRI may serve as a solid metallic Fe anode at 100% SOC, and the anode will form a soluble Fe' species (i.e., $FeCl_2$) upon discharge. The cathode active material may be a soluble inorganic Fe-based salt, such as the $FeCl_2/FeCl_3$ redox couple. The cathode active material may also be an inorganic- or organic-based coordination compound, such as $K_3Fe(CN)_6$. At the cathode, the soluble Fe species will undergo redox reactions associated with the $Fe^{2+}/Fe^{3+}$ redox couple. One specific example of an all-Fe battery employing DRI as the active material would utilize DRI as the anode material with an electrolyte containing concentration HCl (1-5 M). At the anode, the DRI would engage in the following half-cell reaction upon discharge: $Fe+2Cl^- \rightarrow FeCl_2+2e^-$. At the cathode, soluble $FeCl_3$ would undergo the following half-cell reaction upon discharge: $2FeCl_3+2e^- \rightarrow 2FeCl_2+2Cl^-$. The full cell reaction upon discharge would be $Fe+2FeCl_3 \rightarrow 3FeCl_2$. The DRI may be used as a feedstock for the soluble $FeCl_2$ required in solution to enable the cathode reaction by allowing the DRI to react with HCl in solution, will engage the following spontaneous chemical reaction: $Fe+2HCl \rightarrow FeCl_2+H_2$.

In some embodiments, DRI is used as the anode in a flow battery, in which DRI pellets are transported from a storage tank through an electrochemical reactor where the DRI pellets react electrochemically. The DRI pellets remain in electrical contact with one another as they flow through the electrochemical reactor, enabling sufficient electrical percolation to provide high electrical conductivity through the collection of pellets. The electrolyte may be acidic (pH<5), neutral (5<pH<9), or alkaline (pH>9). In specific embodiments, the discharge reactions may proceed such that the metallic Fe anode forms a soluble product (e.g., $FeCl_2$) upon discharge, or a sparingly soluble (e.g., $Fe(OH)_2$) discharge product film on the surface of the transported DRI pellets. Specific embodiments concerning methods of transporting the DRI pellets through the battery include any of methods known in the art for transporting particulate matter or slurries or suspensions, including without limitation transport by pressure-driven fluid flow, using a fluidized bed, by mechanical conveyor such as a conveyor belt, rotating drum, or using a helical screw. In some embodiments, the mechanical conveyor or screw comprises an electronically conductive material such as a metal or carbon that also serves as a current collector of the battery.

In various embodiments, DRI is used as a feedstock source of metallic Fe in the synthesis of $FeCl_2$ according to the following spontaneous chemical reaction: $Fe+2HCl \rightarrow FeCl_2+H_2$. The DRI may be used as a feedstock material as pellets, or pellets may be crushed into a powder. Further, DRI fines (pellet or particle size <0.5 cm), which are a waste product of the DRI process, could be used as the feedstock material. Iron iodide ($FeI_2$) and iron bromide ($FeBr_2$) can be synthesized in an analogous fashion, where HI and HBr would be substitute acids for HCl in the salt synthesis.

In various embodiments, DRI is used to form a packed catalyst bed for gas-phase or liquid-phase reactions. In some embodiments, a packed catalyst bed of DRI may be used as a catalyst in the Haber-Bosch process for the production of ammonia. The DRI may replace, or may be used in addition to, iron powder, which is typically used in the Haber-Bosch process. In particular, the wustite coating that exists in commercially-produced DRI may be desirable for promoting reactions in the Haber-Bosch process. In some embodiments, the iron or iron salt component of the DRI, which may be iron oxide, hydroxide, or carbide, is reacted with another constituent such as another metal or metal salt to form a catalytically-active surface on the DRI. DRI may be used as a feedstock to produce alkali ferrocyanide salts. First, DRI can be used to synthesize $FeCl_2$ according to the following spontaneous chemical reaction: $Fe+2HCl \rightarrow FeCl_2+H_2$. Subsequently, the $FeCl_2$, derived from DRI, can be used to synthesize $Na_4Fe(CN)_6 \cdot 10H_2O$ according to the following reactions: Calcium ferrocyanide synthesis: $6 HCN+FeCl_2+3 Ca(OH)_2 \rightarrow Ca_2Fe(CN)_6 \cdot 11H_2O+CaCl_2$; Conversion to mixed salt: $Ca_2Fe(CN)_6 \cdot 11H_2O+2 NaCl \rightarrow CaNa_2Fe(CN)_6 \cdot 11H_2O$ (s)$+CaCl_2$ (aq); and Conversion to Na salt: $CaNa_2Fe(CN)_6 \cdot 11H_2O+Na_2CO_3 \rightarrow Na_4Fe(CN)_6 \cdot 10H_2O+CaCO_3$. In this conventional $Na_4Fe(CN)_6 \cdot 10H_2O$ synthesis processes, $FeCl_2$ (~$0.2/mol) represents ~54% of the overall raw materials cost. Therefore, replacing $FeCl_2$ with DRI (~$0.01/mol) has the potential to significantly cut the raw materials cost of $Na_4Fe(CN)_6 \cdot 10H_2O$ by half.

In various embodiments, DRI is used as an electrode for the hydrogen evolution reaction (HER) for the production of hydrogen ($H_2$) gas via electrolysis. The DRI may be used as a catalytic surface to promote the HER, or as a conductive substrate for one or more other catalyst materials. In the substrate embodiment, the DRI may be coated in a continuous layer of catalyst material or decorated with catalyst particles. Platinum (Pt) metal is an example of a catalyst that may be used to coat or decorate a DRI substrate for the HER. DRI may be used for the HER in either acidic or alkaline solutions.

In various embodiments, porous DRI pellets is used as an OER electrode. Non-limiting examples of the way in which DRI may be used for this purpose include: in the as received state, after electroplating surface with a transition metal, after electroless plating surface with a transition metal, after the surface is modified through chemical etching, after surface modifications through thermal processing, or after OER catalyst is thermally imparted onto the DRI substrate surface.

In various embodiments, DRI is used as an electrode for the oxygen evolution reaction (OER) for the production of oxygen ($O_2$) gas via electrolysis. Non-limiting ways in which the DRI can be used include as a catalytic surface to promote the OER, or as a conductive substrate for one or more other catalyst materials. In embodiments where the DRI is a substrate, the DRI may be coated in a continuous layer of catalyst material or decorated with catalyst particles. Nickel (Ni) metal is an example of a catalyst that may be used to coat or decorate a DRI substrate for the OER. DRI may be used for the OER electrode in either acidic or alkaline solutions. DRI may be used as a catalyst or electrode substrate in alkaline electrolyzers.

In another embodiment, DRI is used in an oxygen reduction reaction (ORR) electrode. In some embodiments, the iron or iron salt component of the DRI, which may be iron oxide, hydroxide, or carbide, is reacted with another constituent such as another metal or metal salt to form an ORR catalyst. This catalyst may form on the surface of a DRI pellet or may penetrate into the DRI pellet, and may be a portion of or substantially transform the entirety of the DRI. DRI fines as well as DRI pellets or crushed pellets may be used as an ORR electrode. In some embodiments, the ORR catalyst formed from the DRI is a mixed metal oxide comprising iron. In other embodiments, the ORR catalyst is an oxide that comprises iron and another transition metal. In various embodiments, the ORR catalyst is a spinel structure oxide that comprises iron and manganese.

In various embodiments, a packed bed of DRI is used in a water filtration device. In such an embodiment, the DRI may be housed in a column, creating a packed bed of DRI pellets. Particulate matter is trapped within the pores inside DRI pellets and within the void space between DRI pellets. Use of pelletized iron as the filtration medium may provide the ability to tune the pressure drop and filtration effectiveness.

In various embodiments, DRI is used as a metallic iron feedstock for the production of Fe-containing industrial or specialty chemicals, such as: ferrocyanides, iron tris-bipyridine, and ferrocene, among others.

FIG. 1 is a schematic view of a battery (or cell) 100, according to various embodiments of the present disclosure. Referring to FIG. 1, the battery 100 includes a vessel 101 in which an air electrode 103, a negative electrode 102, a liquid electrolyte 104, and a current collector 106 are disposed. The liquid electrolyte 104 may separate the air electrode 103 from the negative electrode 102.

The negative electrode 102 may include metallic pellets 105 that may comprise by elemental mass at least 50 wt % metal, such as at least 60 wt % metal. In some embodiments, the metallic pellets 105 may comprise at least 60 wt % iron by elemental mass. Accordingly, the pellets 105 may be referred to as iron-containing pellets. The pellets 105 may be electrically connected to one another and may be disposed in one or more layers to form the negative electrode 102. In various embodiments, the negative electrode 102 may be a slurry. In various embodiments, the slurry may include one or more metallic pellets 105 therein. In various embodiments, the slurry may include dissolved particles, such as particles corresponding to the compositions of the metallic pellets 105 as discussed herein. As a specific example, the negative electrode 102 may be a slurry including iron. In various embodiments, the positive electrode 103 may be a slurry. In various embodiments, the negative electrode 102 may take the form of a gel. A flowable, semi-solid negative electrode 102 (e.g., a flowable, semi-solid iron electrode, etc.) may be valuable for large-scale energy storage systems due to low cost of manufacture and ease of assembly into cell architectures. For example, iron, in the reduced form, is highly conductive. By suspending iron particles in a polymer gel, a percolating networking of iron particles may be generated, thereby creating a conductive and electroactive gel that may form the negative electrode 102. As examples, the polymer gel may be formed by dissolving organic polymers (e.g., carboxymethyl cellulose (CMC)), or by dissolving an inorganic, oxide-forming network (e.g., $SiO_2$ dissolved in concentrated KOH). In certain embodiments the electrolyte is gelled. In certain embodiments silica ($SiO_2$) or other network forming oxides such as boron oxide ($B_2O_3$) or alumina ($Al_2O_3$) are dissolved in an alkaline liquid to form a gel. In certain embodiments, a network-forming organic molecule is dispersed in a liquid electrolyte to form a gel electrolyte. In certain embodiments, the organic molecule comprises a polymer. In certain embodiments a liquid electrolyte is added to a solid polymer such as polyethylene oxide (PEO), polyvinyl alcohol (PVA), polyacrylamide (PAM), or polyacrylic acid (PAA) to form a gel electrolyte. Bio-derived polymers, such as cassava or gelatin, may also be used as the polymer additive. In certain embodiments the gel electrolyte is formed in situ by dissolution of silica (or other oxides) from DRI. In certain other embodiments, additional gel-former is intentionally added to a liquid electrolyte for purposes of creating a gel. In certain embodiments a gel electrolyte is formed in situ due to the evaporation of solvent (e.g. water) from the electrolyte, concentrating the dissolved salts and converting the electrolyte from a liquid to a gel or supersaturated solution.

In various embodiments, the pellets 105 comprise one primary, iron-containing phase, and one or more secondary phases ("gangue"). In various embodiments, the oxidation state of the primary phase may range from being highly reduced (e.g., metallic iron) to highly oxidized (e.g., ionic). For example, the pellets 105 may be substantially metallic iron, i.e. with a valence state of 0 (e.g. $Fe^0$). Accordingly, in some embodiments, the pellet may comprise by mass at least 60 wt % metallic iron, preferably at least 80 wt % metallic iron, and in some embodiments, between 90 wt % and 98 wt % metallic iron. In various other embodiments, the pellets 105 may be comprised of iron that is fully oxidized to a 3+ valence state (e.g. $Fe_2O_3$). In various other embodiments, the iron valence state may be between 0 and 3+. In various embodiments, the primary phase may be an oxide, hydroxide, sulfide, carbide, or combinations thereof. For example, the primary phase may have a composition of Fe, FeO, $Fe_2O_3$, $Fe_3O_4$, $FeO_x(OH)_y$, $Fe_3C$, $FeS_x$, $FeO_xS_y$, and/or $FeO_xS_yH_z$. In some embodiments, the pellets 105 may comprise direct reduced iron (DRI) pellets and the pellets 105 may comprise at least 60 percent of the total mass of the negative electrode 102. In various embodiments, negative electrode 102 may be composed of DRI pellets.

In various embodiments, the secondary phase comprises silicon. For example, the secondary phase may comprise silica ($SiO_2$) and/or one or more silicates such as feldspar, mica, amphibole, pyroxene, olivine, tourmaline, and/or forsterite. In various other embodiments, the secondary phase may include titanium, vanadium, manganese, magnesium, calcium, phosphorus, carbon, aluminum, zirconium, or any combination thereof.

The pellets 105 may be spherical, as shown in FIG. 1. For example, in various embodiments, the pellets 105 may have an average diameter ranging from about 0.5 mm to about 10 cm, such as about 10 mm. As a specific example, the pellets 105 may have an average diameter of 4 mm to 20 mm. As used herein, the term "spherical" is used to describe any rounded form that resembles a three-dimensional object with all its surface points equidistant from its center, but in which all surface points may not actually be equidistant from the center. Stated another way, "spherical" encompasses shapes that are perfect spheres and shapes that may have the general appearance of a sphere by may not be perfect spheres, e.g., a ball. However, the present disclosure is not limited to any particular pellet shape. For example, pellets may be briquette-shaped, as discussed below with regard to FIG. 2A. Additionally, while illustrated as whole pellets, the pellets 105 may be pieces of crushed pellets. For example, received pellets may be crushed and the pieces of those crushed pellets may form the pellets 105 in the negative electrode, such as the pellets 105 packed into a bed. In various embodiments, the crushed pellets may have an average particle size between 10 nm (nm=$10^{-9}$ m) and 10 mm (mm=$10^{-3}$ m), such as between 10-100 nm, 1-100 um (um=$10^{-6}$ m), or 1-10 mm. In some embodiments, the crushed pellets may include a combination of pellets having different average particle sizes.

In various non-limiting embodiments, the pellets 105 may have an internal porosity ranging from about 2% to 80%, such as from about 50% to about 75%. In various non-limiting embodiments, the negative electrode 102 may have a pellet packing density in the range of about 40% to about 74%. Accordingly, the liquid electrolyte 104 may infiltrate the spaces between the pellets 115 to impregnate the negative electrode 102. To assure good conductivity through the pellets 105, low contact resistance may be required. In various embodiments, compression of the pellets 105 of the negative electrode 102 may ensure contact of the pellets 105. In various embodiments, the pellets 105 may have a compressive strength from between about 700 psi and about 2500 psi. In some embodiments, such compressive strength pellets 105 may be placed in a bed constituting the negative electrode 102 and compressive force may be applied to the pellets to improve conductivity.

The liquid electrolyte 104 may comprise an electropositive element, such as Li, K, Na, or combinations thereof. In some embodiments, the liquid electrolyte 104 may be basic, namely with a pH greater than 7. In some embodiments the pH of the electrolyte 104 is greater than 10, and in other embodiments, greater than 12. For example, the electrolyte 104 may comprise a 6M (mol/liter) concentration of potassium hydroxide (KOH). In certain embodiments, the electrolyte 104 may comprise a combination of ingredients such as 5.5 M potassium hydroxide (KOH) and 0.5M lithium hydroxide (LiOH). For iron materials, high pH beneficially promotes mechanical stability, as iron is sparingly soluble in high pH liquids. In various embodiments, the pH is greater than 10, or greater than 12, or greater than 14 to ensure this low solubility of iron. By contrast, at low pH, such as pH less than 5, or pH less than 3, or pH less than 2, iron is soluble and the pellets would dissolve.

In various non-limiting embodiments, the negative electrode 102 may have a thickness in the range of about 0.5 cm to about 50 cm, such as from about 0.75 cm to about 25 cm. The pellets 105 may be arranged in the negative electrode 102 at a packing density in the range of about 30% to about 74%. In various non-limiting embodiments, the pellets 105 may be disposed on one another (such as by dispersing or spreading, as in a bed of gravel), or may be mechanically attached or connected to one another by a process such as compaction or pressing. In other embodiments, the pellets 105 may be physically connected by a process such as welding or brazing. In other embodiments, the pellets 105 may be joined to one another by arc welding. In other embodiments, the pellets 105 may be connected by a combination of such connecting processes. In other embodiments, the pellets 105 may be attached and connected to one another by conductive wires strung through holes in the pellets 105. The holes in the pellets 105 may introduce additional contact points throughout not only the thickness of the pellet 105 bed that is the negative electrode 102, but also through the thickness of a single pellet 105. Once strung, the wires may be pulled tightly to enhance inter-pellet 105 contact and may then be mechanically held in place by a conductive mechanical stopper, which in turn may be connected to a larger current collector plate, such as current collector 106. In some embodiments, pellets 105 may be packed into a bed, optionally with the assistance of mechanical pressure applied by a high-temperature-resistant material, and then sintered in a non-oxidizing atmosphere. The result is a bed of pellets 105 that are fused together with low inter-pellet 105 contact resistance. The sintered bed of pellets 105 may form the negative electrode 102.

In various embodiments, the pellets 105 may be produced from iron ore pellets, such as taconite or magnetite or hematite. In various embodiments, the pellets 105 may be produced by reducing iron ore pellets to form a more metallic (more reduced, less highly oxidized) material, such as iron metal ($Fe^0$), wustite (FeO), or a mixture thereof. In various non-limiting embodiments, the pellets 105 may be reduced taconite, direct reduced ("DR") taconite, direct reduced iron ("DRI") pellets, or any combination thereof.

In various non-limiting embodiments, the pellets 105 comprise the cementite form of iron ($Fe_3C$). While iron batteries require an iron-containing starting material, the cementite form of iron ($Fe_3C$) may be easier or cost less to acquire or transport. In various embodiments, cementite ($Fe_3C$) may be used as a starting electrode material for an iron-containing battery. For example, the pellets 105 may initially be formed of cementite ($Fe_3C$). The cementite ($Fe_3C$) may be converted initially to magnetite before or during early operation of the battery 100, and the magnetite may be reversibly cycled between other iron oxidation states in order to store energy. The conversion to magnetite may occur in the battery 100 in either case, and may not be performed externally before assembling the battery 100. The cementite ($Fe_3C$) starting pellet 105 may take the form of an ore pellet of majority cementite ($Fe_3C$) and/or as a formed pellet of majority cementite ($Fe_3C$) powder. In various embodiments, by treating the pellets 105 of a low specific surface area cementite material as the anode of the battery 100 and discharging the battery 100 at current densities of about 25 mA/g, a high specific surface area iron oxide phase may be created. This high specific surface area iron oxide phase may be used as the negative electrode 102.

Commercially available DRI pellets may not necessarily have optimal chemical and physical properties for maximizing electrochemical performance. In various embodiments, ex-situ treatments are performed on the DRI pellets prior to assembly of the DRI pellets into the negative electrode 102. Various embodiments include processing DRI pellets with mechanical, chemical, and/or thermal processes before introducing the DRI pellets into the electrochemical cell (i.e., processing the DRI pellets ex-situ) to achieve better chemical and physical properties. Better chemical and physical properties may include higher content of desirable impurities (e.g., hydrogen evolution reaction (HER) suppressants), lower content of undesirable impurities (e.g., HER catalysts), higher specific surface area, higher total porosity, different pore size distribution (e.g. multimodal to reduce mass transport resistance), different pellet size distribution (e.g. multimodal to enhance bed packing), different aspect ratio (e.g. to enhance bed packing), etc. Mechanical processes that may be applied to the DRI pellets ex-situ may include crushing, pulverizing, and/or powderizing. Thermal processes that may be applied to the DRI pellets ex-situ may include processing the DRI pellets in at elevated temperature in reducing (e.g., hydrogen), oxidizing, and/or carburizing (e.g., carbon monoxide and/or carbon dioxide) atmosphere. Chemical processes that may be applied to the DRI pellets ex-situ may include acid etching, etc. In various embodiments, to increase accessible capacity of the DRI pellets during the discharge reaction, the DRI pellets may be pretreated by soaking in an acid bath (e.g., concentrated HCl) that will etch the iron and enlarge pores in the DRI pellets, increasing the total porosity of the DRI pellets in comparison to DRI pellets not etched in an acid bath. After pretreatment, the etched and now porous DRI pellets may be assembled into the negative electrode 102. The etch time may be optimized to increase the usable capacity of a DRI pellet, without losing too much active material to the acid etching solution. In various embodiments, DRI may be used as an electrode in an electrochemical cell and may be charged with current. This process may increase the surface area of the DRI.

The current collector 106 may be in the form of a conductive plate electrically connected to the negative electrode 102. However, the current collector 106 may have other configurations, as discussed below with regard to FIG. 2A.

The positive electrode half-reaction, as occurring on discharge at the air electrode 103 in an alkaline electrolyte, may be $O_2 + 4\ e^- + 2H_2O \rightarrow 4\ OH^-$; the corresponding half reaction occurring at the negative electrode 102, starting from a fully metallic iron (fully charged negative electrode) may be $2Fe \rightarrow 2Fe^{2+} + 4e^-$, giving a net discharge reaction of $2Fe + O_2 + 2H_2O \rightarrow 2\ Fe(OH)_2$. In various embodiments, oxygen may be delivered to the air electrode 103. This delivery of oxygen to the air electrode 103 may be done in forms other than gaseous oxygen, including oxygen containing compounds in gaseous, liquid, or solid states.

Various configurations of starting materials are possible, with a range of iron valence states (0 to 3+) and counter-ions $O^{2-}$, $OH^-$, $S^{2-}$, etc. For example, other possible discharge products include $Fe_2O_3$, $Fe_3O_4$, FeO, FeOOH, FeS, $FeS_2$, etc., and combinations thereof.

In various embodiments, the packing of the pellets 105 in a bed to form the negative electrode 102 may create macro-pores in between individual pellets 105. Additionally, in various embodiments, the individual pellets 105 may each have a porous, e.g., micro-porous surface. The micro-pores in the surface of the pellets 105 may provide a greater surface area for each individual pellet 105 than if the pellet 105 were a smooth sphere. The pore size of the pellets may vary. In some embodiments, the pellet 105 may have a volume weighted mean pore size of greater than 1 micron, such as 1 micron to 10 microns, etc. The pore size distribution within the pellet may be measured by mercury intrusion porosimetry. Mercury intrusion porosimetry is a technique in which a pressurized chamber is used to force mercury into the pores of a pellet. The mercury is forced into larger pores first, and as the chamber is increasingly pressurized, the mercury is forced into smaller and smaller pores. A physical relation such as the Washburn equation may be used to relate the applied pressure to the pore size, resulting in a volume- or area-weighted pore size distribution. The pore size distributions may be transformed into cumulative distributions, from which the values $d_{pore,\ 90\%\ volume}$ and $d_{pore,\ 50\%\ surface\ area}$ may be deduced as stated in Tables 1, 2, and 3 discussed above.

Figure 6:
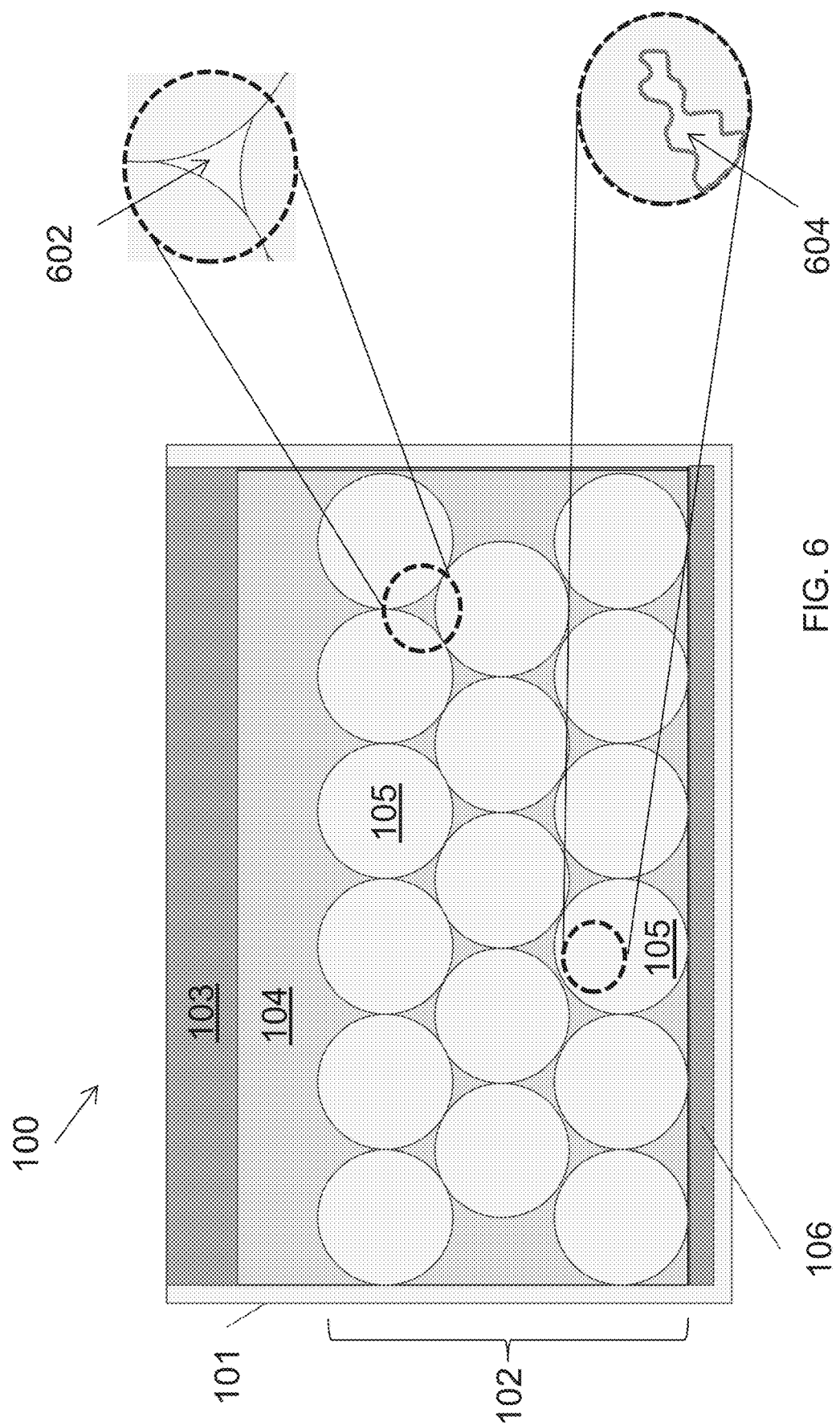
FIG. 6 is a schematic of the electrochemical cell of FIG. 1 showing expanded views of the macro-pores and micro-pores according to various embodiments of the present disclosure.

FIG. 6 is a schematic view of the battery 100 showing expanded views of the macro-pores 602 and micro-pores 604 according to various embodiments of the present disclosure. The macro-pores 602 are created by the gaps in-between individual pellets 105 when the pellets 105 are packed into a bed. The macro-pores 602 may facilitate ion transport through a very thick (e.g., multi-centimeter) electrode 102. The micro-pores 604 may be deformations in the surface of the pellets 105 themselves. The micro-pores 604 may allow high surface area active material to be in contact with electrolyte 104 to enable high utilization of the active material via a solid-solid electrochemical reaction. The micropores may include cracks in the pellet. Such cracks may be formed during the production of the pellet, or may be introduced afterwards, such as by applying a mechanical load that causes cracking. This electrode structure with macro-pores 602 and micro-pores 604 lends itself specifically to improving the rate capability of extremely thick electrodes for stationary long duration energy storage, where thick electrodes may be required to achieve extremely high areal capacities.

Figure 7:
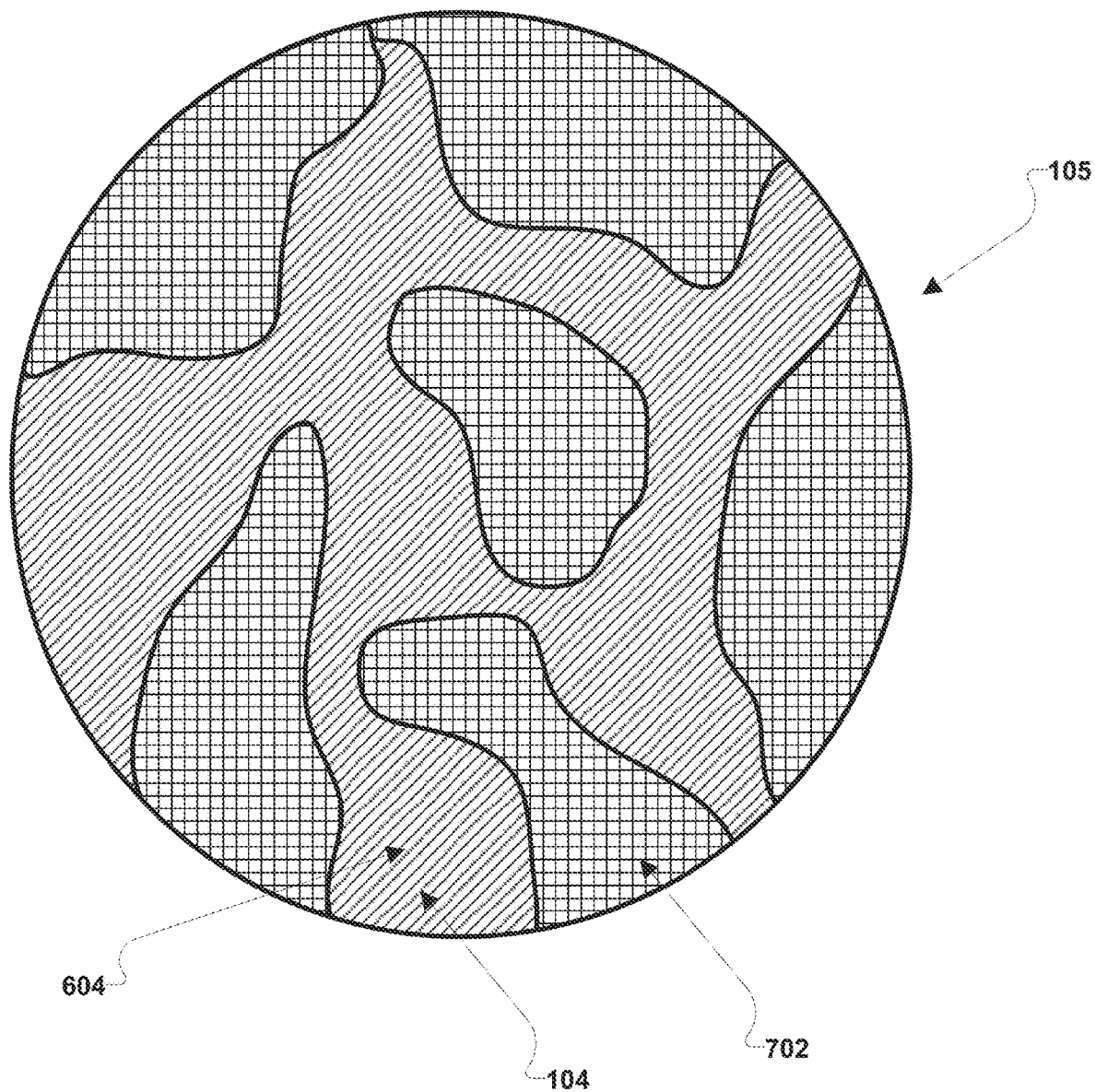
FIG. 7 is a schematic of one pellet of the electrochemical cell of FIG. 1 according to various embodiments of the present disclosure.

FIG. 7 illustrates a single pellet 105 of the battery 100. The pellet 105 may include micro-pores 604 in the solid phase surface 702 of the pellet 105. The electrolyte 104 may fill the micro-pores 604 thereby giving the outer surface area of the sphere that is the pellet 105 both liquid phase electrolyte areas associated with the micro-pores 604 and solid phase areas surface 702. The filling by electrolyte of the micro-pores 604 reduces the solid phase areas where the surface 702 contacts the electrolyte to the external surface of the pellet, giving the pellet 105 a low effective specific surface area (e.g., low m$^2$/g) which reduces electrolyte concentration boundary layers on the solid phase surfaces 702. Many metal anodes (e.g., Zn, Fe, Al) in aqueous batteries are known to undergo self-discharge due to spontaneous reaction with the electrolyte, forming an oxidized metal and hydrogen gas. For long duration energy storage systems (e.g., systems with discharge durations of 8 hours or greater, such as 8 to 20 hours, 20 to 24 hours, 24 hours or greater, etc.), self-discharge may limit performance since cells may self-discharge a significant fraction of the stored capacity before a complete discharge cycle is finished. In some embodiments, metal electrodes with low specific surface area (e.g., low m$^2$/g) are used to suppress self-discharge in low-rate, long duration energy storage systems. In many typical, modern electrochemical cells, high specific surface area is desirable to promote high rate capability (i.e., high power) through the introduction of many surface sites for reactions to take place. In long duration systems, the rate capability requirement is significantly reduced, so low specific surface area electrodes may meet target rate-capability requirements while minimizing the rate of self-discharge.

In various embodiments, an electrolyte 104 additive that forms a thin, passivating film (e.g., Na$_2$MoO$_4$), is added to the battery 100. In this manner, self-discharge of the anode may be limited to only a small layer on the surface of the anode. This passivating film will limit the extent of the self-discharge reaction. To recover reactivity of the metal anode, a short and aggressive charging pulse can reduce the surface film. Once the surface film is reduced, the discharge reaction can proceed.

In various embodiments, resistive elements are intentionally introduced into the battery 100 to enable slow charging. By increasing the effective resistance of other cell components (i.e., not the negative electrode 102 or the negative current collector 106), a larger overall cell polarization can be achieved. Doing this may cause the negative electrode 102 to have larger polarization. If the extra negative electrode 102 polarization is sufficiently large, the absolute potential of the electrode 102 when it is an Fe electrode may become sufficiently low to activate the Fe(OH)$_2$→Fe reaction at lower cell-level currents. This effect may be achieved by increasing the effective resistance of the electrolyte 104, cathode (e.g., electrode 103), or cathode current collector.

Figure 2A:
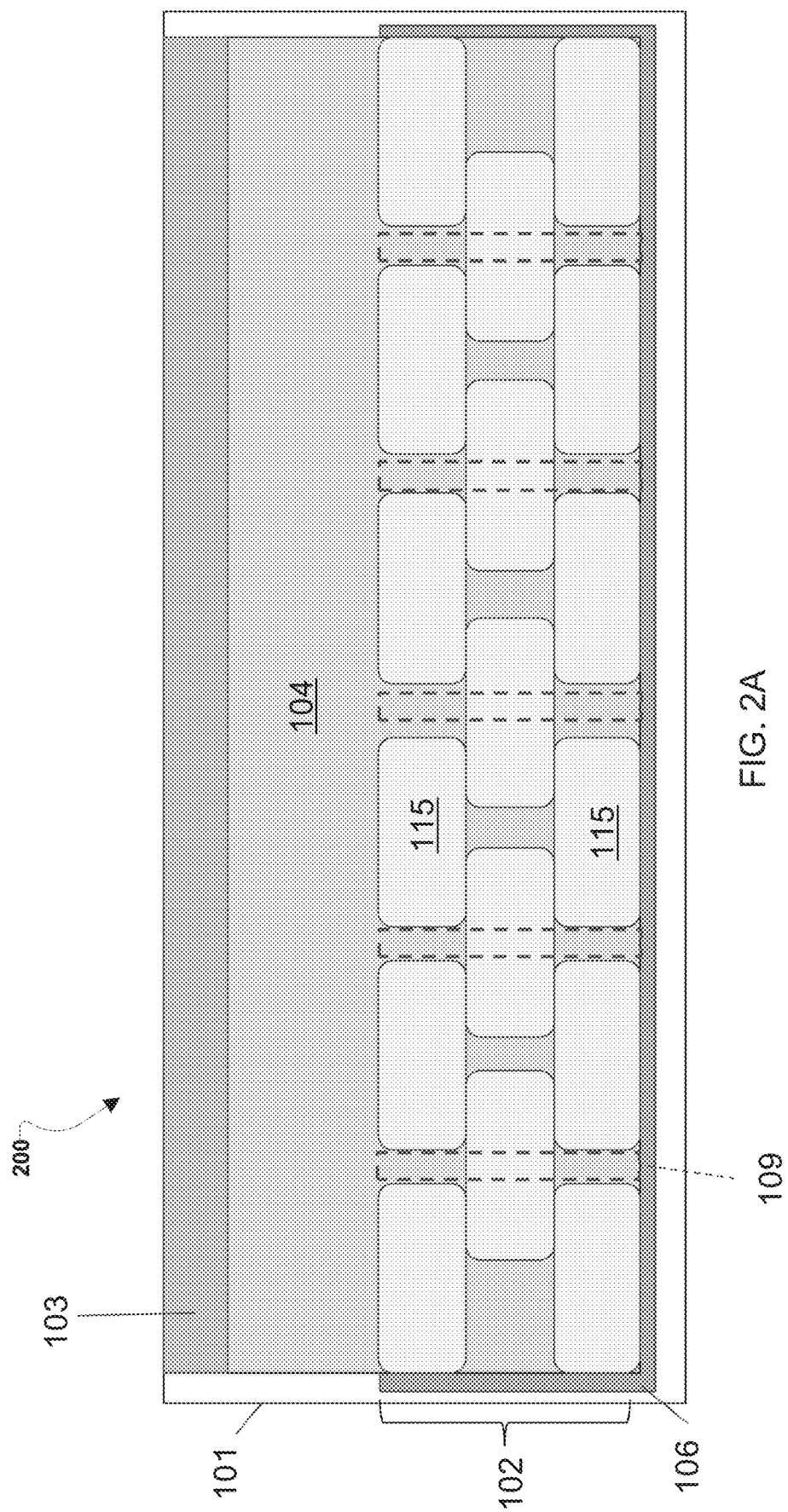
FIG. 2A is a schematic of an electrochemical cell, according to various embodiments of the present disclosure.

FIG. 2A is a schematic view of a battery 200, according to various embodiments of the present disclosure. The battery 200 is similar to the battery 100, so only difference therebetween will be discussed in detail.

Referring to FIG. 2A, the battery 200 includes a vessel 101 in which an air electrode 103, a negative electrode 102, a liquid electrolyte 104, and a current collector 106 are disposed. The liquid electrolyte 104 may separate the air electrode 103 from the negative electrode 102. The liquid electrolyte 104 may also impregnate the negative electrode 102.

In various embodiments, the negative electrode 102 may include briquette-shaped pellets 115. Herein, "briquette-shaped" may refer to a rounded rectangular prism. For example, the pellets 115 may have a length ranging from 10 to 500 mm, a width ranging from 5 to 250 mm, and a thickness ranging from 5 to 200 mm. In some embodiments, the pellets 115 may have a length of about 100 mm, a width of about 50 mm, and a thickness of about 30 mm. In various non-limiting embodiments, the pellets 115 may have an internal porosity ranging from about 50% to about 1%.

In various other embodiments, the pellets 115 may be formed of hot briquetted iron ("HBI"), which may be formed by combining and aggregating pellets, or which may be formed by combining and aggregating a powdered metal, such as powdered iron fines.

Figure 2B:
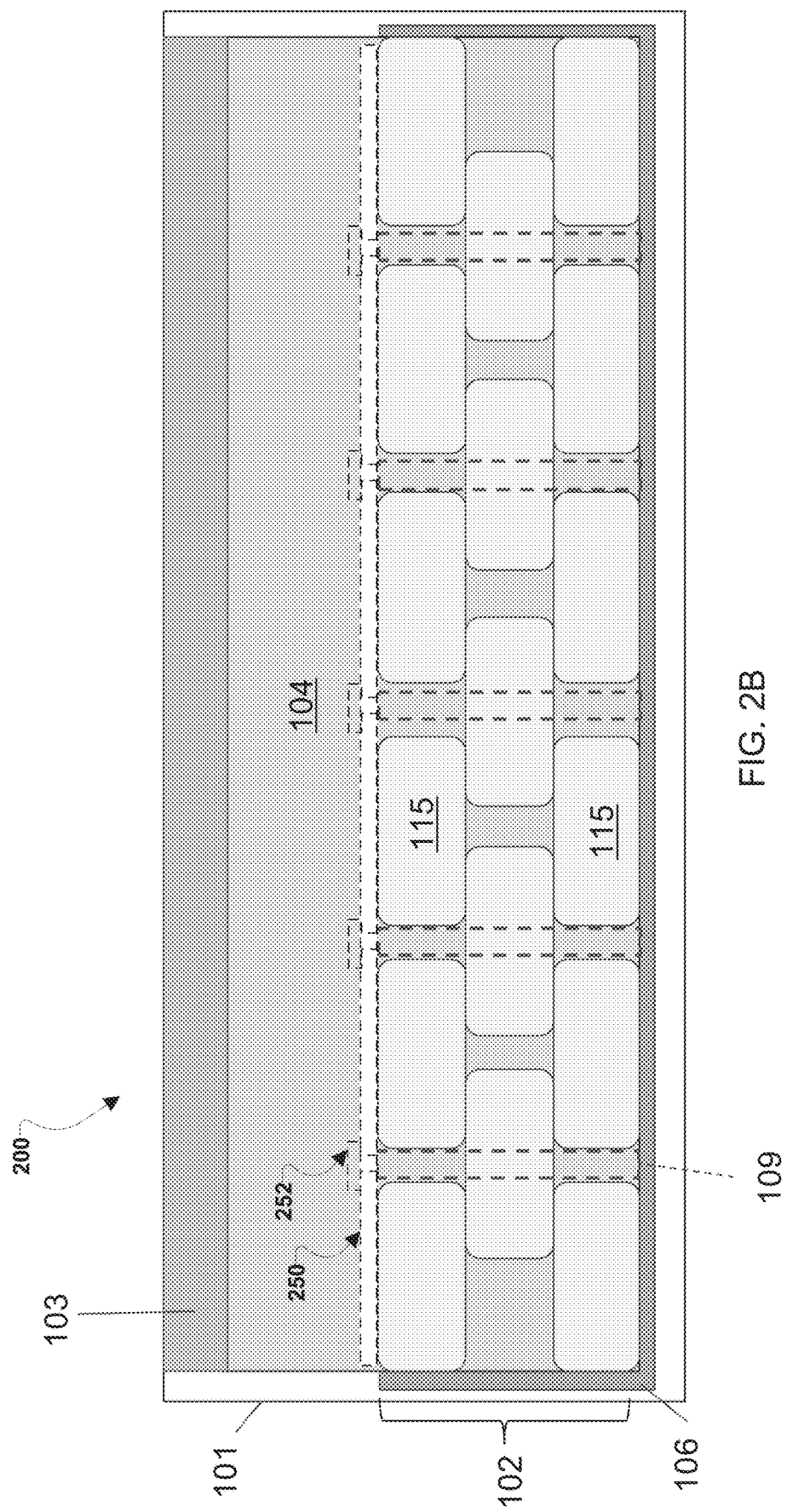
FIG. 2B is a schematic of an electrochemical cell, according to various embodiments of the present disclosure

The current collector 106 may be formed of a conductive material electrically connected to the negative electrode 102. The current collector 106 may directly contact lower and side surfaces of the negative electrode 102. In some embodiments, the current collector 106 may optionally include projections 109 that extend through the negative electrode 102, so as to directly contact internal regions thereof. The projections 109 may also reduce the effective transport lengths within the electrode 102 from the total pellet bed thickness to the inter-projection 109 spacing. Additionally, these projections 109 may be used to affix a mechanical clamping mechanism to incorporate down-force onto the pellet bed, while serving as a current collection element. For example, FIG. 2B illustrates an example plate 250 over the bed of pellets 115 compressing the electrode 102. The plate 250 may be affixed to the projections 109 by clamps 252 attaching the plate 250 to the projections 109 and causing the plate 250 to exert the compressing force on the bed of pellets 115 that is the negative electrode 102. In this manner, the plate 250 and clamps 252 may be a mechanical clamping mechanism. Similarly, the current collector may utilize magnets to compress the material forming the negative electrode 102. For example, the plate 250 could be a magnet attracted to a bottom of the housing 101, projections 109, and/or current collector 106 that may pull the plate 250 onto the pellets 115 to compress the bed of pellets 115 that is the negative electrode 102. In some embodiments, the current collector 106, the projections 109, and/or another element in the battery 200 may be magnetic and may pull the pellets 115 down and/or together to compact the bed of pellets 115. In some embodiments, the current collector 106 may be a two part collector with a first part attached to a front face of the negative electrode 102 and a second part attached to a back face of the negative electrode 102. The front face of an electrode may be the surface disposed generally toward the electrolyte and the back face of an electrode may be the surface disposed generally away from the electrolyte. In some embodiments, the first part may be attached to the front face may be a porous structure (e.g., a mesh) and the second part attached to the back face may be a solid. Having the current collector on the front face of the electrode and back face of the electrode may aid in applying a clamp force and may enable more uniform reaction rates throughout the entire electrode. The front and back portions of the current collectors may be short circuited together to impact reaction rate distributions. In some embodiments, the current collector 106 may clamp onto the negative electrode 102.

In a metal-air battery, pelletized and briquetted electrode materials have various advantages including high surface area, large internal porosity, and high electronic conductivity. Further advantages include more efficient methods of transport and handling, which are substantially simplified for pelletized and briquetted materials, as compared to powdered materials. Further advantages include simplicity of fabrication of the negative electrode. In some embodiments, the electrode may be formed by dispersing or pouring the pellets into a vessel or container. The combination of the high electronic conductivity of the materials and the weight of the pellets, which may be the result of the high density of iron-rich materials, provides a low contact resistance between pellets.

The electrical conductivity of materials that may comprise the pellets is generally ranked from high to low in the order: Fe metal>FeO>$Fe_3O_4$>$Fe_2O_3$. However, the more reduced materials having higher conductivity also require greater input energy in processing, and therefore, are more expensive and difficult to prepare. Thus, materials such as wustite and mixed phases containing some amount of iron metal, e.g. Fe/FeO, or Fe/$Fe_3O_4$, or Fe/$Fe_2O_3$, are generally preferred. For example, wustite (FeO) may provide a desired balance between input energy and processing cost versus electrical conductivity. As a specific, but non-limiting example, pellets may be produced as reduced taconite pellets, with a composition near FeO.

As one specific example, pellets may be largely spherical pellets of metallic iron, with a porosity of 50% (by volume) with a typical diameter of 10 millimeters (mm). A negative electrode may be 2 centimeters (cm) thick, and may be formed of a packed bed of the pellets. In the case of hard packed spheres, it is known that the packing density of randomly close-packed spheres may be approximately 64%, and close packed spheres may reach 74% packing density. Thus, the overall solid-phase density of a negative electrode may be approximately 32% (50%×64%) to 39% (50%×74%). The negative electrode is infiltrated with liquid electrolyte, comprised of 6M (mol/liter) concentration of potassium hydroxide (KOH).

Further advantages of the proposed negative electrode structures include the existence of low-tortuosity electrolyte pathways in the interstitial spaces between the pellets, which allows for rapid liquid-phase ionic transport, and enables the use of thick, high areal capacity (>0.1 Ah/$cm^2$) metal negative electrodes. The disclosed concepts also allow for independent tuning of the electrode surface area (that is, the solid-liquid interface area) and the electrode porosity, as the pellet porosity and packing densities may be independently varied.

As a further advantage of the invention, pellets may be assembled by spreading and packing in a dry state. In other embodiments, pellets may be first dispersed in a liquid electrolyte and then poured and spread into a battery vessel. In various embodiments, the vessel supporting the pellets may take various forms. While illustrated in FIGS. 1 and 2 as a bed of pellets, the negative electrode 102 may have various different shapes, such as a cone, tube, etc.

FIGS. 12A-12F are sectional views of exemplary batteries 1200A-1200F having alternative electrode configurations including ordered arrays of pellets 105. The batteries 1200A-1200F may be similar to the battery 100, so only differences therebetween will be discussed in detail.

Figure 12A:
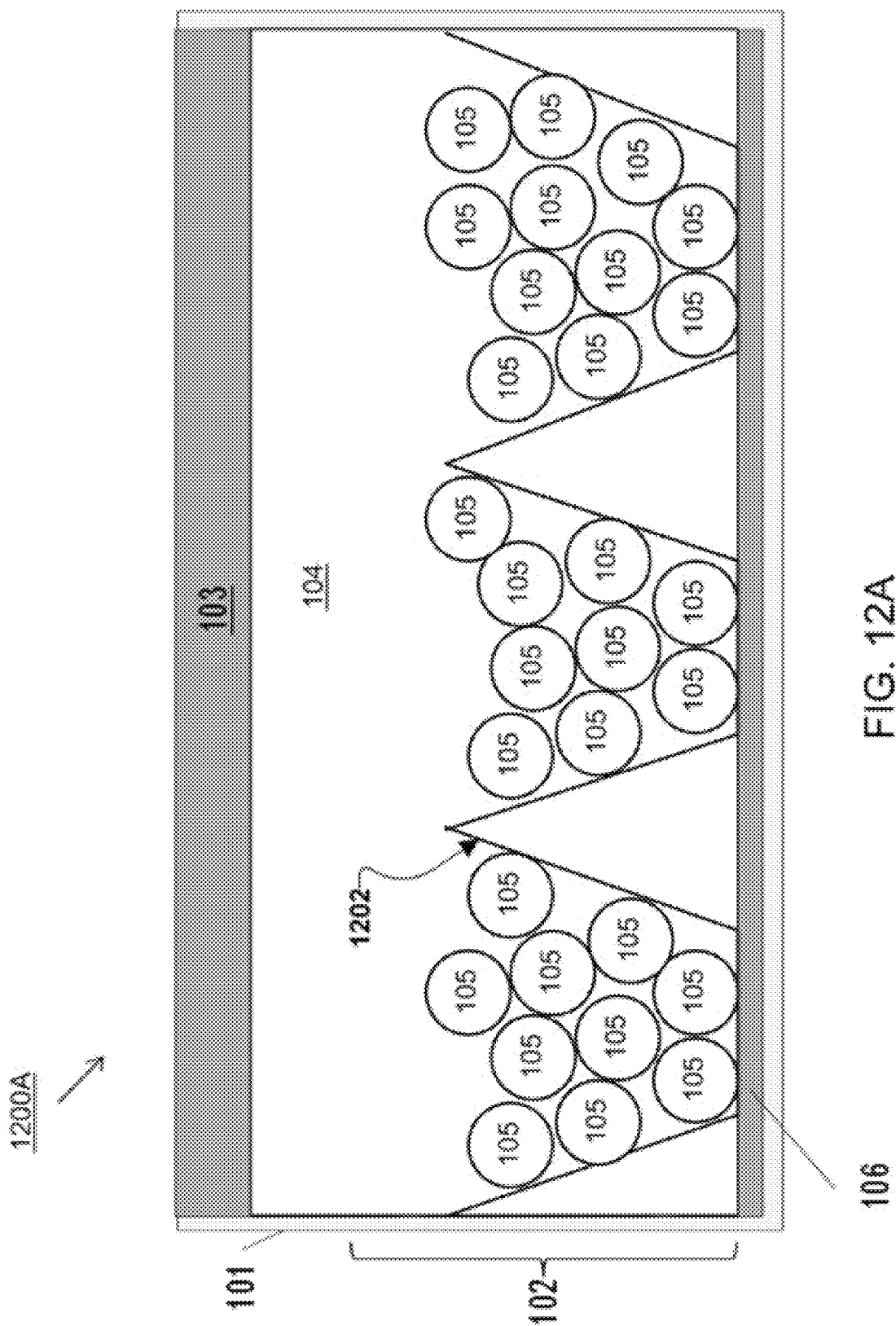

Referring to FIG. 12A, the battery 1200A may include one or more conical container 1202 supporting pellets 105. The conical container 1202 may enable the self-alignment of the pellets 105. The conical container 1202 may enable a modular design of the negative electrode 102 by having a large "swimming pool" type of reactor with multiple conical containers 1202 sitting on the bottom of the swimming pool of electrolyte 104. The conical container 1202 may be a cost effective design for bed current collection.

Figure 12B:
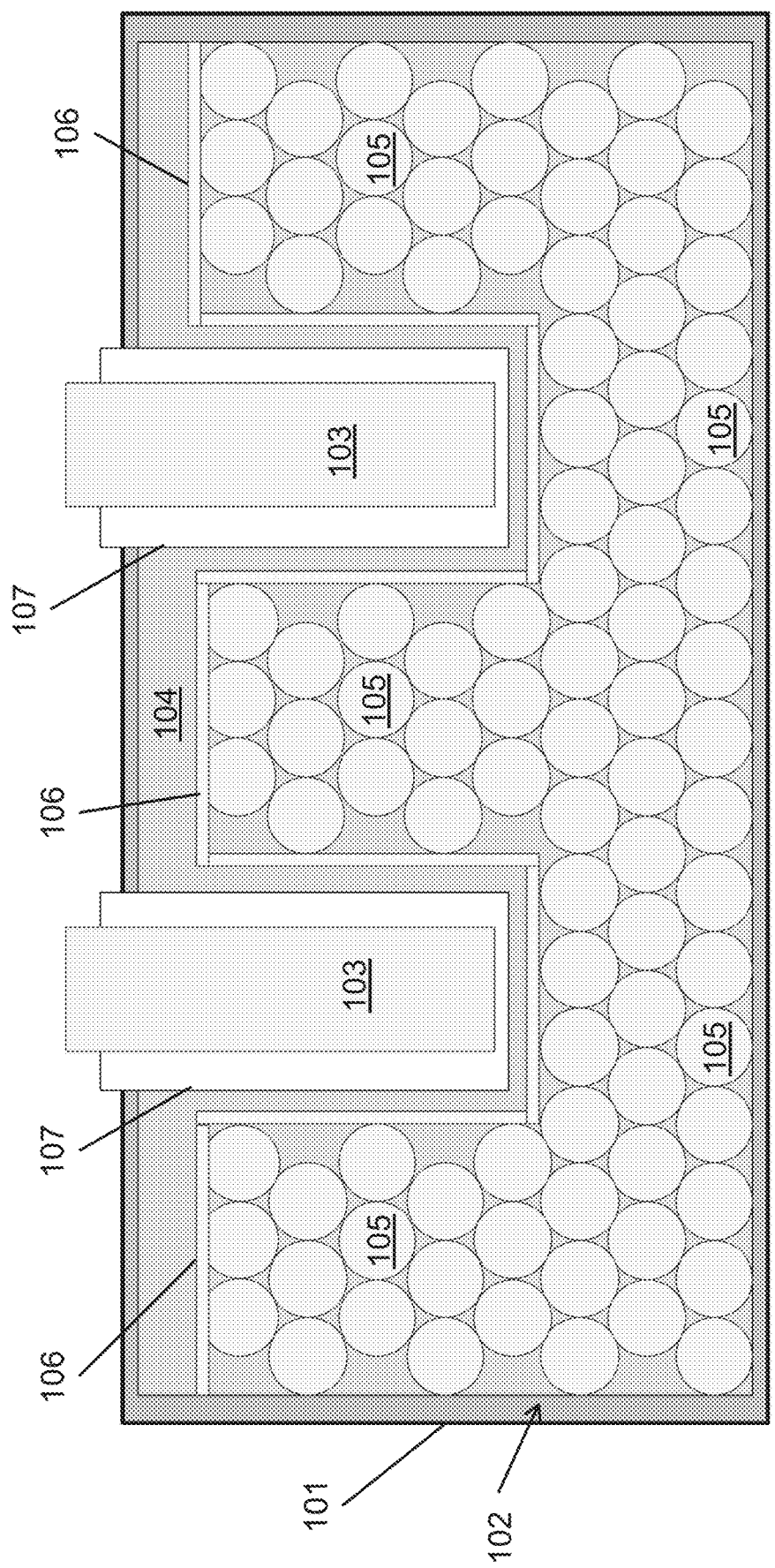

Referring to FIG. 12B, the battery 1200B may include a container 101 supporting an array of negative electrode pellets 105 that form a negative electrode 102. One or more positive electrodes 103 may be inserted into a negative electrode 102. The pellets 105 may be electrically connected to one another and/or to a current collector 106. A separator 107 may surround and electrically isolate the positive electrodes 103 from the negative electrode 102.

Figure 12D:
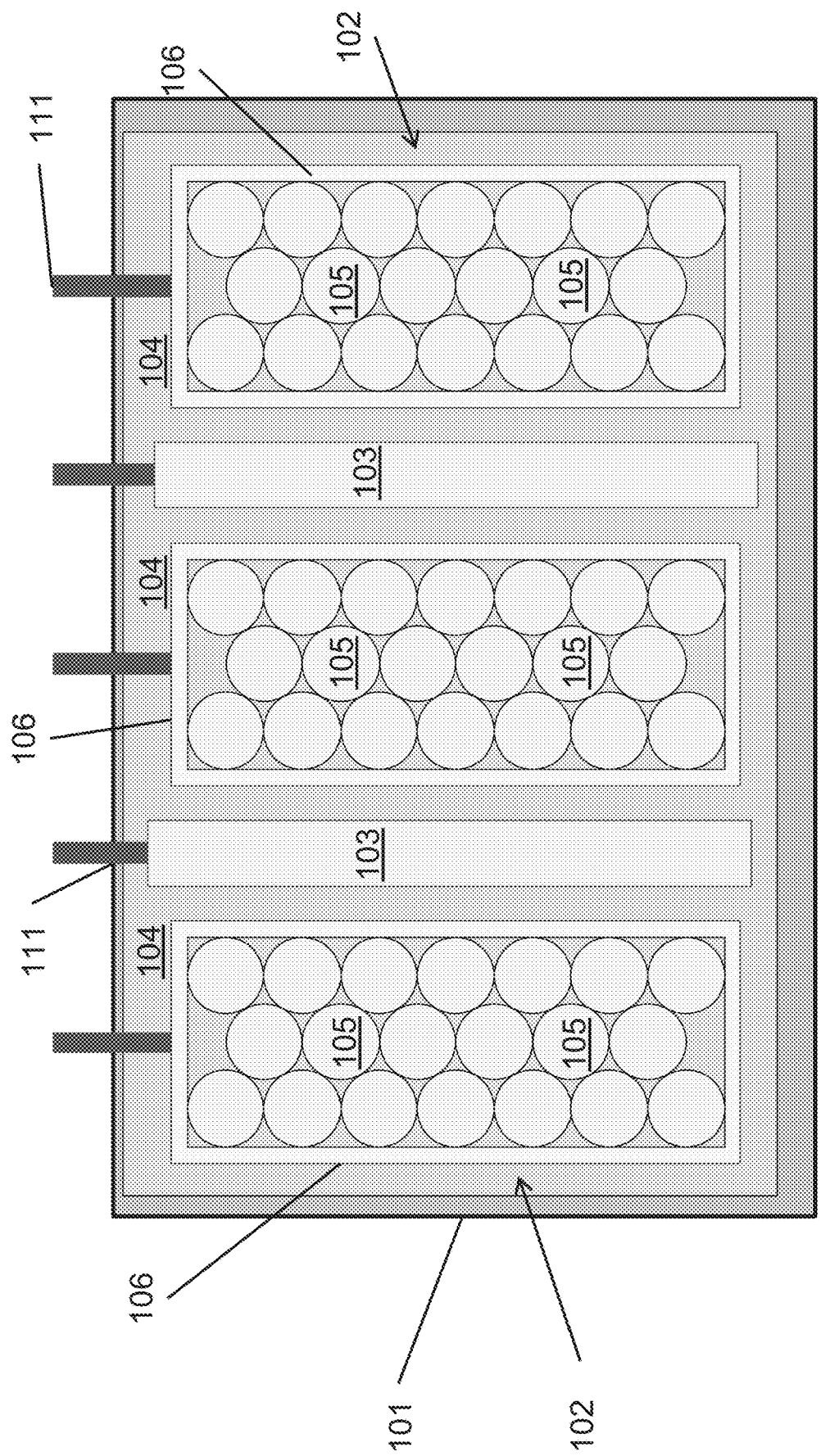

As shown in FIG. 12C, the battery 1200C may positive electrodes 103 that extend completely through an array of negative electrode pellets. In the battery 1200C, the pellets 105 may be arranged into stacks alternating with the electrodes 103. Referring to FIG. 12D, the battery 1200D, the battery 1200D is similar to the battery 1200C, except for omitting a separator. In the battery 1200D, the pellets 105 may be arranged into supported beds suspended in the electrolyte 104 along with the electrodes 103.

FIG. 12E, illustrates another example battery 1200E, according to various embodiments of the present disclosure. In the battery 1200E, the pellets 105 may be arranged in a hexagonal array surrounding the electrode 103 which may be circular in shape. FIG. 12F, illustrates another example battery 1200F, according to various embodiments of the present disclosure. In the battery 1200F, the pellets 105 may be arranged in a hexagonal array surrounding the electrode 103 which may be hexagonal in shape.

Figure 3A:
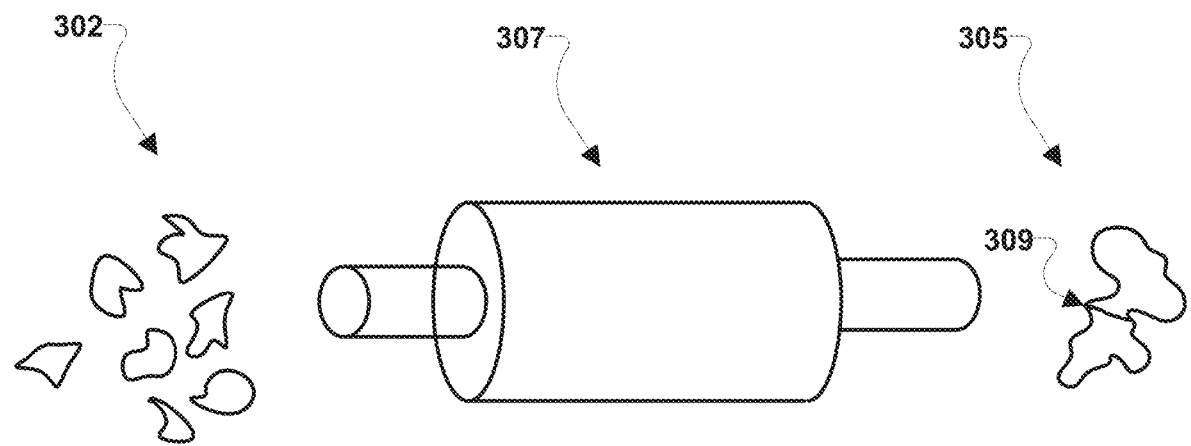
FIG. 3A is a schematic of an example continuous feed calcining furnace configured to form sintered agglomerate pellets according to various embodiments of the present disclosure.

As discussed above, the pellets of the present disclosure are not limited to any particular pellet shape. In various embodiments, the pellets may be iron agglomerates with various different shapes, such as sintered iron agglomerate pellet 305 illustrated in FIG. 3A. The sintered iron agglomerate pellets may have symmetrical and/or non-symmetrical shapes. As an example, the sintered iron agglomerate pellets may have a symmetrical shape such as a sphere, ellipsoid, cylinder, or plate, or an irregular shape such as a granule. In various embodiments, the sintered iron agglomerate 305 may be formed in a furnace, such as a continuous feed calcining furnace, a batch calcining furnace, a shaft furnace, or any other type of furnace. As a specific example, when the furnace is a continuous feed calcining furnace, the furnace 307 may be configured with a rotating tube. In operation, iron powder particles 302 may be feed into the furnace 307. The furnace 307 may rotate and heat the iron powder particles 302 to sinter the iron powder particles 302 together, thereby fabricating sintered iron agglomerate pellets, such as sintered iron agglomerate pellet 305. The sintered iron agglomerate pellets, such as sintered iron agglomerate pellet 305, may provide the same chemistry and morphology of sintered pellets discussed herein, such as pellets 105, 115, etc., and may be substituted in the various embodiments for other shaped pellets. The sintered iron agglomerate pellets, such as sintered iron agglomerate pellet 305, may include a neck 309 at the sintered joint of the iron powder particles 302 joined together to form the sintered iron agglomerate pellets, such as sintered iron agglomerate pellet 305.

An advantage to using pellets formed as iron agglomerates is that the manufacture of such iron agglomerate pellets, such as sintered iron agglomerate pellet 305, may be less expensive than the manufacture of spherical and/or briquette-shaped pellets, such as pellets 105, 115, etc.

In various embodiments, a sintered iron electrode, such as an entire electrode and/or individual pellets, such as pellets 105, 115, 305, etc., may be formed from crushed precursors and/or byproduct materials (e.g., fines) from steel making processes (e.g., DRI). For example, DRI precursors and DRI fines may be crushed, formed with a binder under heat and pressure, and then sintered to form a porous iron electrode in the shape of pellets 105, 115, 305, etc. and/or electrodes of other shapes, including but not limited to sheets, plates, bars, cylinders, and other shapes.

Figure 3B:
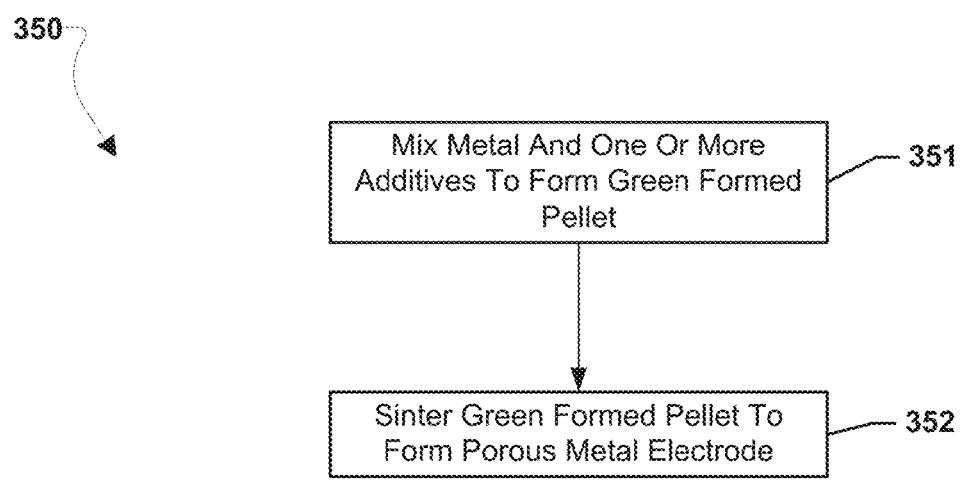
FIG. 3B is a process flow diagram of an embodiment method for forming sintered porous metal electrodes.
Figure 3C:
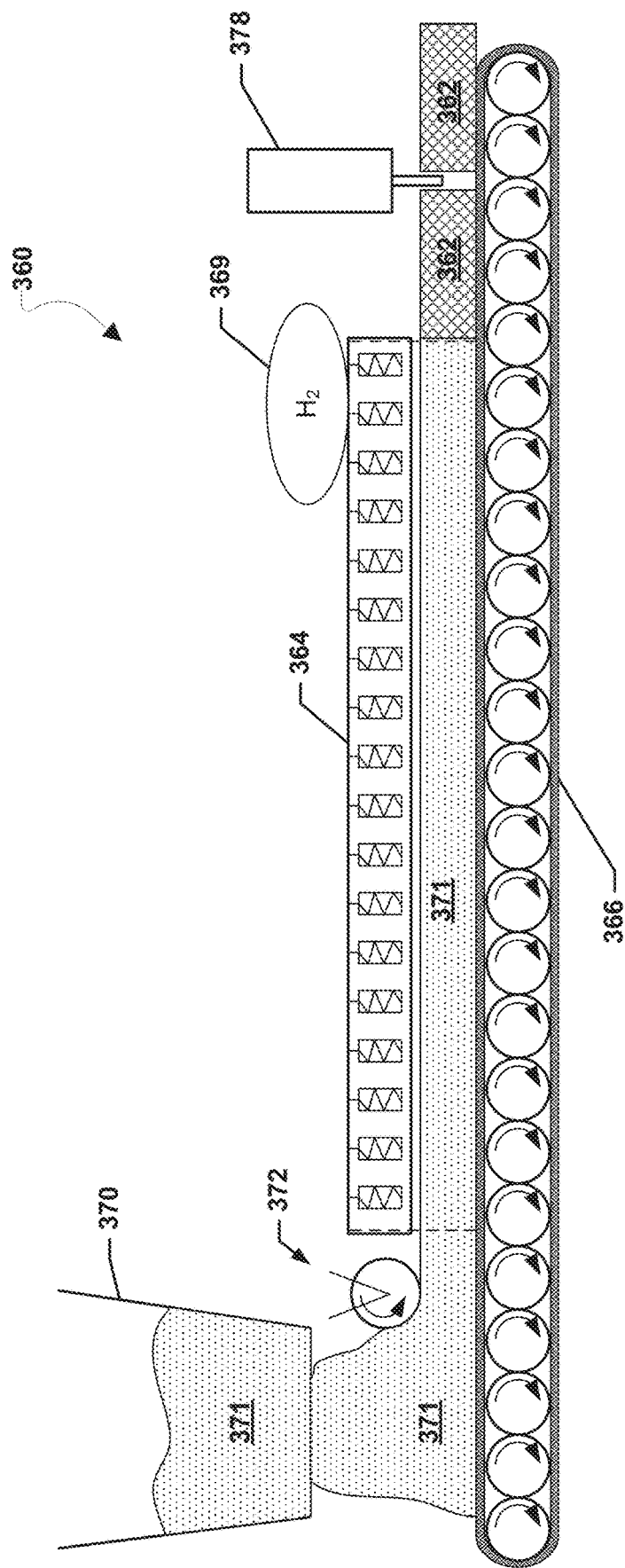
FIG. 3C is a block diagram of an embodiment system for forming sintered porous metal electrodes.
Figure 3D:
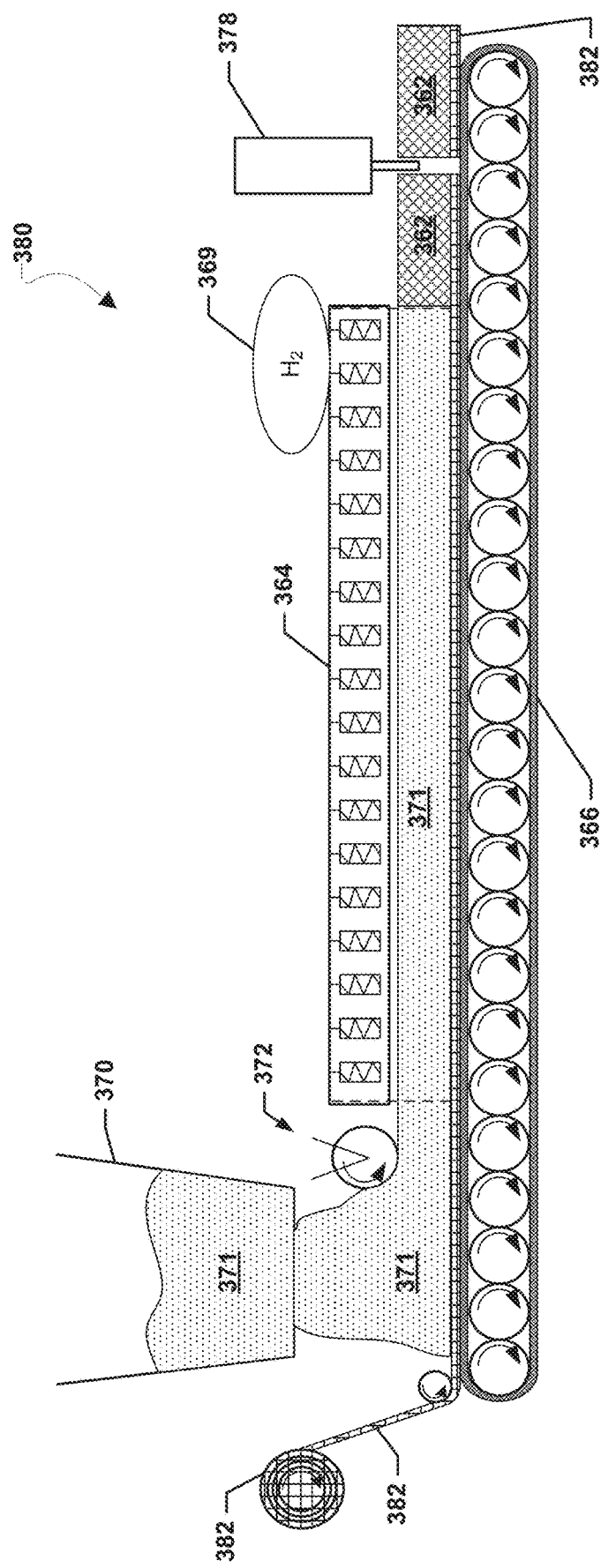
FIG. 3D is a block diagram of an embodiment system for forming sintered porous metal electrodes

Various embodiments discussed below with reference to FIGS. 3B-3D provide for making sintered porous metal electrodes for batteries, such as batteries 100, 200, 400, 800, 814, 900, 1000, 1100, and 1200 described herein.

FIG. 3B illustrates one embodiment method 350 for making sintered porous metal electrodes. The method 350 may include mixing metal and one or more additives to form a green formed pellet in block 351 and sintering the green formed pellet to form a porous metal electrode in block 352.

Mixing metal and one or more additives to form a "green" formed pellet in block 351 may include hot pressing the mixture of the metal and the one or more additives to form the green formed pellet. In various embodiments, the metal may include iron. In various embodiments, the additives may include a combination pore former and binder additive. As a specific example, a mixture of iron, polyethylene, and bismuth sulfide powder may be hot pressed into a green formed pellet. In various embodiments, the polyethylene may act as both a green forming binder and a pore former that is evaporated during the sintering step. The polyethylene may sublime at a temperature less than the sintering temperature. In various embodiments, other pore former additives that do not necessarily serve as a binder may be used, such as any inorganic or organic material that is solid-phase at room temperature and liquid or gas phase between room temperature and the sintering temperature in a nitrogen (e.g., $N_2$) atmosphere or argon/hydrogen (e.g., Ar(95%)/$H_2$ (5%) or other relative argon and hydrogen concentration) atmosphere. In various embodiments, multiple types of binders may be mixed together as additives to the metal. Mixing of multiple types of binders may be used to target specific microstructure morphologies and stabilize the powder bed during binder burnout.

Sintering the green formed pellet to form a porous metal electrode in block 352 may include sintering the green formed pellet in a gas atmosphere at a time-temperature profile. The gas atmosphere may be a nitrogen (e.g., $N_2$) atmosphere or argon/hydrogen (e.g., Ar(95%)/$H_2$ (5%) or other relative argon and hydrogen concentration) atmosphere. In various embodiments, the time-temperature profile may be a linear time-temperature profile or a non-linear time-temperature profile. For example, the linear time-temperature profile may include a linear temperature ramp-up period, followed by a constant soak temperature period, followed by a linear ramp-down period. As a specific example, sintering the green formed pellet in a gas atmosphere at a time-temperature profile may include sintering the green formed pellet in a nitrogen (e.g., $N_2$) atmosphere or argon/hydrogen (e.g., Ar(95%)/$H_2$ (5%) or other relative argon and hydrogen concentration) atmosphere, with a linear temperature ramp up to 850° C., soak at 850° C. for 15 min, and linear ramp back down to room temperature. As another example, a non-linear time-temperature profile may have multiple ramps and soaks to better control the evaporation rate of the pore former, such as a polyethylene pore former. For example, the non-linear time-temperature profile may have a non-linear temperature ramp-up period, two or more soak temperature periods with ramp-down and ramp-up periods in-between, and a non-linear ramp-down period.

FIG. 3C illustrates an embodiment system 360 for forming sintered porous metal electrodes 362. The system 360 may include a continuous roller furnace having a series of heating elements 364 and belt 366 with rollers configured to convey items on the belt 366 through the furnace from one end to another while being heated by the heating elements 364. The area under the heating elements 364 may be configured to have controlled atmospheric conditions, such as an atmosphere of pure hydrogen ($H_2$) supplied by hydrogen tank 369. The system 360 may include a powder supply 370, such as a hopper, container, drum, etc., that supports metal powder 371, such as iron oxide powder, etc., to be used for forming a sintered porous metal electrode 362. When the metal powder 371 is iron oxide powder, the iron oxide powder may or may not be oxidized in air at high temperature, which would result in a fully oxidized ($Fe_2O_3$) powder feedstock. The metal powder 371 may be deposited from the powder supply onto the belt 366 and compressed before being fed into the furnace (i.e., under the heating elements 364). As examples, the metal powder 371 may be compressed by a slot die, compression roller 372, press, or other compaction type device at the front of the furnace. The compressed metal powder may be fed by the belt 366 along the length of the furnace under the heating elements 364. As the metal powder 371 is heated by the heating elements 364 in the hydrogen atmosphere while being moved by the belt 366, $H_2O$ vapor may be released from the metal powder 371. The hydrogen reduces the iron oxide at elevated temperature to form water and metallic iron (i.e., $FeO_x + H_2 \rightarrow H_2O + Fe$). The resulting metal powder (e.g., iron powder) rolls on the belt 366 continuously through the furnace, allowing the particles to sinter together, forming a sintered porous metal electrode 362 (e.g., a sintered porous Fe electrode) in a continuous fashion. In some embodiments, the sintered porous metal electrode 362 may be cleaved into pieces once it exits the furnace, such as by knife 378, pinch cleaver, cutting jet, or any other type device configured to cut the sintered porous metal electrode 362 into pieces. In some embodiments, the weight of the sintered porous metal electrode 362 may break it into pieces.

FIG. 3D illustrates a system 380 for forming sintered porous metal electrodes 362. The system 380 may be similar to the system 360 described above, except that a metal sheet 382 may be placed under the metal powder 371 before the metal powder 371 is fed into the furnace. In this manner, the metal powder 371 may be sintered directly onto the metal sheet 382 thereby continuously forming sintered porous metal electrodes 362 with integrated current collectors. The metal sheet 382 may be a roll of metal being fed into the furnace under the metal powder 371 and supporting the metal powder 371 on the belt 366. For example, the metal sheet 382 may be fed by a reel to reel system onto the belt 366 before the metal powder 371 is deposited and compressed. In various embodiments, the metal sheet 382 may be a metal foil. In various embodiments, the metal sheet 382 may be formed of any metal selected to act as a current collector, such as nickel, iron, steel, etc.

Figure 4:
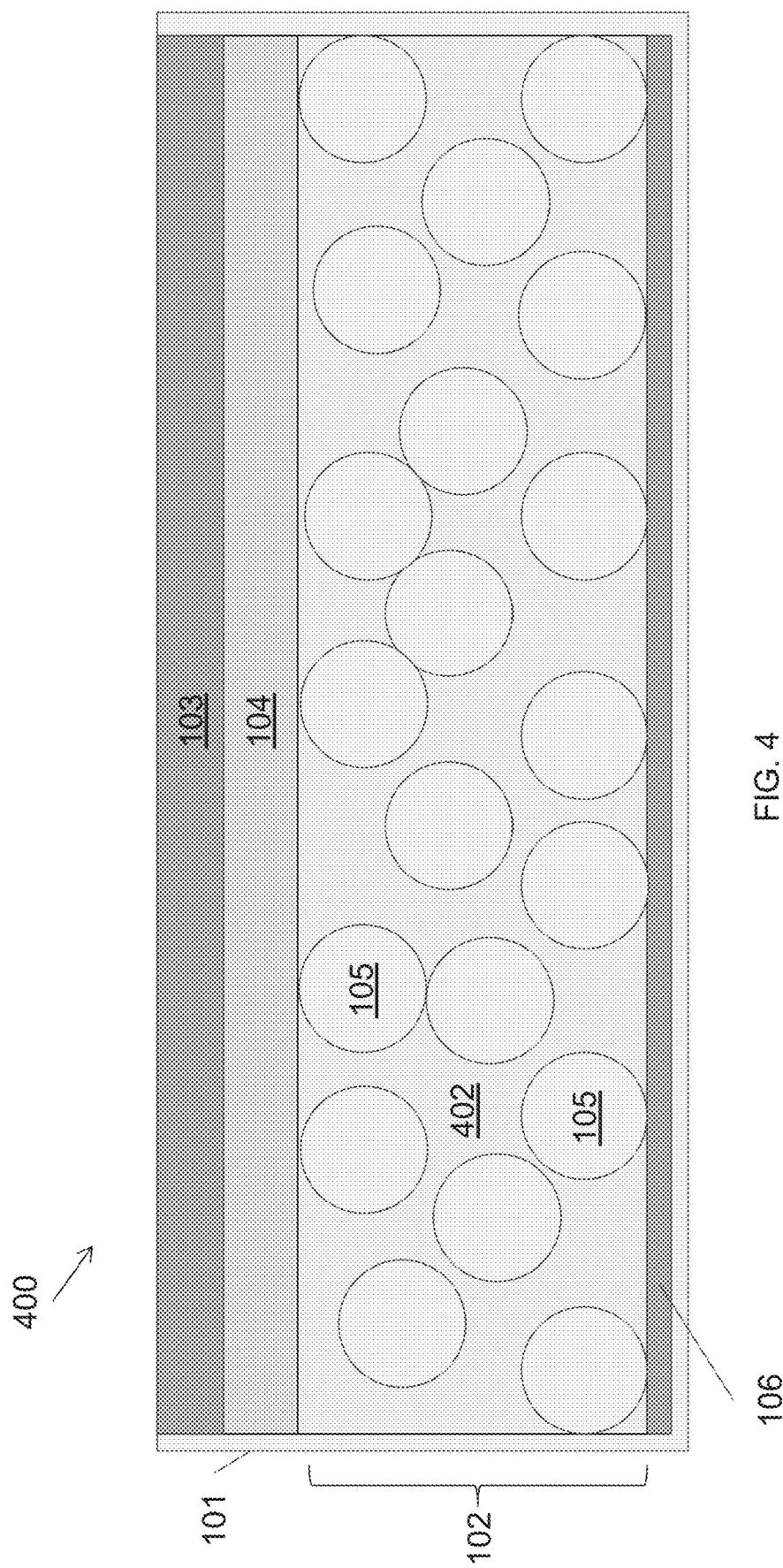
FIG. 4 is a schematic of an electrochemical cell including a composite metal electrode with spherical pellets and metal feedstock according to various embodiments of the present disclosure.

FIG. 4 is a schematic of a battery 400 according to various embodiments of the present disclosure. The battery 400 is similar to the battery 100, so only differences between the batteries 100 and 400 will be discussed in detail. The battery 400 may include spherical pellets 105 disposed in a smaller particle composition, such as a composition formed from powdered metal feed stock, metal fines, metal grains, etc.

Long-duration electrochemical energy storage may benefit from very low-cost material inputs. While the spherical pellets 105 of battery 100 may provide extremely low-cost material, electrical and ionic conductivity through the spherical pellets 105 may not be ideal because of the limited points of contact inherent in touching spherical pellets 105. One solution to providing better electrical and ionic conductivity may be to use powdered metal feedstocks as an electrode, such as the negative electrode 102. While powdered metal feedstocks used as an electrode may provide for tailored electrical and ionic conductivity, powdered metal feedstocks may be high-cost to produce, especially in comparison to spherical pellets 105.

Various embodiments may provide a composite metal electrode architecture that provides a lower cost than exclusively powdered metal feedstock electrodes and/or higher electric conductivity than exclusively spherical pellet electrodes. As used herein, an average width or diameter of the pellets is at least 10 times greater than an average width or diameter of the powder particles in the powdered metal feedstock. In various embodiments, the composite metal electrode architecture may include a mixture of spherical pellets and a smaller metal particle composition, such as powdered metal feedstock. For example, as illustrated in FIG. 4, the negative electrode 102 may include spherical pellets 105 disposed in smaller metal particle composition 402, such as a powdered metal feedstock. The spherical pellets 105 and powdered metal feedstock as the negative electrode 102 may provide a mixture of larger and smaller particles akin to marbles in sand or other combinations of relative particle size. In some embodiments, the macropores between the larger pellets comprise smaller pellets. The composite metal electrode formed from the spherical pellets 105 and powdered metal feedstock may provide an electrode architecture with a cost, electrical conductivity, and/or ionic conductivity that may be highly-tunable. In some embodiments, the composite metal electrode may be wetted with the liquid electrolyte 104. As the powdered metal feedstock included in the composite metal electrode may be wetted, the composite metal electrode formed from the spherical pellets 105 and powdered metal feedstock may have a lower iron to electrolyte ratio than an electrode formed of exclusively spherical pellets 105. The powdered metal feedstock 402 improves the electrical conductivity between the pellets 105 in the electrode 102, and also the total packing density of the electrode.

In various embodiments, the composite metal electrode architecture may include a mixture of spherical pellets and a smaller metal particle composition, such as metal fines or shavings. For example, as illustrated in FIG. 4, the negative electrode 102 may include spherical pellets 105 comprised of taconite and a smaller metal particle composition 402 comprised of conductive DRI fines. By combining low cost taconite pellets used as a bulk iron feedstock for the pellets 105 and waste, conductive DRI fines as the smaller metal particle composition 402, the cost of forming a conductive electrode upon assembly of the battery 400 may be lowered. As other examples, the composite metal electrode architecture may include a mixture of different sized iron ore particles, such as larger iron ore pellets (e.g., taconite, DRI, sponge iron, atomized iron, etc.) and a smaller metal particle composition, such as metal fines or shavings (e.g., fines or shavings of DRI, taconite, sponge iron, atomized iron, etc.).

In some embodiments, the electrical conductivity of the metal electrode is increased by adding conductive fibers, wires, mesh, or sheets to the pellets such that the conductive material is dispersed between individual pellets.

Various embodiments provide for on-site synthesis of active materials for bulk energy storage systems using renewable energy over-production. In various embodiments, chemical costs may be reduced by configuring the energy storage plant including an embodiment battery, such as an embodiment metal-air electrochemical cell discussed herein, for dual use. The initial use of the energy storage plant may be to synthesize critical active materials, such as metallic pellets, such as pellets 105, 115, 305, etc., on site using much lower cost input chemicals and very cheap or free renewable energy. The next use of the energy storage plant may be as an actual energy storage plant where the chemical(s) that were synthesized are the active materials, such as metallic pellets, such as pellets 105, 115, 305, etc. For example, a metal powder that will ultimately be used in a very large battery may be synthesized on site at the dual use energy storage plant prior to the battery commissioning, for example by direct reduction using hydrogen that is generated electrochemically through alkaline or PEM electrolysis powered by a renewable source (e.g., wind, solar, etc.) on site. This onsite production of active materials in a first stage may not only lower the cost of production but also potentially avoid shipping costs. In embodiments where iron ore is the source of the active material, renewable energy may be used to provide the thermal energy to reduce the ore at the dual use energy storage plant. Additionally, renewable energy and may optionally be used to produce hydrogen as a reducing gas to reduce the ore. The ore or reduced ore may be optionally in the form of iron containing pellets.

Figure 5:
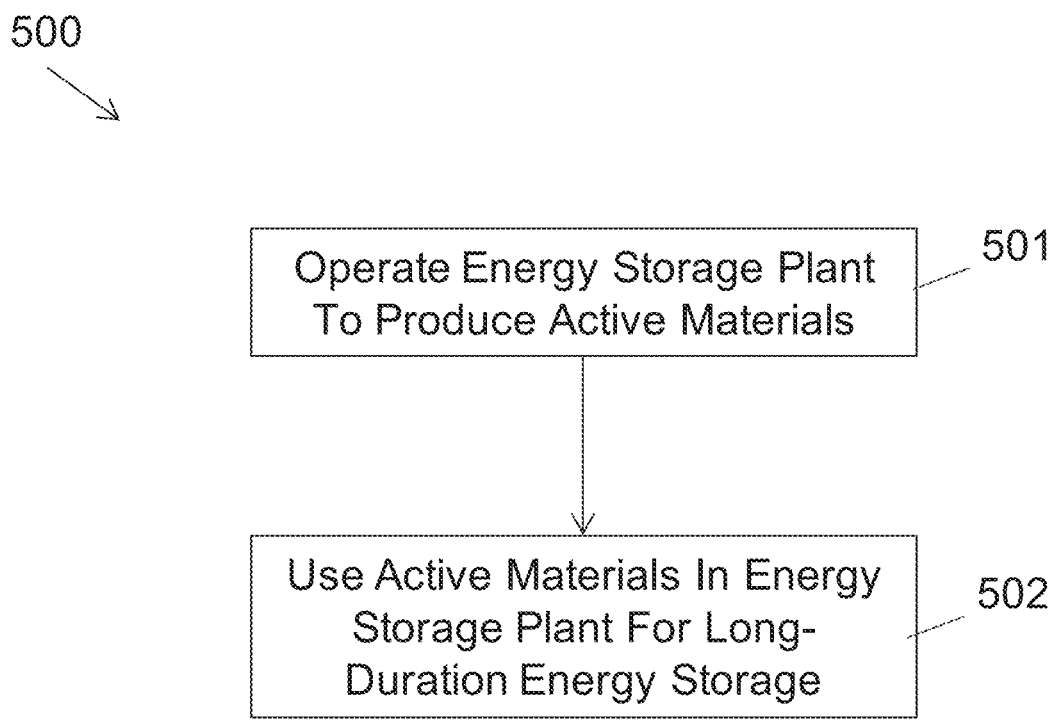
FIG. 5 is a process flow diagram illustrating an embodiment method for on-site synthesis of active materials for bulk energy storage systems using renewable over-production.

In various embodiments, metallic pellets, such as pellets 105, 115, 305, etc., may be synthesized in a first stage of a dual use energy storage plant and used in the negative electrode in a second stage of the dual use energy storage plant. FIG. 5 illustrates an embodiment method 500 for on-site synthesis of active materials, such as metallic pellets, such as pellets 105, 115, 305, etc., for bulk energy storage systems using renewable over-production. In block 501, during a first stage of operation, the dual use energy storage plant may be operated to produce active materials, such as metallic pellets, such as pellets 105, 115, 305, etc. For example, when iron ore is the source of the active material, the ore may be reduced on site at the dual use energy storage plant to synthesize metallic pellets, such as pellets 105, 115, 305, etc. In block 502 during a second stage of operation, the dual use energy storage plant may use the active materials for long-duration energy storage. For example, the synthesized metallic pellets, such as pellets 105, 115, 305, etc., may be loaded (or otherwise deposited, added, formed, etc.) into negative electrodes, such as electrodes 102, etc. of a battery, to support long-duration energy storage by the dual use energy storage plant. In various embodiments, the operations of blocks 501 and/or 502 may be performed using renewable energy.

Figure 8A:
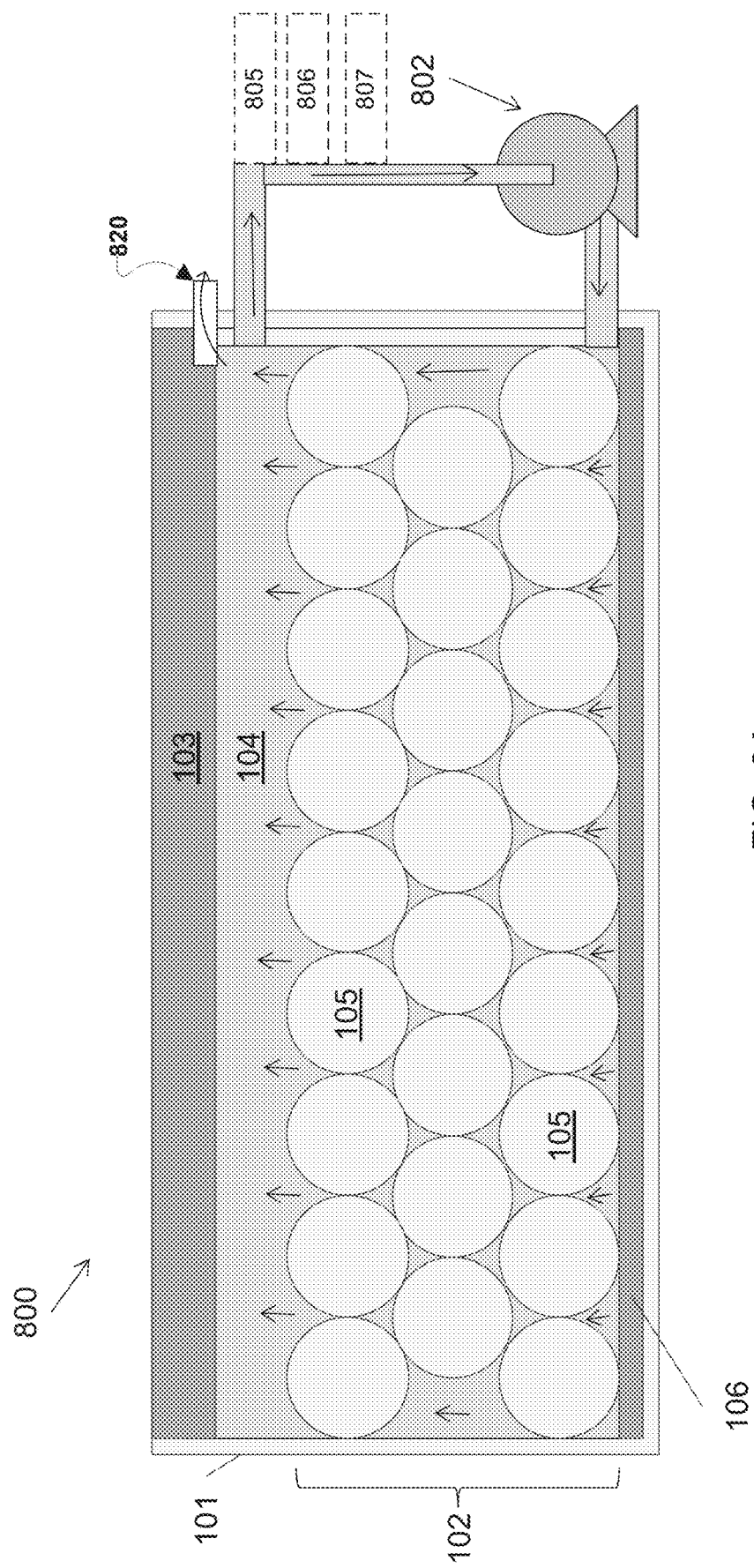
FIG. 8A is a schematic of an electrochemical cell, according to various embodiments of the present disclosure.

FIG. 8A is a schematic of a battery 800 according to various embodiments of the present disclosure. The battery 800 is similar to the battery 100, so only differences therebetween will be discussed in detail. The battery 800 may be configured to flow electrolyte 104 over the negative electrode 102. For example, the battery 800 may include a circulating pump 802 and piping configured to enable the pumping of electrolyte 104 at a selected rate, such as a constant flow rate, variable flow rate, etc., over the pellets 105 comprising the electrode 102. Transport of electrolyte 104 through a very thick (multi-centimeter) battery electrode 102 comprised of active material pellets 105 may be challenging. Low electrolyte 104 transport rates can increase overpotential losses in the pellet 105 based electrode 102.

By flowing electrolyte 104, through the thick electrode 102, convective transport may be introduced which promotes flow of electrolyte to individual pellets 105. As discussed above, pellets 105 may be micro-porous and the reaction condition can benefit by decreasing electrolyte 104 concentration boundary layers that may arise through the thickness of the entire pellet 105 bed of the electrode 102 and through macro-pores, such as macro-pore 602, in the pellet 105 bed. The electrolyte 104 flow will generally decrease overpotential losses by homogenizing the electrolyte 104 composition throughout the macro- and micro-structure of the electrode 102. Electrolyte 104 flow rates may be preferably chosen to be low enough that any energy consumed by pumping does not consume undesirable amounts of energy. In various embodiments, the electrolyte 104 flow rate may be a steady flow rate or a variable flow rate.

In various embodiments, by flowing electrolyte 104 at a low, but consistent flow rate through the battery electrode 102 (e.g., the battery electrode 102 comprised of active material pellets 105) convective transport may be introduced which promotes flow of electrolyte 104 to individual pellets 105. Pellets 105 may be micro-porous and the reaction condition may benefit by decreasing electrolyte 104 concentration boundary layers that may arise through the thickness of the entire pellet 105 bed (e.g., through the electrode 102) and through macro-pores in the pellet 105 bed (e.g., in the electrode 102). The electrolyte 104 flow may generally decrease overpotential losses by homogenizing the electrolyte 104 throughout the macro- and micro-structure of the electrode 102.

In various embodiments, electrolyte 104 formulations may be different for the charge, discharge, and idle states of the battery 800. Flowing different electrolyte 104 formulations into the battery 800 when switching between states may improve utilization, self-discharge, and HER simultaneously. For example, in the case of an electrolyte management system with continuous flow, there may optionally be an arbitrary number of distinct electrolyte formulation reservoirs, each connected to the electrochemical cell with separate flow controllers (e.g., three reservoir and flow controller combinations 805, 806, 807). During different operation, different relative amounts of each electrolyte formulation could be flowed based on the optimal concentrations of constituent species for the instantaneous operation mode (e.g., charge, discharge, idle). In some embodiments, the electrolyte formulation may be adjust based on the instantaneous state of charge of the battery 800. In various embodiments, a reservoir and flow controller combinations (e.g., 805, 806, 807) may be used to add additional electrolyte 104 to the battery 800, for example thereby compensating for electrolyte 104 evaporation. In various embodiments, the battery 800 may include an overflow drain 820 or spill way passage that may enable electrolyte 104 to overflow out of the battery 800. For example, the level of electrolyte 104 may be maintained because as the level of electrolyte 104 reaches the overflow drain 820, it may exit the battery 800 to maintain the level of the electrolyte 104 at the overflow drain 820 level.

Figure 8B:
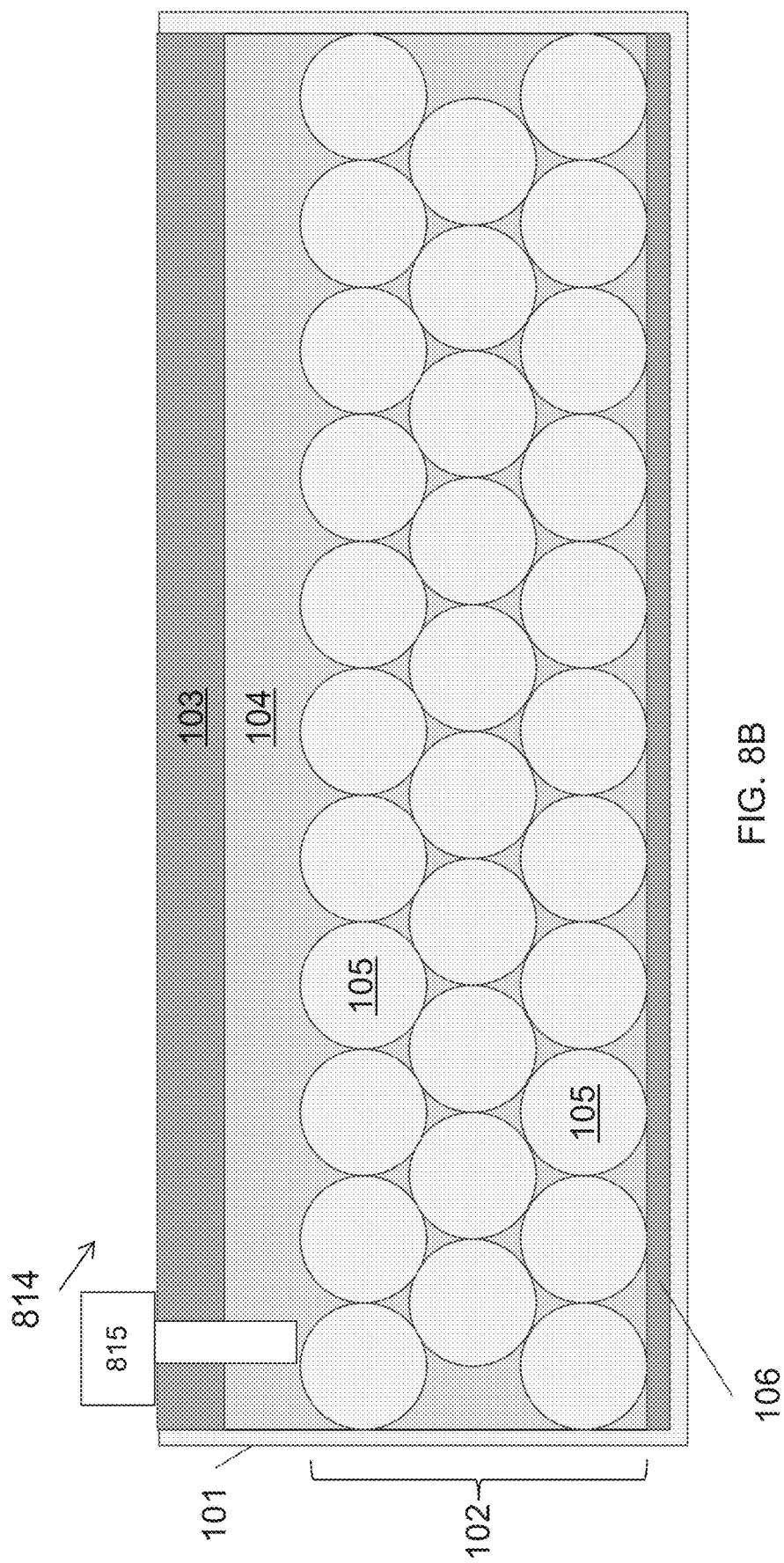
FIG. 8B is a schematic of an electrochemical cell, according to various embodiments of the present disclosure.

FIG. 8B is a block diagram of an embodiment battery 814 including an additive delivery system 815. The battery 814 is similar to the battery 100, so only difference therebetween will be discussed in detail. In one embodiment, the additive delivery system 815 may be a pump that delivers additive-bearing liquid to the battery 814. In another embodiment, the additive delivery system 815 may be a dry hopper that delivers additive-bearing solids to the battery 814. As one example, the additive delivery system 815 may be a sulfur delivery system. As a specific example, when the additive delivery system 815 is a sulfur delivery system, the sulfur delivery system may be a pump that delivers sulfur-bearing liquid to the battery 814. In as another specific example, when the additive delivery system 815 is a sulfur delivery system, the sulfur delivery system may be a dry hopper that delivers sulfur-bearing solids (e.g., polysulfide salts, iron sulfide (FeS), etc.) to the battery 814. In another example, the additive delivery system 815 may be a salt delivery system. Specifically, the additive delivery system 815 may add certain solid-phase hydrogen evolution inhibitors (e.g., Bi, Sb, As) as a soluble salt. For example, a soluble salt of a desired hydrogen evolution inhibitor, which dissolves to provide in solution ions of the desired additive (i.e., $Bi^{3+}$, $Sb^{3+}$, $As^{3+}$), may be added to the liquid electrolyte 104 by the additive delivery system 815. The additive may be selected such that the redox potential of the inhibitor's ion-to-metal plating reaction (e.g., $Bi^{3+} \rightarrow Bi^0$) occurs at a higher half-cell potential (as measured vs. RHE (but at a lower cell potential)) than the potential of the charging reaction of the anode active material. Thus, during charging of the battery 800, the ionic form of the HER inhibitor may be electrodeposited onto the surfaces of the metal electrode, providing an inexpensive and simple strategy for introducing an HER inhibitor to the battery 800 electrolyte 104 chemistry. The electrodeposited inhibitor suppresses the hydrogen evolution reaction at the surface of the electrode, which may be an electrode with open porosity. During the discharge mode, the deposit may dissolve back into the electrolyte 104. The salt additive may be preferably selected so that it does not degrade the operation of the cathode during charge or discharge operations. As another example, the salt added may be a carbonate salt. In some embodiments, the additive delivery system 815 may deliver multiple additives to the battery 800. For example, a combined additive composition such as a corrosion inhibitor that suppresses the HER reaction or suppresses self-discharge combined with an additive that improves capacity utilization may be delivered by the additive delivery system 815. As another example, an inhibitor that forms a passivation layer on the metal surface is paired with an additive that depassivates the iron surface and both may be delivered by the additive delivery system 815. In some embodiments, the additive delivery system 815 may deliver additives comprising a molybdate ion. As an example, a molybdate ion may be added via a molybdate compound such as $KMoO_4$. In one specific example, the electrolyte 104 may include an additive concentration of 10 mM molybdate anion. In other embodiments, the electrolyte 104 may include additive concentrations ranging from 1-100 mM of the molybdate anion. In some embodiments, a surfactant additive may be delivered by the additive delivery system 815. A surfactant additive may reduce electrolyte surface tension and viscosity at the oxygen evolution electrode to generate smaller, uniformly sized, controllable bubbles during charging. In one non-limiting example, 1-Octanethiol is added to the alkaline electrolyte 104 at a concentration of 10 mM. In some embodiments, a corrosion inhibitor additive may be delivered by the additive delivery system 815. In some embodiments, the additive delivery system 815 may delivery liquid and/or interphase interface inhibitors. In some embodiments, the additive delivery system 815 may deliver additives as mixtures of solids. In some embodiments, the additive delivery system 815 may deliver an electrolyte additive (e.g., $Na_2MoO_4$) that forms a thin, passivating film. Self-discharge of the anode is therefore limited to only a small layer on the surface of the anode. However, to recover reactivity of the metal anode, a short and aggressive charging pulse may be used to reduce the surface film. Once the surface film is reduced, the discharge reaction may proceed.

Figure 8C:
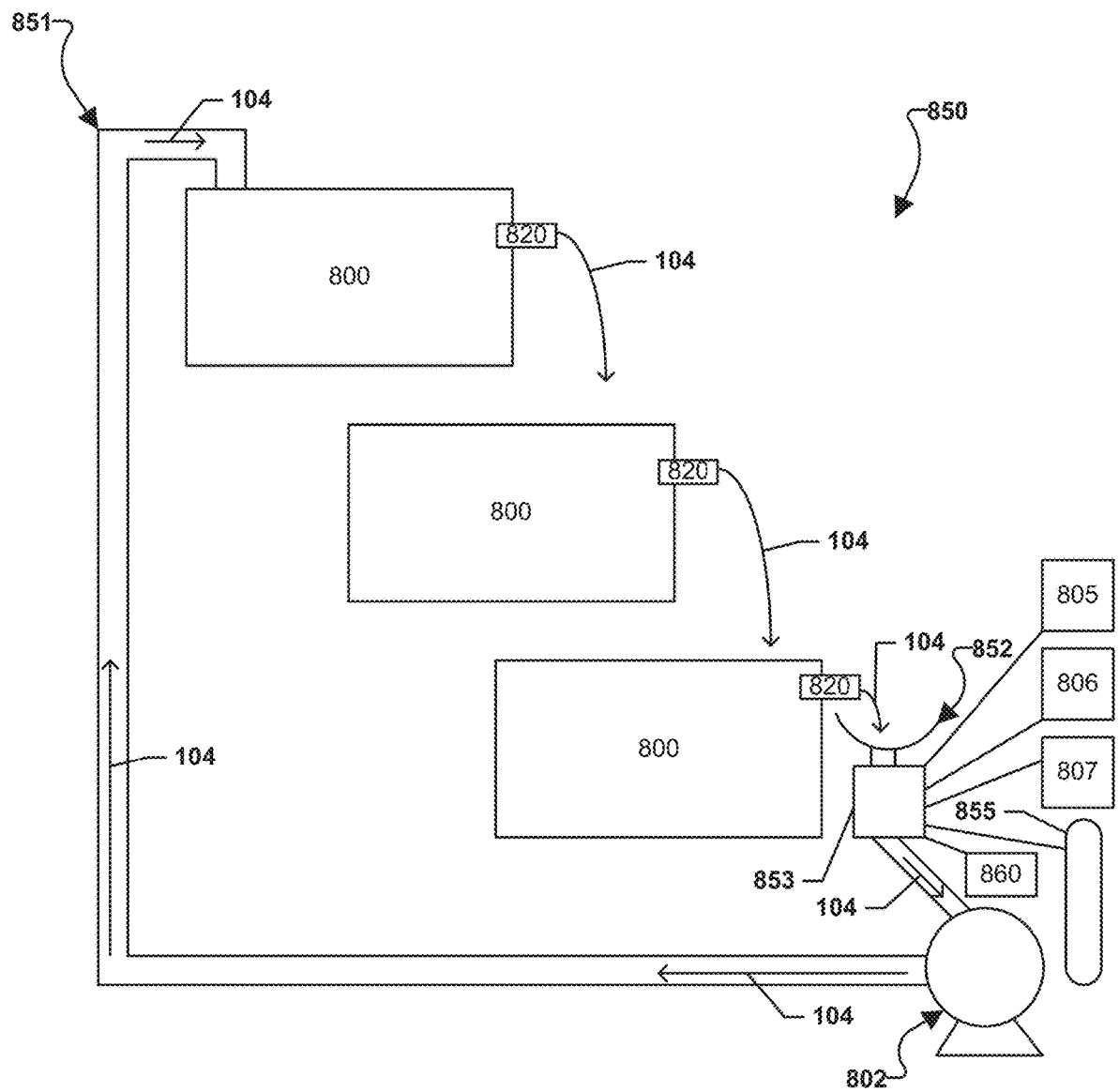
FIG. 8C is a schematic of a series of fluid connected electrochemical cells, according to various embodiments of the present disclosure.
Figure 14:
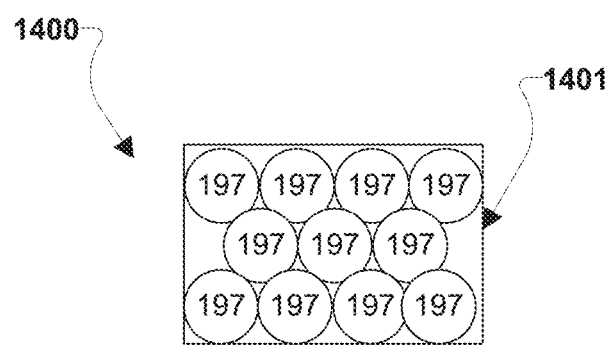
FIG. 14 is a schematic of a filtration device, according to various embodiments of the present disclosure.

FIG. 8C is a block diagram of a battery system 850 including a series of embodiment batteries 800 fluidly connected (or otherwise in liquid communication) according to various embodiments. The batteries 800 may be arranged in a cascade manner such that overflow electrolyte 104 from one battery 800 via its overflow drain 820 can flow into the next battery 800, establishing "liquid communication" between the batteries 800. Linking these batteries 800 in series allows one source to supply liquid electrolyte 104 to several batteries 800 simultaneously. For example, a single electrolyte supply pipe 851 connected to a pump 802 may supply electrolyte 104 to the first battery 800. The overflow of electrolyte from the first battery 800 may flow to the second battery 800 and to the third battery 800. From the third battery 800, the electrolyte may overflow into the return pipe 852 and be circulated by the pump 802 back to the supply pipe 851. In this manner, overflow from the final battery 800 can be re-circulated to the first battery 800. In the system 850 that utilizes shared electrolyte 104, flowing in a cascading fashion between batteries 800, attributes of the electrolyte 104 can be monitored and treated at a central location for many batteries, such as monitoring station 853. Electrolyte 104 mediation, such as performing compositional adjustments or adding components, in order to mitigate issues related to electrolyte carbonation, electrolyte dehydration, and the like, may be beneficially conducted at the monitoring station 853. The monitoring station 853 may be collocated with the collection structure for the circulating electrolyte 104, such as the return pipe 852. As an example, the monitoring station 853 may control the supply of electrolyte 104 from different reservoir and flow controller combinations (e.g., 805, 806, 807), a filtration device 860, and/or a reserve electrolyte supply tank 855. In various embodiments, the monitoring station 853 may be configured to monitor electrolyte health. Electrolyte health may be monitored while the battery is in operation in order to determine the appropriate time to replenish, replace, or treat the electrolyte 104. The feedback mechanism employed by the monitoring station 853 may be manual or automated. When the monitoring station 853 is an automated system, the electrolyte quality measurement may be one input to a control loop such as a proportional-integral-derivative (PID) loop that adjusts electrolyte constituent concentrations on a continuous basis. The electrolyte quality measurement may be done ex-situ on a small aliquot of the electrolyte 104, or may be done operando on the active electrolyte 104 while the batteries 800 are in operation. One non-limiting method for assessing electrolyte health is to measure the electrical conductivity of the electrolyte. One mechanism of degradation is carbonation of the electrolyte over time, due to $CO_2$ dissolution in the electrolyte from air. For example, a conductivity probe is used to evaluate the concentration of carbonate in the electrolyte. The conductivity probe is used to monitor the state of health of the electrolyte. While illustrated as part of a cascading system 850, the monitoring station 853 may similarly be part of an electrolyte delivery system for a single battery, such as the electrolyte system of FIG. 8A. The monitoring station 853 may control the release of electrolyte 104 from and/or to the reserve electrolyte supply tank 852 to increase and/or decrease the volume of electrolyte 104 in the system 850. The monitoring station 853 may control the flow of liquid through the filtration device 860. The filtration device 860 may be configured to filter liquid flowed through it, such as water, electrolyte 104, etc. and the monitoring station 853 may control the flow of liquid into and out of the filtration device 860. For example, the filtration device 860 may be a water filter, such as the water filter 1400 illustrated in FIG. 14. The water filter 1400 may be a packed bed 1401 of DRI that may operate as a water filtration device. In such an embodiment, the DRI may be housed in a column, creating a packed bed 1401 of DRI pellets 197. Particulate matter will be trapped within the pores inside DRI pellets 197 and within the void space between DRI pellets 197 as water flows through the bed 1401. Using pelletized iron as the filtration mechanism may enable the ability to tune pressure drop and filtration effectiveness.

Figure 9:
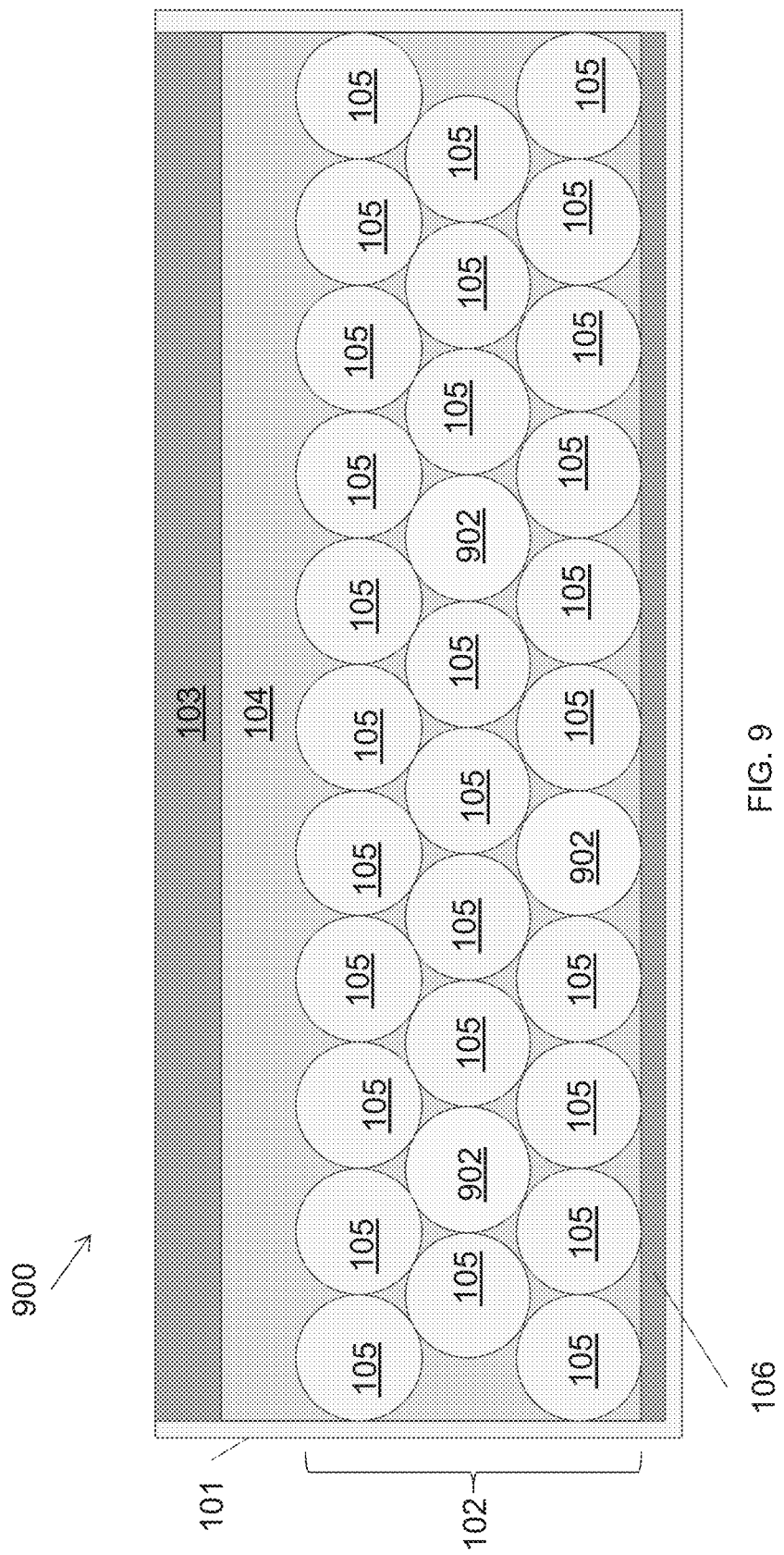
FIG. 9 is a schematic of an electrochemical cell including a mix of active material and additive material pellets, according to various embodiments of the present disclosure.

FIG. 9 is a schematic of a battery 900 according to various embodiments of the present disclosure. The battery 900 is similar to the battery 100, so only difference therebetween will be discussed in detail. Alkaline iron electrode batteries operate best with certain additives in the electrolyte/cell. These may have a range of solubilities, and some may have a most beneficial effect when intimately mixed with the solid electrode. As illustrated in FIG. 9, in various embodiments, pellets 902 including additives may be mixed with active-material dominant pellets 105 such that the negative electrode 102 may be a blended electrode. The additive pellets 902 may be partially and/or entirely formed from additives, e.g., an iron sulfur compound, such as FeS, $FeS_2$, etc. In various embodiments, the liquid electrolyte 104 may comprise additives to suppress the hydrogen evolution reaction at the anode or cathode. These may be soluble or insoluble, and may include metalloid HER inhibitors such as bismuth, antimony, tin, boron, indium, gallium, selenium. Additives may plate from solution or change phase during operation, for example, starting in dissolved solution and later precipitating as solids.

Figure 10:
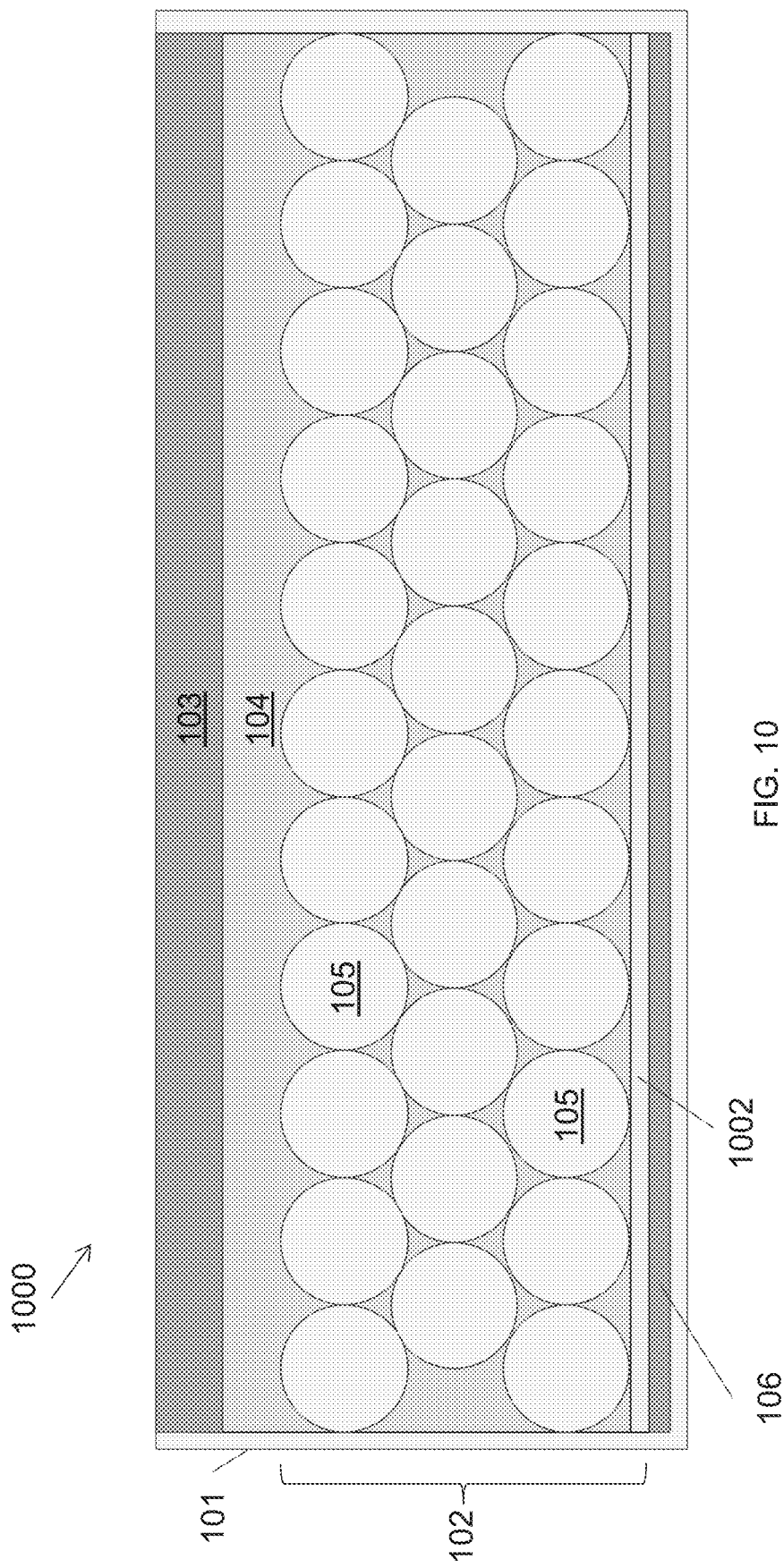
FIG. 10 is a schematic of an electrochemical cell, according to various embodiments of the present disclosure.

FIG. 10 is a schematic of a battery 1000 according to various embodiments of the present disclosure. The battery 1000 is similar to the battery 100, so only differences therebetween will be discussed in detail. Interfacial resistivity between the current collector 106 and the negative electrode 102 comprised of pellets 105 may be high due to the spherical structure of the pellets 105 contacting the current collector 106 in battery 100. Due to this, the electrode 102 sees an increased effective current density at the pellet contacts. In various embodiments, adding a layer 1002 of powdered iron (Fe) to the electrode 102 and current collector 106 interface as illustrated in battery 1000 of FIG. 10 may decrease interfacial resistivity. In battery 1000, the layer 1002 of powdered iron may be added at the bottom of the bed of pellets 105 to reduce the interfacial resistivity. The layer 1002 of powdered iron may be configured to form an interface between the pellets 105 and a current collector 106 of the battery 1000. The average width or diameter of the pellets 105 is at least 10 times greater than the average width or diameter of the powder particles in the layer 1002.

Figure 11:
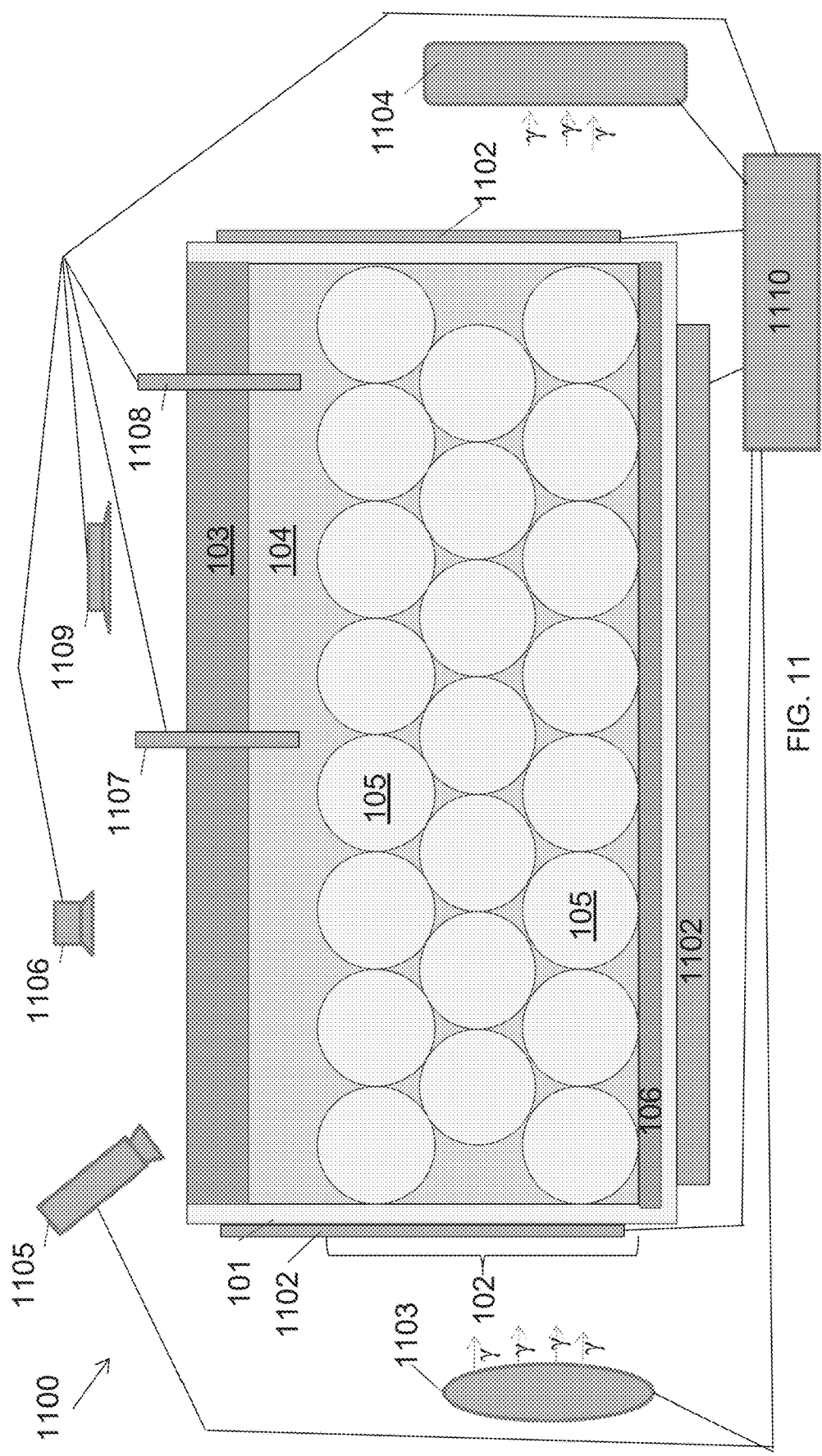
FIG. 11 is a schematic of an electrochemical cell, according to various embodiments of the present disclosure.

FIG. 11 is a schematic of a battery 1100 according to various embodiments of the present disclosure. The battery 1100 is similar to the battery 100, so only differences therebetween will be discussed in detail. The battery 1100 may include a monitoring system comprising one or more sensors connected (e.g., wirelessly or via a wire) to a controller 1110 configured to monitor the state-of-charge (SOC) and/or state-of-health (SOH) of the iron electrode 102. Monitoring the SOC and/or the SOH may be valuable for improving controls and health monitoring of the battery 1100.

Various embodiments may include one or more of various methods to monitor a chemical and/or physical attribute of the negative electrode 102 including using a Mossbauer spectrometer, using a charge coupled device (CCD) detector (e.g., a color camera, etc.), using a strain gauge, using a temperature sensor, measuring ion concentration, measuring electrolyte level displacement, measuring pellet bed height, measuring pellet size, measuring battery 1100 cell mass, measuring magnetic susceptibility, and using gas sensing. In various embodiments, a NiOH/NiOOH electrode, containing a carbon conductive additive and/or binder, may be used as a quasi-reference electrode to monitor potential. These NiOH/NiOOH electrodes may be placed at a variety of locations throughout the electrolyte vessel to also monitor potential distributions throughout the system.

For example, the SOC and/or SOH may be monitored in-situ by one or more strain gauges 1102 connected to the vessel 101. The one or more strain gauges 1102 may be connected to the controller 1110 and may output measurements of the strain on the vessel 101 to the controller 1110. The controller 1110 may be configured to convert the strain measurements to SOC and/or SOH measurements.

As another example, the SOC and/or SOH may be monitored in-situ by a Mossbauer spectrometer comprised of a gamma source 1103 and gamma detector 1104. The gamma source 1103 may output gamma rays through the battery 1100 which may be detected by the gamma detector 1104. The gamma source 1103 may be connected to the controller 1110 and the controller 1110 may control the gamma source 1103 to output gamma rays. The gamma detector 1104 may be connected to the controller 1110 and may output measurements of the gamma rays to the controller 1110. The controller 1110 may be configured to convert the gamma ray measurements to SOC and/or SOH measurements.

As a further example, the SOC and/or SOH may be monitored in-situ by one or more CCD detectors 1105 (e.g., a color camera, etc.) connected to the controller 1110. The CCD detector 1105 may capture and output images of the negative electrode 102 to the controller 1110. The controller 1110 may be configured to use the images to determine a SOC and/or SOH measurement. For example, the controller 1110 may be configured to correlate the color of the pellets 105 in the images to a SOC and/or SOH measurement. As another example, the controller 1110 may be configured to measure the pellet 105 size from the image data and/or may be configured to measure the pellet 105 bed height from the image data.

As a further example, the SOC and/or SOH may be monitored in-situ by one or more ultrasonic transducers 1106 connected to the controller 1110. The ultrasonic transducer 1106 may output sound wave measurements to the controller 1110. The controller 1110 may be configured to use the sound wave measurements to determine a SOC and/or SOH measurement. For example, based on the roundtrip time of the sound wave to the surface of the pellet 105 bed, changes in height in the pellet 105 bed may be determined by the controller 1110 and correlated with SOC and/or SOH measurements.

As a further example, the SOC and/or SOH may be monitored in-situ by one or more ion sensing electrodes 1107 connected to the controller 1110. The ion sensing electrode 1107 may output ion measurements, such as ion concentration, to the controller 1110. The controller 1110 may be configured to use the ion measurements to determine a SOC and/or SOH measurement.

As a further example, the SOC may be monitored in-situ by one or more thermocouples 1108 connected to the controller 1110. The thermocouple 1108 may output temperature measurements to the controller 1110. The controller 1110 may be configured to use the temperature measurements to determine a SOC and/or SOH measurement.

As a still further example, the SOC and/or SOH may be monitored in-situ by one or more gas sensors 1109 connected to the controller 1110. The gas sensor 1109 may output gas measurements, e.g., specific particle detections, concentrations, etc., to the controller 1110. The controller 1110 may be configured to use the gas measurements to determine a SOC and/or SOH measurement.

In various embodiments, the physical and/or chemical attributes of the battery 1100, and more specifically the negative electrode 102, measured by the various sensors 1102-1109 may be used by the controller 1110 to determine control operations to take in regard to the battery 1100, such as operations to ensure battery 1100 health based on the monitored SOC and/or SOH of the negative electrode 102.

Figure 13A:
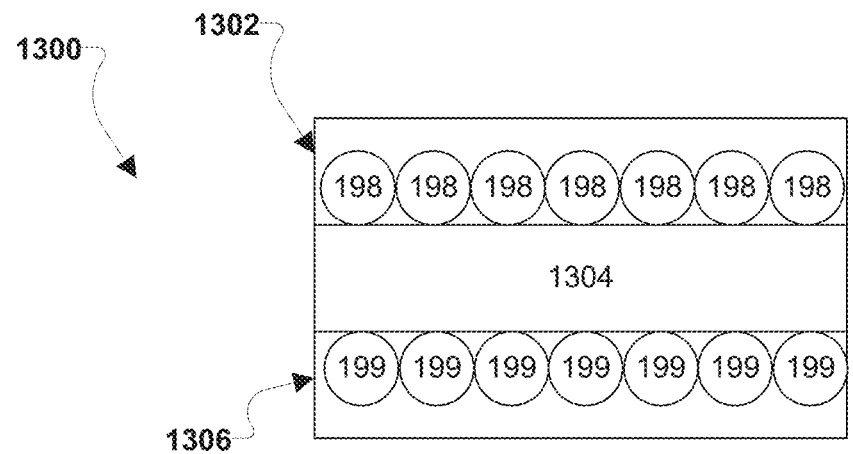
FIG. 13A is a schematic of an electrochemical cell, according to various embodiments of the present disclosure.

FIG. 13A illustrates a battery 1300 according to various embodiments. As an example, the battery 1300 is a static type battery that uses DRI. In some embodiments, the battery 1300 is a non-flowing aqueous type battery. In some embodiments, the battery 1300 may be a primary battery. In some embodiments, the battery 1300 may be a secondary battery. In some embodiments, the battery 1300 may include DRI pellets 198 in one electrode 1302 and/or may include DRI pellets 199 in another electrode 1306. While illustrated as both including DRI pellets 198, 199, in some configurations only one of the electrodes 1302 or 1306 may include DRI pellets 198, 199, respectively while in other configurations both electrodes 1302, 1306 may include DRI pellets 198, 199, respectively. In various embodiments, the electrodes 1302 and 1306 may be separated by electrolyte 1304. In various embodiments, the battery 1300 may be a sealed battery. In various embodiments, the battery 1300 may be an open battery, such as a battery open air type battery. In various embodiments, the DRI pellets 198 may be similar to the various DRI pellets (or other DRI type configurations) described herein, such as DRI pellets 105, 115, 305, etc.

In various embodiments, the electrode 1302 is an anode of the battery 1300 and the electrode 1306 is a cathode of the battery 1300. In various embodiments, DRI is used as a redox-active electrode material when the battery 1300 is of primary or secondary type. In one embodiment, DRI (such as DRI pellets 198) is used as an anode active material when the battery 1300 is a secondary battery. In another embodiment, DRI (such as DRI pellets 198, 199) is used as an electrode material with alkaline electrolyte (pH>9). In one particular embodiment, when the battery 1300 is an alkaline secondary battery, the battery 1300 may employ a nickel cathode. In this embodiment, DRI serves as the starting material for the anode of the Ni—Fe alkaline secondary battery 1300, and may be used in its as-received state or may be processed before use according to other embodiments described herein. Other electrochemical couples (combinations of a cathode and an anode) for use when the battery 1300 is an alkaline battery employing a DRI anode include iron/nickel (Fe/Ni cell) or iron/silver (Fe/Ag cell). In various embodiments, DRI may serve as an anode active material when the battery 1300 is a primary or secondary battery where the pH of the electrode spans the acidic (pH<5.5) or neutral (5.5<pH<9) regimes. As an example, DRI may be used as the anode active material in the battery 1300 employing an electrolyte containing hydrochloric acid (HCl) in the concentration range of 1-5 M. At the anode, the DRI may engage in the following half-cell reaction upon discharge: $Fe+2Cl^- \rightarrow FeCl_2+2e^-$.

DRI may specifically be used as the anode material when the battery 1300 is an all-Fe battery, where Fe is the reactive species at both the anode and cathode. In such an embodiment, the DRI may serve as a solid metallic Fe anode at 100% SOC, and the anode will form a soluble Fe' species (e.g., $FeCl_2$) upon discharge. The cathode active material may be a soluble inorganic Fe-based salt, such as the $FeCl_2/FeCl_3$ redox couple. The cathode active material may also be an inorganic- or organic-based coordination compound, such as $K_3Fe(CN)_6$. At the cathode, the soluble Fe species will undergo redox reactions associated with the $Fe^{2+}/Fe^{3+}$ redox couple. As one specific example, when the battery 1300 is an all-Fe battery employing DRI as the active material, the battery 1300 may utilize DRI as the anode material with an electrolyte containing concentration HCl (1-5 M). At the anode, the DRI would engage in the following half-cell reaction upon discharge: $Fe+2Cl^- \rightarrow FeCl_2+2e^-$. At the cathode, soluble $FeCl_3$ would undergo the following half-cell reaction upon discharge: $2FeCl_3+2e^- \rightarrow 2FeCl_2+2Cl^-$. The full cell reaction upon discharge would be $Fe+2FeCl_3 \rightarrow 3FeCl_2$. The DRI may be used as a feedstock for the soluble $FeCl_2$ required in solution to enable the cathode reaction by allowing the DRI to react with HCl in solution, will engage the following spontaneous chemical reaction: $Fe+2HCl \rightarrow FeCl_2+H_2$.

Figure 13B:
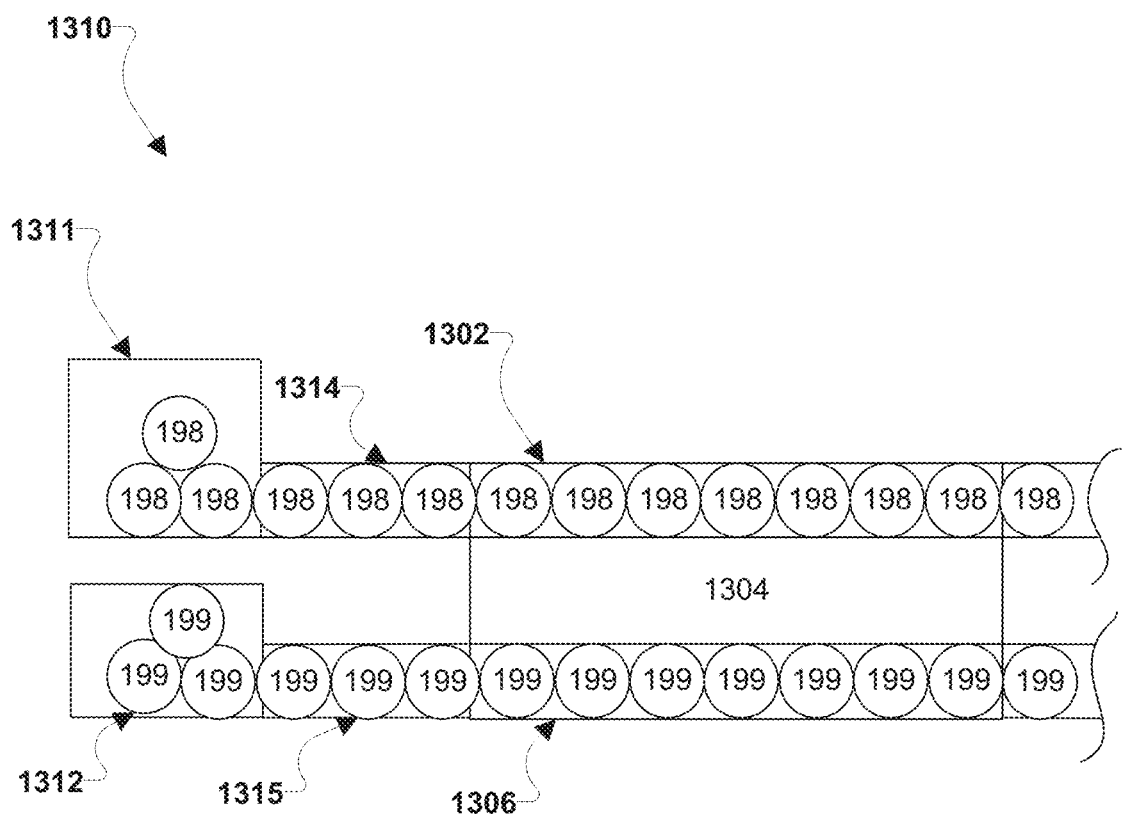
FIG. 13B is a schematic of an electrochemical cell, according to various embodiments of the present disclosure.

FIG. 13B illustrates a battery 1310 according to various embodiments. The battery 1310 is similar to the battery 1300 described above, except that the battery 1310 is a flow battery using DRI. In various embodiments, DRI pellets 198, 199, are transported from respective storage tanks 1311, 1312 through the electrodes 1302, 1306, respectively of the flow battery 1310 by one or more respective transport systems 1314, 1316. As an example, DRI may serve as the anode in the flow battery 1310 in which DRI pellets are transported from the storage tank through an electrochemical reactor where the DRI pellets react electrochemically. The DRI pellets remain in electrical contact with one another as they flow through the electrochemical reactor, enabling sufficient electrical percolation to provide high electrical conductivity through the collection of pellets. The electrolyte 1304 may be acidic (pH<5), neutral (5<pH<9), or alkaline (pH>9). In specific embodiments, the discharge reactions may proceed such that the metallic Fe anode forms a soluble product (e.g., $FeCl_2$) upon discharge, or a sparingly soluble (i.e., $Fe(OH)_2$) discharge product film on the surface of the transported DRI pellets. Specific embodiments concerning methods of transporting the DRI pellets through the battery 1310 via one or both of the transport systems 1314, 1316 include any of methods known in the art for transporting particulate matter or slurries or suspensions. For example, one or both of the transport systems 1314, 1316 may be without limitation pressure-driven fluid flow systems, a fluidized bed system, or a mechanical conveyor system, such as a conveyor belt, rotating drum, or a helical screw. In some embodiments, the transport systems 1314, 1316, such as a mechanical belt, screw, drum, etc., comprises an electronically conductive material such as a metal or carbon that also serves as a current collector of the battery 1310.

Various embodiments provide a method for making a sintered porous metal electrode including mixing metal and one or more additives to form a green formed pellet, and sintering the green formed pellet to form a sintered porous metal electrode. In various embodiments, the method includes mixing the metal and the one or more additives to form the green formed pellet by hot pressing the mixture of the metal and the one or more additives to form the green formed pellet. In various embodiments, the metal comprises iron. In various embodiments, at least one of the one or more additives is both a pore former and binder additive. In various embodiments, the one or more additives comprise an additive of polyethylene and an additive of bismuth sulfide powder. In various embodiments, at least one of the one or more additives is a pore former additive and at least one other of the one or more additives is a binder additive. In various embodiments, the binder additive is a mixture of two or more different type binders. In various embodiments, sintering the green formed pellet to form the sintered porous metal electrode comprises sintering the green formed pellet in a gas atmosphere at a time-temperature profile. In various embodiments, the gas atmosphere is a $N_2$ atmosphere or an $Ar/H_2$ atmosphere. In various embodiments, the gas atmosphere is a $Ar(95\%)/H_2$ (5%) atmosphere. In various embodiments, the time-temperature profile comprises a linear temperature ramp-up period, followed by a constant soak temperature period, followed by a linear ramp-down period. In various embodiments, the linear temperature ramp-up period raises a temperature of the green formed pellet to 850° C., a soak temperature is 850° C., and the linear ramp-down period drops a temperature of the green formed pellet to room temperature. In various embodiments, the constant soak temperature period is 15 minutes. In various embodiments, time-temperature profile comprises a non-linear temperature ramp-up period, two or more soak temperature periods with ramp-down and ramp-up periods in-between, and a non-linear ramp-down period.

Various embodiments may provide a method for making a sintered porous metal electrode, including feeding compressed metal powder into a continuous roller furnace, and passing the compressed metal powder though the furnace to sinter the metal powder together to form a sintered porous metal electrode. In various embodiments, the metal powder comprises iron oxide powder. In various embodiments, the method may include compressing the metal powder before feeding the metal powder into the furnace. In various embodiments, compressing the metal powder comprises passing the metal powder through a slot die or under a compression roller. In various embodiments, the method may include placing a metal sheet under the powder before feeding the metal powder into the furnace. In various embodiments, the metal sheet is received from a roll of metal being fed into the furnace and is supporting the compressed metal powder in the furnace. In various embodiments, the metal sheet is a metal foil. In various embodiments, the metal sheet comprises, nickel, iron, or steel. In various embodiments, the method may include cleaving the sintered porous metal electrode into sections. In various embodiments, the continuous roller furnace heats the metal powder in an atmosphere of hydrogen. In various other embodiments the continuous roller furnace heats the metal powder in an inert atmosphere of nitrogen or argon. In various other embodiments the continuous roller furnace heats the metal powder in an atmosphere that comprises a mixture of hydrogen, nitrogen, and/or argon.

Various embodiments may provide devices and/or methods for use in bulk energy storage systems, such as long duration energy storage (LODES) systems, short duration energy storage (SDES) systems, etc. As an example, various embodiments may provide batteries and/or components of batteries (e.g., any of batteries 100, 200, 400, 800, 814, 900, 1000, 1100, 1200, 1300, 1310, pellets 105, 115, 305, 198, 199, systems 850, etc.) for bulk energy storage systems, such as batteries for LODES systems. Renewable power sources are becoming more prevalent and cost effective. However, many renewable power sources face an intermittency problem that is hindering renewable power source adoption. The impact of the intermittent tendencies of renewable power sources may be mitigated by pairing renewable power sources with bulk energy storage systems, such as LODES systems, SDES systems, etc. To support the adoption of combined power generation, transmission, and storage systems (e.g., a power plant having a renewable power generation source paired with a bulk energy storage system and transmission facilities at any of the power plant and/or the bulk energy storage system) devices and methods to support the design and operation of such combined power generation, transmission, and storage systems, such as the various embodiment devices and methods described herein, are needed.

A combined power generation, transmission, and storage system may be a power plant including one or more power generation sources (e.g., one or more renewable power generation sources, one or more non-renewable power generations sources, combinations of renewable and non-renewable power generation sources, etc.), one or more transmission facilities, and one or more bulk energy storage systems. Transmission facilities at any of the power plant and/or the bulk energy storage systems may be co-optimized with the power generation and storage system or may impose constraints on the power generation and storage system design and operation. The combined power generation, transmission, and storage systems may be configured to meet various output goals, under various design and operating constraints.

EXAMPLES

The following examples are provided to illustrate various embodiments of systems, processes, compositions, applications and materials of the present inventions. These examples are for illustrative purposes, may be prophetic, and should not be viewed as limiting, and do not otherwise limit the scope of the present inventions.

FIGS. 15-23 illustrate various example systems in which one or more aspects of the various embodiments are used as part of bulk energy storage systems, such as LODES systems, SDES systems, etc. For example, various embodiment batteries and/or components described herein (e.g., any of batteries 100, 200, 400, 800, 814, 900, 1000, 1100, 1200, 1300, 1310, pellets 105, 115, 305, 198, 199, systems 850, etc.) may be used as batteries and/or components for bulk energy storage systems, such as LODES systems, SDES systems, etc. As used herein, the term "LODES system" unless expressly used otherwise, means a bulk energy storage system configured to may have a rated duration (energy/power ratio) of 24 hours (h) or greater, such as a duration of 24 h, a duration of 24 h to 50 h, a duration of greater than 50 h, a duration of 24 h to 150 h, a duration of greater than 150 h, a duration of 24 h to 200 h, a duration greater than 200 h, a duration of 24 h to 500 h, a duration greater than 500 h, etc.

Example 1

A storage system, have from one, five, ten, 50, 100, 500, or more electrochemical cells, having an electrode or electrodes that include constitutes direct reduced iron pellets. Preferably the store system is a long duration storage system, having long duration electrochemical cells.

Example 1A

The long duration storage system of Example 1, where the electrode has the properties shown in the following Table E1A:

TABLE E1A

| Shape of pellets | spheres |
|---|---|
| Pellets having total Fe (wt %) | 92 |
| Pellets having $SiO_2$ (wt %) | 1.5 |
| Pellets having $Al_2O_3$ (wt %) | 0.2 |
| Pellets having MgO (wt %) | 0.1 |
| Pellets having CaO (wt %) | 0.9 |
| Pellets having $TiO_2$ (wt %) | 0.05 |
| Pellets having $Fe_2C$ (wt %) | 80 |
| Metallization (%) | 94 |
| Bulk density of the electrode (g/cc) | 1.7 |
| Apparent density of the pellets (g/cc) | 3.5 |
| Actual density of the pellets (g/cc) | 6 |
| Minimum $d_{pore,\ 90\%\ volume}$ of the pellets (microns) | 0.966 |
| Minimum $d_{pore,\ 50\%\ surface\ area}$ of the pellets (microns) | 0.0114 |
| Specific surface area of the pellets ($m^2$/g) | 0.31 |

Example 1B

The long duration storage system of Example 1, where the electrode has the properties shown in the following Table E1B:

TABLE E1B

| Shape of pellets | beads |
|---|---|
| Pellets having total Fe (wt %) | 89 |
| Pellets having $SiO_2$ (wt %) | 2 |
| Pellets having $Al_2O_3$ (wt %) | 0.3 |
| Pellets having MgO (wt %) | 0.1 |
| Pellets having CaO (wt %) | 0.9 |
| Pellets having $TiO_2$ (wt %) | 0.05 |
| Pellets having $Fe_2C$ (wt %) | 15 |
| Metallization (%) | 94 |
| Bulk density of the electrode (g/cc) | 1.7 |
| Apparent density of the pellets (g/cc) | 3.5 |
| Actual density of the pellets (g/cc) | 6.1 |
| Minimum $d_{pore,\ 90\%\ volume}$ of the pellets (microns) | 4.53 |
| Minimum $d_{pore,\ 50\%\ surface\ area}$ of the pellets (microns) | 11.55 |
| Specific surface area of the pellets ($m^2$/g) | 0.69 |

Example 1C

The long duration storage system of Example 1, where the electrode has the properties shown in the following Table E1C:

TABLE E1C

| Shape of pellets | spheres |
|---|---|
| Pellets having total Fe (wt %) | 91 |
| Pellets having $SiO_2$ (wt %) | 1 |
| Pellets having $Al_2O_3$ (wt %) | 0.5 |
| Pellets having MgO (wt %) | 0.1 |
| Pellets having CaO (wt %) | 0.9 |
| Pellets having $TiO_2$ (wt %) | 0.05 |
| Pellets having $Fe_2C$ (wt %) | 0 |
| Metallization (%) | 94 |
| Bulk density of the electrode (g/cc) | 1.7 |
| Apparent density of the pellets (g/cc) | 3.3 |
| Actual density of the pellets (g/cc) | 5.9 |
| Minimum $d_{pore,\ 90\%\ volume}$ of the pellets (microns) | 4.4 |
| Minimum $d_{pore,\ 50\%\ surface\ area}$ of the pellets (microns) | 11.1 |
| Specific surface area of the pellets ($m^2$/g) | 0.74 |

Example 1D

The long duration storage system of Example 1, where the electrode has the properties shown in the following Table E1D:

TABLE E1D

| Shape of pellets | blocks |
|---|---|
| Pellets having total Fe (wt %) | 89 |
| Pellets having $SiO_2$ (wt %) | 2 |
| Pellets having $Al_2O_3$ (wt %) | 0.5 |
| Pellets having MgO (wt %) | 0.1 |
| Pellets having CaO (wt %) | 0.9 |
| Pellets having $TiO_2$ (wt %) | 0.05 |
| Pellets having $Fe_2C$ (wt %) | 15 |
| Metallization (%) | 94 |
| Bulk density of the electrode (g/cc) | 2.1 |
| Apparent density of the pellets (g/cc) | 3.6 |
| Actual density of the pellets (g/cc) | 6.2 |
| Minimum $d_{pore,\ 90\%\ volume}$ of the pellets (microns) | 4.2 |
| Minimum $d_{pore,\ 50\%\ surface\ area}$ of the pellets (microns) | 10.8 |
| Specific surface area of the pellets ($m^2/g$) | 0.72 |

Example 1E

The long duration storage system of Example 1, where the electrode has the properties shown in the following Table E1E:

TABLE E1E

| Shape of pellets | spheres |
|---|---|
| Pellets having total Fe (wt %) | 86 |
| Pellets having $SiO_2$ (wt %) | 3 |
| Pellets having $Al_2O_3$ (wt %) | 3 |
| Pellets having MgO (wt %) | 0.75 |
| Pellets having CaO (wt %) | 1.5 |
| Pellets having $TiO_2$ (wt %) | 0.75 |
| Pellets having $Fe_2C$ (wt %) | 70 |
| Metallization (%) | 92 |
| Bulk density of the electrode (g/cc) | 1.5 |
| Apparent density of the pellets (g/cc) | 3.3 |
| Actual density of the pellets (g/cc) | 6.1 |
| Minimum $d_{pore,\ 90\%\ volume}$ of the pellets (microns) | 1.77 |
| Minimum $d_{pore,\ 50\%\ surface\ area}$ of the pellets (microns) | 0.15 |
| Specific surface area of the pellets ($m^2/g$) | 0.12 |

Example 1F

The long duration storage system of Example 1, where the electrode has the properties shown in the following Table E1F:

TABLE E1F

| Shape of pellets | columns |
|---|---|
| Pellets having total Fe (wt %) | 85 |
| Pellets having $SiO_2$ (wt %) | 10 |
| Pellets having $Al_2O_3$ (wt %) | 1.5 |
| Pellets having MgO (wt %) | 0.1 |
| Pellets having CaO (wt %) | 1.5 |
| Pellets having $TiO_2$ (wt %) | 0.05 |
| Pellets having $Fe_2C$ (wt %) | 3 |
| Metallization (%) | 92 |
| Bulk density of the electrode (g/cc) | 2 |
| Apparent density of the pellets (g/cc) | 3.4 |
| Actual density of the pellets (g/cc) | 5.8 |

TABLE E1F-continued

| Shape of pellets | columns |
|---|---|
| Minimum $d_{pore,\ 90\%\ volume}$ of the pellets (microns) | 2.55 |
| Minimum $d_{pore,\ 50\%\ surface\ area}$ of the pellets (microns) | 1.74 |
| Specific surface area of the pellets ($m^2/g$) | 0.34 |

Example 1G

The long duration storage system of Example 1, where the electrode has the properties shown in the following Table E1G:

TABLE E1G

| Shape of pellets | spheres |
|---|---|
| Pellets having total Fe (wt %) | 84 |
| Pellets having $SiO_2$ (wt %) | 6 |
| Pellets having $Al_2O_3$ (wt %) | 5 |
| Pellets having MgO (wt %) | 1 |
| Pellets having CaO (wt %) | 1.5 |
| Pellets having $TiO_2$ (wt %) | 0.75 |
| Pellets having $Fe_2C$ (wt %) | 5 |
| Metallization (%) | 92 |
| Bulk density of the electrode (g/cc) | 2 |
| Apparent density of the pellets (g/cc) | 3.4 |
| Actual density of the pellets (g/cc) | 5.8 |
| Minimum $d_{pore,\ 90\%\ volume}$ of the pellets (microns) | 1.62 |
| Minimum $d_{pore,\ 50\%\ surface\ area}$ of the pellets (microns) | 0.57 |
| Specific surface area of the pellets ($m^2/g$) | 0.26 |

Example 1H

The long duration storage system of Example 1, where the electrode has the properties shown in the following Table E1H:

TABLE E1H

| Shape of pellets | spheres |
|---|---|
| Pellets having total Fe (wt %) | 84 |
| Pellets having $SiO_2$ (wt %) | 2 |
| Pellets having $Al_2O_3$ (wt %) | 0.2 |
| Pellets having MgO (wt %) | 10 |
| Pellets having CaO (wt %) | 0.9 |
| Pellets having $TiO_2$ (wt %) | 0.05 |
| Pellets having $Fe_2C$ (wt %) | 10 |
| Metallization (%) | 92 |
| Bulk density of the electrode (g/cc) | 2 |
| Apparent density of the pellets (g/cc) | 3.4 |
| Actual density of the pellets (g/cc) | 5.8 |
| Minimum $d_{pore,\ 90\%\ volume}$ of the pellets (microns) | 1.27 |
| Minimum $d_{pore\ 50\%\ surface\ area}$ of the pellets (microns) | 0.42 |
| Specific surface area of the pellets ($m^2/g$) | 0.41 |

Example 1I

The long duration storage system of Example 1, where the electrode has the properties shown in the following Table E1I:

TABLE E1I

| Shape of pellets | blocks |
|---|---|
| Pellets having total Fe (wt %) | 84 |
| Pellets having $SiO_2$ (wt %) | 1.5 |

TABLE E1I-continued

| Shape of pellets | blocks |
|---|---|
| Pellets having $Al_2O_3$ (wt %) | 2 |
| Pellets having MgO (wt %) | 0.1 |
| Pellets having CaO (wt %) | 10 |
| Pellets having $TiO_2$ (wt %) | 0.05 |
| Pellets having $Fe_2C$ (wt %) | 2 |
| Metallization (%) | 92 |
| Bulk density of the electrode (g/cc) | 2 |
| Apparent density of the pellets (g/cc) | 3.4 |
| Actual density of the pellets (g/cc) | 5.8 |
| Minimum $d_{pore,\ 90\%\ volume}$ of the pellets (microns) | 0.95 |
| Minimum $d_{pore,\ 50\%\ surface\ area}$ of the pellets (microns) | 0.78 |
| Specific surface area of the pellets ($m^2/g$) | 0.63 |

Example 1J

The long duration storage system of Example 1, where the electrode has the properties shown in the following Table E1J:

TABLE E1J

| Shape of pellets | disks |
|---|---|
| Pellets having total Fe (wt %) | 84 |
| Pellets having $SiO_2$ (wt %) | 4 |
| Pellets having $Al_2O_3$ (wt %) | 1 |
| Pellets having MgO (wt %) | 0.5 |
| Pellets having CaO (wt %) | 1.5 |
| Pellets having $TiO_2$ (wt %) | 5 |
| Pellets having $Fe_2C$ (wt %) | 10 |
| Metallization (%) | 92 |
| Bulk density of the electrode (g/cc) | 2 |
| Apparent density of the pellets (g/cc) | 3.4 |
| Actual density of the pellets (g/cc) | 5.8 |
| Minimum $d_{pore,\ 90\%\ volume}$ of the pellets (microns) | 1.52 |
| Minimum $d_{pore,\ 50\%\ surface\ area}$ of the pellets (microns) | 2.82 |
| Specific surface area of the pellets ($m^2/g$) | 0.51 |

Example 1K

The long duration storage system of Example 1, where the electrode has the properties shown in the following Table E1K:

TABLE E1K

| Shape of pellets | rods |
|---|---|
| Pellets having total Fe (wt %) | 84 |
| Pellets having $SiO_2$ (wt %) | 5 |
| Pellets having $Al_2O_3$ (wt %) | 5 |
| Pellets having MgO (wt %) | 2 |
| Pellets having CaO (wt %) | 1 |
| Pellets having $TiO_2$ (wt %) | 1.5 |
| Pellets having $Fe_2C$ (wt %) | 0 |
| Metallization (%) | 94 |
| Bulk density of the electrode (g/cc) | 1.8 |
| Apparent density of the pellets (g/cc) | 3.5 |
| Actual density of the pellets (g/cc) | 6 |
| Minimum $d_{pore,\ 90\%\ volume}$ of the pellets (microns) | 2.72 |
| Minimum $d_{pore,\ 50\%\ surface\ area}$ of the pellets (microns) | 2.79 |
| Specific surface area of the pellets ($m^2/g$) | 0.22 |

Example 1L

The long duration storage system of Example 1, where the electrode has the properties shown in the following Table E1L:

TABLE E1L

| Shape of pellets | Crushed spheres |
|---|---|
| Pellets having total Fe (wt %) | 85 |
| Pellets having $SiO_2$ (wt %) | 10 |
| Pellets having $Al_2O_3$ (wt %) | 0.2 |
| Pellets having MgO (wt %) | 1.4 |
| Pellets having CaO (wt %) | 0.9 |
| Pellets having $TiO_2$ (wt %) | 0.05 |
| Pellets having $Fe_2C$ (wt %) | 10 |
| Metallization (%) | 92 |
| Bulk density of the electrode (g/cc) | 1.9 |
| Apparent density of the pellets (g/cc) | 3.4 |
| Actual density of the pellets (g/cc) | 6.1 |
| Minimum $d_{pore,\ 90\%\ volume}$ of the pellets (microns) | 3.26 |
| Minimum $d_{pore,\ 50\%\ surface\ area}$ of the pellets (microns) | 7.71 |
| Specific surface area of the pellets ($m^2/g$) | 0.11 |

Example 1M

The long duration storage system of Example 1, where the electrode has the properties shown in the following Table E1M:

TABLE E1M

| Shape of pellets | briquettes |
|---|---|
| Pellets having total Fe (wt %) | 91 |
| Pellets having $SiO_2$ (wt %) | 3 |
| Pellets having $Al_2O_3$ (wt %) | 0.2 |
| Pellets having MgO (wt %) | 0.5 |
| Pellets having CaO (wt %) | 0.9 |
| Pellets having $TiO_2$ (wt %) | 0.05 |
| Pellets having $Fe_2C$ (wt %) | 2.5 |
| Metallization (%) | 91 |
| Bulk density of the electrode (g/cc) | 3.3 |
| Apparent density of the pellets (g/cc) | 5.2 |
| Actual density of the pellets (g/cc) | 6.2 |
| Minimum $d_{pore,\ 90\%\ volume}$ of the pellets (microns) | 0.094 |
| Minimum $d_{pore,\ 50\%\ surface\ area}$ of the pellets (microns) | 0.0084 |
| Specific surface area of the pellets ($m^2/g$) | 0.024 |

Example 1N

The long duration storage system of Example 1, where the electrode has the properties shown in the following Table E1N:

TABLE E1N

| Shape of pellets | briquettes |
|---|---|
| Pellets having total Fe (wt %) | 86 |
| Pellets having $SiO_2$ (wt %) | 9 |
| Pellets having $Al_2O_3$ (wt %) | 0.2 |
| Pellets having MgO (wt %) | 0.5 |
| Pellets having CaO (wt %) | 0.9 |
| Pellets having $TiO_2$ (wt %) | 0.05 |
| Pellets having $Fe_2C$ (wt %) | 40 |
| Metallization (%) | 90 |
| Bulk density of the electrode (g/cc) | 2.5 |
| Apparent density of the pellets (g/cc) | 5 |
| Actual density of the pellets (g/cc) | 6.3 |

TABLE E1N-continued

| Shape of pellets | briquettes |
|---|---|
| Minimum $d_{pore,\ 90\%\ volume}$ of the pellets (microns) | 1.84 |
| Minimum $d_{pore,\ 50\%\ surface\ area}$ of the pellets (microns) | 0.0171 |
| Specific surface area of the pellets (m²/g) | 0.015 |

Example 1O

The long duration storage system of Example 1, where the electrode has the properties shown in the following Table E1O:

TABLE E1O

| Shape of pellets | tubes |
|---|---|
| Pellets having total Fe (wt %) | 92 |
| Pellets having $SiO_2$ (wt %) | 1.7 |
| Pellets having $Al_2O_3$ (wt %) | 0.2 |
| Pellets having MgO (wt %) | 0.5 |
| Pellets having CaO (wt %) | 0.9 |
| Pellets having $TiO_2$ (wt %) | 0.05 |
| Pellets having $Fe_2C$ (wt %) | 50 |
| Metallization (%) | 94 |
| Bulk density of the electrode (g/cc) | 1.9 |
| Apparent density of the pellets (g/cc) | 3.9 |
| Actual density of the pellets (g/cc) | 6.2 |
| Minimum $d_{pore,\ 90\%\ volume}$ of the pellets (microns) | 0.096 |
| Minimum $d_{pore\ 50\%\ surface\ area}$ of the pellets (microns) | 0.0168 |
| Specific surface area of the pellets (m²/g) | 0.035 |

Example 1P

The long duration storage system of Example 1, where the electrode has the properties shown in the following Table E1P:

TABLE E1P

| Shape of pellets | Strips |
|---|---|
| Pellets having total Fe (wt %) | 84 |
| Pellets having $SiO_2$ (wt %) | 6 |
| Pellets having $Al_2O_3$ (wt %) | 3 |
| Pellets having MgO (wt %) | 0.5 |
| Pellets having CaO (wt %) | 0.9 |
| Pellets having $TiO_2$ (wt %) | 0.05 |
| Pellets having $Fe_2C$ (wt %) | 10 |
| Metallization (%) | 90 |
| Bulk density of the electrode (g/cc) | 1.8 |
| Apparent density of the pellets (g/cc) | 3.9 |
| Actual density of the pellets (g/cc) | 6.1 |
| Minimum $d_{pore,\ 90\%\ volume}$ of the pellets microns | 1.98 |
| Minimum $d_{pore,\ 50\%\ surface\ area}$ of the pellets (microns) | 0.0123 |
| Specific surface area of the pellets (m²/g) | 0.027 |

Example 1Q

The long duration storage system of Example 1, where the electrode has the properties shown in the following Table E1Q:

TABLE E1Q

| Shape of pellets | Powder |
|---|---|
| Pellets having total Fe (wt %) | 88 |
| Pellets having $SiO_2$ (wt %) | 7 |

TABLE E1Q-continued

| Shape of pellets | Powder |
|---|---|
| Pellets having $Al_2O_3$ (wt %) | 2 |
| Pellets having MgO (wt %) | 0.5 |
| Pellets having CaO (wt %) | 0.9 |
| Pellets having $TiO_2$ (wt %) | 0.05 |
| Pellets having $Fe_2C$ (wt %) | 10 |
| Metallization (%) | 95 |
| Bulk density of the electrode (g/cc) | 3.5 |
| Apparent density of the pellets (g/cc) | 6.3 |
| Actual density of the pellets (g/cc) | 6.6 |
| Minimum $d_{pore,\ 90\%\ volume}$ of the pellets (microns) | 0.015 |
| Minimum $d_{pore\ 50\%\ surface\ area}$ of the pellets (microns) | 0.012 |
| Specific surface area of the pellets (m²/g) | 1.21 |

Example 1R

The long duration storage system of Example 1, where the electrode has the properties shown in the following Table E1R:

TABLE E1R

| Shape of pellets | spheres |
|---|---|
| Pellets having total Fe (wt %) | 80 |
| Pellets having $SiO_2$ (wt %) | 4.9 |
| Pellets having $Al_2O_3$ (wt %) | 0.3 |
| Pellets having MgO (wt %) | 1.2 |
| Pellets having CaO (wt %) | 0.75 |
| Pellets having $TiO_2$ (wt %) | 0.032 |
| Pellets having $Fe_2C$ (wt %) | 5 |
| Metallization (%) | 60 |
| Bulk density of the electrode (g/cc) | 1.7 |
| Apparent density of the pellets (g/cc) | 5.1 |
| Actual density of the pellets (g/cc) | 5.4 |
| Minimum $d_{pore,\ 90\%\ volume}$ of the pellets (microns) | 0.0488 |
| Minimum $d_{pore,\ 50\%\ surface\ area}$ of the pellets (microns) | 0.0255 |
| Specific surface area of the pellets (m²/g) | 24 |

Example 2

Figure 15:
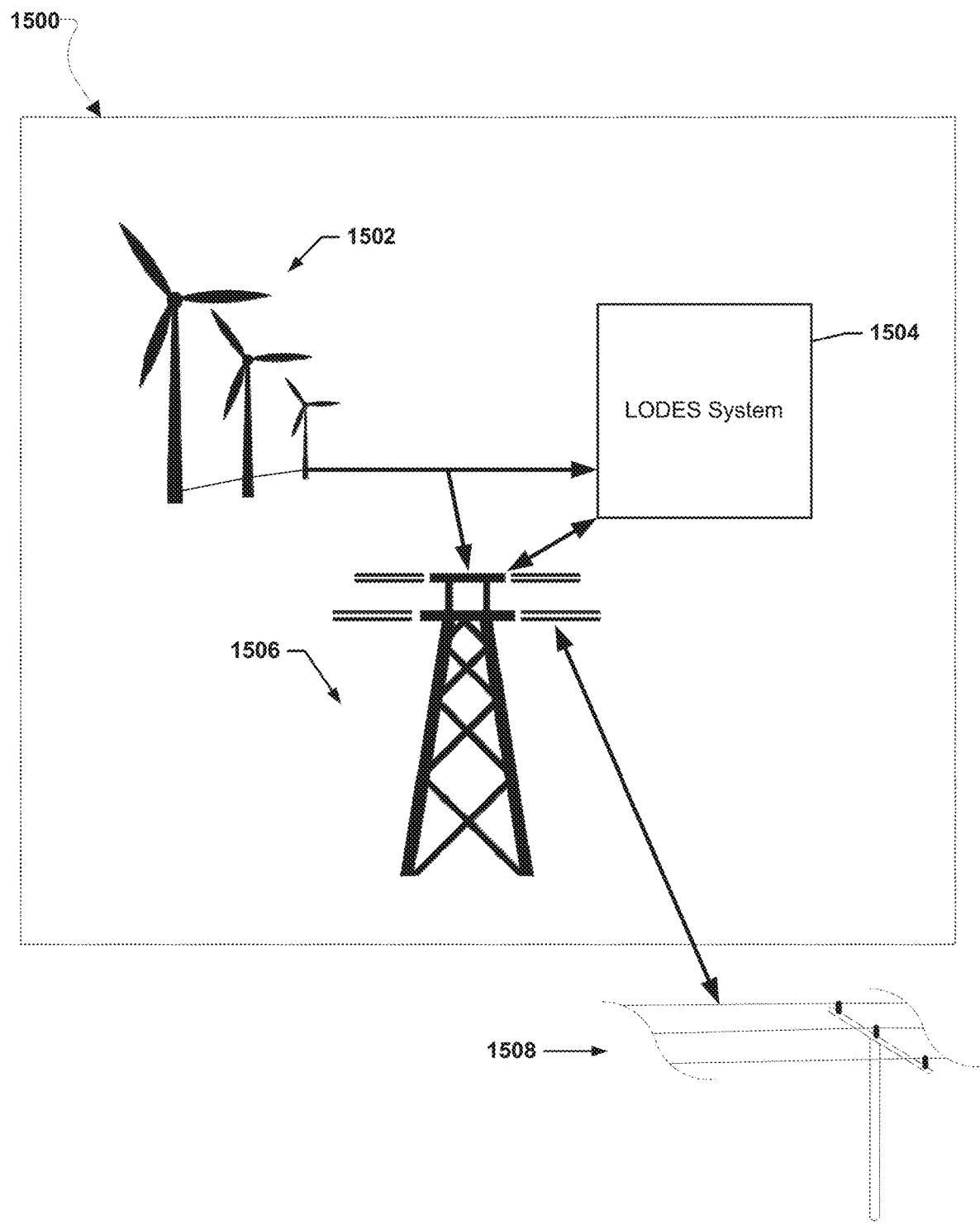
FIGS. 15-23 illustrate various example systems in which one or more aspects of the various embodiments may be used as part of bulk energy storage systems.

FIG. 15 illustrates an example system in which one or more aspects of the various embodiments may be used as part of bulk energy storage system. As a specific example, the bulk energy storage system incorporating one or more aspects of the various embodiments may be a LODES system 1504. As an example, the LODES system 1504 may include any of the various embodiment batteries and/or components described herein (e.g., any of batteries 100, 200, 400, 800, 814, 900, 1000, 1100, 1200, 1300, 1310, pellets 105, 115, 305, 198, 199, systems 850, etc.), singularly or in various combinations. The LODES system 1504 may be electrically connected to a wind farm 1502 and one or more transmission facilities 1506. The wind farm 1502 may be electrically connected to the transmission facilities 1506. The transmission facilities 1506 may be electrically connected to the grid 1508. The wind farm 1502 may generate power and the wind farm 1502 may output generated power to the LODES system 1504 and/or the transmission facilities 1506. The LODES system 1504 may store power received from the wind farm 1502 and/or the transmission facilities 1506. The LODES system 1504 may output stored power to the transmission facilities 1506. The transmission facilities 1506 may output power received from one or both of the wind farm 1502 and LODES system 1504 to the grid 1508 and/or may receive power from the grid 1508 and output that power to the LODES system 1504. Together the wind farm 1502, the LODES system 1504, and the transmission facilities 1506 may constitute a power plant 1500 that may be a combined power generation, transmission, and storage system. The power generated by the wind farm 1502 may be directly fed to the grid 1508 through the transmission facilities 1506, or may be first stored in the LODES system 1504. In certain cases the power supplied to the grid 1508 may come entirely from the wind farm 1502, entirely from the LODES system 1504, or from a combination of the wind farm 1502 and the LODES system 1504. The dispatch of power from the combined wind farm 1502 and LODES system 1504 power plant 1500 may be controlled according to a determined long-range (multi-day or even multi-year) schedule, or may be controlled according to a day-ahead (24 hour advance notice) market, or may be controlled according to an hour-ahead market, or may be controlled in response to real time pricing signals.

As one example of operation of the power plant 1500, the LODES system 1504 may be used to reshape and "firm" the power produced by the wind farm 1502. In one such example, the wind farm 1502 may have a peak generation output (capacity) of 260 megawatts (MW) and a capacity factor (CF) of 41%. The LODES system 1504 may have a power rating (capacity) of 106 MW, a rated duration (energy/power ratio) of 150 hours (h), and an energy rating of 15,900 megawatt hours (MWh). In another such example, the wind farm 1502 may have a peak generation output (capacity) of 300 MW and a capacity factor (CF) of 41%. The LODES system 1504 may have a power rating of 106 MW, a rated duration (energy/power ratio) of 200 h and an energy rating of 21,200 MWh. In another such example, the wind farm 1502 may have a peak generation output (capacity) of 176 MW and a capacity factor (CF) of 53%. The LODES system 1504 may have a power rating (capacity) of 88 MW, a rated duration (energy/power ratio) of 150 h and an energy rating of 13,200 MWh. In another such example, the wind farm 1502 may have a peak generation output (capacity) of 277 MW and a capacity factor (CF) of 41%. The LODES system 1504 may have a power rating (capacity) of 97 MW, a rated duration (energy/power ratio) of 50 h and an energy rating of 4,850 MWh. In another such example, the wind farm 1502 may have a peak generation output (capacity) of 315 MW and a capacity factor (CF) of 41%. The LODES system 1504 may have a power rating (capacity) of 110 MW, a rated duration (energy/power ratio) of 25 h and an energy rating of 2,750 MWh.

Example 2A

The System of Example 2 where in the LODES system utilizes one or more of the storage systems of Examples 1, 1A, 1B, 1C, 1D, 1E, 1F, 1G, 1H, 1I, 1J, 1K, 1L, 1M, 1N, 1O, 1P, 1Q, and 1R.

Example 3

Figure 16:
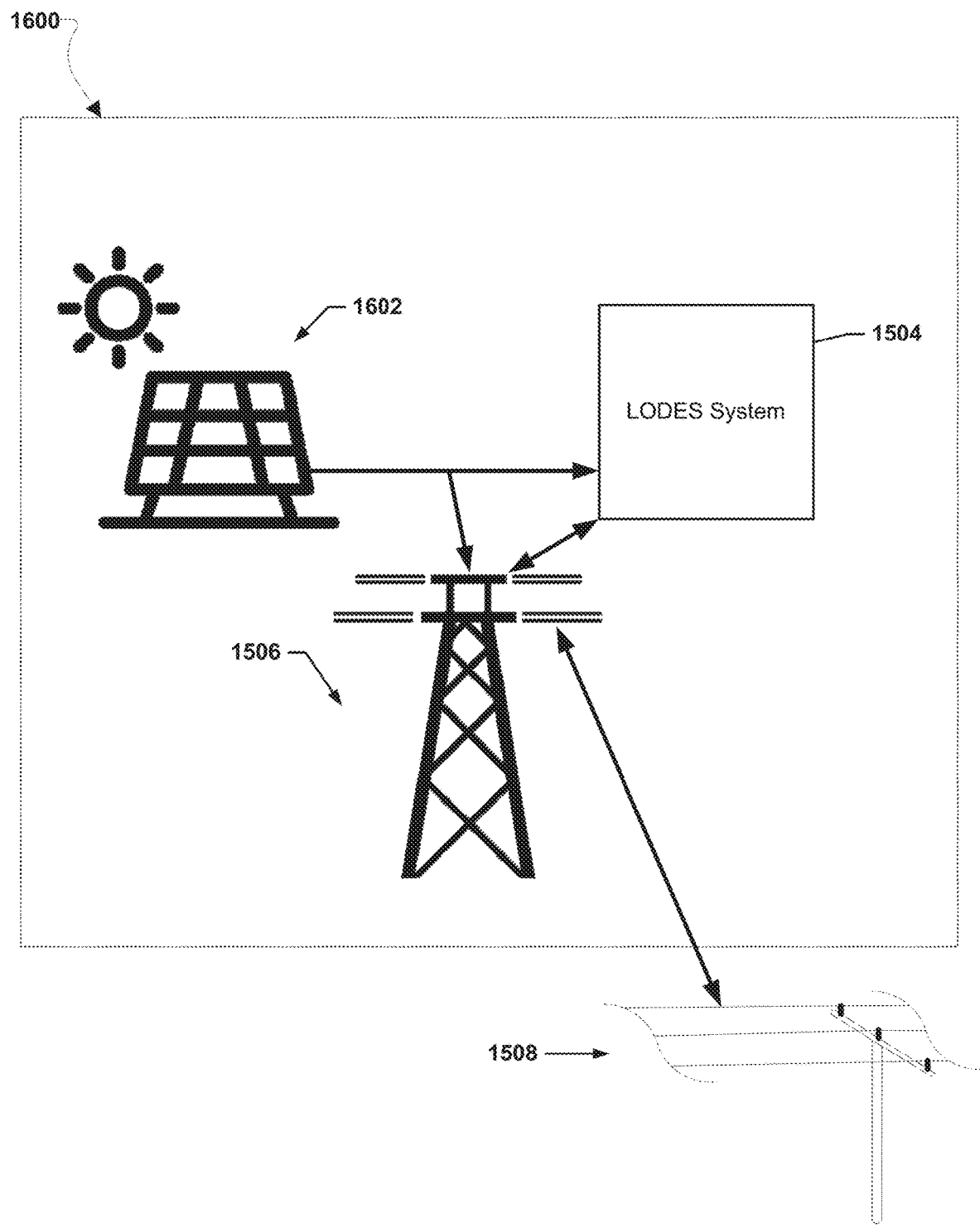

FIG. 16 illustrates an example system in which one or more aspects of the various embodiments may be used as part of bulk energy storage system. As a specific example, the bulk energy storage system incorporating one or more aspects of the various embodiments may be a LODES system 1504. As an example, the LODES system 1504 may include any of the various embodiment batteries and/or components described herein (e.g., any of batteries 100, 200, 400, 800, 814, 900, 1000, 1100, 1200, 1300, 1310, pellets 105, 115, 305, 198, 199, systems 850, etc.), singularly or in various combinations. The system of FIG. 16 may be similar to the system of FIG. 15, except a photovoltaic (PV) farm 1602 may be substituted for the wind farm 1502. The LODES system 1504 may be electrically connected to the PV farm 1602 and one or more transmission facilities 1506. The PV farm 1602 may be electrically connected to the transmission facilities 1506. The transmission facilities 1506 may be electrically connected to the grid 1508. The PV farm 1602 may generate power and the PV farm 1602 may output generated power to the LODES system 1504 and/or the transmission facilities 1506. The LODES system 1504 may store power received from the PV farm 1602 and/or the transmission facilities 1506. The LODES system 1504 may output stored power to the transmission facilities 1506. The transmission facilities 1506 may output power received from one or both of the PV farm 1602 and LODES system 1504 to the grid 1508 and/or may receive power from the grid 1508 and output that power to the LODES system 1504. Together the PV farm 1602, the LODES system 1504, and the transmission facilities 1506 may constitute a power plant 1600 that may be a combined power generation, transmission, and storage system. The power generated by the PV farm 1602 may be directly fed to the grid 1508 through the transmission facilities 1506, or may be first stored in the LODES system 1504. In certain cases the power supplied to the grid 1508 may come entirely from the PV farm 1602, entirely from the LODES system 1504, or from a combination of the PV farm 1602 and the LODES system 1504. The dispatch of power from the combined PV farm 1602 and LODES system 1504 power plant 1600 may be controlled according to a determined long-range (multi-day or even multi-year) schedule, or may be controlled according to a day-ahead (24 hour advance notice) market, or may be controlled according to an hour-ahead market, or may be controlled in response to real time pricing signals.

As one example of operation of the power plant 1600, the LODES system 1504 may be used to reshape and "firm" the power produced by the PV farm 1602. In one such example, the PV farm 1602 may have a peak generation output (capacity) of 490 MW and a capacity factor (CF) of 24%. The LODES system 1504 may have a power rating (capacity) of 340 MW, a rated duration (energy/power ratio) of 150 h and an energy rating of 51,000 MWh. In another such example, the PV farm 1602 may have a peak generation output (capacity) of 680 MW and a capacity factor (CF) of 24%. The LODES system 1504 may have a power rating (capacity) of 410 MW, a rated duration (energy/power ratio) of 200 h, and an energy rating of 82,000 MWh. In another such example, the PV farm 1602 may have a peak generation output (capacity) of 330 MW and a capacity factor (CF) of 31%. The LODES system 1504 may have a power rating (capacity) of 215 MW, a rated duration (energy/power ratio) of 150 h, and an energy rating of 32,250 MWh. In another such example, the PV farm 1602 may have a peak generation output (capacity) of 510 MW and a capacity factor (CF) of 24%. The LODES system 1504 may have a power rating (capacity) of 380 MW, a rated duration (energy/power ratio) of 50 h, and an energy rating of 19,000 MWh. In another such example, the PV farm 1602 may have a peak generation output (capacity) of 630 MW and a capacity factor (CF) of 24%. The LODES system 1504 may have a power rating (capacity) of 380 MW, a rated duration (energy/power ratio) of 25 h, and an energy rating of 9,500 MWh.

Example 3A

The System of Example 3 where in the LODES system utilizes one or more of the storage systems of Examples 1, 1A, 1B, 1C, 1D, 1E, 1F, 1G, 1H, 1I, 1J, 1K, 1L, 1M, 1N, 1O, 1P, 1Q, and 1R.

Example 4

Figure 17:
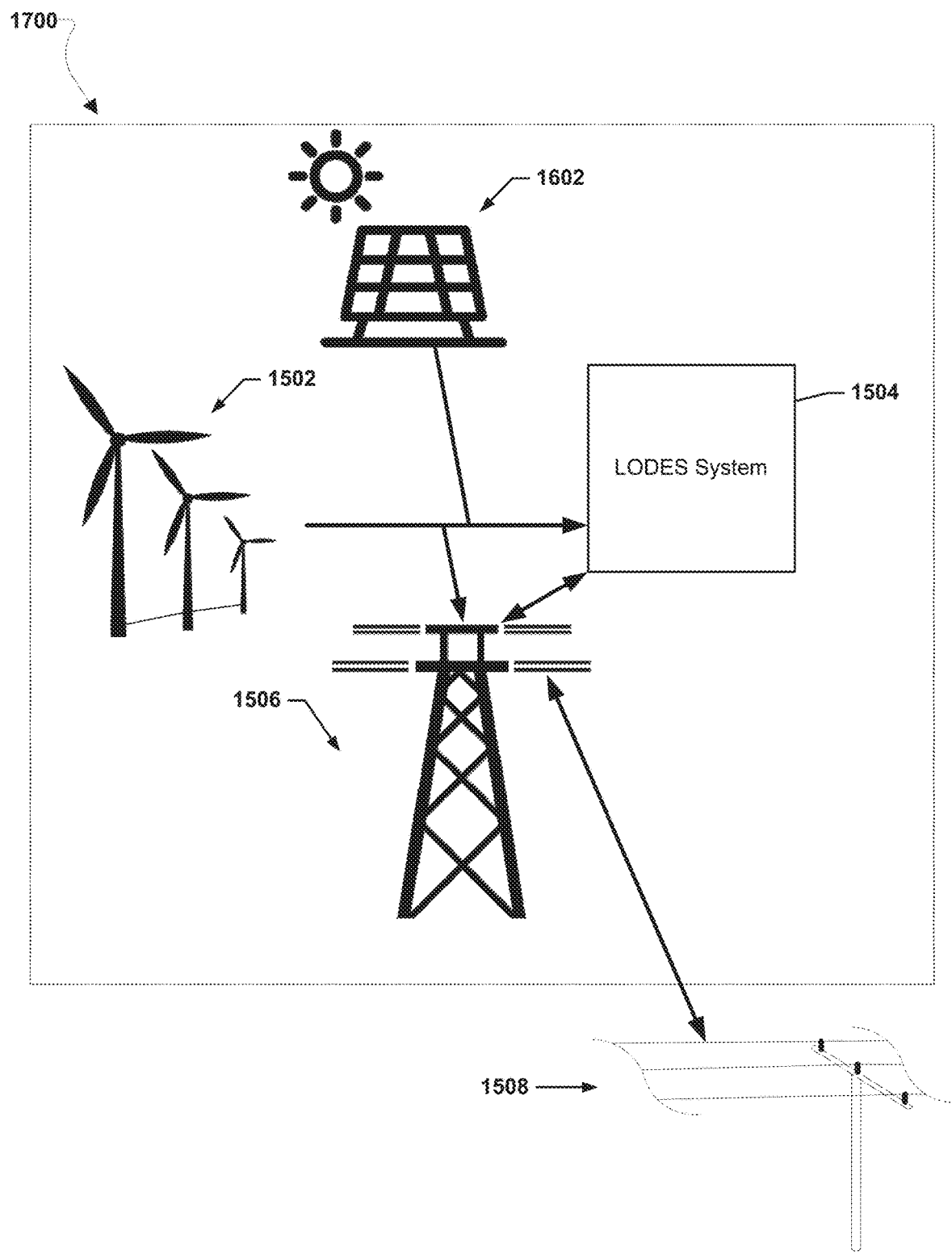

FIG. 17 illustrates an example system in which one or more aspects of the various embodiments may be used as part of bulk energy storage system. As a specific example, the bulk energy storage system incorporating one or more aspects of the various embodiments may be a LODES system 1504. As an example, the LODES system 1504 may include any of the various embodiment batteries and/or components described herein (e.g., any of batteries 100, 200, 400, 800, 814, 900, 1000, 1100, 1200, 1300, 1310, pellets 105, 115, 305, 198, 199, systems 850, etc.), singularly or in various combinations. The system of FIG. 17 may be similar to the systems of FIGS. 15 and 16, except the wind farm '1502 and the photovoltaic (PV) farm 1602 may both be power generators working together in the power plant 1700. Together the PV farm 1602, wind farm 1502, the LODES system 1504, and the transmission facilities 1506 may constitute the power plant 1700 that may be a combined power generation, transmission, and storage system. The power generated by the PV farm 1602 and/or the wind farm 1502 may be directly fed to the grid 1508 through the transmission facilities 1506, or may be first stored in the LODES system 1504. In certain cases the power supplied to the grid 1508 may come entirely from the PV farm 1602, entirely from the wind farm 1502, entirely from the LODES system 1504, or from a combination of the PV farm 1602, the wind farm 1502, and the LODES system 1504. The dispatch of power from the combined wind farm 1502, PV farm 1602, and LODES system 1504 power plant 1700 may be controlled according to a determined long-range (multi-day or even multi-year) schedule, or may be controlled according to a day-ahead (24 hour advance notice) market, or may be controlled according to an hour-ahead market, or may be controlled in response to real time pricing signals.

As one example of operation of the power plant 1700, the LODES system 1504 may be used to reshape and "firm" the power produced by the wind farm 1502 and the PV farm 1602. In one such example, the wind farm 1502 may have a peak generation output (capacity) of 126 MW and a capacity factor (CF) of 41% and the PV farm 1602 may have a peak generation output (capacity) of 126 MW and a capacity factor (CF) of 24%. The LODES system 1504 may have a power rating (capacity) of 63 MW, a rated duration (energy/power ratio) of 150 h, and an energy rating of 9,450 MWh. In another such example, the wind farm 1502 may have a peak generation output (capacity) of 170 MW and a capacity factor (CF) of 41% and the PV farm 1602 may have a peak generation output (capacity) of 110 MW and a capacity factor (CF) of 24%. The LODES system 1504 may have a power rating (capacity) of 57 MW, a rated duration (energy/power ratio) of 200 h, and an energy rating of 11,400 MWh. In another such example, the wind farm 1502 may have a peak generation output (capacity) of 105 MW and a capacity factor (CF) of 51% and the PV farm 1602 may have a peak generation output (capacity) of 70 MW and a capacity factor (CF) of 31 The LODES system 1504 may have a power rating (capacity) of 61 MW, a rated duration (energy/power ratio) of 150 h, and an energy rating of 9,150 MWh. In another such example, the wind farm 1502 may have a peak generation output (capacity) of 135 MW and a capacity factor (CF) of 41% and the PV farm 1602 may have a peak generation output (capacity) of 90 MW and a capacity factor (CF) of 24%. The LODES system 1504 may have a power rating (capacity) of 68 MW, a rated duration (energy/power ratio) of 50 h, and an energy rating of 3,400 MWh. In another such example, the wind farm 1502 may have a peak generation output (capacity) of 144 MW and a capacity factor (CF) of 41% and the PV farm 1602 may have a peak generation output (capacity) of 96 MW and a capacity factor (CF) of 24%. The LODES system 1504 may have a power rating (capacity) of 72 MW, a rated duration (energy/power ratio) of 25 h, and an energy rating of 1,800 MWh.

Example 4A

The System of Example 4 where in the LODES system utilizes one or more of the storage systems of Examples 1, 1, 1A, 1B, 1C, 1D, 1E, 1F, 1G, 1H, 1I, 1J, 1K, 1L, 1M, 1N, 1O, 1P, 1Q, and 1R.

Example 5

Figure 18:
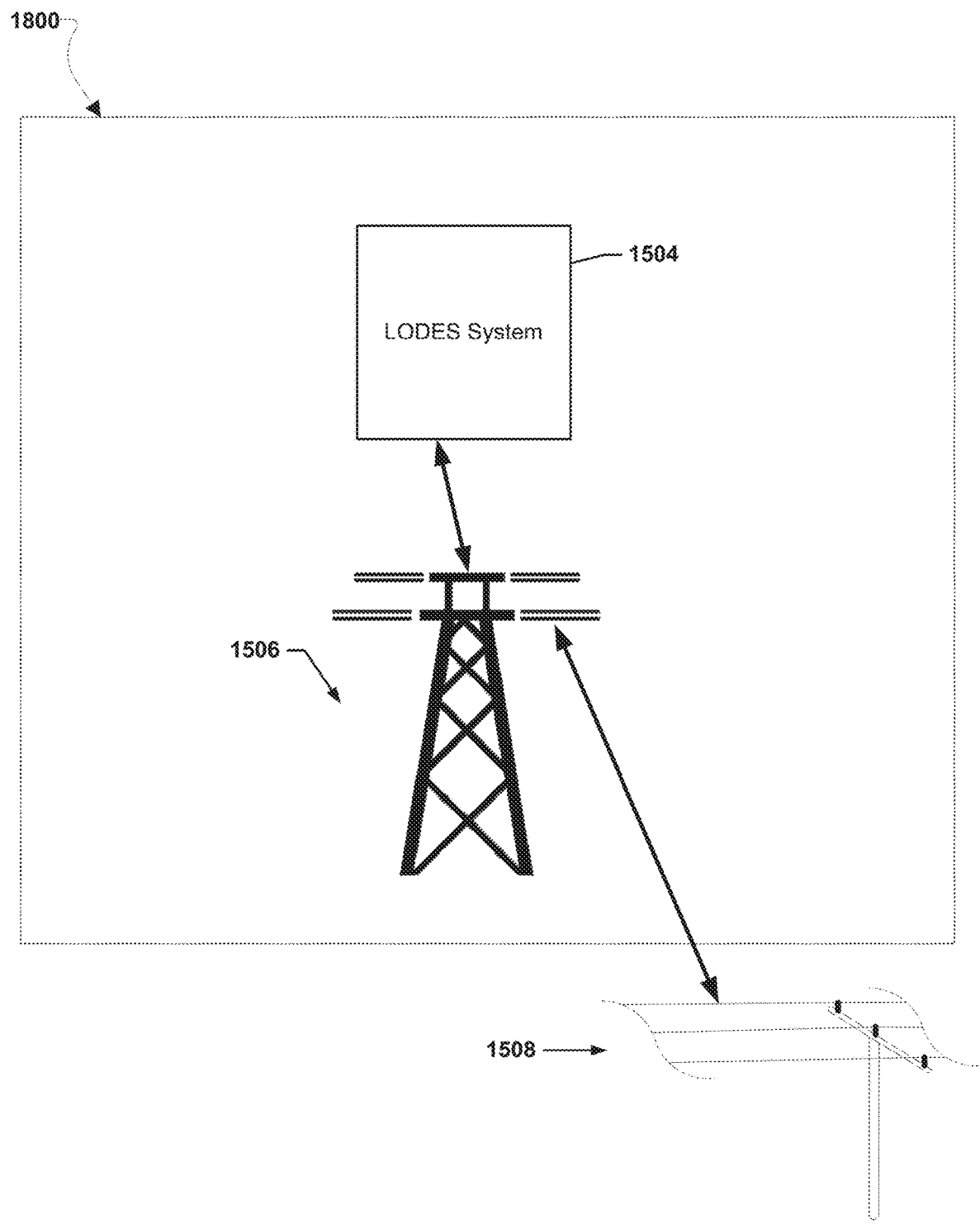

FIG. 18 illustrates an example system in which one or more aspects of the various embodiments may be used as part of bulk energy storage system. As a specific example, the bulk energy storage system incorporating one or more aspects of the various embodiments may be a LODES system 1504. As an example, the LODES system 1504 may include any of the various embodiment batteries and/or components described herein (e.g., any of batteries 100, 200, 400, 800, 814, 900, 1000, 1100, 1200, 1300, 1310, pellets 105, 115, 305, 198, 199, systems 850, etc.), singularly or in various combinations. The LODES system 1504 may be electrically connected to one or more transmission facilities 1506. In this manner, the LODES system 1504 may operate in a "stand-alone" manner to arbiter energy around market prices and/or to avoid transmission constraints. The LODES system 1504 may be electrically connected to one or more transmission facilities 1506. The transmission facilities 1506 may be electrically connected to the grid 1508. The LODES system 1504 may store power received from the transmission facilities 1506. The LODES system 1504 may output stored power to the transmission facilities 1506. The transmission facilities 1506 may output power received from the LODES system 1504 to the grid 1508 and/or may receive power from the grid 1508 and output that power to the LODES system 1504.

Together the LODES system 1504 and the transmission facilities 1506 may constitute a power plant 1800. As an example, the power plant 1800 may be situated downstream of a transmission constraint, close to electrical consumption. In such an example downstream situated power plant 1800, the LODES system 1504 may have a duration of 24 h to 500 h and may undergo one or more full discharges a year to support peak electrical consumptions at times when the transmission capacity is not sufficient to serve customers. Additionally, in such an example downstream situated power plant 1800, the LODES system 1504 may undergo several shallow discharges (daily or at higher frequency) to arbiter the difference between nighttime and daytime electricity prices and reduce the overall cost of electrical service to customer. As a further example, the power plant 1800 may be situated upstream of a transmission constraint, close to electrical generation. In such an example upstream situated power plant 1800, the LODES system 1504 may have a duration of 24 h to 500 h and may undergo one or more full charges a years to absorb excess generation at times when the transmission capacity is not sufficient to distribute the electricity to customers. Additionally, in such an example upstream situated power plant 1800, the LODES system 1504 may undergo several shallow charges and discharges (daily or at higher frequency) to arbiter the difference between nighttime and daytime electricity prices and maximize the value of the output of the generation facilities.

Example 5A

The System of Example 5 where in the LODES system utilizes one or more of the storage systems of Examples 1, 1A, 1B, 1C, 1D, 1E, 1F, 1G, 1H, 1I, 1J, 1K, 1L, 1M, 1N, 1O, 1P, 1Q, and 1R.

Example 6

Figure 19:
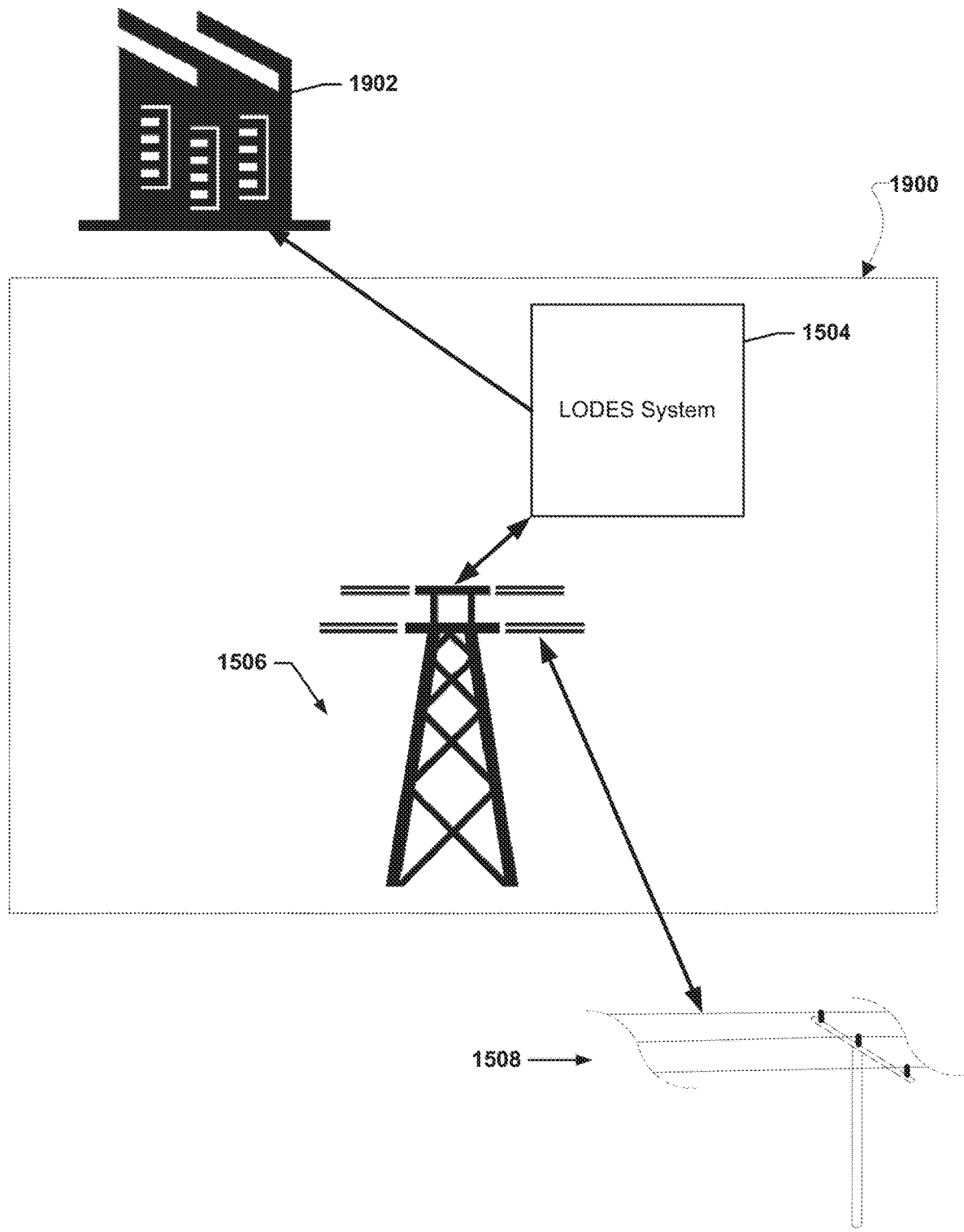

FIG. 19 illustrates an example system in which one or more aspects of the various embodiments may be used as part of bulk energy storage system. As a specific example, the bulk energy storage system incorporating one or more aspects of the various embodiments may be a LODES system 1504. As an example, the LODES system 1504 may include any of the various embodiment batteries and/or components described herein (e.g., any of batteries 100, 200, 400, 800, 814, 900, 1000, 1100, 1200, 1300, 1310, pellets 105, 115, 305, 198, 199, systems 850, etc.), singularly or in various combinations. The LODES system 1504 may be electrically connected to a commercial and industrial (C&I) customer 1902, such as a data center, factory, etc. The LODES system 1504 may be electrically connected to one or more transmission facilities 1506. The transmission facilities 1506 may be electrically connected to the grid 1508. The transmission facilities 1506 may receive power from the grid 1508 and output that power to the LODES system 1504. The LODES system 1504 may store power received from the transmission facilities 1506. The LODES system 1504 may output stored power to the C&I customer 1902. In this manner, the LODES system 1504 may operate to reshape electricity purchased from the grid 1508 to match the consumption pattern of the C&I customer 1902.

Together, the LODES system 1504 and transmission facilities 1506 may constitute a power plant 1900. As an example, the power plant 1900 may be situated close to electrical consumption, i.e., close to the C&I customer 1902, such as between the grid 1508 and the C&I customer 1902. In such an example, the LODES system 1504 may have a duration of 24 h to 500 h and may buy electricity from the markets and thereby charge the LODES system 1504 at times when the electricity is cheaper. The LODES system 1504 may then discharge to provide the C&I customer 1902 with electricity at times when the market price is expensive, therefore offsetting the market purchases of the C&I customer 1902. As an alternative configuration, rather than being situated between the grid 1508 and the C&I customer 1902, the power plant 1900 may be situated between a renewable source, such as a PV farm, wind farm, etc., and the transmission facilities 1506 may connect to the renewable source. In such an alternative example, the LODES system 1504 may have a duration of 24 h to 500 h, and the LODES system 1504 may charge at times when renewable output may be available. The LODES system 1504 may then discharge to provide the C&I customer 1902 with renewable generated electricity so as to cover a portion, or the entirety, of the C&I customer 1902 electricity needs.

Example 6A

The System of Example 6 where in the LODES system utilizes one or more of the storage systems of Examples 1, 1A, 1B, 1C, 1D, 1E, 1F, 1G, 1H, 1I, 1J, 1K, 1L, 1M, 1N, 1O, 1P, 1Q, and 1R.

Example 7

Figure 20:
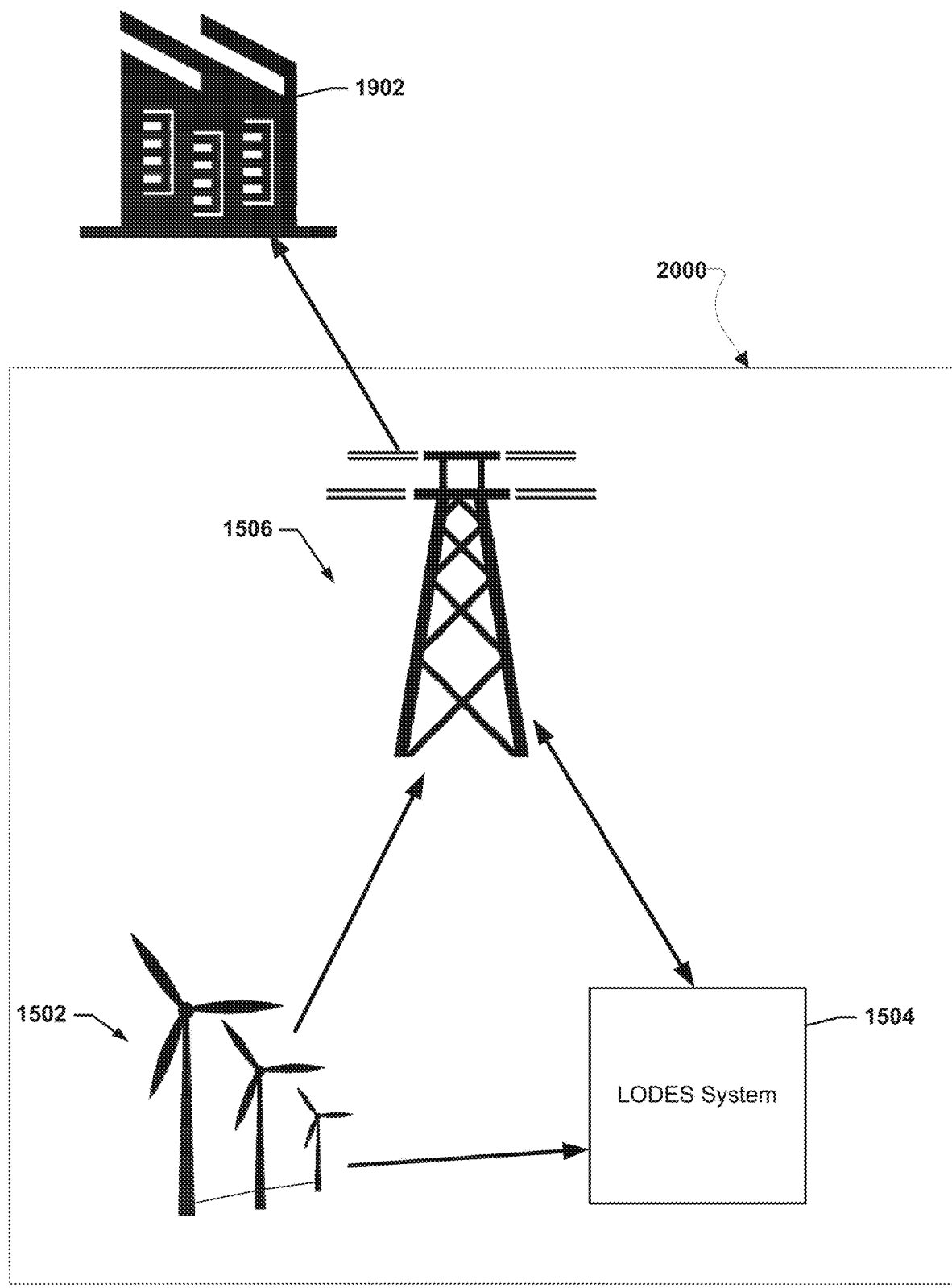

FIG. 20 illustrates an example system in which one or more aspects of the various embodiments may be used as part of bulk energy storage system. As a specific example, the bulk energy storage system incorporating one or more aspects of the various embodiments may be a LODES system 1504. As an example, the LODES system 1504 may include any of the various embodiment batteries and/or components described herein (e.g., any of batteries 100, 200, 400, 800, 814, 900, 1000, 1100, 1200, 1300, 1310, pellets 105, 115, 305, 198, 199, systems 850, etc.), singularly or in various combinations. The LODES system 1504 may be electrically connected to a wind farm 1502 and one or more transmission facilities 1506. The wind farm 1502 may be electrically connected to the transmission facilities 1506. The transmission facilities 1506 may be electrically connected to a C&I customer 1902. The wind farm 1502 may generate power and the wind farm 1502 may output generated power to the LODES system 1504 and/or the transmission facilities 1506. The LODES system 1504 may store power received from the wind farm 1502. The LODES system 1504 may output stored power to the transmission facilities 1506. The transmission facilities 1506 may output power received from one or both of the wind farm 1502 and LODES system 1504 to the C&I customer 1902. Together the wind farm 1502, the LODES system 1504, and the transmission facilities 1506 may constitute a power plant 2000 that may be a combined power generation, transmission, and storage system. The power generated by the wind farm 1502 may be directly fed to the C&I customer 1902 through the transmission facilities 1506, or may be first stored in the LODES system 1504. In certain cases the power supplied to the C&I customer 1902 may come entirely from the wind farm 1502, entirely from the LODES system 1504, or from a combination of the wind farm 1502 and the LODES system 1504. The LODES system 1504 may be used to reshape the electricity generated by the wind farm 1502 to match the consumption pattern of the C&I customer 1902. In one such example, the LODES system 1504 may have a duration of 24 h to 500 h and may charge when renewable generation by the wind farm 1502 exceeds the C&I customer 1902 load. The LODES system 1504 may then discharge when renewable generation by the wind farm 1502 falls short of C&I customer 1902 load so as to provide the C&I customer 1902 with a firm renewable profile that offsets a fraction, or all of, the C&I customer 1902 electrical consumption.

Example 7A

The System of Example 7 where in the LODES system utilizes one or more of the storage systems of Examples 1, 1A, 1B, 1C, 1D, 1E, 1F, 1G, 1H, 1I, 1J, 1K, 1L, 1M, 1N, 1O, 1P, 1Q, and 1R.

Example 8

Figure 21:
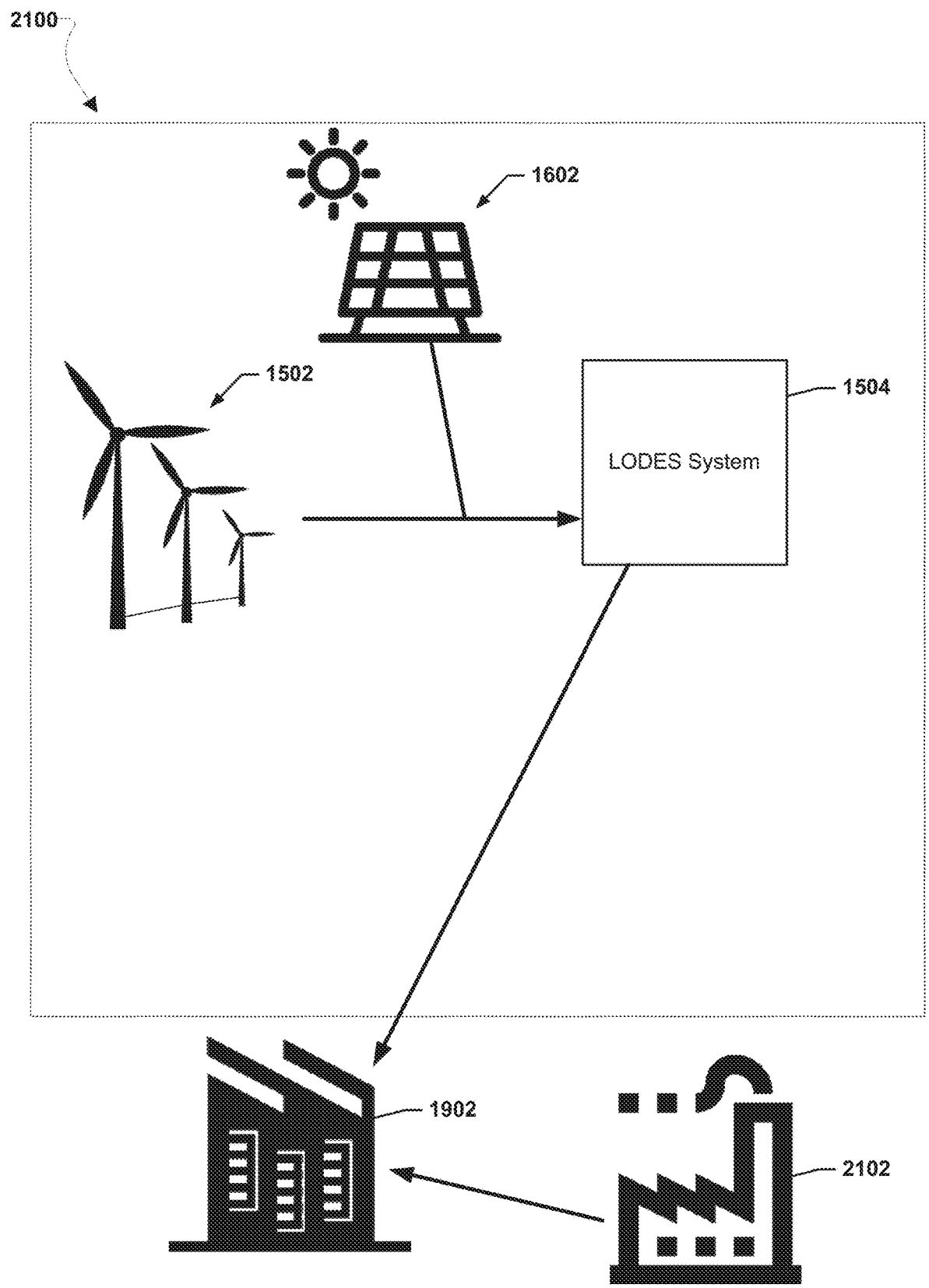

FIG. 21 illustrates an example system in which one or more aspects of the various embodiments may be used as part of bulk energy storage system. As a specific example, the bulk energy storage system incorporating one or more aspects of the various embodiments may be a LODES system 1504. As an example, the LODES system 1504 may include any of the various embodiment batteries and/or components described herein (e.g., any of batteries 100, 200, 400, 800, 814, 900, 1000, 1100, 1200, 1300, 1310, pellets 105, 115, 305, 198, 199, systems 850, etc.), singularly or in various combinations. The LODES system 1504 may be part of a power plant 2100 that is used to integrate large amounts of renewable generation in microgrids and harmonize the output of renewable generation by, for example a PV farm 1602 and wind farm 1502, with existing thermal generation by, for example a thermal power plant 2102 (e.g., a gas plant, a coal plant, a diesel generator set, etc., or a combination of thermal generation methods), while renewable generation and thermal generation supply the C&I customer 1902 load at high availability. Microgrids, such as the microgrid constituted by the power plant 2100 and the thermal power plant 2102, may provide availability that is 90% or higher. The power generated by the PV farm 1602 and/or the wind farm 1502 may be directly fed to the C&I customer 1902, or may be first stored in the LODES system 1504. In certain cases the power supplied to the C&I customer 1902 may come entirely from the PV farm 1602, entirely from the wind farm 1502, entirely from the LODES system 1504, entirely from the thermal power plant 2102, or from any combination of the PV farm 1602, the wind farm 1502, the LODES system 1504, and/or the thermal power plant 2102. As examples, the LODES system 1502 of the power plant 2100 may have a duration of 24 h to 500 h. As a specific example, the C&I customer 1902 load may have a peak of 100 MW, the LODES system 1504 may have a power rating of 14 MW and duration of 150 h, natural gas may cost $6/million British thermal units (MMBTU), and the renewable penetration may be 58%. As another specific example, the C&I customer 1902 load may have a peak of 100 MW, the LODES system 1504 may have a power rating of 25 MW and duration of 150 h, natural gas may cost $8/MMBTU, and the renewable penetration may be 65%.

Example 8A

The System of Example 8 where in the LODES system utilizes one or more of the storage systems of Examples 1, 1A, 1B, 1C, 1D, 1E, 1F, 1G, 1H, 1I, 1J, 1K, 1L, 1M, 1N, 1O, 1P, 1Q, and 1R.

Example 9

Figure 22:
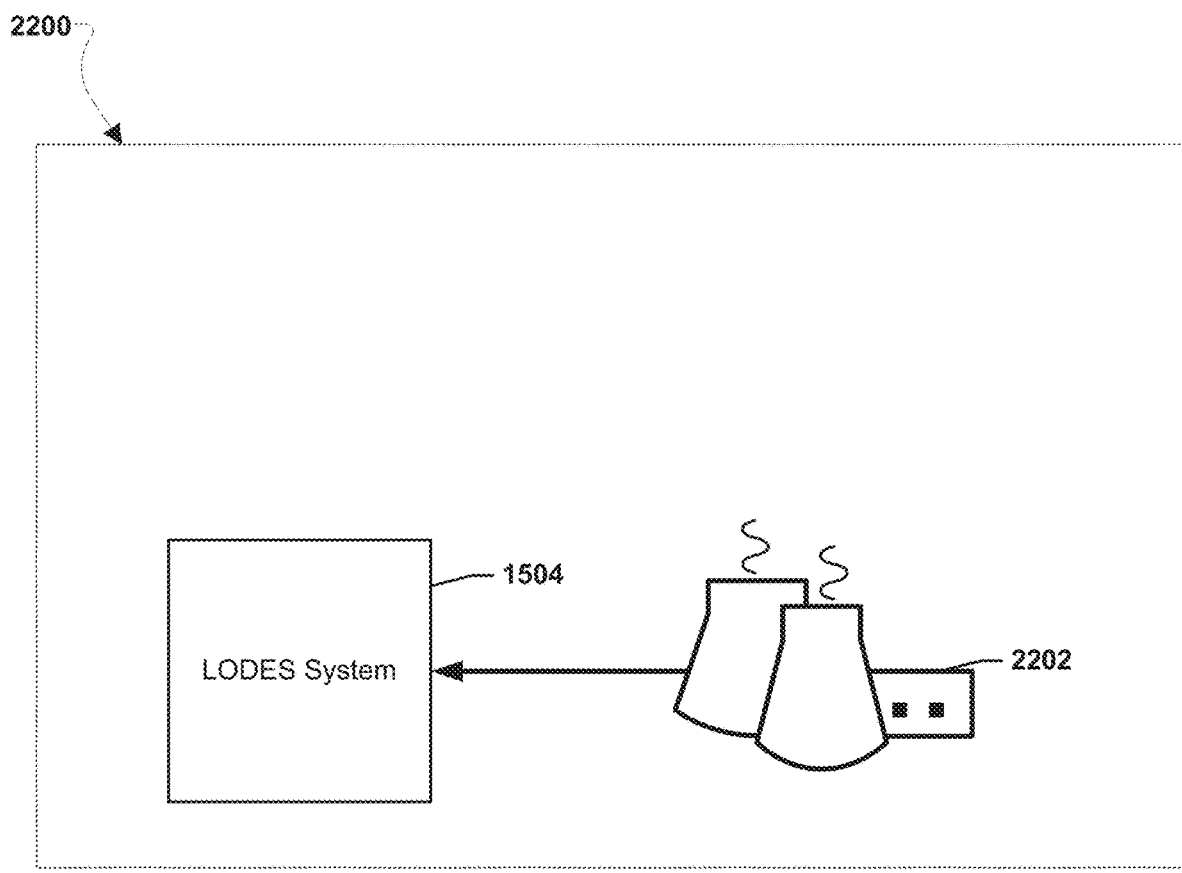

FIG. 22 illustrates an example system in which one or more aspects of the various embodiments may be used as part of bulk energy storage system. As a specific example, the bulk energy storage system incorporating one or more aspects of the various embodiments may be a LODES system 1504. As an example, the LODES system 1504 may include any of the various embodiment batteries and/or components described herein (e.g., any of batteries 100, 200, 400, 800, 814, 900, 1000, 1100, 1200, 1300, 1310, pellets 105, 115, 305, 198, 199, systems 850, etc.), singularly or in various combinations. The LODES system 1504 may be used to augment a nuclear plant 2202 (or other inflexible generation facility, such as a thermal, a biomass, etc., and/or any other type plant having a ramp-rate lower than 50% of rated power in one hour and a high capacity factor of 80% or higher) to add flexibility to the combined output of the power plant 2200 constituted by the combined LODES system 1504 and nuclear plant 2202. The nuclear plant 2202 may operate at high capacity factor and at the highest efficiency point, while the LODES system 1504 may charge and discharge to effectively reshape the output of the nuclear plant 2202 to match a customer electrical consumption and/or a market price of electricity. As examples, the LODES system 1502 of the power plant 2200 may have a duration of 24 h to 500 h. In one specific example, the nuclear plant 2202 may have 1,000 MW of rated output and the nuclear plant 2202 may be forced into prolonged periods of minimum stable generation or even shutdowns because of depressed market pricing of electricity. The LODES system 1502 may avoid facility shutdowns and charge at times of depressed market pricing; and the LODES system 1502 may subsequently discharge and boost total output generation at times of inflated market pricing.

Example 9A

The System of Example 9 where in the LODES system utilizes one or more of the storage systems of Examples 1, 1A, 1B, 1C, 1D, 1E, 1F, 1G, 1H, 1I, 1J, 1K, 1L, 1M, 1N, 1O, 1P, 1Q, and 1R.

Example 10

Figure 23:
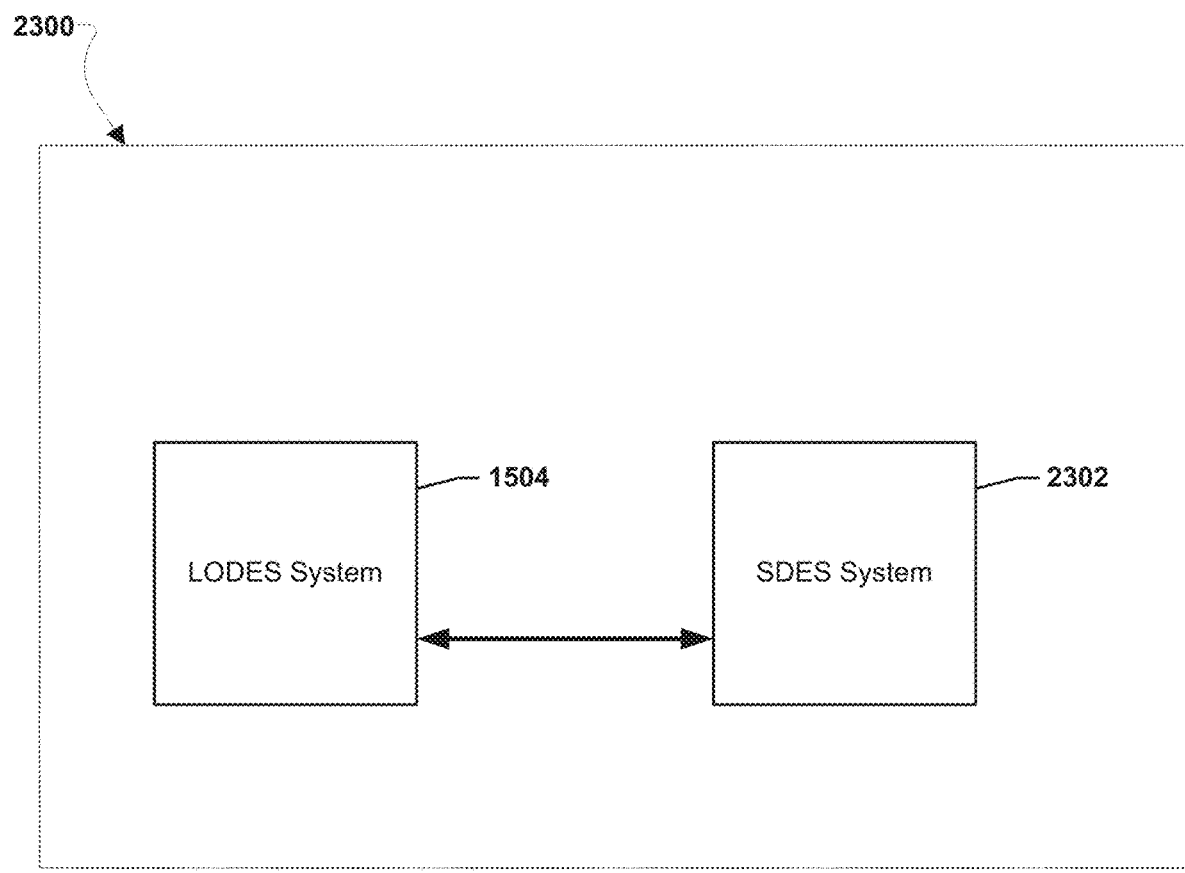

FIG. 23 illustrates an example system in which one or more aspects of the various embodiments may be used as part of bulk energy storage system. As a specific example, the bulk energy storage system incorporating one or more aspects of the various embodiments may be a LODES system 1504. As an example, the LODES system 1504 may include any of the various embodiment batteries and/or components described herein (e.g., any of batteries 100, 200, 400, 800, 814, 900, 1000, 1100, 1200, 1300, 1310, pellets 105, 115, 305, 198, 199, systems 850, etc.), singularly or in various combinations. The LODES system 1504 may operate in tandem with a SDES system 2302. Together the LODES system 1504 and SDES system 2302 may constitute a power plant 2300. As an example, the LODES system 1504 and SDES system 2302 may be co-optimized whereby the LODES system 1504 may provide various services, including long-duration back-up and/or bridging through multi-day fluctuations (e.g., multi-day fluctuations in market pricing, renewable generation, electrical consumption, etc.), and the SDES system 2302 may provide various services, including fast ancillary services (e.g. voltage control, frequency regulation, etc.) and/or bridging through intra-day fluctuations (e.g., intra-day fluctuations in market pricing, renewable generation, electrical consumption, etc.). The SDES system 2302 may have durations of less than 10 hours and round-trip efficiencies of greater than 80%. The LODES system 1504 may have durations of 24 h to 500 h and round-trip efficiencies of greater than 40%. In one such example, the LODES system 1504 may have a duration of 150 hours and support customer electrical consumption for up to a week of renewable under-generation. The LODES system 1504 may also support customer electrical consumption during intra-day under-generation events, augmenting the capabilities of the SDES system 2302. Further, the SDES system 2302 may supply customers during intra-day under-generation events and provide power conditioning and quality services such as voltage control and frequency regulation.

Example 10A

The System of Example 10 where in the LODES system utilizes one or more of the storage systems of Examples 1, 1A, 1B, 1C, 1D, 1E, 1F, 1G, 1H, 1I, 1J, 1K, 1L, 1M, 1N, 1O, 1P, 1Q, and 1R.

Example 11

Figure 24A:
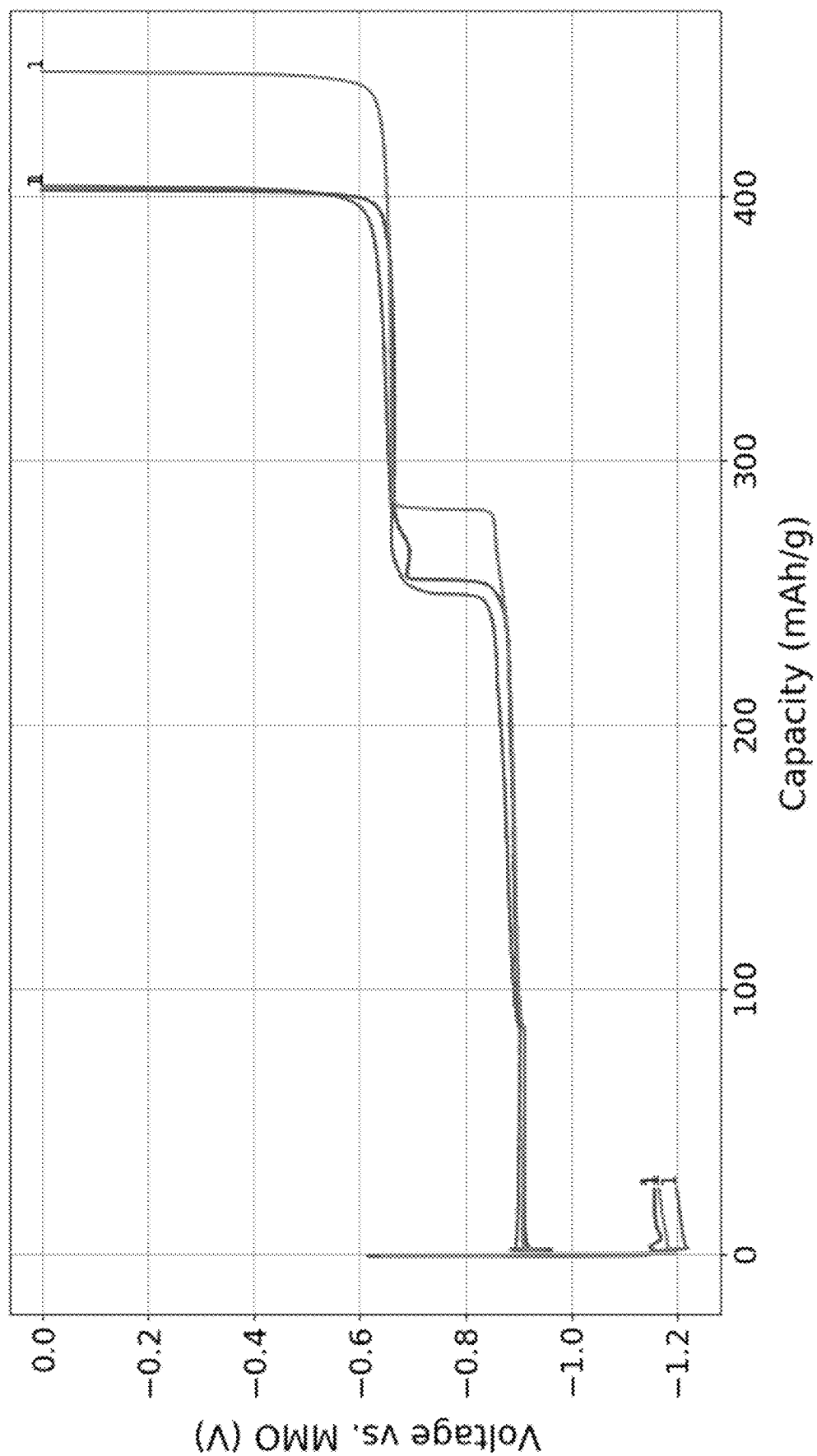
FIGS. 24A-24D are graphs illustrating DRI electrode first cycle discharge specific capacity ($mAh/g_{DRI}$), discharge vs cycle number, coulombic efficiency, and a subsequent cycle discharge specific capacity ($mAh/g_{DRI}$), respectively.

A non-limiting example according to embodiments of the invention was built and tested. An electrochemical cell using a direct reduced iron (DRI) pellet was assembled and tested. The DRI pellet had properties as outlined in Table 4 as characterized according to the methods previously described. The electrochemical cell was a beaker-type cell with three electrodes (Working, Counter, and Reference) and was flooded with liquid electrolyte. The electrolyte formulation was 5.5M KOH+0.5M LiOH+10 mM $Na_2S$. The counter electrode was a NiO/NiOOH electrode harvested from a commercial Fe/Ni (Edison-type) cell. The reference electrode was a Hg/HgO (MMO) electrode, filled with 5.5 M KOH+0.5 M LiOH solution. A stainless steel hose clamp was used to make electrical contact to the DRI pellet. FIG. 24A shows the voltage of the DRI electrode vs. a MMO reference as a function of discharge specific capacity (mAh/$g_{DRI}$) during the first electrochemical discharge cycle (oxidation of the DRI) when cycling at a 5 mA/g specific current.

TABLE 4

| Shape of pellets | spheres |
|---|---|
| Pellets having total Fe (wt %) | 88.6 |
| Pellets having $SiO_2$ (wt %) | 6.1 |
| Pellets having $Al_2O_3$ (wt %) | 0.2 |
| Pellets having MgO (wt %) | 0.4 |
| Pellets having CaO (wt %) | 0.5 |
| Pellets having $TiO_2$ (wt %) | 0.01 |
| Pellets having $Fe_2C$ (wt %) | 0.2 |
| Metallization (%) | 89.4 |
| Bulk density of the electrode (g/cc) | 2.45 |
| Apparent density of the pellets (g/cc) | 6.35 |
| Actual density of the pellets (g/cc) | 6.54 |
| Minimum $d_{pore,\ 90\%\ volume}$ of the pellets (microns) | 2.72 |
| Minimum $d_{pore,\ 50\%\ surface\ area}$ of the pellets (microns) | 5 |
| Specific surface area of the pellets ($m^2/g$) | 0.22 |

Example 12

Figure 24B:
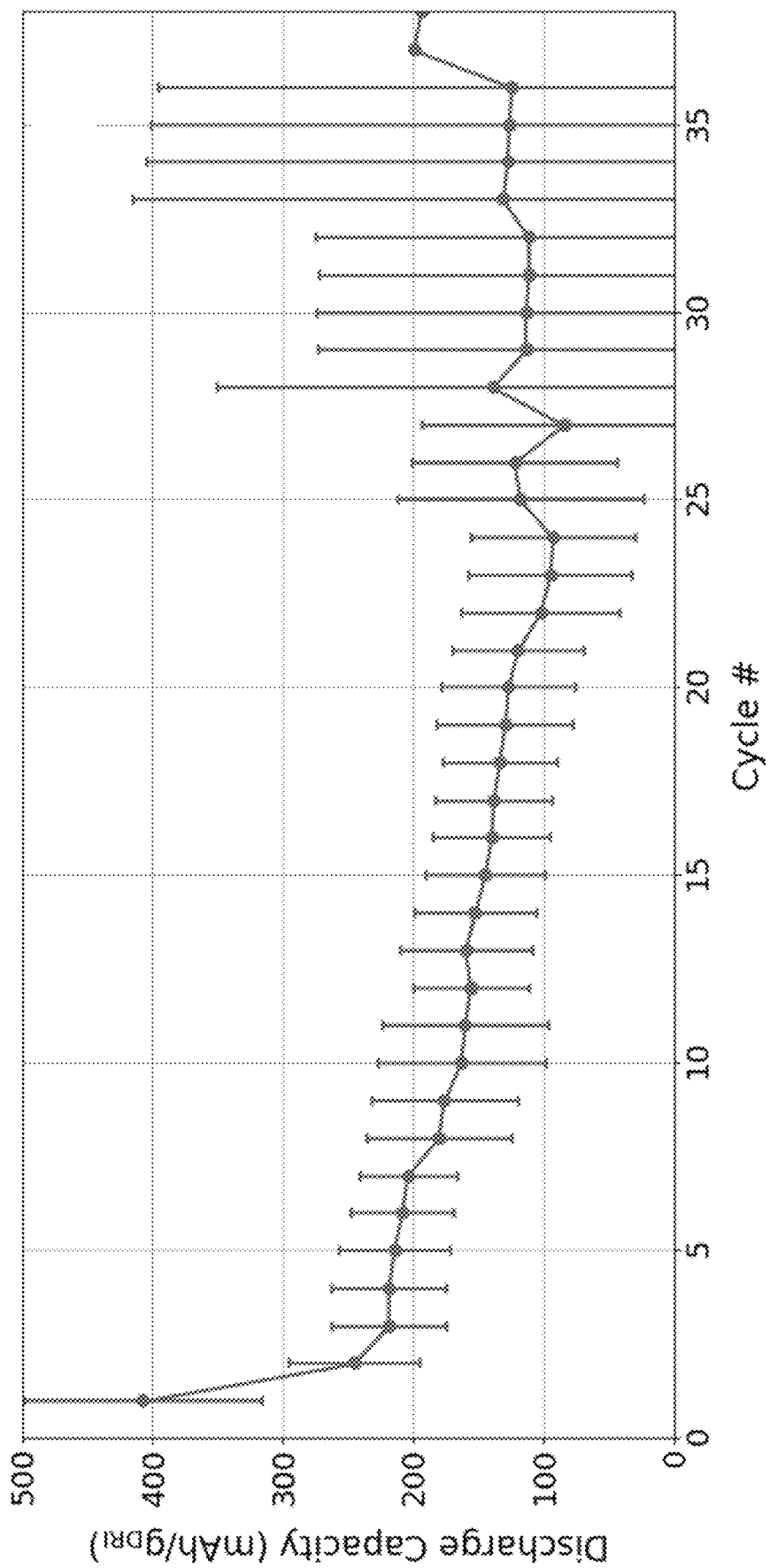
Figure 24C:
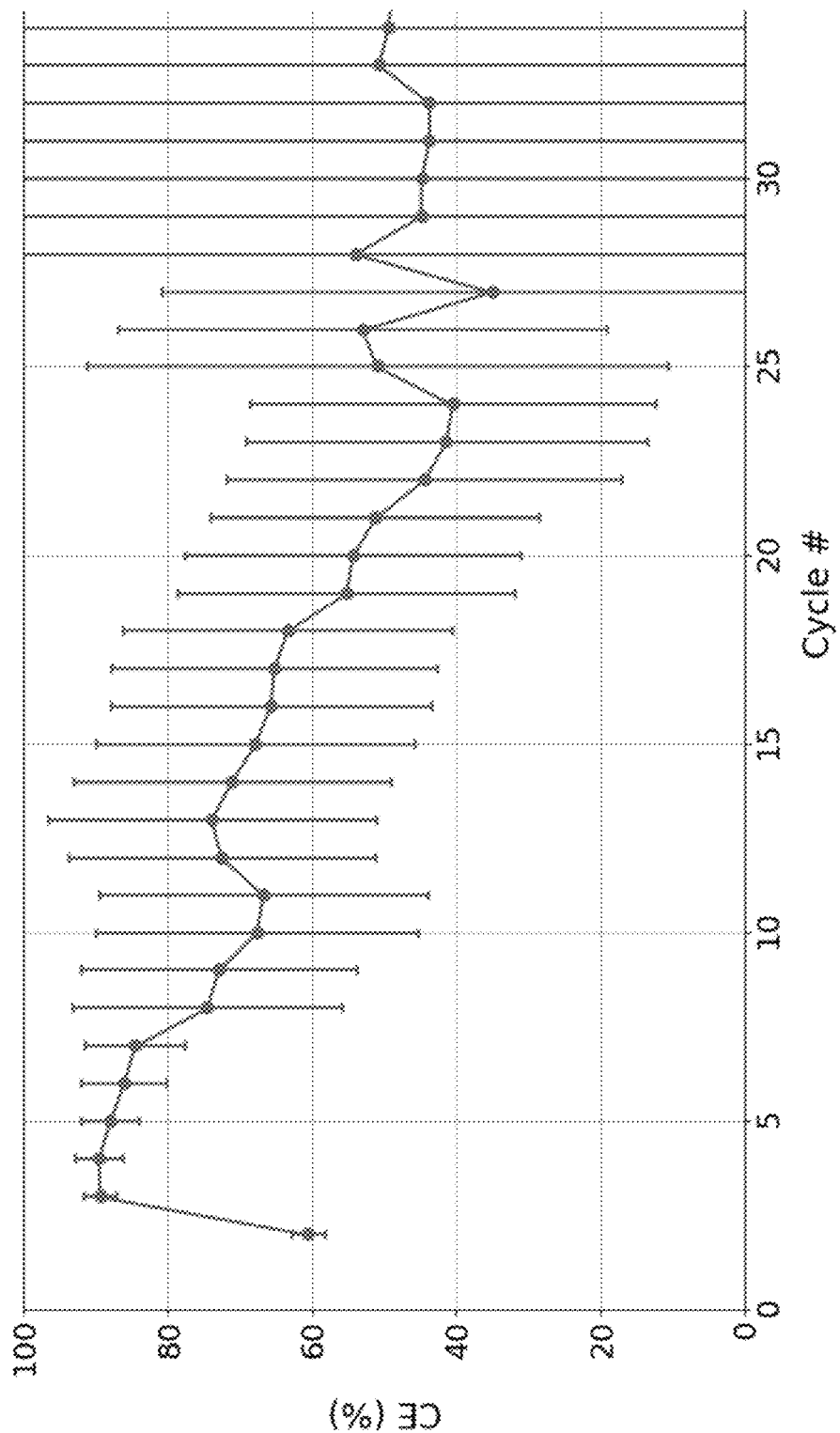

Another non-limiting example according to embodiments of the invention was built and tested. A family of ten (10) electrochemical cells using a direct reduced iron (DRI) pellets were assembled and tested. The DRI pellets had properties as outlined in Table 4 as characterized according to the methods previously described. The electrochemical cells were beaker-type cells with three electrodes (Working, Counter, and Reference) and the cells were flooded with liquid electrolyte. The electrolyte formulation was 5.5 M KOH+0.5 M LiOH+10 mM $Na_2S$. The counter electrode was a NiO/NiOOH electrode harvested from a commercial Fe/Ni (Edison-type) cell. The reference electrode was a Hg/HgO (MMO) electrode, filled with 5.5 M KOH+0.5 M LiOH solution. Stainless steel hose clamps were used to make electrical contact to the DRI pellets. The DRI was electrochemically cycled according to the following conditions: 1) Precharge at 25 mA/g specific current for 60 minutes; 2) Discharge at 25 mA/g specific current to 0 voltage vs. MMO; 3) Charge at 25 mA/g specific current, terminating under a coulombic limitation, with a total charge equal to the first discharge capacity in mAh. FIG. 24B shows the specific capacity of the DRI electrode (mAh/$g_{DRI}$) vs. cycle number for the family of cells. The mean capacity across all cells is plotted, along with error bars representing 95% confidence intervals. FIG. 24C shows the coulombic efficiency (CE) of the same DRI cells.

Example 13

Figure 24D:
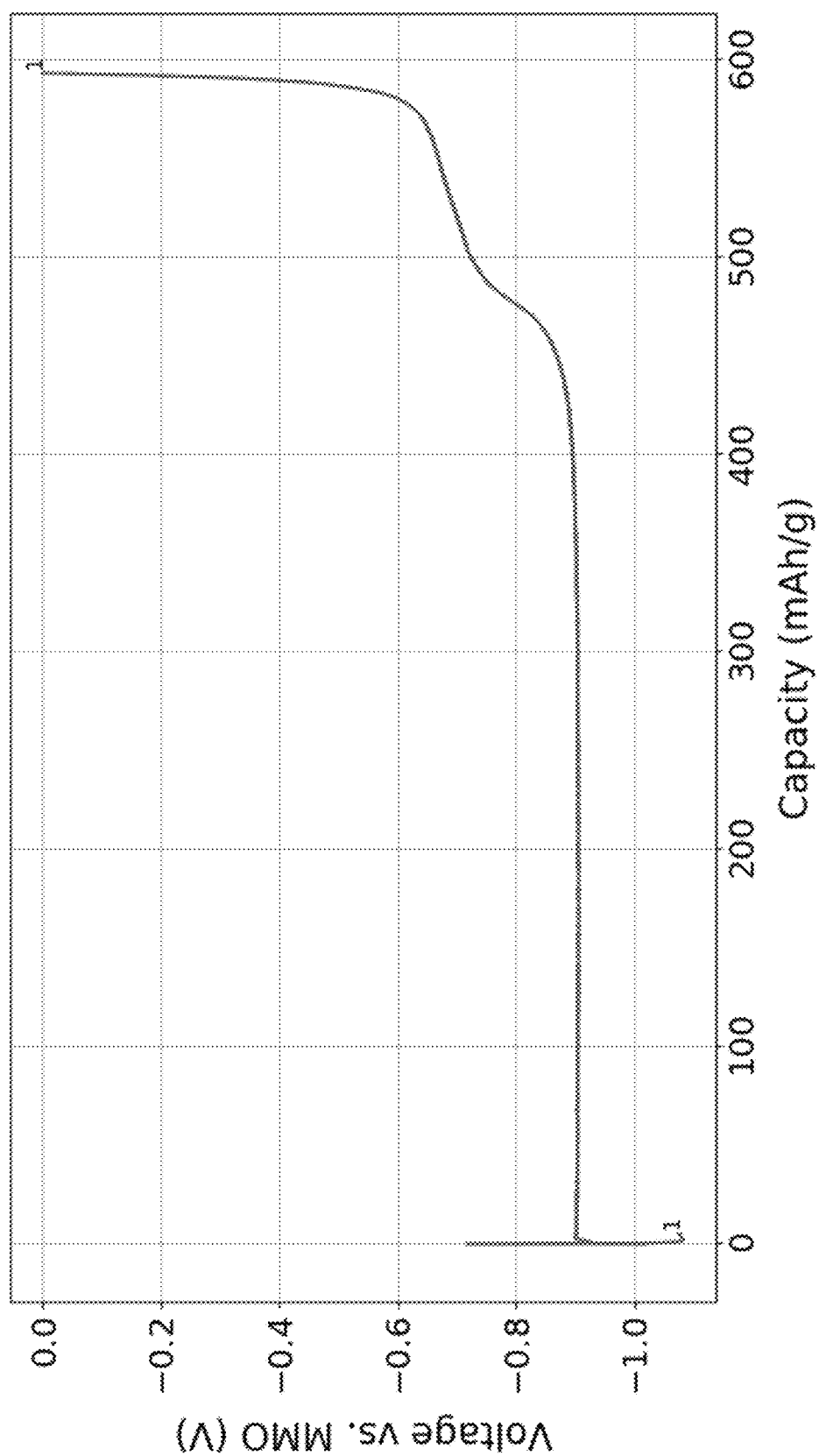

In another non-limiting example, a bed of spherical DRI pellets was tested in beaker-type cell. The DRI pellet had properties as outlined in Table 4 as characterized according to the methods previously described. The pellet bed had a mass of 251.86 g. The electrolyte formulation was 5.5 M KOH+0.5 M LiOH+60 mM $Na_2S$, and the volume of electrolyte used was 348 mL. The counter electrode was a stainless steel mesh (100×100 mesh). A Hg/HgO (MMO) reference electrode with a 5.5 M KOH+0.5 M LiOH fill solution was employed to measure anode potentials. A stainless steel perforated plate was used as a current collector for the DRI pellet bed, and a stainless steel slab was used as the counter electrode current collector. The cell utilized a 5 mA/g specific current for both charging and discharging. FIG. 24D shows the voltage of the DRI electrode vs. a MMO reference as a function of discharge specific capacity (mAh/$g_{DRI}$).

The foregoing method descriptions are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not necessarily intended to limit the order of the steps; these words may be used to guide the reader through the description of the methods. Further, any reference to claim elements in the singular, for example, using the articles "a," "an" or "the" is not to be construed as limiting the element to the singular. Further, any step of any embodiment described herein can be used in any other embodiment.

The preceding description of the disclosed aspects is provided to enable any person skilled in the art to make or use the present invention. Various modifications to these aspects will be readily apparent to those skilled in the art, and the generic principles defined herein may be applied to other aspects without departing from the scope of the invention. Thus, the present invention is not intended to be limited to the aspects shown herein but is to be accorded the widest scope consistent with the principles and novel features disclosed herein.

What is claimed is:
1. A battery, comprising:
   a first electrode;
   an electrolyte;
   a second electrode, wherein one or both of the first electrode and the second electrode comprises direct reduced iron ("DRI"), wherein the DRI is in the form of pellets, and wherein the pellets have an average length ranging from about 10 mm to about 500 mm, an average width ranging from about 5 mm to about 250 mm, and an average height ranging from about 5 mm to about 200 mm; and
   a current collector electrically connected to the pellets.
2. The battery of claim 1, wherein the pellets comprise at least about 60 wt % iron by elemental mass, based on the total mass of the pellets.

3. The battery of claim 1, wherein the pellets comprise between about 90 wt % and about 98 wt % metallic iron, based on the total mass of the pellets.

4. The battery of claim 1, wherein the pellets are spherical, rod-shaped, disk-shaped, plate shaped, briquette-shaped, or a combination thereof.

5. The battery of claim 4, wherein the pellets comprise hot briquetted iron formed from powdered iron fines or iron pellets.

6. The battery of claim 1, wherein the DRI comprises iron ore, direct reduced grade iron ore, reduced taconite, wustite, magnetite, hematite, cementite, iron oxide, or any combination thereof.

7. The battery of claim 1, wherein the DRI comprises DRI fines or powder.

8. The battery of claim 1, wherein the pellets have an average internal porosity ranging from about 10% to about 90% by volume.

9. The battery of claim 1, wherein the pellets have an average specific surface area ranging from about 0.19 $m^2/g$ to about 18 $m^2/g$.

10. The battery of claim 1, wherein the pellets have a volume weighted mean pore size ranging from 1 to 10 microns.

11. The battery of claim 1, wherein at least one of the first electrode and the second electrode has a thickness of greater than 0.1 cm.

12. The battery of claim 1, wherein the pellets are spherical and have an average diameter ranging from about 0.5 mm to about 10 cm.

13. The battery of claim 1, wherein the pellets comprise greater than 0.5 wt % percent silica containing compounds, based on the total weight of the pellets.

14. The battery of claim 1, wherein the pellets comprise from about 1 wt % to about 5 wt % silica containing compounds by elemental mass, based on the total mass of the pellets.

15. The battery of claim 1, wherein the pellets comprise from about 1 wt % to about 25 wt % silica containing compounds by elemental mass, based on the total mass of the pellets.

16. The battery of claim 1, wherein a packing fraction of the pellets in at least one of the first electrode and the second electrode is between 30% and 74%.

17. The battery of claim 1, wherein the pellets comprise:
a primary phase comprising iron; and
a secondary phase comprising silicon or another metal.

18. The battery of claim 1, wherein the pellets comprise:
a primary phase comprising iron; and
a secondary phase comprising cementite.

19. The battery of claim 18, wherein the secondary phase comprises silica or a silicate.

20. The battery of claim 18, wherein the secondary phase comprises titanium, vanadium, manganese, magnesium, calcium, phosphorus, carbon, aluminum, zirconium, or any combinations thereof.

21. The battery of claim 1, wherein the electrolyte is infiltrated between the pellets.

22. The battery of claim 1, wherein the current collector contacts a lower surface of at least one of the first electrode and the second electrode, side surfaces of at least one of at least one of the first electrode and the second electrode, extends through at least one of the first electrode and the second electrode, or any combination thereof.

23. The battery of claim 1, wherein the second electrode further comprises a slurry or a gel.

24. The battery of claim 1, wherein at least one of the first electrode and the second electrode is a composite metal electrode comprising a mixture of the pellets and a smaller metal particle composition.

25. The battery of claim 24, wherein the smaller metal particle composition is a powdered metal feedstock.

26. The battery of claim 25, wherein powdered metal feedstock is wetted by the electrolyte.

27. The battery of claim 24, wherein the smaller metal particle composition comprises DRI fines, sponge iron, atomized iron, or any combination thereof.

28. The battery of claim 27, wherein the pellets comprise DR taconite.

29. The battery of claim 1, wherein:
the pellets are packed in a bed such that macro-pores are created between two or more pellets in contact with one another; and
the pellets each include micro-pores in their respective outer surfaces.

30. The battery of claim 29, wherein the pellets are fused together.

31. The battery of claim 1, wherein the pellets are pre-processed chemically, mechanically, thermally, electrically, and/or electrochemically to fuse at least a portion of the pellets into a packed bed.

32. The battery of claim 1, wherein the pellets each include micro-pores in their respective outer surfaces.

33. The battery of claim 1, wherein the pellets are initially comprised of at least a portion of cementite ($Fe_3C$) before operation of the battery.

34. The battery of claim 1, wherein at least one of the first electrode and the second electrode further comprises a layer of powdered iron configured to form an interface between the pellets and a current collector of the battery.

35. The battery of claim 1, further comprising a monitoring system configured to monitor the state-of-charge (SOC) and/or state-of-health of at least one of the first electrode and the second electrode.

36. The battery of claim 35, wherein the monitoring system comprises one or more sensor and the one or more sensor is selected from the group consisting of a strain gauge, a Mossbauer spectrometer, a CCD detector, an ultrasonic transducer, an ion sensing electrode, a thermocouple, and a gas sensor.

37. The battery of claim 1, wherein at least one of the first electrode and the second electrode is a composite metal electrode comprising a mixture of the pellets and a conductive material dispersed between individual ones of the pellets.

38. The battery of claim 1, further comprising an additive delivery system configured to add one or more additives to the electrolyte.

39. The battery of claim 38, wherein the one or more additives include a salt.

40. The battery of claim 39, wherein the salt is a carbonate salt or polysulfide salt.

41. The battery of claim 38, wherein the one or more additives include a sulfur-based additive.

42. The battery of claim 38, wherein the one or more additives include a surfactant additive.

43. The battery of claim 38, wherein the one or more additives are configured to mitigate self-discharge and/or suppress the Hydrogen Evolution Reaction.

44. The battery of claim 1, wherein at least one of the first electrode and the second electrode is under compressive force.

45. The battery of claim 1, wherein at least one of the first electrode and the second electrode comprises additional conductive material.

46. The battery of claim 45, wherein the additional conductive material surrounds the iron-containing pellets.

47. The battery of claim 45, wherein the additional conductive material is a foil, sheet, screen, or wire.

48. A bulk energy storage system, comprising:
one or more batteries, wherein at least one of the one or more batteries comprises:
a first electrode;
an electrolyte;
a second electrode, wherein one or both of the first electrode and the second electrode comprises direct reduced iron ("DRI"), wherein the DRI is in the form of pellets, and wherein the pellets have an average length ranging from about 10 mm to about 500 mm, an average width ranging from about 5 mm to about 250 mm, and an average height ranging from about 5 mm to about 200 mm; and
a current collector electrically connected to the pellets.

49. The bulk energy storage system of claim 48, wherein at least one of the first electrode and the second electrode is a negative electrode.

50. The bulk energy storage system of claim 49, wherein at least one of the first electrode and the second electrode further comprises additive pellets.

51. The bulk energy storage system of claim 50, wherein the additive pellets are comprised of FeS, $FeS_2$, $Na_2S$, $Bi_2O_3$, a metal sulfide, or combinations thereof.

52. The bulk energy storage system of claim 48, wherein the pellets are sintered iron pellets comprised of crushed DRI precursors and/or DRI fines.

53. The bulk energy storage system of claim 48, wherein the pellets are mechanically, chemically, and/or thermally pre-processed before installation in at least one of the first electrode and the second electrode.

54. The bulk energy storage system of claim 48, wherein the pellets comprise at least about 60 wt % metallic iron based on the total mass of the pellets and the pellets comprise at least 60 percent of the total mass of at least one of the first electrode and the second electrode.

55. The bulk energy storage system of claim 54, wherein the bulk energy storage system is a long duration energy storage (LODES) system.

56. The bulk energy storage system of claim 53, wherein the pre-processing includes pre-charging the pellets.

* * * * *